US012628856B2

(12) United States Patent
Johns et al.

(10) Patent No.: US 12,628,856 B2

(45) Date of Patent: May 19, 2026

(54) NUTRITIONAL COMPOSITION HAVING LIPOPHILIC COMPOUNDS WITH IMPROVED SOLUBILITY AND BIOAVAILABILITY

(71) Applicant: Abbott Laboratories, Abbott Park, IL (US)

(72) Inventors: Paul Johns, Columbus, OH (US); Mustafa Vurma, Dublin, OH (US); Daniel Albrecht, Columbus, OH (US); Stephen DeMichele, Dublin, OH (US); Gary Katz, Columbus, OH (US); Todime Reddy, New Albany, OH (US)

(73) Assignee: ABBOTT LABORATORIES, Abbott Park, IL (US)

( * ) Notice: Subject to any disclaimer, the term of this patent is extended or adjusted under 35 U.S.C. 154(b) by 0 days.

(21) Appl. No.: 17/964,609

(22) Filed: Oct. 12, 2022

(65) Prior Publication Data

US 2023/0114071 A1 Apr. 13, 2023

Related U.S. Application Data

(63) Continuation of application No. 14/915,552, filed as application No. PCT/US2014/053230 on Aug. 28, 2014, now abandoned.

(Continued)

(51) Int. Cl.

*A23L 33/115* (2016.01)
*A23C 9/152* (2006.01)

(Continued)

(52) U.S. Cl.

CPC .......... *A23L 33/115* (2016.08); *A23C 9/1526* (2013.01); *A23C 9/1528* (2013.01);

(Continued)

(58) Field of Classification Search

CPC .................................................... A23L 33/115

See application file for complete search history.

(56) References Cited

U.S. PATENT DOCUMENTS

| | | |
|---|---|---|
| 3,278,310 A | 10/1966 | Williams et al. |
| 4,262,017 A | 4/1981 | Kuipers et al. |

(Continued)

FOREIGN PATENT DOCUMENTS

| | | |
|---|---|---|
| CN | 1181194 A | 5/1998 |
| CN | 1440240 A | 9/2003 |

(Continued)

OTHER PUBLICATIONS

Office Action from Canadian Application No. 2,922,351 dated Apr. 10, 2017.

(Continued)

*Primary Examiner* — Elizabeth Gwartney

(74) *Attorney, Agent, or Firm* — McAndrews, Held & Malloy, Ltd.

(57) ABSTRACT

Disclosed herein is a nutritional composition having at least one protein, at least one fat, and at least one lipophilic compound, the composition comprising at least one assembly comprising at least one hydrophobic protein, monoglycerides and diglycerides ("MDG") and at least one lipophilic compound, wherein at least 1% of the total MDG in the nutritional composition remains in the aqueous phase after centrifugation at 100,000×g for 1 hour at 20° C.

21 Claims, 24 Drawing Sheets

Hourly Lymph Flow Rate over 6 hours

Related U.S. Application Data

(60) Provisional application No. 62/007,037, filed on Jun. 3, 2014, provisional application No. 61/949,505, filed on Mar. 7, 2014, provisional application No. 61/920,675, filed on Dec. 24, 2013, provisional application No. 61/920,657, filed on Dec. 24, 2013, provisional application No. 61/920,669, filed on Dec. 24, 2013, provisional application No. 61/920,666, filed on Dec. 24, 2013, provisional application No. 61/901,207, filed on Nov. 7, 2013, provisional application No. 61/871,719, filed on Aug. 29, 2013.

(51) Int. Cl.

| | |
|---|---|
| ***A23L 33/00*** | (2016.01) |
| ***A23L 33/15*** | (2016.01) |
| ***A23L 33/155*** | (2016.01) |
| ***A23L 33/17*** | (2016.01) |
| ***A23L 33/19*** | (2016.01) |

(52) U.S. Cl.

CPC ............ *A23L 33/15* (2016.08); *A23L 33/155* (2016.08); *A23L 33/17* (2016.08); *A23L 33/19* (2016.08); *A23L 33/40* (2016.08)

(56) References Cited

U.S. PATENT DOCUMENTS

| | | | |
|---|---|---|---|
| 4,519,961 | A | 5/1985 | Schumacher et al. |
| 6,677,327 | B1 | 1/2004 | Gottemoller |
| 2004/0013708 | A1 | 1/2004 | Goulson |
| 2004/0214791 | A1 | 10/2004 | Auestad et al. |
| 2005/0191343 | A1 | 9/2005 | Liang |
| 2005/0208179 | A1 | 9/2005 | Albrecht et al. |
| 2007/0054028 | A1 | 3/2007 | Perlman et al. |
| 2007/0098849 | A1 | 5/2007 | Barrett-Reis |
| 2008/0003330 | A1* | 1/2008 | Rueda .................. A61K 31/202 426/72 |
| 2011/0014288 | A1 | 1/2011 | Hansen |
| 2012/0282368 | A1 | 11/2012 | Perlman |
| 2014/0323574 | A1 | 10/2014 | Yao et al. |
| 2015/0031628 | A1 | 1/2015 | Spilburg |
| 2015/0136638 | A1 | 5/2015 | Eymard et al. |
| 2015/0237902 | A1 | 8/2015 | Rosado Loria et al. |
| 2015/0245644 | A1 | 9/2015 | Rosado Loria et al. |
| 2016/0015068 | A1 | 1/2016 | Ao et al. |
| 2016/0249665 | A1 | 9/2016 | Schulman et al. |

FOREIGN PATENT DOCUMENTS

| | | | |
|---|---|---|---|
| CN | 101888788 | A | 11/2010 |
| CN | 102892304 | A | 1/2013 |
| CN | 101198261 | B | 5/2013 |
| CN | 103200830 | A | 7/2013 |
| EP | 1062873 | A1 | 12/2000 |
| WO | 2004026294 | A1 | 4/2004 |
| WO | 2006114791 | A1 | 11/2006 |
| WO | 2010114627 | A1 | 10/2010 |
| WO | 2011008097 | A1 | 1/2011 |
| WO | 2013003529 | A1 | 1/2013 |
| WO | 2013068879 | A2 | 5/2013 |
| WO | 2015031637 | | 3/2015 |
| WO | 2015031657 | | 3/2015 |
| WO | 2015069974 | A1 | 5/2015 |
| WO | 2015084532 | A1 | 6/2015 |
| WO | 2016010664 | A1 | 1/2016 |
| WO | 2016097220 | A1 | 6/2016 |
| WO | 2016097221 | A1 | 6/2016 |
| WO | 2016101891 | A1 | 6/2016 |

OTHER PUBLICATIONS

Office Action from Canadian Application No. 2,922,351 dated Jan. 30, 2018.

Office Action from Canadian Application No. 2,993,228 dated Feb. 8, 2019.

Office Action from Canadian Application No. 2,993,228 dated Oct. 8, 2019.

First Office Action from Chinese Application No. 201480053008.2 dated Feb. 27, 2017.

Second Office Action from Chinese Application No. 201480053008.2 dated Dec. 5, 2017.

Third Office Action from CN 201480053008.2 dated Jun. 11, 2018.

English Translation Decision on Rejection from CN 201480053008.2 dated Nov. 1, 2018.

English Translation of Notice of Reexamination from CN 201480053008.2 dated Sep. 23, 2020.

Office Action from CN 201480053008.2 dated Apr. 1, 2021 with English Translation.

First Office Action from Chinese Application No. 201480053945.8 dated Mar. 14, 2017.

Second Office Action from Chinese Application No. 201480053945.8 dated Nov. 27, 2017.

Third Office Action from Chinese Application No. 201480053945.8 dated May 15, 2018.

English Translation of Decision on Rejection from Chinese Application No. 201680043239.4 dated Feb. 7, 2021.

Notification to Grant Patent Right for Invention from Chinese Application No. 201480053945.8 dated Oct. 19, 2018.

Office Action from Chinese Application No. 201680043239.4 date Jun. 11, 2020.

Office Action from Israeli Patent Application No. 24410 dated Nov. 13, 2017.

International Preliminary Report on Patentability from PCT Application No. PCT/US2014/053230 dated Mar. 1, 2016.

Communication Pursuant to Article 94(3) EPC from European Application No. 14761548.8 dated Oct. 31, 2017.

Communication Pursuant to Article 94(3) EPC from European Application No. 14761548.8 dated Jul. 6, 2018.

Communication pursuant to Article 94(3) EPC from European Application No. 14761548.8 dated Oct. 18, 2018.

Notice of Opposition from European Application No. 14761548.8 dated Aug. 13, 2020.

Communication Pursuant to Article 94(3) EPC from European Application No. 14762193.2 dated Oct. 30, 2017.

Communication Pursuant to Article 94(3) EPC from European Application No. 14762193.2 dated Jul. 6, 2018.

Communication Under Rule 71(3) EPC from European Application No. 14762193.2 dated Oct. 8, 2018.

Office Action from Israeli Application No. 244064 dated May 7, 2018.

Office Action from Israeli Application No. 256788 dated Sep. 9, 2020.

Exam Report from Malaysian Application No. PI 2016700637 dated Feb. 7, 2020.

Office Action from Mexican Patent Application No. MX/a/2016/002572 dated Sep. 25, 2019.

Office Action from Mexican Patent Application No. MX/a/2016/002573 dated Oct. 22, 2019.

Office Action from Mexican Patent Application No. MX/a/2016/002573 dated Jul. 15, 2020.

Further Examination Report Postponed Acceptance from New Zealand Application No. 738834 dated Apr. 18, 2019.

Patent Examination Report 1 from New Zealand Application No. 716779 dated Oct. 12, 2020.

Patent Examination Report 2 from from New Zealand Application No. 716779 dated May 6, 2021.

Patent Examination Report 1 from New Zealand Application No. 716781 dated Mar. 17, 2021.

Search Report and Written Opinion from Singapore Application No. 11201601278V dated Jan. 10, 2017.

Written Opinion from Singapore Application No. 11201601278V dated Sep. 22, 2017.

Notice of Eligibility for Grant from Singapore Application No. 11201601278V dated Jul. 3, 2018.

Search Report and Written Opinion from Singapore Application No. 11201601277X dated Jan. 10, 2017.

(56) References Cited

OTHER PUBLICATIONS

Written Opinion from Singapore Application No. 11201601277X dated Sep. 22, 2017.
Notice of Eligibility for Grant from Singapore Application No. 11201601277X dated Jul. 3, 2018.
Office Action with Search Report from Taiwan Patent Application No. 103129763 dated Oct. 11, 2018.
Office Action with Search Report from Taiwan Patent Application No. 103129763 dated Apr. 23, 2019.
Third Party Observation from PCT Application No. PCT/US2016/044495 dated Nov. 28, 2017.
Office Action from Vietnamese Office Action No. 1-2016-01077 dated Apr. 9, 2020.
Office Action from Vietnamese Office Action No. 1-2016-01104 dated Mar. 26, 2020.
Encyclopedia of Dairy Sciences, Second Edition, Imitation Dairy Products, p. 914 (3 pages), copyright 2011.
Mang, Keqiang et al., Agricultural Bioengineering, Chemical Industry Press, p. 282 "IV 6-lactoglobulin of sheep and expression construction thereof" Mar. 31, 2004.
Mensi et al. "Interactions of [beta]-Lactoglobulin Variants A and B with Vitamin A. Competitive Binding of Retinoids and Carotenoids," Journal of Agricultural and Food Chemistry, vol. 61, No. 17, May 1, 2013 pp. 4114-4119 XP055145838.
Pomeranz "Functional Properties of Food Components", Grain Marketing Research Laboratory, United States Department of Agriculture, pp. 374-375 1985.
Decision on Appeal from U.S. Appl. No. 14/915,548 dated Apr. 27, 2023.
English Translation of First Office Action from Chinese Application No. 202110740644.4 dated Feb. 2, 2023.
Summons to Attend Oral Proceedings from European Application No. 14761548.8 dated Dec. 16, 2021.
Spernath et al., "Food-Grade Microemulsions Based on Nonionic Emulsifiers: Media to Enhance Lycopene Solubilization," Journal of Agricultural and Food Chemistry, American Chemical Society, US, vol. 50, Jan. 1, 2002 pp. 6917-6922 XP002303729.
Notice of Allowance from U.S. Appl. No. 15/748,346 dated Apr. 4, 2022.
Exam Report from Malaysian Application No. PI 2016700637 dated Dec. 15, 2022.
Office Action from Vietnamese Office Action No. 1-2016-01104 dated Dec. 30, 2022.
Appeal Brief Filed in U.S. Appl. No. 14/915,548 dated Sep. 9, 2021.
Examiner's Answer to Appeal Brief from U.S. Appl. No. 14/915,548 dated Dec. 1, 2021.
Reply Brief from U.S. Appl. No. 14/915,548, filed Jan. 31, 2022.
Gravy Value Estimate for Sodium Caseinate, Jan. 31, 2018, 1 page.
Milk Facts, Milk Composition, http://www.milkfacts.info/Milk%20Composition/Protein.htm, Jan. 31, 2018, pp. 1-4.
Whey Protein Isolate Comparison, May 17, 2010, 7 pages.
International Search Report and Written Opinion from PCT Application No. PCT/US2016/044495 dated Oct. 10, 2016.
International Search Report and Written Opinion from PCT Application No. PCT/US2014/053197 dated Oct. 28, 2014.
International Preliminary Report on Patentability from PCT Application No. PCT/US2014/053197 dated Mar. 1, 2016.
International Search Report and Written Opinion from PCT Application No. PCT/US2014/053230 dated Oct. 28, 2014.
Office Action from U.S. Appl. No. 14/915,548 dated Jul. 6, 2018.
Response to Office Action from U.S. Appl. No. 14/915,548 dated Oct. 4, 2018.
USPTO Interview Summary from Office Action from U.S. Appl. No. 14/915,548 dated Oct. 9, 2018.
Final Office Action from U.S. Appl. No. 14/915,548 dated Jan. 22, 2019.
Response to Office Action from U.S. Appl. No. 14/915,548 dated Apr. 16, 2019.
Office Action from U.S. Appl. No. 14/915,548 dated dated May 16, 2019.
Response to Office Action from U.S. Appl. No. 14/915,548 dated Jul. 29, 2019.
Office Action from U.S. Appl. No. 14/915,548 dated dated Oct. 24, 2019.
Response to Office Action from U.S. Appl. No. 14/915,548 dated Jan. 23, 2020.
Office Action from U.S. Appl. No. 14/915,548 dated Feb. 13, 2020.
Response to Office Action from U.S. Appl. No. 14/915,548 dated Jun. 12, 2020.
Office Action from U.S. Appl. No. 14/915,548 dated Aug. 21, 2020.
Response to Office Action from U.S. Appl. No. 14/915,548 dated Nov. 19, 2020.
Office Action from U.S. Appl. No. 14/915,548 dated Feb. 9, 2021.
Office Action from U.S. Appl. No. 14/915,552 dated Jul. 5, 2018.
Response to Office Action from U.S. Appl. No. 14/915,552 dated Oct. 4, 2018.
Final Office Action from U.S. Application No. U.S. Appl. No. 14/915,552 dated Jan. 22, 2019.
Response to Office Action from U.S. Appl. No. 14/915,552 dated Apr. 16, 2019.
Office Action from U.S. Application No. U.S. Appl. No. 14/915,552 dated Jun. 11, 2019.
Response to Office Action from U.S. Appl. No. 14/915,552 dated Aug. 8, 2019.
Office Action from U.S. Application No. U.S. Appl. No. 14/915,552 dated Nov. 1, 2019.
Response to Office Action from U.S. Appl. No. 14/915,552 dated Jan. 30, 2020.
Office Action from U.S. Application No. U.S. Appl. No. 14/915,552 dated Apr. 29, 2020.
Response to Office Action from U.S. Appl. No. 14/915,552 dated Jul. 28, 2020.
Office Action from U.S. Application No. U.S. Appl. No. 14/915,552 dated Aug. 10, 2020.
Pre-Brief Conference Request from U.S. Appl. No. 14/915,552 dated Nov. 9, 2020.
Appeal Brief Filed in U.S. Appl. No. 14/915,552 dated Jan. 8, 2021.
Examiner's Answer to Appeal Brief from U.S. Appl. No. 14/915,552 dated Mar. 22, 2021.
Office Action from U.S. Appl. No. 15/748,346 dated Sep. 6, 2019.
Response to Office Action from U.S. Appl. No. 15/748,346 dated Dec. 17, 2019.
Office Action from U.S. Appl. No. 15/748,346 dated Mar. 6, 2020.
Notice of Appeal from U.S. Appl. No. 15/748,346 dated Jun. 4, 2020.
Office Action from U.S. Appl. No. 15/748,346 dated Aug. 3, 2020.
Response to Office Action from U.S. Appl. No. 15/748,346 dated Oct. 27, 2020.
Office Action from U.S. Appl. No. 15/748,346 dated Dec. 9, 2020.
Response to Office Action from U.S. Appl. No. 15/748,346 dated Feb. 23, 2021.
Office Action from U.S. Appl. No. 15/748,346 dated Apr. 5, 2021.
Response to Office Action from U.S. Appl. No. 15/748,346 dated Jun. 8, 2021.
Office Action from U.S. Appl. No. 15/748,346 dated Jul. 1, 2021.
Response to Office Action from U.S. Appl. No. 15/748,346 dated Sep. 29, 2021.
Office Action from U.S. Appl. No. 15/748,346 dated Nov. 29, 2021.
Notice of Appeal and Pre Appeal Brief Conference Request from U.S. Appl. No. 15/748,346 dated Feb. 25, 2022.
Pre-Brief Appeal Conference Decision from U.S. Appl. No. 15/748,346 dated Mar. 24, 2022.
Office Action from Canadian Application No. 2,922,242 dated Apr. 10, 2017.
Office Action from Canadian Application No. 2,922,242 dated Jan. 30, 2018.
Office Action from U.S. Appl. No. 18/056,768 dated Jul. 6, 2023.

* cited by examiner

Hourly Lymph Flow Rate over 6 hours

Hourly Lymphatic Lutein Output over 6 hours

Lymphatic Lutein Absorption over 6 hours
(Area Under The Curve)

Percent Change in Lymphatic Lutein Absorption over 6 hours (AUC) versus control (lutein in SO)

Hourly Lymph Flow Rate over 8 hours

Hourly Lymphatic Lutein Output over 8 hours

Lymphatic Lutein Absorption over 6 & 8 hours
(Area under the curve)

Percent Change in Lymphatic Lutein Absorption over 6 & 8 hours versus control

Hourly Lymphatic Triglyceride Output over 6 hours

Hourly Lymphatic Phospholipid Output over 6 hours

Change in Lymphatic Absorption of ARA over 8 hours

Change in Lymphatic Absorption of DHA over 8 hours

Lymphatic Absorption of Linoleic Acid

NUTRITIONAL COMPOSITION HAVING LIPOPHILIC COMPOUNDS WITH IMPROVED SOLUBILITY AND BIOAVAILABILITY

RELATED APPLICATION INFORMATION

This application is a continuation of U.S. application Ser. No. 14/915,552, filed Feb. 29, 2016, which is the U.S. national phase entry of PCT/US2014/053230, with an international filing date of Aug. 28, 2014, which claims the benefit of U.S. Application No. 61/871,719, filed on Aug. 29, 2013, U.S. Application No. 61/901,207, filed on Nov. 7, 2013, U.S. Application No. 61/920,657, filed on Dec. 24, 2013, U.S. Application No. 61/920,666, filed on Dec. 24, 2013, U.S. Application No. 61/920,669 filed on Dec. 24, 2013, U.S. Application No. 61/920,675, filed on Dec. 24, 2013, U.S. Application No. 61/949,505 filed on Mar. 7, 2014 and U.S. Application No. 62/007,037 filed on Jun. 3, 2014, the contents of each of which are herein incorporated by reference in its entirety.

TECHNICAL FIELD

The present disclosure relates to compositions containing lipophilic compounds with improved bioavailability. More particularly, the compositions contain an activated premix or an MDG-protected premix comprising monoglycerides and diglycerides. These premixes may provide lipophilic compounds in a form that is more available for absorption into the body upon consumption.

BACKGROUND

Adult, pediatric, and infant manufactured nutritional and pharmaceutical products may comprise a variety of lipophilic compounds such as carotenoids, lipid soluble vitamins, lipophilic antioxidants or combinations thereof. Current nutritional compositions comprising lipophilic compounds typically provide limited bioavailability following consumption because lipophilic compounds are unable to remain in stable, water soluble forms. As a result, the products are often over-fortified with lipophilic compounds to ensure that the desired nutritional or pharmaceutical benefits from the compounds may be obtained. In some cases, the over-fortification may be from about 2 times to about 10 times the amount required to achieve the desired benefits.

These high fortification rates may lead to increased production costs and potential complications in formulating the final product without providing additional consumer benefits. Furthermore, the over fortified formulations may overwhelm the digestive tract with non-soluble lipophilic compounds leading to indigestion.

Accordingly, there is a need for nutritional compositions for infants, toddlers, children and adults that provide necessary lipophilic compounds in a more stable soluble form.

SUMMARY OF THE INVENTION

In one aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides (“MDG”) and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides (“MDG”) and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides (“MDG”) and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition, comprising about 1.0 µg/kg to about 7.0 g/kg of a lipophilic compound based on total weight of the composition.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition, comprising about 1.0 µg/kg to about 7.0 g/kg of a lipophilic compound based on total weight of the composition, comprising about 147.4 mg/kg to about 589.6 mg/kg of MDG and about 1.12 mg/kg of a lipophilic compound based on total weight of the composition.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition, comprising about 1.0 μg/kg to about 7.0 g/kg of a lipophilic compound based on total weight of the composition, comprising about 147.4 mg/kg to about 589.6 mg/kg of MDG and about 1.12 mg/kg of a lipophilic compound based on total weight of the composition, wherein the ratio of MDG to lipophilic compound are selected from the group consisting of 12000:1, 11000:1, 10000:1, 9000:1, 8000:1, 7000:1, 6000:1, 5000:1, 4000:1, 3000:1, 2000:1, 1000:1, 900:1, 800:1, 700:1, 600:1, 500:1, 400:1, 300:1, 200:1, 100:1, 75:1, 50:1, 25:1, 20:1, 15:1, 14:1, 13:1, 12:1, 11:1, 10:1, 9:1, 8:1, 7:1, 6:1, 5:1, 4:1, 3:1, 2:1 and 1:1 (w/w).

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition, comprising about 1.0 μg/kg to about 7.0 g/kg of a lipophilic compound based on total weight of the composition, comprising about 147.4 mg/kg to about 589.6 mg/kg of MDG and about 1.12 mg/kg of a lipophilic compound based on total weight of the composition, wherein the ratio of MDG to lipophilic compound are selected from the group consisting of 12000:1, 11000:1, 10000:1, 9000:1, 8000:1, 7000:1, 6000:1, 5000:1, 4000:1, 3000:1, 2000:1, 1000:1, 900:1, 800:1, 700:1, 600:1, 500:1, 400:1, 300:1, 200:1, 100:1, 75:1, 50:1, 25:1, 20:1, 15:1, 14:1, 13:1, 12:1, 11:1, 10:1, 9:1, 8:1, 7:1, 6:1, 5:1, 4:1, 3:1, 2:1 and 1:1 (w/w), wherein the ratio of MDG to lipophilic compound comprises a ratio of about 12000:1 to about 1:1 (w/w).

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition, comprising about 1.0 μg/kg to about 7.0 g/kg of a lipophilic compound based on total weight of the composition, comprising about 147.4 mg/kg to about 589.6 mg/kg of MDG and about 1.12 mg/kg of a lipophilic compound based on total weight of the composition, wherein the ratio of MDG to lipophilic compound are selected from the group consisting of 12000:1, 11000:1, 10000:1, 9000:1, 8000:1, 7000:1, 6000:1, 5000:1, 4000:1, 3000:1, 2000:1, 1000:1, 900:1, 800:1, 700:1, 600:1, 500:1, 400:1, 300:1, 200:1, 100:1, 75:1, 50:1, 25:1, 20:1, 15:1, 14:1, 13:1, 12:1, 11:1, 10:1, 9:1, 8:1, 7:1, 6:1, 5:1, 4:1, 3:1, 2:1 and 1:1 (w/w), wherein the ratio of MDG to lipophilic compound comprises a ratio of about 12000:1 to about 1:1 (w/w), wherein the ratio of MDG to lipophilic compound is 4:1, 3:1 or 2:1.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition, comprising about 1.0 μg/kg to about 7.0 g/kg of a lipophilic compound based on total weight of the composition, comprising about 147.4 mg/kg to about 589.6 mg/kg of MDG and about 1.12 mg/kg of a lipophilic compound based on total weight of the composition, wherein the ratio of MDG to lipophilic compound are selected from the group consisting of 12000:1, 11000:1, 10000:1, 9000:1, 8000:1, 7000:1, 6000:1, 5000:1, 4000:1, 3000:1, 2000:1, 1000:1, 900:1, 800:1, 700:1, 600:1, 500:1, 400:1, 300:1, 200:1, 100:1, 75:1, 50:1, 25:1, 20:1, 15:1, 14:1, 13:1, 12:1, 11:1, 10:1, 9:1, 8:1, 7:1, 6:1, 5:1, 4:1, 3:1, 2:1 and 1:1 (w/w), wherein the ratio of MDG to lipophilic compound comprises a ratio of about 12000:1 to about 1:1 (w/w), wherein the ratio of MDG to lipophilic compound is 4:1, 3:1 or 2:1, comprising about 1.0 g/L to about 100 g/L of hydrophobic protein based on total weight of the composition.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition, comprising about 1.0 μg/kg to about 7.0 g/kg of a lipophilic compound based on total weight of the composition, comprising about 147.4 mg/kg to about 589.6 mg/kg of MDG and about 1.12 mg/kg of a lipophilic compound based on total weight of the composition, wherein the ratio of MDG to lipophilic compound are selected from the group consisting of 12000:1, 11000:1, 10000:1, 9000:1, 8000:1, 7000:1, 6000:1, 5000:1, 4000:1, 3000:1, 2000:1, 1000:1, 900:1, 800:1, 700:1, 600:1, 500:1, 400:1, 300:1, 200:1, 100:1, 75:1, 50:1, 25:1, 20:1, 15:1, 14:1, 13:1, 12:1, 11:1, 10:1, 9:1, 8:1, 7:1, 6:1, 5:1, 4:1, 3:1, 2:1 and 1:1 (w/w), wherein the ratio of MDG to lipophilic compound comprises a ratio of about 12000:1 to about 1:1 (w/w), wherein the ratio of MDG to lipophilic compound is 4:1, 3:1 or 2:1, comprising about 1.0 g/L to about 100 g/L of hydrophobic protein based on total weight of the composition, further comprising choline.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition, comprising about 1.0 μg/kg to about 7.0 g/kg of a lipophilic compound based on total weight of the composition, comprising about 147.4 mg/kg to about 589.6 mg/kg of MDG and about 1.12 mg/kg of a lipophilic compound based on total weight of the composition, wherein the ratio of MDG to lipophilic compound are selected from the group consisting of 12000:1, 11000:1, 10000:1, 9000:1, 8000:1, 7000:1, 6000:1, 5000:1, 4000:1, 3000:1, 2000:1, 1000:1, 900:1, 800:1, 700:1, 600:1, 500:1, 400:1, 300:1, 200:1, 100:1, 75:1, 50:1, 25:1, 20:1, 15:1, 14:1, 13:1, 12:1, 11:1, 10:1, 9:1, 8:1, 7:1, 6:1, 5:1, 4:1, 3:1, 2:1 and 1:1 (w/w), wherein the ratio of MDG to lipophilic compound comprises a ratio of about 12000:1 to about 1:1 (w/w), wherein the ratio of MDG to lipophilic compound is 4:1, 3:1 or 2:1, comprising about 1.0 g/L to about 100 g/L of hydrophobic protein based on total weight of the composition, further comprising choline, comprising about 5 mg/kg to about 1 g/kg of choline based on total weight of the composition.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition, comprising about 1.0 μg/kg to about 7.0 g/kg of a lipophilic compound based on total weight of the composition, comprising about 147.4 mg/kg to about 589.6 mg/kg of MDG and about 1.12 mg/kg of a lipophilic compound based on total weight of the composition, wherein the ratio of MDG to lipophilic compound are selected from the group consisting of 12000:1, 11000:1, 10000:1, 9000:1, 8000:1, 7000:1, 6000:1, 5000:1, 4000:1, 3000:1, 2000:1, 1000:1, 900:1, 800:1, 700:1, 600:1, 500:1, 400:1, 300:1, 200:1, 100:1, 75:1, 50:1, 25:1, 20:1, 15:1, 14:1, 13:1, 12:1, 11:1, 10:1, 9:1, 8:1, 7:1, 6:1, 5:1, 4:1, 3:1, 2:1 and 1:1 (w/w), wherein the ratio of MDG to lipophilic compound comprises a ratio of about 12000:1 to about 1:1 (w/w), wherein the ratio of MDG to lipophilic compound is 4:1, 3:1 or 2:1, comprising about 1.0 g/L to about 100 g/L of hydrophobic protein based on total weight of the composition, further comprising choline, comprising about 5 mg/kg to about 1 g/kg of choline based on total weight of the composition, further comprising lecithin.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition, comprising about 1.0 μg/kg to about 7.0 g/kg of a lipophilic compound based on total weight of the composition, comprising about 147.4 mg/kg to about 589.6 mg/kg of MDG and about 1.12 mg/kg of a lipophilic compound based on total weight of the composition, wherein the ratio of MDG to lipophilic compound are selected from the group consisting of 12000:1, 11000:1, 10000:1, 9000:1, 8000:1, 7000:1, 6000:1, 5000:1, 4000:1, 3000:1, 2000:1, 1000:1, 900:1, 800:1, 700:1, 600:1, 500:1, 400:1, 300:1, 200:1, 100:1, 75:1, 50:1, 25:1, 20:1, 15:1, 14:1, 13:1, 12:1, 11:1, 10:1, 9:1, 8:1, 7:1, 6:1, 5:1, 4:1, 3:1, 2:1 and 1:1 (w/w), wherein the ratio of MDG to lipophilic compound comprises a ratio of about 12000:1 to about 1:1 (w/w), wherein the ratio of MDG to lipophilic compound is 4:1, 3:1 or 2:1, comprising about 1.0 g/L to about 100 g/L of hydrophobic protein based on total weight of the composition, further comprising choline, comprising about 5 mg/kg to about 1 g/kg of choline based on total weight of the composition, further comprising lecithin, comprising about 10 mg/kg to about 5 g/kg of lecithin based on total weight of the composition.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition, comprising about 1.0 µg/kg to about 7.0 g/kg of a lipophilic compound based on total weight of the composition, comprising about 147.4 mg/kg to about 589.6 mg/kg of MDG and about 1.12 mg/kg of a lipophilic compound based on total weight of the composition, wherein the ratio of MDG to lipophilic compound are selected from the group consisting of 12000:1, 11000:1, 10000:1, 9000:1, 8000:1, 7000:1, 6000:1, 5000:1, 4000:1, 3000:1, 2000:1, 1000:1, 900:1, 800:1, 700:1, 600:1, 500:1, 400:1, 300:1, 200:1, 100:1, 75:1, 50:1, 25:1, 20:1, 15:1, 14:1, 13:1, 12:1, 11:1, 10:1, 9:1, 8:1, 7:1, 6:1, 5:1, 4:1, 3:1, 2:1 and 1:1 (w/w), wherein the ratio of MDG to lipophilic compound comprises a ratio of about 12000:1 to about 1:1 (w/w), wherein the ratio of MDG to lipophilic compound is 4:1, 3:1 or 2:1, comprising about 1.0 g/L to about 100 g/L of hydrophobic protein based on total weight of the composition, further comprising choline, comprising about 5 mg/kg to about 1 g/kg of choline based on total weight of the composition, further comprising lecithin, comprising about 10 mg/kg to about 5 g/kg of lecithin based on total weight of the composition, further comprising docosahexaenoic acid ("DHA").

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition, comprising about 1.0 µg/kg to about 7.0 g/kg of a lipophilic compound based on total weight of the composition, comprising about 147.4 mg/kg to about 589.6 mg/kg of MDG and about 1.12 mg/kg of a lipophilic compound based on total weight of the composition, wherein the ratio of MDG to lipophilic compound are selected from the group consisting of 12000:1, 11000:1, 10000:1, 9000:1, 8000:1, 7000:1, 6000:1, 5000:1, 4000:1, 3000:1, 2000:1, 1000:1, 900:1, 800:1, 700:1, 600:1, 500:1, 400:1, 300:1, 200:1, 100:1, 75:1, 50:1, 25:1, 20:1, 15:1, 14:1, 13:1, 12:1, 11:1, 10:1, 9:1, 8:1, 7:1, 6:1, 5:1, 4:1, 3:1, 2:1 and 1:1 (w/w), wherein the ratio of MDG to lipophilic compound comprises a ratio of about 12000:1 to about 1:1 (w/w), wherein the ratio of MDG to lipophilic compound is 4:1, 3:1 or 2:1, comprising about 1.0 g/L to about 100 g/L of hydrophobic protein based on total weight of the composition, further comprising choline, comprising about 5 mg/kg to about 1 g/kg of choline based on total weight of the composition, further comprising lecithin, comprising about 10 mg/kg to about 5 g/kg of lecithin based on total weight of the composition, further comprising docosahexaenoic acid ("DHA"), wherein the nutritional composition comprises about 10 mg/kg to about 10 g/kg DHA based on total weight of the composition.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition, comprising about 1.0 µg/kg to about 7.0 g/kg of a lipophilic compound based on total weight of the composition, comprising about 147.4 mg/kg to about 589.6 mg/kg of MDG and about 1.12 mg/kg of a lipophilic compound based on total weight of the composition, wherein the ratio of MDG to lipophilic compound are selected from the group consisting of 12000:1, 11000:1, 10000:1, 9000:1, 8000:1, 7000:1, 6000:1, 5000:1, 4000:1, 3000:1, 2000:1, 1000:1, 900:1, 800:1, 700:1, 600:1, 500:1, 400:1, 300:1, 200:1, 100:1, 75:1, 50:1, 25:1, 20:1, 15:1, 14:1, 13:1, 12:1, 11:1, 10:1, 9:1, 8:1, 7:1, 6:1, 5:1, 4:1, 3:1, 2:1 and 1:1 (w/w), wherein the ratio of MDG to lipophilic compound comprises a ratio of about 12000:1 to about 1:1 (w/w), wherein the ratio of MDG to lipophilic compound is 4:1, 3:1 or 2:1, comprising about 1.0 g/L to about 100 g/L of hydrophobic protein based on total weight of the composition, further comprising choline, comprising about 5 mg/kg to about 1 g/kg of choline based on total weight of the composition, further comprising lecithin, comprising about 10 mg/kg to about 5 g/kg of lecithin based on total weight of the composition, further comprising docosahexaenoic acid ("DHA"), wherein the nutritional composition comprises about 10 mg/kg to about 10 g/kg DHA based on total weight of the composition, further comprising high palmitic acid vegetable oil.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition, comprising about 1.0 µg/kg to about 7.0 g/kg of a lipophilic compound based on total weight of the composition, comprising about 147.4 mg/kg to about 589.6 mg/kg of MDG and about 1.12 mg/kg of a lipophilic compound based on total weight of the composition, wherein the ratio of MDG to lipophilic compound are selected from the group consisting of 12000:1, 11000:1, 10000:1, 9000:1, 8000:1, 7000:1, 6000:1, 5000:1, 4000:1, 3000:1, 2000:1, 1000:1, 900:1, 800:1, 700:1, 600:1, 500:1, 400:1, 300:1, 200:1, 100:1, 75:1, 50:1, 25:1, 20:1, 15:1, 14:1, 13:1, 12:1, 11:1, 10:1, 9:1, 8:1, 7:1, 6:1, 5:1, 4:1, 3:1, 2:1 and 1:1 (w/w), wherein the ratio of MDG to lipophilic compound comprises a ratio of about 12000:1 to about 1:1 (w/w), wherein the ratio of MDG to lipophilic compound is 4:1, 3:1 or 2:1, comprising about 1.0 g/L to about 100 g/L of hydrophobic protein based on total weight of the composition, further comprising choline, comprising about 5 mg/kg to about 1 g/kg of choline based on total weight of the composition, further comprising lecithin, comprising about 10 mg/kg to about 5 g/kg of lecithin based on total weight of the composition, further comprising docosahexaenoic acid ("DHA"), wherein the nutritional composition comprises about 10 mg/kg to about 10 g/kg DHA based on total weight of the composition, further comprising high palmitic acid vegetable oil, wherein the nutritional composition comprises about 0.5 g/kg to about 35 g/kg of high palmitic acid vegetable oil based on total weight of the composition.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition, comprising about 1.0 μg/kg to about 7.0 g/kg of a lipophilic compound based on total weight of the composition, comprising about 147.4 mg/kg to about 589.6 mg/kg of MDG and about 1.12 mg/kg of a lipophilic compound based on total weight of the composition, wherein the ratio of MDG to lipophilic compound are selected from the group consisting of 12000:1, 11000:1, 10000:1, 9000:1, 8000:1, 7000:1, 6000:1, 5000:1, 4000:1, 3000:1, 2000:1, 1000:1, 900:1, 800:1, 700:1, 600:1, 500:1, 400:1, 300:1, 200:1, 100:1, 75:1, 50:1, 25:1, 20:1, 15:1, 14:1, 13:1, 12:1, 11:1, 10:1, 9:1, 8:1, 7:1, 6:1, 5:1, 4:1, 3:1, 2:1 and 1:1 (w/w), wherein the ratio of MDG to lipophilic compound comprises a ratio of about 12000:1 to about 1:1 (w/w), wherein the ratio of MDG to lipophilic compound is 4:1, 3:1 or 2:1, comprising about 1.0 g/L to about 100 g/L of hydrophobic protein based on total weight of the composition, further comprising choline, comprising about 5 mg/kg to about 1 g/kg of choline based on total weight of the composition, further comprising lecithin, comprising about 10 mg/kg to about 5 g/kg of lecithin based on total weight of the composition, further comprising docosahexaenoic acid ("DHA"), wherein the nutritional composition comprises about 10 mg/kg to about 10 g/kg DHA based on total weight of the composition, further comprising high palmitic acid vegetable oil, wherein the nutritional composition comprises about 0.5 g/kg to about 35 g/kg of high palmitic acid vegetable oil based on total weight of the composition, wherein the nutritional composition comprises about 0.2 g/L to about 20 g/L of β-casein based on total weight of the composition.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition, comprising about 1.0 μg/kg to about 7.0 g/kg of a lipophilic compound based on total weight of the composition, comprising about 147.4 mg/kg to about 589.6 mg/kg of MDG and about 1.12 mg/kg of a lipophilic compound based on total weight of the composition, wherein the ratio of MDG to lipophilic compound are selected from the group consisting of 12000:1, 11000:1, 10000:1, 9000:1, 8000:1, 7000:1, 6000:1, 5000:1, 4000:1, 3000:1, 2000:1, 1000:1, 900:1, 800:1, 700:1, 600:1, 500:1, 400:1, 300:1, 200:1, 100:1, 75:1, 50:1, 25:1, 20:1, 15:1, 14:1, 13:1, 12:1, 11:1, 10:1, 9:1, 8:1, 7:1, 6:1, 5:1, 4:1, 3:1, 2:1 and 1:1 (w/w), wherein the ratio of MDG to lipophilic compound comprises a ratio of about 12000:1 to about 1:1 (w/w), wherein the ratio of MDG to lipophilic compound is 4:1, 3:1 or 2:1, comprising about 1.0 g/L to about 100 g/L of hydrophobic protein based on total weight of the composition, further comprising choline, comprising about 5 mg/kg to about 1 g/kg of choline based on total weight of the composition, further comprising lecithin, comprising about 10 mg/kg to about 5 g/kg of lecithin based on total weight of the composition, further comprising docosahexaenoic acid ("DHA"), wherein the nutritional composition comprises about 10 mg/kg to about 10 g/kg DHA based on total weight of the composition, further comprising high palmitic acid vegetable oil, wherein the nutritional composition comprises about 0.5 g/kg to about 35 g/kg of high palmitic acid vegetable oil based on total weight of the composition, wherein the nutritional composition comprises about 0.2 g/L to about 20 g/L of β-casein based on total weight of the composition, wherein the nutritional composition comprises a carbohydrate.

In another aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 1% of the total MDG in the nutritional composition remains in the aqueous phase after centrifugation at 100,000×g for 1 hour at 20° C., wherein the assembly is (i) water soluble; and (ii) has a size of 100 kD to 1000 kD, wherein MDG increases the concentration of protein of the assembly by at least 2% compared to a nutritional composition without MDG, wherein MDG increases the bound lipophilic compound of the assembly by at least 2% compared to a nutritional composition without MDG, wherein the lipophilic compound of the composition has at least a 15% improvement in bioavailability when administered to a subject, wherein the 15% improvement in bioavailability is measured by lymphatic absorption of the composition over a nutritional composition without MDG, wherein the assembly is still water soluble after centrifugation at about 31,000×g for at least 1 hour at 20° C., wherein at least 5% of the assembly remains in the aqueous phase after centrifugation, wherein the protein is intact protein, hydrolyzed protein or combinations thereof, wherein the assembly is stable for at least 12 months at 23° C., wherein the assembly is stable for at least 24 months at room temperature, wherein the assembly comprises a hydrophobic protein having a GRAVY value of about −0.5 to about 0, wherein the hydrophobic protein is β-lactoglobulin, bovine lactoferrin, $\gamma_2$-casein, β-casein, α-lactalbumin, or combinations thereof, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the fat is MDG, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof, comprising about 145 mg/kg to about 890 mg/kg of MDG based on total weight of the composition, comprising about 145 mg/kg to about 600 mg/kg of MDG based on total weight of the composition, comprising about 1.0 μg/kg to about 7.0 g/kg of a lipophilic compound based on total weight of the composition, comprising about 147.4 mg/kg to about 589.6 mg/kg of MDG and about 1.12 mg/kg of a lipophilic compound based on total weight of the composition, wherein the ratio of MDG to lipophilic compound are selected from the group consisting of 12000:1, 11000:1, 10000:1, 9000:1, 8000:1, 7000:1, 6000:1, 5000:1, 4000:1, 3000:1, 2000:1, 1000:1, 900:1, 800:1, 700:1, 600:1, 500:1, 400:1, 300:1, 200:1, 100:1, 75:1, 50:1, 25:1, 20:1, 15:1, 14:1, 13:1, 12:1, 11:1, 10:1, 9:1, 8:1, 7:1, 6:1, 5:1, 4:1, 3:1, 2:1 and 1:1 (w/w), wherein the ratio of MDG to lipophilic compound comprises a ratio of about 12000:1 to about 1:1 (w/w), wherein the ratio of MDG to lipophilic compound is 4:1, 3:1 or 2:1, comprising about 1.0 g/L to about 100 g/L of hydrophobic protein based on total weight of the composition, further comprising choline, comprising about 5 mg/kg to about 1 g/kg of choline based on total weight of the composition, further comprising lecithin, comprising about 10 mg/kg to about 5 g/kg of lecithin based on total weight of the composition, further comprising docosahexaenoic acid ("DHA"), wherein the nutritional composition comprises about 10 mg/kg to about 10 g/kg DHA based on total weight of the composition, further comprising high palmitic acid vegetable oil, wherein the nutritional composition comprises about 0.5 g/kg to about 35 g/kg of high palmitic acid vegetable oil based on total weight of the composition, wherein the nutritional composition comprises about 0.2 g/L to about 20 g/L of β-casein based on total weight of the composition, wherein the nutritional composition comprises a carbohydrate, wherein the carbohydrate is maltodextrin, hydrolyzed or modified starch, hydrolyzed or modified cornstarch, glucose polymers, corn syrup, corn syrup solids, rice-derived carbohydrates, glucose, fructose, lactose, high fructose corn syrup, honey, sugar alcohols, maltitol, erythritol, sorbitol, or combinations thereof.

In one aspect, the disclosure may be directed to a nutritional composition comprising at least one protein and vitamin D, having improved bioavailability of vitamin D, wherein the nutritional composition comprises: an assembly comprising a combination of monoglycerides and diglycerides ("MDG") and vitamin D, wherein the vitamin D has improved bioavailability when administered to a subject.

In another aspect, the disclosure may be directed to a nutritional composition comprising at least one protein and vitamin D, having improved bioavailability of vitamin D, wherein the nutritional composition comprises: an assembly comprising a combination of monoglycerides and diglycerides ("MDG") and vitamin D, wherein the vitamin D has improved bioavailability when administered to a subject, comprising about 0.1 mg/kg to about 20 mg/kg of MDG based on total weight of the composition.

In another aspect, the disclosure may be directed to a nutritional composition comprising at least one protein and vitamin D, having improved bioavailability of vitamin D, wherein the nutritional composition comprises: an assembly comprising a combination of monoglycerides and diglycerides ("MDG") and vitamin D, wherein the vitamin D has improved bioavailability when administered to a subject, comprising about 0.1 mg/kg to about 20 mg/kg of MDG based on total weight of the composition, comprising about 0.1 mg/kg to about 10 mg/kg of MDG based on total weight of the composition.

In another aspect, the disclosure may be directed to a nutritional composition comprising at least one protein and vitamin D, having improved bioavailability of vitamin D, wherein the nutritional composition comprises: an assembly comprising a combination of monoglycerides and diglycerides ("MDG") and vitamin D, wherein the vitamin D has improved bioavailability when administered to a subject, comprising about 0.1 mg/kg to about 20 mg/kg of MDG based on total weight of the composition, comprising about 0.1 mg/kg to about 10 mg/kg of MDG based on total weight of the composition, comprising about 10 μg/kg to about 30 μg/kg of vitamin D based on total weight of the composition.

In another aspect, the disclosure may be directed to a nutritional composition comprising at least one protein and vitamin D, having improved bioavailability of vitamin D, wherein the nutritional composition comprises: an assembly comprising a combination of monoglycerides and diglycerides ("MDG") and vitamin D, wherein the vitamin D has improved bioavailability when administered to a subject, comprising about 0.1 mg/kg to about 20 mg/kg of MDG based on total weight of the composition, comprising about 0.1 mg/kg to about 10 mg/kg of MDG based on total weight of the composition, comprising about 10 μg/kg to about 30 μg/kg of vitamin D based on total weight of the composition, comprising about 0.1 mg/kg to about 10 mg/kg of MDG and about 20 μg/kg of vitamin D based on total weight of the composition.

In one aspect, the disclosure may be directed to a nutritional composition having at least one protein, at least one fat, and at least one lipophilic compound, the composition comprising: an activated assembly comprising at least one hydrophobic protein, at least one combination of monoglycerides and diglycerides ("MDG") and at least one lipophilic compound, wherein at least 15% of the total lipophilic compound in the nutritional composition remains in the aqueous phase after centrifugation at 1,000×g for 1 hour at 20° C.

In one aspect, the disclosure may be directed to a method of preparing a nutritional composition having at least one lipophilic compound having improved bioavailability, the method comprising the steps of: providing a premix comprising an assembly that comprises at least one hydrophobic protein, combination of monoglycerides and diglycerides ("MDG") and at least one lipophilic compound, wherein the assembly is (i) water soluble; and (ii) has a size of 100 kD to 1000 kD; adding the premix to an aqueous solution to form an activated premix; and adding the activated premix to the nutritional composition.

In another aspect, the disclosure may be directed to a method of preparing a nutritional composition having at least one lipophilic compound having improved bioavailability, the method comprising the steps of: providing a premix comprising an assembly that comprises at least one hydrophobic protein, combination of monoglycerides and diglycerides ("MDG") and at least one lipophilic compound, wherein the assembly is (i) water soluble; and (ii) has a size of 100 kD to 1000 kD; adding the premix to an aqueous solution to form an activated premix; and adding the activated premix to the nutritional composition, wherein the assembly has a size of 60 kD to 400 kD.

In another aspect, the disclosure may be directed to a method of preparing a nutritional composition having at least one lipophilic compound having improved bioavailability, the method comprising the steps of: providing a premix comprising an assembly that comprises at least one hydrophobic protein, combination of monoglycerides and diglycerides ("MDG") and at least one lipophilic compound, wherein the assembly is (i) water soluble; and (ii) has a size of 100 kD to 1000 kD; adding the premix to an aqueous solution to form an activated premix; and adding the activated premix to the nutritional composition, wherein the assembly has a size of 60 kD to 400 kD, wherein the lipophilic compound is a carotenoid, a lipid soluble vitamin, a lipophilic antioxidant or combinations thereof.

In another aspect, the disclosure may be directed to a method of preparing a nutritional composition having at least one lipophilic compound having improved bioavailability, the method comprising the steps of: providing a premix comprising an assembly that comprises at least one hydrophobic protein, combination of monoglycerides and diglycerides ("MDG") and at least one lipophilic compound, wherein the assembly is (i) water soluble; and (ii) has a size of 100 kD to 1000 kD; adding the premix to an aqueous solution to form an activated premix; and adding the activated premix to the nutritional composition, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof.

In another aspect, the disclosure may be directed to a method of preparing a nutritional composition having at least one lipophilic compound having improved bioavailability, the method comprising the steps of: providing a premix comprising an assembly that comprises at least one hydrophobic protein, combination of monoglycerides and diglycerides ("MDG") and at least one lipophilic compound, wherein the assembly is (i) water soluble; and (ii) has a size of 100 kD to 1000 kD; adding the premix to an aqueous solution to form an activated premix; and adding the activated premix to the nutritional composition, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the premix is heated to a temperature of 120° F. for about 10 minutes.

In one aspect, the disclosure may be directed to a method of preparing a nutritional composition having at least one lipophilic compound having improved bioavailability, the method comprising the steps of: providing a premix comprising an assembly that comprises at least one hydrophobic protein, a combination of monoglycerides and diglycerides ("MDG") and at least one lipophilic compound, wherein the assembly is (i) water soluble; and (ii) has a size of 100 kD to 1000 kD; adding the premix to a fat-containing solution to form a protected premix; and adding the protected premix to the nutritional composition.

In another aspect, the disclosure may be directed to a method of preparing a nutritional composition having at least one lipophilic compound having improved bioavailability, the method comprising the steps of: providing a premix comprising an assembly that comprises at least one hydrophobic protein, a combination of monoglycerides and diglycerides ("MDG") and at least one lipophilic compound, wherein the assembly is (i) water soluble; and (ii) has a size of 100 kD to 1000 kD; adding the premix to a fat-containing solution to form a protected premix; and adding the protected premix to the nutritional composition, wherein the assembly has a size of 60 kD to 400 kD.

In another aspect, the disclosure may be directed to a method of preparing a nutritional composition having at least one lipophilic compound having improved bioavailability, the method comprising the steps of: providing a premix comprising an assembly that comprises at least one hydrophobic protein, a combination of monoglycerides and diglycerides ("MDG") and at least one lipophilic compound, wherein the assembly is (i) water soluble; and (ii) has a size of 100 kD to 1000 kD; adding the premix to a fat-containing solution to form a protected premix; and adding the protected premix to the nutritional composition, wherein the assembly has a size of 60 kD to 400 kD, wherein the lipophilic compound is a carotenoid, a lipid soluble vitamin, a lipophilic antioxidant or combinations thereof.

In another aspect, the disclosure may be directed to a method of preparing a nutritional composition having at least one lipophilic compound having improved bioavailability, the method comprising the steps of: providing a premix comprising an assembly that comprises at least one hydrophobic protein, a combination of monoglycerides and diglycerides ("MDG") and at least one lipophilic compound, wherein the assembly is (i) water soluble; and (ii) has a size of 100 kD to 1000 kD; adding the premix to a fat-containing solution to form a protected premix; and adding the protected premix to the nutritional composition, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof.

In another aspect, the disclosure may be directed to a method of preparing a nutritional composition having at least one lipophilic compound having improved bioavailability, the method comprising the steps of: providing a premix comprising an assembly that comprises at least one hydrophobic protein, a combination of monoglycerides and diglycerides ("MDG") and at least one lipophilic compound, wherein the assembly is (i) water soluble; and (ii) has a size of 100 kD to 1000 kD; adding the premix to a fat-containing solution to form a protected premix; and adding the protected premix to the nutritional composition, wherein the assembly has a size of 60 kD to 400 kD, wherein the lipophilic compound is a carotenoid, a lipid soluble vitamin, a lipophilic antioxidant or combinations thereof, wherein the lipophilic compound is lutein, vitamin A, vitamin D, vitamin E, vitamin K or any combinations thereof, wherein the premix is heated to a temperature of 120° F. for about 10 minutes.

BRIEF DESCRIPTION OF THE FIGURES

FIG. 15: protein greater than 137 kD; and FIG. 16: bound lipophile within the aqueous fraction following centrifugation of variable nutritional compositions.

DETAILED DESCRIPTION

Figure 1:
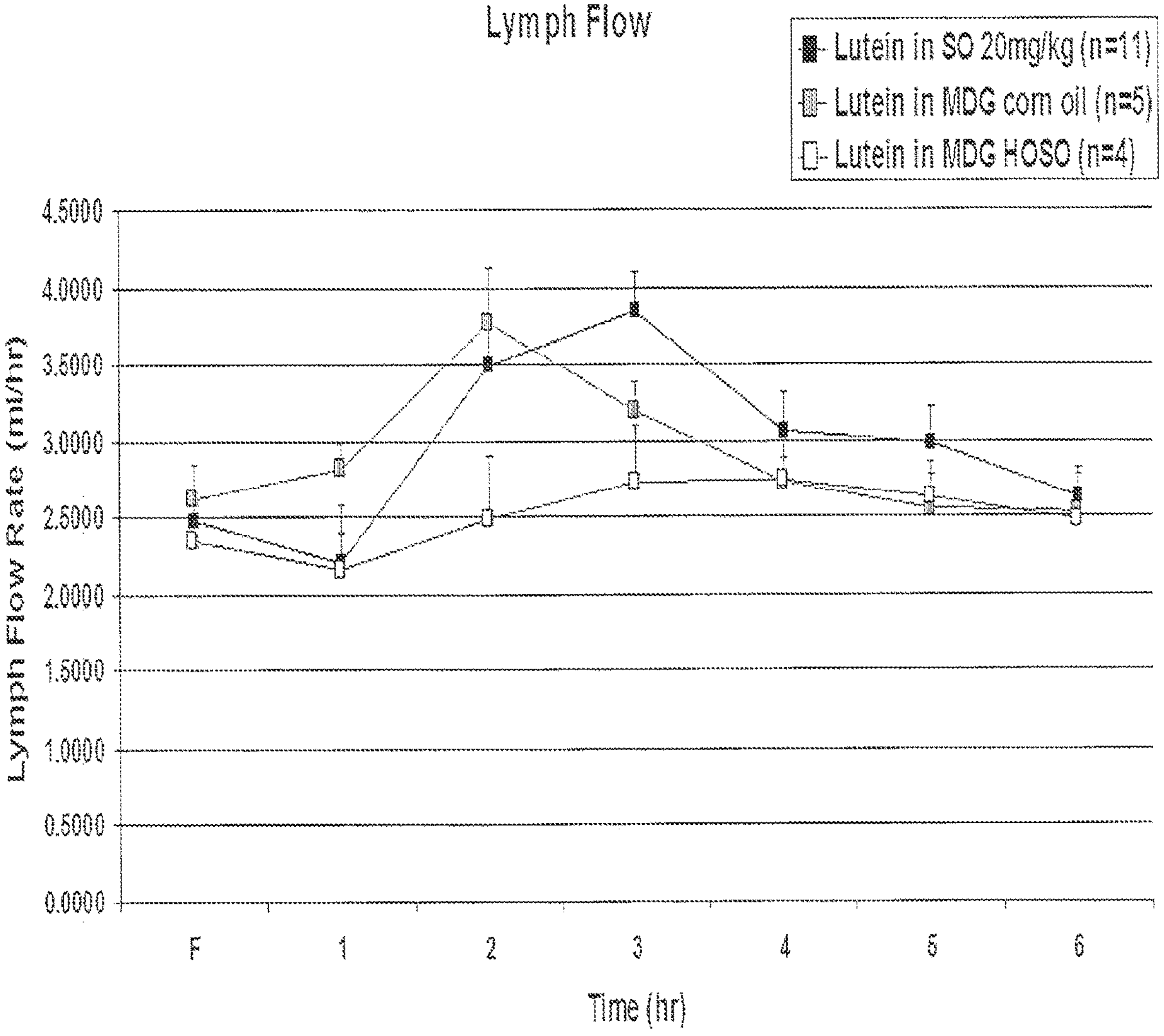
FIG. 1 shows the hourly lymph flow rate over a period of 6 hours following lutein administration of different nutritional composition batches.

The present invention relates to a nutritional composition for the delivery of nutrients, including lipophilic compounds in a more soluble form by using mono- and diglycerides (hereafter "MDG") and hydrophobic protein assembled with the lipophilic protein. This assembly of the nutritional composition containing MDG, hydrophobic protein and a lipophilic compound allows for a chaperoning of the lipophilic compound into a more soluble form to facilitate easy digestion. The formations of stable, high molecular weight assemblies (MDG plus hydrophobic protein and lipophilic protein at approximately 60 kD to approximately 400 kD) enable maximum nutritional delivery and bioavailability of the lipophilic compound due to the increase in these stable, soluble forms over lipophilic compound combinations that do not contain MDG and hydrophobic protein. Increased water soluble forms of the lipophilic compound lead to increased bioavailability following consumption.

Ultimately, this enables the nutritional composition to deliver lipophilic compounds without over-fortification, which decreases production costs, limits composition complications, and results in a more desirable product. The nutritional composition may be ingested by an infant, toddler, child or adult, thereby providing the nutrients needed for proper development, growth, and/or as a nutritional supplement. The nutritional composition may further be consumed to deliver lipophilic compounds for the treatment of numerous conditions, including bone health/growth, eye health, cardiovascular health, etc.

2. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein may be used in practice or testing of the nutritional composition. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

The term "activated" refers to MDG that has been blended with water or other aqueous liquid. The term "activation" refers to the step of blending the MDG with the aqueous liquid. For example, an "activated MDG component" means an aqueous liquid into which a MDG has been blended. For the purpose of this disclosure, an activated MDG is typically an aqueous liquid substantially free of oils or fats other than the MDG.

The term "activated assembly" refers to an assembly that comprises at least one MDG, at least one hydrophobic protein, and at least one lipophilic compound, wherein the assembly may have contacted an aqueous liquid.

The terms "adult formula" and "adult nutritional product" as used herein, are used interchangeably to refer to formulas for generally maintaining or improving the health of an adult, and includes those formulas designed for adults who have, are susceptible to, or are at risk of age-related macular degeneration.

The term "bioavailable" as used herein, unless otherwise specified, refers to the ability of a lipophilic compound to be absorbed from the gastrointestinal tract into lymph which will then enter into the bloodstream of an individual such that the substance may be absorbed into organs and tissues in the body. As the degree of bioavailability of a compound increases, the compound becomes more likely to enter into and remain in the bloodstream where it may be absorbed and used by the body. As the degree of bioavailability of a compound decreases, the compound becomes less likely to being absorbed into lymph from the gastrointestinal tract and would be excreted from the body before entering the bloodstream.

The term "casein(s)" as used herein, unless otherwise specified, should be understood to refer to those proteins in bovine milk that will precipitate from the milk at a solution pH of 4.6 (20° C.); caseins typically make up about 80% of the protein in whole, undiluted, bovine milk. Generally, any type of milk-sourced protein source may be utilized for the nutritional compositions as a source of bovine beta-casein, including whole milk, nonfat dry milk, milk protein concentrate, total milk protein, milk protein isolate, acid casein, calcium caseinate, sodium caseinate, magnesium caseinate, purified beta-casein, and combinations thereof, all of which will contain beta-casein. Beta-casein comprises around 30% of the protein contained in cow's milk, and may be present as one of several genetic variants, the two most prevalent being genetic variants A1 and A2. Bovine beta-casein has further been categorized into genetic variants including A3, B, C, D, E, F, G, H1, H2, and I.

The term "composition" as used herein, unless otherwise specified, refers to mixtures that are suitable for enteral administration to a subject. Compositions may be in the form of powders, solids, semi-solids, liquids, gels, and semi-liquids. Compositions may further comprise vitamins, minerals, and other ingredients.

The term "dry blended" as used herein, unless otherwise specified, refers to the mixing of components or ingredients to form a base nutritional powder or, to the addition of a dry, powdered or granulated component or ingredient to a base powder to form a powdered nutritional composition.

The terms "fat," "lipid," and "oil" as used herein, unless otherwise specified, are used interchangeably to refer to lipid materials derived or processed from plants or animals. These terms also include synthetic lipid materials so long as such synthetic materials are suitable for administration to subjects as defined herein.

The term "glycerides" as used herein refer generally to lipophilic compounds comprising a glycerol molecule bonded to fatty acid groups. Monoglycerides are glycerol molecules bonded to a single fatty acid group; diglycerides are glycerol molecules bonded to two fatty acid groups; and triglycerides are glycerol molecules bonded to three fatty acid groups. Fats and oils comprise glycerides, and typical fats and oils from animal, fish, algae, vegetable, or seed sources are comprised primarily of triglycerides.

The terms "high palmitic acid vegetable oil" or "HPAV oil" refer to vegetable oils comprising greater than about 22% palmitic acid, as a percentage of the total fatty acids in the HPAV oil. Examples of HPAV oil include, but are not limited to, palm oil and palm olein. For the purpose of this disclosure, HPAV oil may come from sources including, but not limited to, plants, genetically modified plants, fungi, algae, bacteria, and other single-cell organisms. For the purpose of this disclosure, the term "HPAV oil" excludes oils and fats that come from multicellular animal sources, such as beef tallow, chicken fat, fish oil, or milk butterfat.

The term "human milk fortifier" as used herein, unless otherwise specified, refers to nutritional products suitable for mixing with breast milk or preterm infant formula or infant formula for consumption by a preterm or term infant.

The term "infant," as used herein, unless otherwise specified, refers to a human about 12 months of age or younger. The term "toddler," as used herein, unless otherwise specified, refers to a human about 12 months of age to about 3 years of age. The term "child," as used herein, unless otherwise specified, refers to a human about 3 years of age to about 18 years of age. The term "adult," as used herein, unless otherwise specified, refers to a human about 18 years of age or older.

The terms "infant formula" or "infant nutritional product" as used herein are used interchangeably to refer to nutritional compositions that have the proper balance of macronutrients, micro-nutrients, and calories to provide sole or supplemental nourishment for and generally maintain or improve the health of infants, toddlers, or both. Infant formulas preferably comprise nutrients in accordance with the relevant infant formula guidelines for the targeted consumer or user population, an example of which would be the Infant Formula Act, 21 U.S.C. Section 350(a).

The term "lipophilic compound" as used herein refers to components that have greater solubility in organic solvents such as ethanol, methanol, ethyl ether, acetone, chloroform, benzene, or lipids than they have in water. Vitamin D is one example of a lipophilic nutrient. For the purpose of this disclosure, the term "lipophilic nutrient" may be applied to other lipophilic compounds, including but not limited to pharmaceutical compounds.

The terms "monoglyceride and diglyceride oil" or "MDG oil" as used herein refer to a combination of both monoglycerides and diglycerides that are present within a premix. The premix according to the disclosure may comprise monoglycerides and diglycerides in an amount of monoglycerides of at least 12%, including from about 12% to about 98%, and also including from about 20% to about 80%, including from about 20% to about 60%, and including from about 25% to about 50% by weight of the premix (excluding the weight of the lipophilic compound). The premix may comprise at least 12%, about 12% to about 98%, about 20% to about 80%, about 20% to about 60% or about 25% to about 50% by weight of the mixture of monoglycerides and diglycerides; an amount of lipophilic compound as described above; and impurities in an amount of less than about 20%, less than about 15%, less than about 10%, or less than about 2% by weight. It will be recognized by one skilled in the art based on the disclosure herein that the premix may include a small percentage of impurities such that the mixture of monoglycerides and diglycerides is not 100% by weight solely monoglycerides and diglycerides. In some embodiments, the impurity may be a triglyceride and/or free glycerol. These impurities may typically be less than about 20%, less than about 15%, less than about 10%, or less than about 2% by weight. In embodiments in which the premix comprises monoglycerides and impurities, the balance of the premix (excluding the lipophilic compound) is diglycerides.

The term "protected premix" refers to a mixture comprising a surfactant and a MDG. The surfactant may be present within, but is not limited to, the premix, the activated premix, and other components of the nutritional composition. Non-limiting examples of suitable surfactants in a protected premix include lecithin, polyglycerol esters, and combinations thereof. The protected premix may be made by blending the surfactant and the MDG in the presence of heat or at ambient temperature and, in some embodiments, with agitation. The protected premix may be added to a fat-containing solution to form an "MDG-protected component."

The term "nutritional composition" as used herein, unless otherwise specified, refers to nutritional powders, solids, semi-solids, liquids, gels, and semi-liquids that comprise at least one of protein, carbohydrate, and lipid, and are suitable for enteral administration to a subject. The nutritional composition may further comprise vitamins, minerals, and other ingredients, and represent sole, primary, or supplemental sources of nutrition.

The term "pharmaceutical composition" as used herein, may encompass any suitable form for dosing to an individual. Non-limiting examples of dosing means include enteral and parenteral dosage.

The term "powdered nutritional composition" as used herein, unless otherwise specified, refers to spray dried and/or dry blended powdered and/or agglomerated nutritional compositions comprising a lipid soluble nutrient, such as lutein, and a mixture of monoglycerides and diglycerides, which are reconstitutable with an aqueous liquid, and which are suitable for oral administration to a human.

The term "shelf life" as used herein, unless otherwise specified, refers to the stability of the assembly within a, but not limited to, powder, premix, activated premix, protected activated premix, suspension, liquid, concentrated liquid, mixture, or combination thereof.

The term "subject" as used herein refers to a mammal, including but not limited to a human (e.g., an infant, toddler, child or adult), a domesticated farm animal (e.g., cow, horse, or pig), or a pet (e.g., dog or cat), who ingests the composition.

The terms "susceptible to" or "at risk of" as used herein, unless otherwise specified, are used interchangeably to mean having little resistance to a certain condition or disease, including being genetically predisposed, having a family history of, and/or having symptoms of the condition or disease.

The term "vegetable oil" as used herein refers to a fat derived from plant, seed, fungal, or algal sources (e.g., not from a multicellular animal). A vegetable oil may be a solid or liquid fat at room temperature. Examples of vegetable oils include, but are not limited to, coconut oil, fractionated coconut oil, soy oil, corn oil, olive oil, safflower oil, high oleic safflower oil, sunflower oil, high oleic sunflower oil, palm oil, palm kernel oil, palm olein, canola oil, cottonseed oil, flax seed oil, hemp seed oil, peanut oil, borage oil, algal oils, fungal oils, and combinations thereof.

To the extent that the terms "includes," "including," "contains," or "containing" are used herein, they are intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. Also, to the extent that the terms "in" or "into" are used herein, they are intended to additionally mean "on" or "onto."

All percentages, parts and ratios as used herein, are by weight of the total composition, unless otherwise specified. All such weights as they pertain to listed ingredients are based on the active level and, therefore, do not include solvents or by-products that may be included in commercially available materials, unless otherwise specified.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein may be performed in any order, unless otherwise specified or clearly implied to the contrary by the context in which the referenced combination is made.

The various embodiments of the nutritional compositions of the present disclosure may also be substantially free of any optional or selected essential ingredient or feature described herein, provided that the remaining composition still contains all of the required ingredients or features as described herein. In this context, and unless otherwise specified, the term "substantially free" means that the selected compositions contain less than a functional amount of the optional ingredient, typically less than 0.1% by weight, and also including zero percent by weight of such optional or selected essential ingredient.

The nutritional and pharmaceutical compositions and corresponding manufacturing methods of the present disclosure may comprise, consist of, or consist essentially of the essential elements of the disclosure as described herein, as well as any additional or optional element described herein or which is otherwise useful in nutritional and pharmaceutical composition applications.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

3. Nutrient Composition

Provided herein is a nutritional composition. The nutritional composition comprises at least one protein, at least one fat, and at least one lipophilic compound. As explained below, the nutritional composition includes assemblies of agglomerated compounds that increase the bioavailability of the lipophilic compounds following consumption. The nutritional composition may include an assembly comprising at least one lipophilic compound, at least one protein, and at least one fat. The combination of fat (e.g., MDG) and protein (e.g., hydrophobic protein) interacts with lipophilic compounds, such as lutein and Vitamin D, enhancing solubility and stability of lipophilic compounds, compared to assemblies without MDG and hydrophobic protein. The nutritional composition may comprise a premix, an activated premix, and a protected premix.

The nutritional composition may be used for consumption. The nutritional composition may be ingested by an infant and thus, provides the infant nutrients needed for proper development and growth. The nutritional composition may also be ingested by a toddler or child, for proper delivery of nutrients for continued development and growth. The nutritional composition may also be ingested by an adult, as a nutritional supplement. The nutritional composition can be used to deliver lipophilic compounds for the treatment of numerous conditions, including bone health/growth, eye health, cardiovascular health, etc.

The composition may be in any useful form. Non-limiting product forms include: solids, semi-solids, ready-to-drink liquids, concentrated liquids, gels, and powders. In some embodiments, the composition may be in the form of a flowable or substantially flowable particulate composition. In some embodiments, the composition may be easily scooped and measured with a spoon or similar other device, such that the composition may easily be reconstituted by the intended user with a suitable aqueous liquid, such as water, to form a liquid nutritional or pharmaceutical composition for immediate oral or enteral use. In this context, "immediate" use generally means within about 48 hours, most typically within about 24 hours, and in some embodiments, immediately after reconstitution.

In some embodiments, the composition may include spray dried powders, dry blended powders, agglomerated powders, combinations thereof, or powders prepared by other suitable methods.

In some embodiments, the composition may be contained in a dosage element suitable for oral consumption. Suitable dosage elements include tablets, hard gelatin capsules, starch capsules, cellulose-based capsules, softgel capsules, and elixirs.

In some embodiments, the powdered composition may be compressed into a tablet. In some embodiments, the powdered composition may be included in a capsule. Capsules comprise a shell surrounding and containing the composition. The capsule shell dissolves or disintegrates in the digestive tract after the capsule is ingested, thereby releasing the composition to be absorbed by the body of the individual ingesting the capsule. Capsule shells are typically made of gelatin, starch, cellulose, or other components that readily dissolve or disintegrate after ingestion, and the composition, manufacture, and use of capsule shells are well known in the art. In some embodiments, the dosage element for the composition is a softgel capsule. Softgel capsules are particularly suitable for containing liquid-based ingredients, such as nutrients dissolved, dispersed or suspended in a carrier oil. The shell of a softgel capsule is typically made of gelatin plasticized with glycerin and water, although vegetarian softgel capsules made from starch or carrageenan are also available. Softgel capsule shells are typically made and filled with the composition in continuous processes that are known in the art. Softgel capsules are made by manufacturers such as Catalent Pharma Solutions, LLC (Somerset, NJ) and Captek Softgel International (Cerritos, CA).

Capsules come in a wide range of sizes, and the capsule size should be chosen to contain an appropriate volume or weight of the composition and, hence, an appropriate dosage of the lipophilic compound. The capsule size can be chosen to contain at least about 0.1 grams of the composition, including from about 0.1 grams to about 30 grams, from about 0.2 grams to about 20 grams, from about 0.25 grams to about 15 grams, from about 0.25 grams to about 10 grams, from about 0.25 grams to about 5 grams, from about 0.25 to about 3 grams, from about 0.25 grams to about 1.5 grams, or about 0.25 to about 1.0 grams of the composition. In some embodiments, for use with humans, the capsules contain from about 0.1 grams to about 1.5 grams or from about 0.2 grams to about 1.0 grams of the composition, as these capsule sizes are most convenient for most adults and children to swallow. In some embodiments, for use with large animals, such as domesticated farm animals, the capsules contain from about 0.1 grams to about 30 grams or from about 1.0 grams to about 30 grams of the composition.

The nutritional composition may be formulated with sufficient kinds and amounts of nutrients so as to provide a sole, primary, or supplemental source of nutrition, or to provide a specialized nutritional composition for use in individuals afflicted with specific diseases or conditions.

The nutritional composition may have a caloric density tailored to the nutritional needs of the ultimate user, although in most instances the nutritional composition may comprise from about 65 to about 800 kcal/240 mL. The nutritional composition, as discussed herein, provides a method to easily and effectively control caloric intake to an individual (e.g., infant, toddler, child or adult). The ability to tightly control caloric intake is important because different individuals have different caloric needs. The nutritional composition may comprise a caloric density of about 75 to about 700 kcal/240 mL. The nutritional composition may comprise a caloric density of about 100 to about 650 kcal/240 mL. For example, the nutritional composition may comprise about 65 kcal/240 mL, 70 kcal/240 mL, 75 kcal/240 mL, 80 kcal/240 mL, 85 kcal/240 mL, 90 kcal/240 mL, 95 kcal/240 mL, 100 kcal/240 mL, 105 kcal/240 mL, 110 kcal/240 mL, 115 kcal/240 mL, 120 kcal/240 mL, 125 kcal/240 mL, 130 kcal/240 mL, 135 kcal/240 mL, 140 kcal/240 mL, 145 kcal/240 mL, 150 kcal/240 mL, 155 kcal/240 mL, 160 kcal/240 mL, 165 kcal/240 mL, 170 kcal/240 mL, 175 kcal/240 mL, 180 kcal/240 mL, 185 kcal/240 mL, 190 kcal/240 mL, 195 kcal/240 mL, 200 kcal/240 mL, 205 kcal/240 mL, 210 kcal/240 mL, 215 kcal/240 mL, 220 kcal/240 mL, 225 kcal/240 mL, 230 kcal/240 mL, 235 kcal/240 mL, 240 kcal/240 mL, 245 kcal/240 mL, 250 kcal/240 mL, 255 kcal/240 mL, 260 kcal/240 mL, 265 kcal/240 mL, 270 kcal/240 mL, 275 kcal/240 mL, 280 kcal/240 mL, 285 kcal/240 mL, 290 kcal/240 mL, 295 kcal/240 mL, 300 kcal/240 mL, 305 kcal/240 mL, 310 kcal/240 mL, 315 kcal/240 mL, 320 kcal/240 mL, 325 kcal/240 mL, 330 kcal/240 mL, 335 kcal/240 mL, 340 kcal/240 mL, 345 kcal/240 mL, 350 kcal/240 mL, 355 kcal/240 mL, 360 kcal/240 mL, 365 kcal/240 mL, 370 kcal/240 mL, 375 kcal/240 mL, 380 kcal/240 mL, 385 kcal/240 mL, 390 kcal/240 mL, 395 kcal/240 mL, 400 kcal/240 mL, 405 kcal/240 mL, 410 kcal/240 mL, 415 kcal/240 mL, 420 kcal/240 mL, 425 kcal/240 mL, 430 kcal/240 mL, 435 kcal/240 mL, 440 kcal/240 mL, 445 kcal/240 mL, 450 kcal/240 mL, 455 kcal/240 mL, 460 kcal/240 mL, 465 kcal/240 mL, 470 kcal/240 mL, 475 kcal/240 mL, 480 kcal/240 mL, 485 kcal/240 mL, 490 kcal/240 mL, 495 kcal/240 mL, 500 kcal/240 mL, 550 kcal/240 mL, 600 kcal/240 mL, 650 kcal/240 mL, 700 kcal/240 mL, 750 kcal/240 mL, or 800 kcal/240 mL.

Further, non-limiting examples of the composition include human milk fortifiers, preterm infant formulas, infant formulas, elemental and semi-elemental formulas, pediatric formulas, toddler formulas, adult formulas, nutritional supplements, capsules, suppositories, sprays, drops, lotions, ointments, microcapsules, and liposomes.

The at least one lipophilic compound may be in the nutritional composition at about 1 μg/kg to about 10 g/kg of lipophilic compound. The at least one lipophilic compound may be in the nutritional composition at about 1 μg/kg to about 7 g/kg of lipophilic compound. The at least one lipophilic compound may be in the nutritional composition at about 500 μg/kg to about 5 g/kg of lipophilic compound. The at least one lipophilic compound may be in the nutritional composition at about 1 mg/kg to about 1 g/kg of lipophilic compound. The at least one lipophilic compound may be in the nutritional composition at about 100 mg/kg to about 1 g/kg of lipophilic compound. For example, the lipophilic compound may be in the nutritional composition at about 1 μg/kg, 10 μg/kg, 50 μg/kg, 100 μg/kg, 150 μg/kg, 200 μg/kg, 250 μg/kg, 300 μg/kg, 350 μg/kg, 400 μg/kg, 450 μg/kg, 500 μg/kg, 550 μg/kg, 600 μg/kg, 650 μg/kg, 700 μg/kg, 750 μg/kg, 800 μg/kg, 850 μg/kg, 900 μg/kg, 950 μg/kg, 1 mg/kg, 10 mg/kg, 50 mg/kg, 100 mg/kg, 150 mg/kg, 200 mg/kg, 250 mg/kg, 300 mg/kg, 350 mg/kg, 400 mg/kg, 450 mg/kg, 500 mg/kg, 550 mg/kg, 600 mg/kg, 650 mg/kg, 700 mg/kg, 750 mg/kg, 800 mg/kg, 850 mg/kg, 900 mg/kg, 950 mg/kg, 1 g/kg, 0.5 g/kg, 1 g/kg, 1.5 g/kg, 2 g/kg, 2.5 g/kg, 3 g/kg, 3.5 g/kg, 4 g/kg, 4.5 g/kg, 5 g/kg, 5.5 g/kg, 6 g/kg, 6.5 g/kg, 7 g/kg, 7.5 g/kg, 8 g/kg, 8.5 g/kg, 9 g/kg, 9.5 g/kg, or 10 g/kg.

The at least one fat may be in the nutritional composition at about 10 g/kg to about 100 g/kg. The at least one fat may be in the nutritional composition at about 20 g/kg to about 80 g/kg. The at least one fat may be in the nutritional composition at about 30 g/kg to about 70 g/kg. The at least one fat may be in the nutritional composition at about 40 g/kg to about 60 g/kg. For example, the at least one fat may be in the nutritional composition at about 10 g/kg, 10.5 g/kg, 11 g/kg, 11.5 g/kg, 12 g/kg, 12.5 g/kg, 13 g/kg, 13.5 g/kg, 14 g/kg, 14.5 g/kg, 15 g/kg, 15.5 g/kg, 16 g/kg, 16.5 g/kg, 17 g/kg, 17.5 g/kg, 18 g/kg, 18.5 g/kg, 19 g/kg, 19.5 g/kg, 20 g/kg, 20.5 g/kg, 21 g/kg, 21.5 g/kg, 22 g/kg, 22.5 g/kg, 23 g/kg, 23.5 g/kg, 24 g/kg, 24.5 g/kg, 25 g/kg, 25.5 g/kg, 26 g/kg, 26.5 g/kg, 27 g/kg, 27.5 g/kg, 28 g/kg, 28.5 g/kg, 29 g/kg, 29.5 g/kg, 30 g/kg, 30.5 g/kg, 31 g/kg, 31.5 g/kg, 32 g/kg, 32.5 g/kg, 33 g/kg, 33.5 g/kg, 34 g/kg, 34.5 g/kg, 35 g/kg, 35.5 g/kg, 36 g/kg, 36.5 g/kg, 37 g/kg, 37.5 g/kg, 38 g/kg, 38.5 g/kg, 39 g/kg, 39.5 g/kg, 40 g/kg, 40.5 g/kg, 41 g/kg, 41.5 g/kg, 42 g/kg, 42.5 g/kg, 43 g/kg, 43.5 g/kg, 44 g/kg, 44.5 g/kg, 45 g/kg, 45.5 g/kg, 46 g/kg, 46.5 g/kg, 47 g/kg, 47.5 g/kg, 48 g/kg, 48.5 g/kg, 49 g/kg, 49.5 g/kg, 50 g/kg, 50.5 g/kg, 51 g/kg, 51.5 g/kg, 52 g/kg, 52.5 g/kg, 53 g/kg, 53.5 g/kg, 54 g/kg, 54.5 g/kg, 55 g/kg, 55.5 g/kg, 56 g/kg, 56.5 g/kg, 57 g/kg, 57.5 g/kg, 58 g/kg, 58.5 g/kg, 59 g/kg, 59.5 g/kg, 60 g/kg, 60.5 g/kg, 61 g/kg, 61.5 g/kg, 62 g/kg, 62.5 g/kg, 63 g/kg, 63.5 g/kg, 64 g/kg, 64.5 g/kg, 65 g/kg, 65.5 g/kg, 66 g/kg, 66.5 g/kg, 67 g/kg, 67.5 g/kg, 68 g/kg, 68.5 g/kg, 69 g/kg, 69.5 g/kg, 70 g/kg, 70.5 g/kg, 71 g/kg, 71.5 g/kg, 72 g/kg, 72.5 g/kg, 73 g/kg, 73.5 g/kg, 74 g/kg, 74.5 g/kg, 75 g/kg, 75.5 g/kg, 76 g/kg, 76.5 g/kg, 77 g/kg, 77.5 g/kg, 78 g/kg, 78.5 g/kg, 79 g/kg, 79.5 g/kg, 80 g/kg, 80.5 g/kg, 81 g/kg, 81.5 g/kg, 82 g/kg, 82.5 g/kg, 83 g/kg, 83.5 g/kg, 84 g/kg, 84.5 g/kg, 85 g/kg, 85.5 g/kg, 86 g/kg, 86.5 g/kg, 87 g/kg, 87.5 g/kg, 88 g/kg, 88.5 g/kg, 89 g/kg, 89.5 g/kg, 90 g/kg, 90.5 g/kg, 91 g/kg, 91.5 g/kg, 92 g/kg, 92.5 g/kg, 93 g/kg, 93.5 g/kg, 94 g/kg, 94.5 g/kg, 95 g/kg, 95.5 g/kg, 96 g/kg, 96.5 g/kg, 97 g/kg, 97.5 g/kg, 98 g/kg, 98.5 g/kg, 99 g/kg, 99.5 g/kg, or 100 g/kg.

The at least one protein may be in the nutritional composition at about 10 g/kg to about 100 g/kg. The at least one protein may be in the nutritional composition at about 20 g/kg to about 80 g/kg. The at least one protein may be in the nutritional composition at about 30 g/kg to about 70 g/kg. The at least one protein may be in the nutritional composition at about 40 g/kg to about 60 g/kg. For example, the at least one protein may be in the nutritional composition at about 10 g/kg, 10.5 g/kg, 11 g/kg, 11.5 g/kg, 12 g/kg, 12.5 g/kg, 13 g/kg, 13.5 g/kg, 14 g/kg, 14.5 g/kg, 15 g/kg, 15.5 g/kg, 16 g/kg, 16.5 g/kg, 17 g/kg, 17.5 g/kg, 18 g/kg, 18.5 g/kg, 19 g/kg, 19.5 g/kg, 20 g/kg, 20.5 g/kg, 21 g/kg, 21.5 g/kg, 22 g/kg, 22.5 g/kg, 23 g/kg, 23.5 g/kg, 24 g/kg, 24.5 g/kg, 25 g/kg, 25.5 g/kg, 26 g/kg, 26.5 g/kg, 27 g/kg, 27.5 g/kg, 28 g/kg, 28.5 g/kg, 29 g/kg, 29.5 g/kg, 30 g/kg, 30.5 g/kg, 31 g/kg, 31.5 g/kg, 32 g/kg, 32.5 g/kg, 33 g/kg, 33.5 g/kg, 34 g/kg, 34.5 g/kg, 35 g/kg, 35.5 g/kg, 36 g/kg, 36.5 g/kg, 37 g/kg, 37.5 g/kg, 38 g/kg, 38.5 g/kg, 39 g/kg, 39.5 g/kg, 40 g/kg, 40.5 g/kg, 41 g/kg, 41.5 g/kg, 42 g/kg, 42.5 g/kg, 43 g/kg, 43.5 g/kg, 44 g/kg, 44.5 g/kg, 45 g/kg, 45.5 g/kg, 46 g/kg, 46.5 g/kg, 47 g/kg, 47.5 g/kg, 48 g/kg, 48.5 g/kg, 49 g/kg, 49.5 g/kg, 50 g/kg, 50.5 g/kg, 51 g/kg, 51.5 g/kg, 52 g/kg, 52.5 g/kg, 53 g/kg, 53.5 g/kg, 54 g/kg, 54.5 g/kg, 55 g/kg, 55.5 g/kg, 56 g/kg, 56.5 g/kg, 57 g/kg, 57.5 g/kg, 58 g/kg, 58.5 g/kg, 59 g/kg, 59.5 g/kg, 60 g/kg, 60.5 g/kg, 61 g/kg, 61.5 g/kg, 62 g/kg, 62.5 g/kg, 63 g/kg, 63.5 g/kg, 64 g/kg, 64.5 g/kg, 65 g/kg, 65.5 g/kg, 66 g/kg, 66.5 g/kg, 67 g/kg, 67.5 g/kg, 68 g/kg, 68.5 g/kg, 69 g/kg, 69.5 g/kg, 70 g/kg, 70.5 g/kg, 71 g/kg, 71.5 g/kg, 72 g/kg, 72.5 g/kg, 73 g/kg, 73.5 g/kg, 74 g/kg, 74.5 g/kg, 75 g/kg, 75.5 g/kg, 76 g/kg, 76.5 g/kg, 77 g/kg, 77.5 g/kg, 78 g/kg, 78.5 g/kg, 79 g/kg, 79.5 g/kg, 80 g/kg, 80.5 g/kg, 81 g/kg, 81.5 g/kg, 82 g/kg, 82.5 g/kg, 83 g/kg, 83.5 g/kg, 84 g/kg, 84.5 g/kg, 85 g/kg, 85.5 g/kg, 86 g/kg, 86.5 g/kg, 87 g/kg, 87.5 g/kg, 88 g/kg, 88.5 g/kg, 89 g/kg, 89.5 g/kg, 90 g/kg, 90.5 g/kg, 91 g/kg, 91.5 g/kg, 92 g/kg, 92.5 g/kg, 93 g/kg, 93.5 g/kg, 94 g/kg, 94.5 g/kg, 95 g/kg, 95.5 g/kg, 96 g/kg, 96.5 g/kg, 97 g/kg, 97.5 g/kg, 98 g/kg, 98.5 g/kg, 99 g/kg, 99.5 g/kg, or 100 g/kg.

The ratios and amounts between the different compounds are critical in the resultant assemblies formed during composition. In order to form stable, high molecular weight assemblies, the w/w ratio of MDG to lipophilic compound may be in the nutritional composition at about 12,000:1 to about 1:1. The w/w ratio of MDG to lipophilic compound may be in the nutritional composition at about 10,000:1 to about 1:1. The w/w ratio of MDG to lipophilic compound may be in the nutritional composition at about 1,000:1 to about 1:1. The w/w ratio of MDG to lipophilic compound may be in the nutritional composition at about 100:1 to about 1:1. For example, w/w ratio of MDG to lipophilic compound may be in the nutritional composition at about 12000:1, 11500:1, 11000:1, 10500:1, 10000:1, 9500:1, 9000:1, 8500:1, 8000:1, 7500:1, 7000:1, 6500:1, 6000:1, 5500:1, 5000:1, 4900:1, 4800:1, 4700:1, 4600:1, 4500:1, 4400:1, 4300:1, 4200:1, 4100:1, 4000:1, 3900:1, 3800:1, 3700:1, 3600:1, 3500:1, 3400:1, 3300:1, 3200:1, 3100:1, 3000:1, 2900:1, 2800:1, 2700:1, 2600:1, 2500:1, 2400:1, 2300:1, 2200:1, 2100:1, 2000:1, 1900:1, 1800:1, 1700:1, 1600:1, 1500:1, 1400:1, 1300:1, 1200:1, 1100:1, 1000:1, 950:1, 900:1, 850:1, 800:1, 750:1, 700:1, 650:1, 600:1, 550:1, 500:1, 450:1, 400:1, 350:1, 300:1, 250:1, 200:1, 150:1, 100:1, 90:1, 80:1, 70:1, 60:1, 50:1, 40:1, 30:1, 20:1, 10:1, 9:1, 8:1, 7:1, 6:1, 5:1, 4:1, 3:1, 2:1, or 1:1.

One embodiment of the nutritional composition may comprise about 145 mg/kg to about 600 mg/kg of MDG and about 1.12 g/kg of a lipophilic compound.

In another embodiment, the nutritional composition may comprise about 0.1 mg/kg to about 10 mg/kg of MDG and about 20 μg/kg of vitamin D.

b. Assembly

The nutritional composition may comprise an assembly. The assembly may comprise at least one fat, at least one protein, and at least one lipophilic compound. The assembly may comprise MDG, at least one hydrophobic protein, and at least one lipophilic compound. It is well known in the art that lipophilic compounds have limited aqueous solubility, resulting in their decreased bioavailability when consumed as part of a nutritional composition. The assembly increases the aqueous solubility of lipophilic compounds. Accordingly, the assembly increases the bioavailability of the lipophilic compounds, and their resultant absorption within the gastrointestinal (GI) tract, relative to controls without MDG and hydrophobic protein.

The assembly is water soluble, and the interactions between MDG, the at least one hydrophobic protein and at least one lipophilic compound allow for stability of the assembly to withstand high-speed centrifugal forces. For example, the nutritional composition may be centrifuged at 1×g, 50×g, 100×g, 500×g, 1000×g, 1500×g, 2000×g, 2500×g, 3000×g, 3500×g, 4000×g, 4500×g, 5000×g, 5500×g, 6000×g, 6500×g, 7000×g, 7500×g, 8000×g, 8500×g, 9000×g, 9500×g, 10000×g, 10500×g, 11000×g, 11500×g, 12000×g, 12500×g, 13000×g, 13500×g, 14000×g, 14500×g, 15000×g, 15500×g, 16000×g, 16500×g, 17000×g, 17500×g, 18000×g, 18500×g, 19000×g, 19500×g, 20000×g, 20500×g, 21000×g, 21500×g, 22000×g, 22500×g, 23000×g, 23500×g, 24000×g, 24500×g, 25000×g, 25500×g, 26000×g, 26500×g, 27000×g, 27500×g, 28000×g, 28500×g, 29000×g, 29500×g, 30000×g, 30500×g, 31000×g, 31500×g, 32000×g, 32500×g, 33000×g, 33500×g, 34000×g, 34500×g, 35000×g, 35500×g, 36000×g, 36500×g, 37000×g, 37500×g, 38000×g, 38500×g, 39000×g, 39500×g, 40000×g, 40500×g, 41000×g, 41500×g, 42000×g, 42500×g, 43000×g, 43500×g, 44000×g, 44500×g, 45000×g, 45500×g, 46000×g, 46500×g, 47000×g, 47500×g, 48000×g, 48500×g, 49000×g, 49500×g, 50000×g, 50500×g, 51000×g, 51500×g, 52000×g, 52500×g, 53000×g, 53500×g, 54000×g, 54500×g, 55000×g, 55500×g, 56000×g, 56500×g, 57000×g, 57500×g, 58000×g, 58500×g, 59000×g, 59500×g, 60000×g, 60500×g, 61000×g, 61500×g, 62000×g, 62500×g, 63000×g, 63500×g, 64000×g, 64500×g, 65000×g, 65500×g, 66000×g, 66500×g, 67000×g, 67500×g, 68000×g, 68500×g, 69000×g, 69500×g, 70000×g, 70500×g, 71000×g, 71500×g, 72000×g, 72500×g, 73000×g, 73500×g, 74000×g, 74500×g, 75000×g, 75500×g, 76000×g, 76500×g, 77000×g, 77500×g, 78000×g, 78500×g, 79000×g, 79500×g, 80000×g, 80500×g, 81000×g, 81500×g, 82000×g, 82500×g, 83000×g, 83500×g, 84000×g, 84500×g, 85000×g, 85500×g, 86000×g, 86500×g, 87000×g, 87500×g, 88000×g, 88500×g, 89000×g, 89500×g, 90000×g, 90500×g, 91000×g, 91500×g, 92000×g, 92500×g, 93000×g, 93500×g, 94000×g, 94500×g, 95000×g, 95500×g, 96000×g, 96500×g, 97000×g, 97500×g, 98000×g, 98500×g, 99000×g, 99500×g, or 100000×g.

In some embodiments, the assembly is still water soluble after centrifugation at about 31,000×g for at least 1 hour at 20° C. In some embodiments, at least 5% of the assembly remains in the aqueous phase after centrifugation.

The nutritional composition may be spun down using a centrifuge to assess the amount of fat, protein and lipophilic compound remaining in the aqueous phase. It is hypothesized, without being bound to any particular theory, that the fat and lipophilic compound that remain in the aqueous phase following centrifugation are likely associated with the assembly due to their limited aqueous solubility. It should be noted that different centrifugal speeds and times may be used to spin down the nutritional composition. Accordingly, one skilled in the art would appreciate that different centrifugal conditions may provide different amounts of the assembly, and corresponding compounds, within the aqueous phase, but will still allow quantification of desired compound.

In some embodiments, the details of centrifugation are as follows: speed of centrifugation: 1000×g, centrifugation time: 15 min, centrifugation temperature: 20° C., centrifuge tubes: Cellstar tube 50 ml from Greiner bio-one, tube diameter: 23 mm, amount of product in tube: 45 ml, centrifuge: type 5810 R from Eppendorf, and aqueous phase isolation by syringe through the cream layer.

In some embodiments, the details of centrifugation are as follows: speed of centrifugation: 4500×g, centrifugation time: 15 min, centrifugation temperature: 20° C., centrifuge tubes: Cellstar tube 50 ml from Greiner bio-one, tube diameter: 23 mm, amount of product in tube: 45 ml, centrifuge: type 5810 R from Eppendorf, and aqueous phase isolation by syringe through the cream layer.

In some embodiments, the details of centrifugation are as follows: speed of centrifugation: 100,000×g, centrifugation time: 1 h, centrifugation temperature: 20° C., centrifuge tubes: Ultra Clear Centrifuge tubes from Beckmann Coulter, tube size: 14×89 mm, amount of product in tube: 11.3 g, centrifuge: type L-90K from Beckmann Coulter, aqueous phase isolation by freezing the tube with content in liquid nitrogen and cutting the part with the serum phase including the tube wall followed by thawing the content of this part of the tube.

In some embodiments, the centrifuge procedure may be performed as follows, approximately 35 g of nutritional composition is transferred into a 50-mL polypropylene centrifuge tube (capable of withstanding 100,000×g; e.g., VWR catalog no. 21007-290). The tubes are capped and placed in a JA-20 rotor in a Beckman Coulter Model Avanti J-E centrifuge. The temperature is set at 20° C., and the tubes are centrifuged at 31,000×g (16,000 rpm) for 1 to 4 hours. The tubes are removed from the centrifuge, and approximately 0.6 to 1.0 g of supernatant is transferred into a tared 10 mL volumetric flask, and the supernatant sample weight is recorded. The supernatant sample in the 10 mL volumetric flask is diluted to 7.0 g with Milli-Q Plus water, and stirred for five minutes. The diluted supernatant sample in the 10 mL volumetric flask is then diluted to 10 mL with acetonitrile containing trifluoroacetic acid at 0.33% (v/v), and stirred for an additional five minutes. The flask is stoppered, and inverted repeatedly to thoroughly mix. A 1.0 to 1.5 mL aliquot is transferred from the flask into an HPLC autosampler vial. The vial is capped, and the aliquot is tested for the presence of different variables within the aqueous phase, such as MDG, lutein, hydrophobic protein, etc.

In one embodiment, the nutritional composition may be centrifuged at 1,000×g for 1 hour at 20° C. In one embodiment, the nutritional composition may be centrifuged at 31,000×g for 1 hour at 20° C. In one embodiment, the nutritional composition may be centrifuged at 100,000×g for 1 hour at 20° C.

MDG may be in the aqueous phase at about 0.001% to about 50% of the nutritional composition, following centrifugation at 1,000×g for 1 hour at 20° C. MDG may be in the aqueous phase at about 0.5% to about 40% of the nutritional composition, following centrifugation at 1,000×g for 1 hour at 20° C. MDG may be in the aqueous phase at about 5% to about 30% of the nutritional composition, following centrifugation at 1,000×g for 1 hour at 20° C. MDG may be in the aqueous phase at about 15% to about 25% of the nutritional composition, following centrifugation at 1,000×g for 1 hour at 20° C. For example, MDG may be in the aqueous phase at about 0.001%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5%, 5.25%, 5.5%, 5.75%, 6%, 6.25%, 6.5%, 6.75%, 7%, 7.25%, 7.5%, 7.75%, 8%, 8.25%, 8.5%, 8.75%, 9%, 9.25%, 9.5%, 9.75%, 10%, 10.25%, 10.5%, 10.75%, 11%, 11.25%, 11.5%, 11.75%, 12%, 12.25%, 12.5%, 12.75%, 13%, 13.25%, 13.5%, 13.75%, 14%, 14.25%, 14.5%, 14.75%, 15%, 15.25%, 15.5%, 15.75%, 16%, 16.25%, 16.5%, 16.75%, 17%, 17.25%, 17.5%, 17.75%, 18%, 18.25%, 18.5%, 18.75%, 19%, 19.25%, 19.5%, 19.75%, 20%, 20.25%, 20.5%, 20.75%, 21%, 21.25%, 21.5%, 21.75%, 22%, 22.25%, 22.5%, 22.75%, 23%, 23.25%, 23.5%, 23.75%, 24%, 24.25%, 24.5%, 24.75%, 25%, 25.25%, 25.5%, 25.75%, 26%, 26.25%, 26.5%, 26.75%, 27%, 27.25%, 27.5%, 27.75%, 28%, 28.25%, 28.5%, 28.75%, 29%, 29.25%, 29.5%, 29.75%, 30%, 30.25%, 30.5%, 30.75%, 31%, 31.25%, 31.5%, 31.75%, 32%, 32.25%, 32.5%, 32.75%, 33%, 33.25%, 33.5%, 33.75%, 34%, 34.25%, 34.5%, 34.75%, 35%, 35.25%, 35.5%, 35.75%, 36%, 36.25%, 36.5%, 36.75%, 37%, 37.25%, 37.5%, 37.75%, 38%, 38.25%, 38.5%, 38.75%, 39%, 39.25%, 39.5%, 39.75%, 40%, 40.25%, 40.5%, 40.75%, 41%, 41.25%, 41.5%, 41.75%, 42%, 42.25%, 42.5%, 42.75%, 43%, 43.25%, 43.5%, 43.75%, 44%, 44.25%, 44.5%, 44.75%, 45%, 45.25%, 45.5%, 45.75%, 46%, 46.25%, 46.5%, 46.75%, 47%, 47.25%, 47.5%, 47.75%, 48%, 48.25%, 48.5%, 48.75%, 49%, 49.25%, 49.5%, 49.75%, or 50% of the nutritional composition, following centrifugation at 1,000×g for 1 hour at 20° C.

MDG may be in the aqueous phase at about 0.001% to about 30% of the nutritional composition, following centrifugation at 31,000×g for 1 hour at 20° C. MDG may be in the aqueous phase at about 0.1% to about 20% of the nutritional composition, following centrifugation at 31,000×g for 1 hour at 20° C. MDG may be in the aqueous phase at about 1% to about 5% of the nutritional composition, following centrifugation at 31,000×g for 1 hour at 20° C. For example, MDG may be in the aqueous phase at about 0.001%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5%, 5.25%, 5.5%, 5.75%, 6%, 6.25%, 6.5%, 6.75%, 7%, 7.25%, 7.5%, 7.75%, 8%, 8.25%, 8.5%, 8.75%, 9%, 9.25%, 9.5%, 9.75%, 10%, 10.25%, 10.5%, 10.75%, 11%, 11.25%, 11.5%, 11.75%, 12%, 12.25%, 12.5%, 12.75%, 13%, 13.25%, 13.5%, 13.75%, 14%, 14.25%, 14.5%, 14.75%, 15%, 15.25%, 15.5%, 15.75%, 16%, 16.25%, 16.5%, 16.75%, 17%, 17.25%, 17.5%, 17.75%, 18%, 18.25%, 18.5%, 18.75%, 19%, 19.25%, 19.5%, 19.75%, 20%, 20.25%, 20.5%, 20.75%, 21%, 21.25%, 21.5%, 21.75%, 22%, 22.25%, 22.5%, 22.75%, 23%, 23.25%, 23.5%, 23.75%, 24%, 24.25%, 24.5%, 24.75%, 25%, 25.25%, 25.5%, 25.75%, 26%, 26.25%, 26.5%, 26.75%, 27%, 27.25%, 27.5%, 27.75%, 28%, 28.25%, 28.5%, 28.75%, 29%, 29.25%, 29.5%, 29.75%, or 30% of the nutritional composition, following centrifugation at 31,000×g for 1 hour at 20° C.

MDG may be in the aqueous phase at about 0.001% to about 20% of the nutritional composition, following centrifugation at 100,000×g for 1 hour at 20° C. MDG may be in the aqueous phase at about 0.01% to about 15% of the nutritional composition, following centrifugation at 100,000×g for 1 hour at 20° C. MDG may be in the aqueous phase at about 0.1% to about 10% of the nutritional composition, following centrifugation at 100,000×g for 1 hour at 20° C. MDG may be in the aqueous phase at about 1% to about 5% of the nutritional composition, following centrifugation at 100,000×g for 1 hour at 20° C. For example, MDG may be in the aqueous phase at about 0.001%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9%, 5%, 5.1%, 5.2%, 5.3%, 5.4%, 5.5%, 5.6%, 5.7%, 5.8%, 5.9%, 6%, 6.1%, 6.2%, 6.3%, 6.4%, 6.5%, 6.6%, 6.7%, 6.8%, 6.9%, 7%, 7.1%, 7.2%, 7.3%, 7.4%, 7.5%, 7.6%, 7.7%, 7.8%, 7.9%, 8%, 8.1%, 8.2%, 8.3%, 8.4%, 8.5%, 8.6%, 8.7%, 8.8%, 8.9%, 9%, 9.1%, 9.2%, 9.3%, 9.4%, 9.5%, 9.6%, 9.7%, 9.8%, 9.9%, 10%, 10.1%, 10.2%, 10.3%, 10.4%, 10.5%, 10.6%, 10.7%, 10.8%, 10.9%, 11%, 11.1%, 11.2%, 11.3%, 11.4%, 11.5%, 11.6%, 11.7%, 11.8%, 11.9%, 12%, 12.1%, 12.2%, 12.3%, 12.4%, 12.5%, 12.6%, 12.7%, 12.8%, 12.9%, 13%, 13.1%, 13.2%, 13.3%, 13.4%, 13.5%, 13.6%, 13.7%, 13.8%, 13.9%, 14%, 14.1%, 14.2%, 14.3%, 14.4%, 14.5%, 14.6%, 14.7%, 14.8%, 14.9%, 15%, 15.1%, 15.2%, 15.3%, 15.4%, 15.5%, 15.6%, 15.7%, 15.8%, 15.9%, 16%, 16.1%, 16.2%, 16.3%, 16.4%, 16.5%, 16.6%, 16.7%, 16.8%, 16.9%, 17%, 17.1%, 17.2%, 17.3%, 17.4%, 17.5%, 17.6%, 17.7%, 17.8%, 17.9%, 18%, 18.1%, 18.2%, 18.3%, 18.4%, 18.5%, 18.6%, 18.7%, 18.8%, 18.9%, 19%, 19.1%, 19.2%, 19.3%, 19.4%, 19.5%, 19.6%, 19.7%, 19.8%, 19.9%, or 20% of the nutritional composition, following centrifugation at 100,000×g for 1 hour at 20° C.

MDG may be in the assembly at about 0.001% to about 20% of the nutritional composition, following centrifugation at 31,000×g for 1 hour at 20° C. MDG may be in the assembly at about 0.01% to about 15% of the nutritional composition, following centrifugation at 31,000×g for 1 hour at 20° C. MDG may be in the assembly at about 0.1% to about 10% of the nutritional composition, following centrifugation at 31,000×g for 1 hour at 20° C. MDG may be in the assembly at about 1% to about 5% of the nutritional composition, following centrifugation at 31,000×g for 1 hour at 20° C. For example, MDG may be in the assembly at about 0.001%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9%, 5%, 5.1%, 5.2%, 5.3%, 5.4%, 5.5%, 5.6%, 5.7%, 5.8%, 5.9%, 6%, 6.1%, 6.2%, 6.3%, 6.4%, 6.5%, 6.6%, 6.7%, 6.8%, 6.9%, 7%, 7.1%, 7.2%, 7.3%, 7.4%, 7.5%, 7.6%, 7.7%, 7.8%, 7.9%, 8%, 8.1%, 8.2%, 8.3%, 8.4%, 8.5%, 8.6%, 8.7%, 8.8%, 8.9%, 9%, 9.1%, 9.2%, 9.3%, 9.4%, 9.5%, 9.6%, 9.7%, 9.8%, 9.9%, 10%, 10.1%, 10.2%, 10.3%, 10.4%, 10.5%, 10.6%, 10.7%, 10.8%, 10.9%, 11%, 11.1%, 11.2%, 11.3%, 11.4%, 11.5, 11.6%, 11.7%, 11.8%, 11.9%, 12%, 12.1%, 12.2%, 12.3%, 12.4%, 12.5%, 12.6%, 12.7%, 12.8%, 12.9%, 13%, 13.1%, 13.2%, 13.3%, 13.4%, 13.5%, 13.6%, 13.7%, 13.8%, 13.9%, 14%, 14.1%, 14.2%, 14.3%, 14.4%, 14.5%, 14.6%, 14.7%, 14.8%, 14.9%, 15%, 15.1%, 15.2%, 15.3%, 15.4%, 15.5%, 15.6%, 15.7%, 15.8%, 15.9%, 16%, 16.1%, 16.2%, 16.3%, 16.4%, 16.5%, 16.6%, 16.7%, 16.8%, 16.9%, 17%, 17.1%, 17.2%, 17.3%, 17.4%, 17.5%, 17.6%, 17.7%, 17.8%, 17.9%, 18%, 18.1%, 18.2%, 18.3%, 18.4%, 18.5%, 18.6%, 18.7%, 18.8%, 18.9%, 19%, 19.1%, 19.2%, 19.3%, 19.4%, 19.5%, 19.6%, 19.7%, 19.8%, 19.9%, or 20% of the nutritional composition, following centrifugation at 31,000×g for 1 hour at 20° C.

Lutein, a lipophilic compound discussed below, may be in the aqueous phase at about 0.001% to about 50% of the nutritional composition, following centrifugation at 1,000×g for 1 hour at 20° C. Lutein may be in the aqueous phase at about 0.5% to about 40% of the nutritional composition, following centrifugation at 1,000×g for 1 hour at 20° C. Lutein may be in the aqueous phase at about 5% to about 30% of the nutritional composition, following centrifugation at 1,000×g for 1 hour at 20° C. Lutein may be in the aqueous phase at about 15% to about 25% of the nutritional composition, following centrifugation at 1,000×g for 1 hour at 20° C. For example, lutein may be in the aqueous phase at about 0.001%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5%, 5.25%, 5.5%, 5.75%, 6%, 6.25%, 6.5%, 6.75%, 7%, 7.25%, 7.5%, 7.75%, 8%, 8.25%, 8.5%, 8.75%, 9%, 9.25%, 9.5%, 9.75%, 10%, 10.25%, 10.5%, 10.75%, 11%, 11.25%, 11.5%, 11.75%, 12%, 12.25%, 12.5%, 12.75%, 13%, 13.25%, 13.5%, 13.75%, 14%, 14.25%, 14.5%, 14.75%, 15%, 15.25%, 15.5%, 15.75%, 16%, 16.25%, 16.5%, 16.75%, 17%, 17.25%, 17.5%, 17.75%, 18%, 18.25%, 18.5%, 18.75%, 19%, 19.25%, 19.5%, 19.75%, 20%, 20.25%, 20.5%, 20.75%, 21%, 21.25%, 21.5%, 21.75%, 22%, 22.25%, 22.5%, 22.75%, 23%, 23.25%, 23.5%, 23.75%, 24%, 24.25%, 24.5%, 24.75%, 25%, 25.25%, 25.5%, 25.75%, 26%, 26.25%, 26.5%, 26.75%, 27%, 27.25%, 27.5%, 27.75%, 28%, 28.25%, 28.5%, 28.75%, 29%, 29.25%, 29.5%, 29.75%, 30%, 30.25%, 30.5%, 30.75%, 31%, 31.25%, 31.5%, 31.75%, 32%, 32.25%, 32.5%, 32.75%, 33%, 33.25%, 33.5%, 33.75%, 34%, 34.25%, 34.5%, 34.75%, 35%, 35.25%, 35.5%, 35.75%, 36%, 36.25%, 36.5%, 36.75%, 37%, 37.25%, 37.5%, 37.75%, 38%, 38.25%, 38.5%, 38.75%, 39%, 39.25%, 39.5%, 39.75%, 40%, 40.25%, 40.5%, 40.75%, 41%, 41.25%, 41.5%, 41.75%, 42%, 42.25%, 42.5%, 42.75%, 43%, 43.25%, 43.5%, 43.75%, 44%, 44.25%, 44.5%, 44.75%, 45%, 45.25%, 45.5%, 45.75%, 46%, 46.25%, 46.5%, 46.75%, 47%, 47.25%, 47.5%, 47.75%, 48%, 48.25%, 48.5%, 48.75%, 49%, 49.25%, 49.5%, 49.75%, or 50% of the nutritional composition, following centrifugation at 1,000×g for 1 hour at 20° C.

Lutein may be in the aqueous phase at about 0.001% to about 30% of the nutritional composition, following centrifugation at 31,000×g for 1 hour at 20° C. Lutein may be in the aqueous phase at about 0.1% to about 20% of the nutritional composition, following centrifugation at 31,000×g for 1 hour at 20° C. Lutein may be in the aqueous phase at about 1% to about 5% of the nutritional composition, following centrifugation at 31,000×g for 1 hour at 20° C. For example, lutein may be in the assembly at about 0.001%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5%, 5.25%, 5.5%, 5.75%, 6%, 6.25%, 6.5%, 6.75%, 7%, 7.25%, 7.5%, 7.75%, 8%, 8.25%, 8.5%, 8.75%, 9%, 9.25%, 9.5%, 9.75%, 10%, 10.25%, 10.5%, 10.75%, 11%, 11.25%, 11.5%, 11.75%, 12%, 12.25%, 12.5%, 12.75%, 13%, 13.25%, 13.5%, 13.75%, 14%, 14.25%, 14.5%, 14.75%, 15%, 15.25%, 15.5%, 15.75%, 16%, 16.25%, 16.5%, 16.75%, 17%, 17.25%, 17.5%, 17.75%, 18%, 18.25%, 18.5%, 18.75%, 19%, 19.25%, 19.5%, 19.75%, 20%, 20.25%, 20.5%, 20.75%, 21%, 21.25%, 21.5%, 21.75%, 22%, 22.25%, 22.5%, 22.75%, 23%, 23.25%, 23.5%, 23.75%, 24%, 24.25%, 24.5%, 24.75%, 25%, 25.25%, 25.5%, 25.75%, 26%, 26.25%, 26.5%, 26.75%, 27%, 27.25%, 27.5%, 27.75%, 28%, 28.25%, 28.5%, 28.75%, 29%, 29.25%, 29.5%, 29.75%, or 30% of the nutritional composition, following centrifugation at 31,000×g for 1 hour at 20° C.

Lutein may be in the aqueous phase at about 0.001% to about 20% of the nutritional composition, following centrifugation at 100,000×g for 1 hour at 20° C. Lutein may be in the aqueous phase at about 0.01% to about 15% of the nutritional composition, following centrifugation at 100,000×g for 1 hour at 20° C. Lutein may be in the aqueous phase at about 0.1% to about 10% of the nutritional composition, following centrifugation at 100,000×g for 1 hour at 20° C. Lutein may be in the aqueous phase at about 1% to about 5% of the nutritional composition, following centrifugation at 100,000×g for 1 hour at 20° C. For example, lutein may be in the aqueous phase at about 0.001%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9%, 5%, 5.1%, 5.2%, 5.3%, 5.4%, 5.5%, 5.6%, 5.7%, 5.8%, 5.9%, 6%, 6.1%, 6.2%, 6.3%, 6.4%, 6.5%, 6.6%, 6.7%, 6.8%, 6.9%, 7%, 7.1%, 7.2%, 7.3%, 7.4%, 7.5%, 7.6%, 7.7%, 7.8%, 7.9%, 8%, 8.1%, 8.2%, 8.3%, 8.4%, 8.5%, 8.6%, 8.7%, 8.8%, 8.9%, 9%, 9.1%, 9.2%, 9.3%, 9.4%, 9.5%, 9.6%, 9.7%, 9.8%, 9.9%, 10%, 10.1%, 10.2%, 10.3%, 10.4%, 10.5%, 10.6%, 10.7%, 10.8%, 10.9%, 11%, 11.1%, 11.2%, 11.3%, 11.4%, 11.5%, 11.6%, 11.7%, 11.8%, 11.9%, 12%, 12.1%, 12.2%, 12.3%, 12.4%, 12.5%, 12.6%, 12.7%, 12.8%, 12.9%, 13%, 13.1%, 13.2%, 13.3%, 13.4%, 13.5%, 13.6%, 13.7%, 13.8%, 13.9%, 14%, 14.1%, 14.2%, 14.3%, 14.4%, 14.5%, 14.6%, 14.7%, 14.8%, 14.9%, 15%, 15.1%, 15.2%, 15.3%, 15.4%, 15.5%, 15.6%, 15.7%, 15.8%, 15.9%, 16%, 16.1%, 16.2%, 16.3%, 16.4%, 16.5%, 16.6%, 16.7%, 16.8%, 16.9%, 17%, 17.1%, 17.2%, 17.3%, 17.4%, 17.5%, 17.6%, 17.7%, 17.8%, 17.9%, 18%, 18.1%, 18.2%, 18.3%, 18.4%, 18.5%, 18.6%, 18.7%, 18.8%, 18.9%, 19%, 19.1%, 19.2%, 19.3%, 19.4%, 19.5%, 19.6%, 19.7%, 19.8%, 19.9%, or 20% of the nutritional composition, following centrifugation at 100,000×g for 1 hour at 20° C.

Lutein may be in the assembly at about 0.001% to about 20% of the nutritional composition, following centrifugation at 31,000×g for 1 hour at 20° C. Lutein may be in the assembly at about 0.01% to about 15% of the nutritional composition, following centrifugation at 31,000×g for 1 hour at 20° C. Lutein may be in the assembly at about 0.1% to about 10% of the nutritional composition, following centrifugation at 31,000×g for 1 hour at 20° C. Lutein may be in the assembly at about 1% to about 5% of the nutritional composition, following centrifugation at 31,000×g for 1 hour at 20° C. For example, lutein may be in the assembly at about 0.001%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9%, 5%, 5.1%, 5.2%, 5.3%, 5.4%, 5.5%, 5.6%, 5.7%, 5.8%, 5.9%, 6%, 6.1%, 6.2%, 6.3%, 6.4%, 6.5%, 6.6%, 6.7%, 6.8%, 6.9%, 7%, 7.1%, 7.2%, 7.3%, 7.4%, 7.5%, 7.6%, 7.7%, 7.8%, 7.9%, 8%, 8.1%, 8.2%, 8.3%, 8.4%, 8.5%, 8.6%, 8.7%, 8.8%, 8.9%, 9%, 9.1%, 9.2%, 9.3%, 9.4%, 9.5%, 9.6%, 9.7%, 9.8%, 9.9%, 10%, 10.1%, 10.2%, 10.3%, 10.4%, 10.5%, 10.6%, 10.7%, 10.8%, 10.9%, 11%, 11.1%, 11.2%, 11.3%, 11.4%, 11.5%, 11.6%, 11.7%, 11.8%, 11.9%, 12%, 12.1%, 12.2%, 12.3%, 12.4%, 12.5%, 12.6%, 12.7%, 12.8%, 12.9%, 13%, 13.1%, 13.2%, 13.3%, 13.4%, 13.5%, 13.6%, 13.7%, 13.8%, 13.9%, 14%, 14.1%, 14.2%, 14.3%, 14.4%, 14.5%, 14.6%, 14.7%, 14.8%, 14.9%, 15%, 15.1%, 15.2%, 15.3%, 15.4%, 15.5%, 15.6%, 15.7%, 15.8%, 15.9%, 16%, 16.1%, 16.2%, 16.3%, 16.4%, 16.5%, 16.6%, 16.7%, 16.8%, 16.9%, 17%, 17.1%, 17.2%, 17.3%, 17.4%, 17.5%, 17.6%, 17.7%, 17.8%, 17.9%, 18%, 18.1%, 18.2%, 18.3%, 18.4%, 18.5%, 18.6%, 18.7%, 18.8%, 18.9%, 19%, 19.1%, 19.2%, 19.3%, 19.4%, 19.5%, 19.6%, 19.7%, 19.8%, 19.9%, or 20% of the nutritional composition, following centrifugation at 31,000×g for 1 hour at 20° C.

MDG plays a critical role in the formation and stability of the compounds associated with the assembly, wherein MDG increases both the concentration of protein and bound lipophile that remains in the aqueous phase following centrifugation, relative to controls without MDG. MDG in the nutritional composition may increase the concentration of protein in the aqueous phase by about 0.001% to about 20%, following centrifugation at 31,000×g for 1 hour at 20° C., compared to controls without MDG. MDG in the nutritional composition may increase the concentration of protein in the aqueous phase by about 0.01% to about 15%, following centrifugation at 31,000×g for 1 hour at 20° C., compared to controls without MDG. MDG in the nutritional composition may increase the concentration of protein in the aqueous phase by about 0.1% to about 10%, following centrifugation at 31,000×g for 1 hour at 20° C., compared to controls without MDG. MDG in the nutritional composition may increase the concentration of protein in the aqueous phase by about 1% to about 5%, following centrifugation at 31,000×g for 1 hour at 20° C., compared to controls without MDG. For example protein may be increased in the aqueous phase by about 0.001%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9%, 5%, 5.1%, 5.2%, 5.3%, 5.4%, 5.5%, 5.6%, 5.7%, 5.8%, 5.9%, 6%, 6.1%, 6.2%, 6.3%, 6.4%, 6.5%, 6.6%, 6.7%, 6.8%, 6.9%, 7%, 7.1%, 7.2%, 7.3%, 7.4%, 7.5%, 7.6%, 7.7%, 7.8%, 7.9%, 8%, 8.1%, 8.2%, 8.3%, 8.4%, 8.5%, 8.6%, 8.7%, 8.8%, 8.9%, 9%, 9.1%, 9.2%, 9.3%, 9.4%, 9.5%, 9.6%, 9.7%, 9.8%, 9.9%, 10%, 10.1%, 10.2%, 10.3%, 10.4%, 10.5%, 10.6%, 10.7%, 10.8%, 10.9%, 11%, 11.1%, 11.2%, 11.3%, 11.4%, 11.5%, 11.6%, 11.7%, 11.8%, 11.9%, 12%, 12.1%, 12.2%, 12.3%, 12.4%, 12.5%, 12.6%, 12.7%, 12.8%, 12.9%, 13%, 13.1%, 13.2%, 13.3%, 13.4%, 13.5%, 13.6%, 13.7%, 13.8%, 13.9%, 14%, 14.1%, 14.2%, 14.3%, 14.4%, 14.5%, 14.6%, 14.7%, 14.8%, 14.9%, 15%, 15.1%, 15.2%, 15.3%, 15.4%, 15.5%, 15.6%, 15.7%, 15.8%, 15.9%, 16%, 16.1%, 16.2%, 16.3%, 16.4%, 16.5%, 16.6%, 16.7%, 16.8%, 16.9%, 17%, 17.1%, 17.2%, 17.3%, 17.4%, 17.5%, 17.6%, 17.7%, 17.8%, 17.9%, 18%, 18.1%, 18.2%, 18.3%, 18.4%, 18.5%, 18.6%, 18.7%, 18.8%, 18.9%, 19%, 19.1%, 19.2%, 19.3%, 19.4%, 19.5%, 19.6%, 19.7%, 19.8%, 19.9%, or 20%, following centrifugation at 31,000×g for 1 hour at 20° C., compared to controls without MDG.

MDG in the nutritional composition may increase the bound lipophilic compound in the aqueous phase by about 0.001% to about 20%, following centrifugation at 31,000×g for 1 hour at 20° C., compared to controls without MDG. MDG in the nutritional composition may increase the bound lipophilic compound in the aqueous phase by about 0.01% to about 15%, following centrifugation at 31,000×g for 1 hour at 20° C., compared to controls without MDG. MDG in the nutritional composition may increase the bound lipophilic compound in the aqueous phase by about 0.1% to about 10%, following centrifugation at 31,000×g for 1 hour at 20° C., compared to controls without MDG. MDG in the nutritional composition may increase the bound lipophilic compound in the aqueous phase by about 1% to about 5%, following centrifugation at 31,000×g for 1 hour at 20° C., compared to controls without MDG. For example, the bound lipophilic compound may be increased in the aqueous phase and the assembly by about 0.001%, 0.05%, 0.1%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1%, 1.1%, 1.2%, 1.3%, 1.4%, 1.5%, 1.6%, 1.7%, 1.8%, 1.9%, 2%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9%, 5%, 5.1%, 5.2%, 5.3%, 5.4%, 5.5%, 5.6%, 5.7%, 5.8%, 5.9%, 6%, 6.1%, 6.2%, 6.3%, 6.4%, 6.5%, 6.6%, 6.7%, 6.8%, 6.9%, 7%, 7.1%, 7.2%, 7.3%, 7.4%, 7.5%, 7.6%, 7.7%, 7.8%, 7.9%, 8%, 8.1%, 8.2%, 8.3%, 8.4%, 8.5%, 8.6%, 8.7%, 8.8%, 8.9%, 9%, 9.1%, 9.2%, 9.3%, 9.4%, 9.5%, 9.6%, 9.7%, 9.8%, 9.9%, 10%, 10.1%, 10.2%, 10.3%, 10.4%, 10.5%, 10.6%, 10.7%, 10.8%, 10.9%, 11%, 11.1%, 11.2%, 11.3%, 11.4%, 11.5%, 11.6%, 11.7%, 11.8%, 11.9%, 12%, 12.1%, 12.2%, 12.3%, 12.4%, 12.5%, 12.6%, 12.7%, 12.8%, 12.9%, 13%, 13.1%, 13.2%, 13.3%, 13.4%, 13.5%, 13.6%, 13.7%, 13.8%, 13.9%, 14%, 14.1%, 14.2%, 14.3%, 14.4%, 14.5%, 14.6%, 14.7%, 14.8%, 14.9%, 15%, 15.1%, 15.2%, 15.3%, 15.4%, 15.5%, 15.6%, 15.7%, 15.8%, 15.9%, 16%, 16.1%, 16.2%, 16.3%, 16.4%, 16.5%, 16.6%, 16.7%, 16.8%, 16.9%, 17%, 17.1%, 17.2%, 17.3%, 17.4%, 17.5%, 17.6%, 17.7%, 17.8%, 17.9%, 18%, 18.1%, 18.2%, 18.3%, 18.4%, 18.5%, 18.6%, 18.7%, 18.8%, 18.9%, 19%, 19.1%, 19.2%, 19.3%, 19.4%, 19.5%, 19.6%, 19.7%, 19.8%, 19.9%, or 20%, following centrifugation at 31,000×g for 1 hour at 20° C., compared to controls without MDG.

The size of the assembly is dependent on components that make up the nutritional powder, such as the MDG, lipophilic compound(s), protein(s), etc. The size of the assembly may be critical in the bioavailability of the lipophilic compound. For example, lutein incorporation would increase with size of the assembly. However, assembly sizes greater than outside of the range of the invention, may result in complications with solubility and digestibility following consumption. The assembly size may be measured via size exclusion chromatography techniques know within the art and then compared to a known calibration curve. The assembly size may also be measured by size analysis techniques known within the art that include, but are not limited to, laser diffraction, dynamic light scattering, sieve separation analysis and image analysis (e.g., using a microscopic method such as light microscopy or scanning electron microscopy). The assembly size may be measured by a Malvern Zetasizer Nano NS. In some embodiments, the nutritional composition may be centrifuged as described above, and then the aqueous fraction may be analyzed by dynamic light scattering machine. Additionally, the size of the assembly may be measured via size exclusion chromatography (SEC), following the centrifugation step as described above. This is performed by using reference proteins and their SEC elution times and molecular weight. This then can be used to estimate the size of the assembly. By extrapolation from a reference protein plot. The size of the assembly may be about 15 kD to about 3000 kD. The size of the assembly may be about 100 kD to 1000 kD. The size of the assembly may be about 100 kD to about 500 kD. The size of the assembly may be about 60 kD to about 400 kD. For example, the size of the assembly may be about 15 kD, 20 kD, 25 kD, 30 kD, 35 kD, 40 kD, 45 kD, 50 kD, 55 kD, 60 kD, 65 kD, 70 kD, 75 kD, 80 kD, 85 kD, 90 kD, 95 kD, 100 kD, 105 kD, 110 kD, 115 kD, 120 kD, 125 kD, 130 kD, 135 kD, 140 kD, 145 kD, 150 kD, 155 kD, 160 kD, 165 kD, 170 kD, 175 kD, 180 kD, 185 kD, 190 kD, 195 kD, 200 kD, 205 kD, 210 kD, 215 kD, 220 kD, 225 kD, 230 kD, 235 kD, 240 kD, 245 kD, 250 kD, 255 kD, 260 kD, 265 kD, 270 kD, 275 kD, 280 kD, 285 kD, 290 kD, 295 kD, 300 kD, 305 kD, 310 kD, 315 kD, 320 kD, 325 kD, 330 kD, 335 kD, 340 kD, 345 kD, 350 kD, 355 kD, 360 kD, 365 kD, 370 kD, 375 kD, 380 kD, 385 kD, 390 kD, 395 kD, 400 kD, 405 kD, 410 kD, 415 kD, 420 kD, 425 kD, 430 kD, 435 kD, 440 kD, 445 kD, 450 kD, 455 kD, 460 kD, 465 kD, 470 kD, 475 kD, 480 kD, 485 kD, 490 kD, 495 kD, 500 kD, 505 kD, 510 kD, 515 kD, 520 kD, 525 kD, 530 kD, 535 kD, 540 kD, 545 kD, 550 kD, 555 kD, 560 kD, 565 kD, 570 kD, 575 kD, 580 kD, 585 kD, 590 kD, 595 kD, 600 kD, 605 kD, 610 kD, 615 kD, 620 kD, 625 kD, 630 kD, 635 kD, 640 kD, 645 kD, 650 kD, 655 kD, 660 kD, 665 kD, 670 kD, 675 kD, 680 kD, 685 kD, 690 kD, 695 kD, 700 kD, 705 kD, 710 kD, 715 kD, 720 kD, 725 kD, 730 kD, 735 kD, 740 kD, 745 kD, 750 kD, 755 kD, 760 kD, 765 kD, 770 kD, 775 kD, 780 kD, 785 kD, 790 kD, 795 kD, 800 kD, 805 kD, 810 kD, 815 kD, 820 kD, 825 kD, 830 kD, 835 kD, 840 kD, 845 kD, 850 kD, 855 kD, 860 kD, 865 kD, 870 kD, 875 kD, 880 kD, 885 kD, 890 kD, 895 kD, 900 kD, 905 kD, 910 kD, 915 kD, 920 kD, 925 kD, 930 kD, 935 kD, 940 kD, 945 kD, 950 kD, 955 kD, 960 kD, 965 kD, 970 kD, 975 kD, 980 kD, 985 kD, 990 kD, 995 kD, 1000 kD, 1010 kD, 1020 kD, 1030 kD, 1040 kD, 1050 kD, 1060 kD, 1070 kD, 1080 kD, 1090 kD, 1100 kD, 1110 kD, 1120 kD, 1130 kD, 1140 kD, 1150 kD, 1160 kD, 1170 kD, 1180 kD, 1190 kD, 1200 kD, 1210 kD, 1220 kD, 1230 kD, 1240 kD, 1250 kD, 1260 kD, 1270 kD, 1280 kD, 1290 kD, 1300 kD, 1310 kD, 1320 kD, 1330 kD, 1340 kD, 1350 kD, 1360 kD, 1370 kD, 1380 kD, 1390 kD, 1400 kD, 1410 kD, 1420 kD, 1430 kD, 1440 kD, 1450 kD, 1460 kD, 1470 kD, 1480 kD, 1490 kD, 1500 kD, 1510 kD, 1520 kD, 1530 kD, 1540 kD, 1550 kD, 1560 kD, 1570 kD, 1580 kD, 1590 kD, 1600 kD, 1610 kD, 1620 kD, 1630 kD, 1640 kD, 1650 kD, 1660 kD, 1670 kD, 1680 kD, 1690 kD, 1700 kD, 1710 kD, 1720 kD, 1730 kD, 1740 kD, 1750 kD, 1760 kD, 1770 kD, 1780 kD, 1790 kD, 1800 kD, 1810 kD, 1820 kD, 1830 kD, 1840 kD, 1850 kD, 1860 kD, 1870 kD, 1880 kD, 1890 kD, 1900 kD, 1910 kD, 1920 kD, 1930 kD, 1940 kD, 1950 kD, 1960 kD, 1970 kD, 1980 kD, 1990 kD, 2000 kD, 2010 kD, 2020 kD, 2030 kD, 2040 kD, 2050 kD, 2060 kD, 2070 kD, 2080 kD, 2090 kD, 2100 kD, 2110 kD, 2120 kD, 2130 kD, 2140 kD, 2150 kD, 2160 kD, 2170 kD, 2180 kD, 2190 kD, 2200 kD, 2210 kD, 2220 kD, 2230 kD, 2240 kD, 2250 kD, 2260 kD, 2270 kD, 2280 kD, 2290 kD, 2300 kD, 2310 kD, 2320 kD, 2330 kD, 2340 kD, 2350 kD, 2360 kD, 2370 kD, 2380 kD, 2390 kD, 2400 kD, 2410 kD, 2420 kD, 2430 kD, 2440 kD, 2450 kD, 2460 kD, 2470 kD, 2480 kD, 2490 kD, 2500 kD, 2510 kD, 2520 kD, 2530 kD, 2540 kD, 2550 kD, 2560 kD, 2570 kD, 2580 kD, 2590 kD, 2600 kD, 2610 kD, 2620 kD, 2630 kD, 2640 kD, 2650 kD, 2660 kD, 2670 kD, 2680 kD, 2690 kD, 2700 kD, 2710 kD, 2720 kD, 2730 kD, 2740 kD, 2750 kD, 2760 kD, 2770 kD, 2780 kD, 2790 kD, 2800 kD, 2810 kD, 2820 kD, 2830 kD, 2840 kD, 2850 kD, 2860 kD, 2870 kD, 2880 kD, 2890 kD, 2900 kD, 2910 kD, 2920 kD, 2930 kD, 2940 kD, 2950 kD, 2960 kD, 2970 kD, 2980 kD, 2990 kD, or 3000 kD.

The nutritional composition may include an assembly that increases the bioavailability of the lipophilic compound from about 5% to about 80%, relative to controls without MDG and hydrophobic protein. The nutritional composition may include an assembly that increases the range of bioavailability of the lipophilic compound from about 40% to about 55%, relative to controls without MDG and hydrophobic protein. The nutritional composition may include an assembly that increases the range bioavailability of the lipophilic compound from about 70% to about 75%, relative to controls without MDG and hydrophobic protein. The bioavailability of the lipophilic compound is dependent on the formation of the assemblies of the nutritional composition, wherein MDG and hydrophobic protein are comprised within the assembly. The bioavailability of the assembly may be assessed via lymphatic analysis in rats. Specifically, rats may be fasted overnight prior to surgery, and under anesthesia, a laparotomy may be performed, and the intestinal lymph duct may be cannulated according to the procedure of Tso et al., "The Absorption of Lipid and Lipoprotein Synthesis," Lipid Research Methodology, Chapter 5: 191-216 (1984) Alan R. Liss, Inc., NY, NY, hereby incorporated by reference to the extent consistent herewith. The superior mesenteric artery is isolated, but not occluded. A silicon infusion tube (1.6 mm OD) is placed in the stomach for future infusion of a test sample. The fundic incision is closed by a purse string suture. Rats are allowed to recover for 24 hours before infusion begins. Animals are intragastrically infused 24 hours after surgery with 3 ml of nutritional composition that delivers lipophilic compound. Lymph are collected in pre-cooled tubes 1 hour before the nutritional composition infusions (fasting) and then hourly for 8 hours after initiation of infusion. At the end of the 8 hour infusion, rats are sacrificed by exsanguination.

The lymph lipids were extracted and analyzed for lutein concentration using high-performance liquid chromatography with programmed wavelength ultraviolet detection (Craft Technologies, Wilson, NC). For example, the assembly may increase the bioavailability of the lipophilic compound by about 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, 35%, 35.5%, 36%, 36.5%, 37%, 37.5%, 38%, 38.5%, 39%, 39.5%, 40%, 40.5%, 41%, 41.5%, 42%, 42.5%, 43%, 43.5%, 44%, 44.5%, 45%, 45.5%, 46%, 46.5%, 47%, 47.5%, 48%, 48.5%, 49%, 49.5%, 50%, 50.5%, 51%, 51.5%, 52%, 52.5%, 53%, 53.5%, 54%, 54.5%, 55%, 55.5%, 56%, 56.5%, 57%, 57.5%, 58%, 58.5%, 59%, 59.5%, 60%, 60.5%, 61%, 61.5%, 62%, 62.5%, 63%, 63.5%, 64%, 64.5%, 65%, 65.5%, 66%, 66.5%, 67%, 67.5%, 68%, 68.5%, 69%, 69.5%, 70%, 70.5%, 71%, 71.5%, 72%, 72.5%, 73%, 73.5%, 74%, 74.5%, 75%, 75.5%, 76%, 76.5%, 77%, 77.5%, 78%, 78.5%, 79%, 79.5%, or 80%.

(1) Activated Assembly

The assembly may be an activated assembly. The activated assembly may be comprised in a powder, suspension, solution, emulsion or combinations thereof. The activated assembly may comprise MDG, at least one lipophilic compound, and at least one hydrophobic protein. The activated assembly may be in, but is not limited to, a premix, protected premix, and an activated premix. The activated assembly may contact an aqueous liquid as part of the activated premix.

(2) Premix/Protected Premix

The premix may or may not comprise the assembly. The protected premix may or may not comprise the assembly.

(3) Activated Premix Assembly

The activated premix may comprise the assembly. The assembly may be in a protected activated premix. The assembly in the activated premix may comprise MDG, at least one lipophilic compound, and at least one hydrophobic protein. The assembly in the protected activated premix may comprise MDG, at least one lipophilic compound, and at least one hydrophobic protein. The activated premix comprising the assembly may be added to additional components of the nutritional composition. The protected activated premix comprising the assembly may be added to additional components of the nutritional composition.

In some embodiments, the premix is contacted to a protein-in-water slurry, to form an activated premix. This is then added to the additional components of the nutritional composition. In some embodiments, the premix comprising the assembly is contacted to a protein-in-oil slurry, to form an activated premix. This is then added to the additional components of the nutritional composition. In some embodiments, the premix comprising the assembly is contacted to a carbohydrate-mineral slurry and a protein-in-oil slurry, to form an activated premix. This is then added to the additional components of the nutritional composition. In some embodiments, the premix comprising the assembly is contacted to an oil slurry, to form an activated premix. This is then added to the additional components of the nutritional composition. In some embodiments, the premix comprising the assembly is contacted to final blend slurry, to form an activated premix. This is then added to the additional components of the nutritional composition.

(4) Shelf-Life

The nutritional composition may include an assembly with an enhanced shelf-life. The assembly may have an enhanced shelf-life in a, but is not limited to, powder, premix, activated premix, protected activated premix, suspension, liquid, emulsion mixture, or combination thereof.

The nutritional composition may include an assembly that is stable at 23° C. for at least about 1 day to at least about 36 months. The nutritional composition may include an assembly that is stable at 23° C. for at least about 10 days to at least about 36 months. The nutritional composition may include an assembly that is stable at 23° C. for at least about 6 months to at least about 12 months. The nutritional composition may include an assembly that is stable at 23° C. for at least about 1 day to at least about 24 months. The stability of the assembly is dependent on the combination of MDG and the hydrophobic protein's ability to interact with the lipophilic compound, which keeps the lipophilic compound in solution, thereby enhancing its biocompatibility. The stability of the assembly may be investigated by size exclusion chromatography techniques known within the art at variable time points post formulating the nutritional composition. The assembly may be stable at 23° C. for at least about 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 2 months, 3 months, 4 months, 5 months, 6 months, 7 months, 8 months, 9 months, 10 months, 11 months, 12 months, 13 months, 14 months, 15 months, 16 months, 17 months, 18 months, 19 months, 20 months, 21 months, 22 months, 23 months, 24 months, 25 months, 26 months, 27 months, 28 months, 29 months, 30 months, 31 months, 32 months, 33 months, 34 months, 35 months, or 36 months.

c. Lipophilic Compound

The nutritional composition may comprise at least one lipophilic compound. The lipophilic compound may be present within the premix, activated premix, and/or the protected premix. The lipophilic compound may be incorporated into the assembly. Lipophilic compounds have poor aqueous solubility, resulting in decreased bioavailability when incorporated within a nutritional composition. However, by incorporating the lipophilic compound within the aforementioned assembly, along with MDG and the at least one hydrophobic protein, it is more soluble and stable. The lipophilic compound may be a carotenoid, zeaxanthin, alpha- or beta-cryptoxanthin, retinol, a ganglioside, a phosphoinositide, a lipoprotein, a phospholipid, a glycolipid, a glycophospholipid, an oil soluble vitamin such as synthetic and natural forms of vitamins A, E, D, or K, lycopene or mixtures thereof. The lipophilic compound may be a source of long chain polyunsaturated fatty acids (LCPUFAs). Some examples of LCPUFAs include, but are not limited, to eicosapentaenoic acid ("EPA"), arachidonic acid (ARA), linoleic (18:2 n−6), γ-linolenic (18:3 n−6), dihomo-γ-linolenic (20:3 n−6) acids in the n−6 pathway, α-linolenic (18:3 n−3), stearidonic (18:4 n−3), eicosatetraenoic (20:4 n−3), eicosapentaenoic (20:5 n−3), and DHA (22:6 n−3). The lipophilic compound may be lutein. Additionally, the lipophilic compound may be a mixture of different lipophilic compounds.

Suitable, non-limiting examples of lipophilic pharmaceutical agents that may be included in the present composition may be selected from: oil soluble drugs (e.g., immunosuppressive agents such as Cyclosporin™, protease inhibitors such as Ritonavir™, macrolide antibiotics and oil soluble anesthetics such as Propofol™); synthetic and natural forms of steroidal hormones such as estrogens, estradiols, progesterone, testosterone, cortisone, phytoestrogens, dehydroepiandrosterone (DHEA), and growth hormones; oil soluble acids and alcohols (e.g., tartaric acid, lactylic acid, butylated hydroxyanisole, butylated hydroxytoluene, lignin, phytosterols, flavonoids such as quercetin and resveratrol, and diallyl disulfides); and combinations thereof. Additional lipophilic pharmaceutical agents may be found in U.S. patent application Ser. No. 13/452,033, which was filed on Apr. 20, 2012 and is hereby incorporated by reference to the extent that it is consistent with the present disclosure.

The lipophilic compound is a valuable source of nutrients for infants, toddlers, children and adults. The lipophilic compound may be used for treating or maintaining appropriate health, such as, but is not limited to, bone, eye, cardiovascular, and cerebral health.

(1) Lutein

The lipophilic compound of the nutritional composition may be lutein. Lutein may be incorporated into the assembly. Incorporation of lutein as part of the assembly enhances its solubility, thus enhancing its bioavailability for treatment of health conditions, relative to controls without MDG or hydrophobic protein. The term "lutein" as used herein, unless otherwise specified, refers to one or more of free lutein, lutein esters, lutein salts, or other lutein derivatives or related structures as described or otherwise suggested herein. Lutein or lutein sources suitable for use in the nutritional composition of the present disclosure include free lutein as well as esters, salts or other derivatives or related structures thereof, including those that conform to the formula:

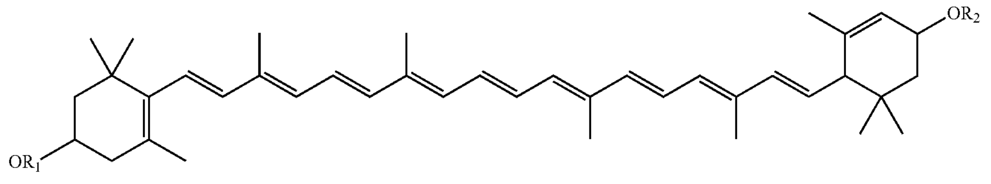

The above formula includes the general structure of lutein and related derivatives or structures. Free lutein, for example, corresponds to the formula wherein $R_1$ and $R_2$ are both hydrogen, and includes cis and trans isomers thereof as well as salts thereof, e.g., sodium, potassium.

Lutein esters suitable for use in the nutritional composition of the present disclosure include any lutein ester of the above formula wherein $R_1$ and $R_2$ are the same or different, and are nutritionally acceptable monovalent salts, hydrogen or an acyl residue of a carboxylic acid, provided that at least one of $R_1$ and $R_2$ is an acyl residue of a carboxylic acid. Suitable lutein esters include, as well, both cis and trans isomers. The $R_1$ and $R_2$ moieties are residues of saturated or unsaturated $C_1$ to $C_{22}$ fatty carboxylic acids, non-limiting examples of which include formic, acetic, propionic, butyric, valeric, caproic, caprylic, capric, lauric, myristic, palmitic, stearic, and oleic acids.

Any natural or synthetic source of lutein is suitable for use herein provided that such a source is also known for or otherwise suitable for use in nutritional composition and is compatible with the other selected ingredients within the composition. Lutein sources may be provided as individual ingredients or in any combination with other materials or sources, including sources such as multivitamin premixes, mixed carotenoid premixes, and pure lutein sources. In some embodiments, components of the nutritional composition may inherently comprise lutein (e.g., lutein rich oils, surfactants, etc.).

Non-limiting examples of suitable lutein sources for use herein include FloraGLO® Crystalline Lutein, available from Kemin Foods, Des Moines, Iowa, USA; and LUTI-MAX Lutein Esters provided by OmniActive, Mumbai, India.

In some embodiments, it may be desirable to blend lutein with the MDG oil to form an MDG premix before blending the MDG oil or lutein with other ingredients of the composition. To make the MDG premix, lutein may be mixed with the MDG oil in the presence of heat or at ambient temperature and, in some embodiments, with agitation to allow the lutein to dissolve, disperse, or suspend into the MDG oil.

In some embodiments, it may be desirable to form an MDG-protected premix comprising lutein, a surfactant, and an MDG oil before blending the MDG oil or lutein with other ingredients of the composition. In these embodiments, lutein and a surfactant may be mixed with the MDG oil in the presence of heat or at ambient temperature and, in some embodiments, with agitation to allow the lutein to dissolve, disperse, or suspend in the MDG oil.

Lutein is a good source of nutrient for infants, toddlers, children and adults. Lutein may be used within the nutritional composition to maintain and supplement healthy vision and eye care. Lutein may be used within the nutritional composition to maintain and supplement cerebral health and development.

Lutein may in the nutritional composition at about 0.01 mg/kg to about 50 mg/kg. Lutein may in the nutritional composition at about 0.02 mg/kg to about 20 mg/kg. Lutein may in the nutritional composition at about 0.1 mg/kg to about 20 mg/kg. Lutein may in the nutritional composition at about 1 mg/kg to about 15 mg/kg. For example, lutein may be in the nutritional composition at about 0.01 mg/kg, 0.02 mg/kg, 0.03 mg/kg, 0.04 mg/kg, 0.05 mg/kg, 0.1 mg/kg, 0.25 mg/kg, 0.5 mg/kg, 0.75 mg/kg, 1 mg/kg, 1.25 mg/kg, 1.5 mg/kg, 1.75 mg/kg, 2 mg/kg, 2.25 mg/kg, 2.5 mg/kg, 2.75 mg/kg, 3 mg/kg, 3.25 mg/kg, 3.5 mg/kg, 3.75 mg/kg, 4 mg/kg, 4.25 mg/kg, 4.5 mg/kg, 4.75 mg/kg, 5 mg/kg, 5.25 mg/kg, 5.5 mg/kg, 5.75 mg/kg, 6 mg/kg, 6.25 mg/kg, 6.5 mg/kg, 6.75 mg/kg, 7 mg/kg, 7.25 mg/kg, 7.5 mg/kg, 7.75 mg/kg, 8 mg/kg, 8.25 mg/kg, 8.5 mg/kg, 8.75 mg/kg, 9 mg/kg, 9.25 mg/kg, 9.5 mg/kg, 9.75 mg/kg, 10 mg/kg, 10.25 mg/kg, 10.5 mg/kg, 10.75 mg/kg, 11 mg/kg, 11.25 mg/kg, 11.5 mg/kg, 11.75 mg/kg, 12 mg/kg, 12.25 mg/kg, 12.5 mg/kg, 12.75 mg/kg, 13 mg/kg, 13.25 mg/kg, 13.5 mg/kg, 13.75 mg/kg, 14 mg/kg, 14.25 mg/kg, 14.5 mg/kg, 14.75 mg/kg, 15 mg/kg, 15.25 mg/kg, 15.5 mg/kg, 15.75 mg/kg, 16 mg/kg, 16.25 mg/kg, 16.5 mg/kg, 16.75 mg/kg, 17 mg/kg, 17.25 mg/kg, 17.5 mg/kg, 17.75 mg/kg, 18 mg/kg, 18.25 mg/kg, 18.5 mg/kg, 18.75 mg/kg, 19 mg/kg, 19.25 mg/kg, 19.5 mg/kg, 19.75 mg/kg, 20 mg/kg, 20.25 mg/kg, 20.5 mg/kg, 20.75 mg/kg, 21 mg/kg, 21.25 mg/kg, 21.5 mg/kg, 21.75 mg/kg, 22 mg/kg, 22.25 mg/kg, 22.5 mg/kg, 22.75 mg/kg, 23 mg/kg, 23.25 mg/kg, 23.5 mg/kg, 23.75 mg/kg, 24 mg/kg, 24.25 mg/kg, 24.5 mg/kg, 24.75 mg/kg, 25 mg/kg, 25.25 mg/kg, 25.5 mg/kg, 25.75 mg/kg, 26 mg/kg, 26.25 mg/kg, 26.5 mg/kg, 26.75 mg/kg, 27 mg/kg, 27.25 mg/kg, 27.5 mg/kg, 27.75 mg/kg, 28 mg/kg, 28.25 mg/kg, 28.5 mg/kg, 28.75 mg/kg, 29 mg/kg, 29.25 mg/kg, 29.5 mg/kg, 29.75 mg/kg, 30 mg/kg, 30.25 mg/kg, 30.5 mg/kg, 30.75 mg/kg, 31 mg/kg, 31.25 mg/kg, 31.5 mg/kg, 31.75 mg/kg, 32 mg/kg, 32.25 mg/kg, 32.5 mg/kg, 32.75 mg/kg, 33 mg/kg, 33.25 mg/kg, 33.5 mg/kg, 33.75 mg/kg, 34 mg/kg, 34.25 mg/kg, 34.5 mg/kg, 34.75 mg/kg, 35 mg/kg, 35.25 mg/kg, 35.5 mg/kg, 35.75 mg/kg, 36 mg/kg, 36.25 mg/kg, 36.5 mg/kg, 36.75 mg/kg, 37 mg/kg, 37.25 mg/kg, 37.5 mg/kg, 37.75 mg/kg, 38 mg/kg, 38.25 mg/kg, 38.5 mg/kg, 38.75 mg/kg, 39 mg/kg, 39.25 mg/kg, 39.5 mg/kg, 39.75 mg/kg, 40 mg/kg, 40.25 mg/kg, 40.5 mg/kg, 40.75 mg/kg, 41 mg/kg, 41.25 mg/kg, 41.5 mg/kg, 41.75 mg/kg, 42 mg/kg, 42.25 mg/kg, 42.5 mg/kg, 42.75 mg/kg, 43 mg/kg, 43.25 mg/kg, 43.5 mg/kg, 43.75 mg/kg, 44 mg/kg, 44.25 mg/kg, 44.5 mg/kg, 44.75 mg/kg, 45 mg/kg, 45.25 mg/kg, 45.5 mg/kg, 45.75 mg/kg, 46 mg/kg, 46.25 mg/kg, 46.5 mg/kg, 46.75 mg/kg, 47 mg/kg, 47.25 mg/kg, 47.5 mg/kg, 47.75 mg/kg, 48 mg/kg, 48.25 mg/kg, 48.5 mg/kg, 48.75 mg/kg, 49 mg/kg, 49.25 mg/kg, 49.5 mg/kg, 49.75 mg/kg, or 50 mg/kg.

(2) Vitamin D

The lipophilic compound of the nutritional composition may be vitamin D. Vitamin D may be incorporated into the assembly. Incorporation of vitamin D as part of the assembly enhances its solubility, thus enhancing its bioavailability for treatment of health conditions, relative to controls without MDG or hydrophobic protein. "Vitamin D" refers to a group of lipophilic compounds, or "vitamers," related to steroids. There are several vitamers encompassed by the term "Vitamin D," but the most important of these are ergocalciferol, also known as Vitamin $D_2$.

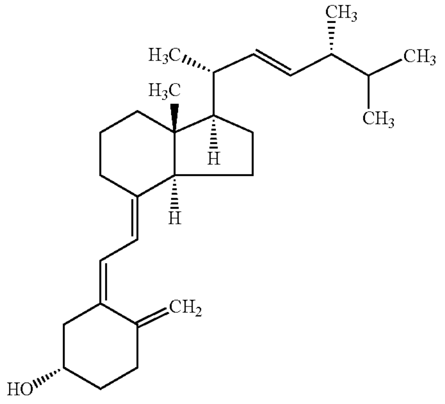

and cholecalciferol, also known as Vitamin $D_3$:

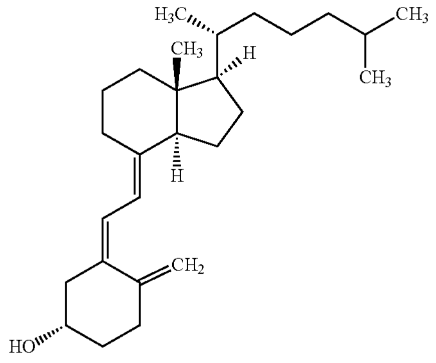 [SMILES: C=C1CC[C@H](O)C/C1=C/C=C1\CCC[C@]2(C)[C@@H]([C@H](C)CCCC(C)C)CC[C@@H]12]

For the purpose of this disclosure, the term "Vitamin D" as used herein, unless otherwise specified, encompasses all forms of Vitamin D, whether as individual vitamers such as Vitamin D2 or Vitamin D3, or as combinations of two or more vitamers.

Vitamin D may be ingested from the diet, and Vitamin D3 is also synthesized in mammalian skin by the reaction of cholesterol with UV radiation from sunlight. Once in the body, Vitamin D vitamers are metabolized into other chemical forms that regulate the concentration of calcium and phosphate in the bloodstream and promote the healthy growth and maintenance of bone. Vitamin D may be used within the nutritional composition to maintain and supplement healthy bone care and maintenance. Vitamin D may be used within the nutritional composition for functions to activate the innate and dampen the adaptive immune systems and assist in cognitive development.

Any natural or synthetic source of Vitamin D is suitable for use in the composition disclosed herein, provided that such a source is suitable for use in ingestible the composition and is compatible with the other ingredients in the composition. Vitamin D may be provided as an individual ingredient or in any combination with other materials or sources, including sources such as multivitamin premixes. For example, Vitamin D may be mixed with other oil-soluble vitamins such as Vitamin A, Vitamin E, or Vitamin K.

Non-limiting examples of suitable Vitamin D sources for use herein include Vitamin D3 provided by BASF Corporation (Florham Park, New Jersey, USA), Vitamin D3 provided by Fermenta Biotech Ltd. (Kullu, Himachal Pradesh, India), or Quali®-D provided by DSM Nutritional Products AG (Kaiseraugst, Switzerland).

Vitamin D may be in the nutritional composition at about 1 µg/kg to about 30 µg/kg. Vitamin D may be in the nutritional composition at about 10 µg/kg to about 30 µg/kg. Vitamin D may be in the nutritional composition at about 5 µg/kg to about 25 µg/kg. Vitamin D may be in the nutritional composition at about 10 µg/kg to about 20 µg/kg. For example, vitamin D may be in the nutritional composition at about 1 µg/kg, 1.2 µg/kg, 1.4 µg/kg, 1.6 µg/kg, 1.8 µg/kg, 2 µg/kg, 2.2 µg/kg, 2.4 µg/kg, 2.6 µg/kg, 2.8 µg/kg, 3 µg/kg, 3.2 µg/kg, 3.4 µg/kg, 3.6 µg/kg, 3.8 µg/kg, 4 µg/kg, 4.2 µg/kg, 4.4 µg/kg, 4.6 µg/kg, 4.8 µg/kg, 5 µg/kg, 5.2 µg/kg, 5.4 µg/kg, 5.6 µg/kg, 5.8 µg/kg, 6 µg/kg, 6.2 µg/kg, 6.4 µg/kg, 6.6 µg/kg, 6.8 µg/kg, 7 µg/kg, 7.2 µg/kg, 7.4 µg/kg, 7.6 µg/kg, 7.8 µg/kg, 8 µg/kg, 8.2 µg/kg, 8.4 µg/kg, 8.6 µg/kg, 8.8 µg/kg, 9 µg/kg, 9.2 µg/kg, 9.4 µg/kg, 9.6 µg/kg, 9.8 µg/kg, 10 µg/kg, 10.2 µg/kg, 10.4 µg/kg, 10.6 µg/kg, 10.8 µg/kg, 11 µg/kg, 11.2 µg/kg, 11.4 µg/kg, 11.6 µg/kg, 11.8 µg/kg, 12 µg/kg, 12.2 µg/kg, 12.4 µg/kg, 12.6 µg/kg, 12.8 µg/kg, 13 µg/kg, 13.2 µg/kg, 13.4 µg/kg, 13.6 µg/kg, 13.8 µg/kg, 14 µg/kg, 14.2 µg/kg, 14.4 µg/kg, 14.6 µg/kg, 14.8 µg/kg, 15 µg/kg, 15.2 µg/kg, 15.4 µg/kg, 15.6 µg/kg, 15.8 µg/kg, 16 µg/kg, 16.2 µg/kg, 16.4 µg/kg, 16.6 µg/kg, 16.8 µg/kg, 17 µg/kg, 17.2 µg/kg, 17.4 µg/kg, 17.6 µg/kg, 17.8 µg/kg, 18 µg/kg, 18.2 µg/kg, 18.4 µg/kg, 18.6 µg/kg, 18.8 µg/kg, 19 µg/kg, 19.2 µg/kg, 19.4 µg/kg, 19.6 µg/kg, 19.8 µg/kg, 20 µg/kg, 20.2 µg/kg, 20.4 µg/kg, 20.6 µg/kg, 20.8 µg/kg, 21 µg/kg, 21.2 µg/kg, 21.4 µg/kg, 21.6 µg/kg, 21.8 µg/kg, 22 µg/kg, 22.2 µg/kg, 22.4 µg/kg, 22.6 µg/kg, 22.8 µg/kg, 23 µg/kg, 23.2 µg/kg, 23.4 µg/kg, 23.6 µg/kg, 23.8 µg/kg, 24 µg/kg, 24.2 µg/kg, 24.4 µg/kg, 24.6 µg/kg, 24.8 µg/kg, 25 µg/kg, 25.2 µg/kg, 25.4 µg/kg, 25.6 µg/kg, 25.8 µg/kg, 26 µg/kg, 26.2 µg/kg, 26.4 µg/kg, 26.6 µg/kg, 26.8 µg/kg, 27 µg/kg, 27.2 µg/kg, 27.4 µg/kg, 27.6 µg/kg, 27.8 µg/kg, 28 µg/kg, 28.2 µg/kg, 28.4 µg/kg, 28.6 µg/kg, 28.8 µg/kg, 29 µg/kg, 29.2 µg/kg, 29.4 µg/kg, 29.6 µg/kg, 29.8 µg/kg, or 30 µg/kg.

(3) Vitamin E

The lipophilic compound of the nutritional composition may be vitamin E. Vitamin E may be incorporated into the assembly. Incorporation of vitamin E as part of the assembly enhances its solubility, thus enhancing its bioavailability for treatment of health conditions, relative to controls without MDG or hydrophobic protein. Vitamin E may be used within the nutritional composition to provide antioxidants and maintain and supplement cardiovascular health. Vitamin E may also be referred to as tocopherol. Tocopherols are available in four forms, alpha, beta, gamma, and delta, which differ in the number and position of the methyl groups on the chroman ring (see the table 1 below). Further, tocopherols may exist in a number of stereoisomeric forms depending on the chirality of the phytyl tail. Of the alpha tocopherols, RRR-alpha tocopherol (also referred to as "natural vitamin E") has the greatest biological activity and is reported to be the dominant form of the alpha tocopherol in the brain. In one aspect, the composition may comprise RRR-alpha tocopherol, which means that the composition is either formulated with the addition of RRR-alpha tocopherol or are otherwise prepared so as to contain RRR-alpha tocopherol. As used herein, the term "RRR-alpha tocopherol" refers to both exogenous sources and inherent sources of free RRR-alpha tocopherol and RRR-alpha tocopherol esters such as RRR alpha tocopherol acetate that are present in a composition. Inherent sources include RRR-alpha tocopherol that is inherently present in components that are present in a nutritional composition and may include for example, various oils and fats. Exogenous sources of RRR-alpha tocopherol include RRR-alpha tocopherol acetate that is added to the nutritional composition not as part of another component. Any source of RRR-alpha tocopherol is suitable for use herein provided that the finished product contains RRR-alpha tocopherol.

RRR-alpha tocopherol is a single stereoisomer whereas synthetic vitamin E (all-rac-alpha tocopherol or tocopherol acetate) is an equimolar mixture of eight isomers, only one of which is RRR-alpha tocopherol. The fact that the dominant form of alpha tocopherol is RRR alpha tocopherol (based on animal studies) strongly suggests that the other seven chiral isomers must be absorbed at a lower rate by the brain or oxidized at a faster rate. Cholesterol is a major component of myelin, and it is likely that stimulated cholesterol synthesis may stimulate newborn infant neuron myelination.

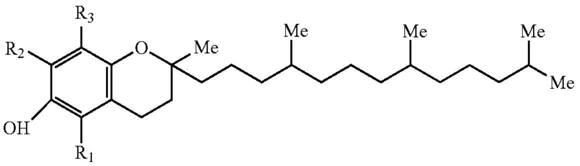

TABLE 1

| Types of Tocopherols | | | |
|---|---|---|---|
| Compound | $R_1$ | $R_2$ | $R_3$ |
| alpha-tocopherol | Me | Me | Me |
| beta-tocopherol | Me | H | Me |
| gamma-tocopherol | H | Me | Me |
| delta-tocopherol | H | H | Me |

Vitamin E may be in the nutritional composition at about 5 mg/kg to about 75 mg/kg. Vitamin E may be in the nutritional composition at about 10 mg/kg to about 60 mg/kg. Vitamin E may be in the nutritional composition at about 20 mg/kg to about 40 mg/kg. For example, vitamin E may be in the nutritional composition at about 5 mg/kg, 5.5 mg/kg, 6 mg/kg, 6.5 mg/kg, 7 mg/kg, 7.5 mg/kg, 8 mg/kg, 8.5 mg/kg, 9 mg/kg, 9.5 mg/kg, 10 mg/kg, 10.5 mg/kg, 11 mg/kg, 11.5 mg/kg, 12 mg/kg, 12.5 mg/kg, 13 mg/kg, 13.5 mg/kg, 14 mg/kg, 14.5 mg/kg, 15 mg/kg, 15.5 mg/kg, 16 mg/kg, 16.5 mg/kg, 17 mg/kg, 17.5 mg/kg, 18 mg/kg, 18.5 mg/kg, 19 mg/kg, 19.5 mg/kg, 20 mg/kg, 20.5 mg/kg, 21 mg/kg, 21.5 mg/kg, 22 mg/kg, 22.5 mg/kg, 23 mg/kg, 23.5 mg/kg, 24 mg/kg, 24.5 mg/kg, 25 mg/kg, 25.5 mg/kg, 26 mg/kg, 26.5 mg/kg, 27 mg/kg, 27.5 mg/kg, 28 mg/kg, 28.5 mg/kg, 29 mg/kg, 29.5 mg/kg, 30 mg/kg, 30.5 mg/kg, 31 mg/kg, 31.5 mg/kg, 32 mg/kg, 32.5 mg/kg, 33 mg/kg, 33.5 mg/kg, 34 mg/kg, 34.5 mg/kg, 35 mg/kg, 35.5 mg/kg, 36 mg/kg, 36.5 mg/kg, 37 mg/kg, 37.5 mg/kg, 38 mg/kg, 38.5 mg/kg, 39 mg/kg, 39.5 mg/kg, 40 mg/kg, 40.5 mg/kg, 41 mg/kg, 41.5 mg/kg, 42 mg/kg, 42.5 mg/kg, 43 mg/kg, 43.5 mg/kg, 44 mg/kg, 44.5 mg/kg, 45 mg/kg, 45.5 mg/kg, 46 mg/kg, 46.5 mg/kg, 47 mg/kg, 47.5 mg/kg, 48 mg/kg, 48.5 mg/kg, 49 mg/kg, 49.5 mg/kg, 50 mg/kg, 50.5 mg/kg, 51 mg/kg, 51.5 mg/kg, 52 mg/kg, 52.5 mg/kg, 53 mg/kg, 53.5 mg/kg, 54 mg/kg, 54.5 mg/kg, 55 mg/kg, 55.5 mg/kg, 56 mg/kg, 56.5 mg/kg, 57 mg/kg, 57.5 mg/kg, 58 mg/kg, 58.5 mg/kg, 59 mg/kg, 59.5 mg/kg, 60 mg/kg, 60.5 mg/kg, 61 mg/kg, 61.5 mg/kg, 62 mg/kg, 62.5 mg/kg, 63 mg/kg, 63.5 mg/kg, 64 mg/kg, 64.5 mg/kg, 65 mg/kg, 65.5 mg/kg, 66 mg/kg, 66.5 mg/kg, 67 mg/kg, 67.5 mg/kg, 68 mg/kg, 68.5 mg/kg, 69 mg/kg, 69.5 mg/kg, 70 mg/kg, 70.5 mg/kg, 71 mg/kg, 71.5 mg/kg, 72 mg/kg, 72.5 mg/kg, 73 mg/kg, 73.5 mg/kg, 74 mg/kg, 74.5 mg/kg, or 75 mg/kg.

The lipophilic compound of the nutritional composition may be DHA. DHA may be incorporated into the assembly. Incorporation of DHA as part of the assembly enhances its solubility, thus enhancing its bioavailability for treatment of health conditions, relative to controls without MDG or hydrophobic protein. DHA may be used within the nutritional composition to maintain and supplement conditions such as healthy brain function. DHA is an omega-3 fatty acid with 22 carbons in the lipophilic chain, typically found, for example, in cold water fish and algae:

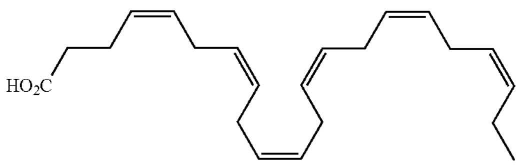 [SMILES: CC/C=C\C/C=C\C/C=C\C/C=C\C/C=C\C/C=C\CCC(=O)O]

DHA is a primary structural component of the human brain, cerebral cortex, and retina, and is an essential fatty acid for proper development of the eyes, brain, and nervous system of infants and babies. Breast milk contains DHA, and many infant formulas are enriched with DHA because of its crucial role in the growth and development of these systems in infants. There is increasing interest in providing supplemental DHA to pregnant women. DHA is believed to lower the risk of developing lacrimal keratoconjunctivitis, glaucoma, and macular degeneration. DHA is also needed for healthy brain functioning in adults. DHA deficiency may contribute to the decline in mental functioning of healthy older adults, and preliminary studies indicate that early intervention with DHA supplements may improve memory and learning in adults over 50 years of age.

Non-limiting examples of suitable DHA sources for use herein include Life's DHA®, available from DSM Nutritional Products, Kaiseraugst, Switzerland, and Maxomega™ DHA, available from BASF Pharma Ltd., Callanish, Scotland.

DHA may be in the nutritional composition at about 10 mg/kg to about 10 g/kg. DHA may be in the nutritional composition at about 100 mg/kg to about 5 g/kg. DHA may be in the nutritional composition at about 500 mg/kg to about 5 g/kg. DHA may be in the nutritional composition at about 50 mg/kg to about 1 g/kg. For example, DHA may be in the nutritional composition at about 10 mg/kg, 20 mg/kg, 30 mg/kg, 40 mg/kg, 50 mg/kg, 60 mg/kg, 70 mg/kg, 80 mg/kg, 90 mg/kg, 100 mg/kg, 110 mg/kg, 120 mg/kg, 130 mg/kg, 140 mg/kg, 150 mg/kg, 160 mg/kg, 170 mg/kg, 180 mg/kg, 190 mg/kg, 200 mg/kg, 210 mg/kg, 220 mg/kg, 230 mg/kg, 240 mg/kg, 250 mg/kg, 260 mg/kg, 270 mg/kg, 280 mg/kg, 290 mg/kg, 300 mg/kg, 310 mg/kg, 320 mg/kg, 330 mg/kg, 340 mg/kg, 350 mg/kg, 360 mg/kg, 370 mg/kg, 380 mg/kg, 390 mg/kg, 400 mg/kg, 410 mg/kg, 420 mg/kg, 430 mg/kg, 440 mg/kg, 450 mg/kg, 460 mg/kg, 470 mg/kg, 480 mg/kg, 490 mg/kg, 500 mg/kg, 510 mg/kg, 520 mg/kg, 530 mg/kg, 540 mg/kg, 550 mg/kg, 560 mg/kg, 570 mg/kg, 580 mg/kg, 590 mg/kg, 600 mg/kg, 610 mg/kg, 620 mg/kg, 630 mg/kg, 640 mg/kg, 650 mg/kg, 660 mg/kg, 670 mg/kg, 680 mg/kg, 690 mg/kg, 700 mg/kg, 710 mg/kg, 720 mg/kg, 730 mg/kg, 740 mg/kg, 750 mg/kg, 760 mg/kg, 770 mg/kg, 780 mg/kg, 790 mg/kg, 800 mg/kg, 810 mg/kg, 820 mg/kg, 830 mg/kg, 840 mg/kg, 850 mg/kg, 860 mg/kg, 870 mg/kg, 880 mg/kg, 890 mg/kg, 900 mg/kg, 910 mg/kg, 920 mg/kg, 930 mg/kg, 940 mg/kg, 950 mg/kg, 960 mg/kg, 970 mg/kg, 980 mg/kg, 990 mg/kg, 1 g/kg, 1.2 g/kg, 1.4 g/kg, 1.6 g/kg, 1.8 g/kg, 2 g/kg, 2.2 g/kg, 2.4 g/kg, 2.6 g/kg, 2.8 g/kg, 3 g/kg, 3.2 g/kg, 3.4 g/kg, 3.6 g/kg, 3.8 g/kg, 4 g/kg, 4.2 g/kg, 4.4 g/kg, 4.6 g/kg, 4.8 g/kg, 5 g/kg, 5.2 g/kg, 5.4 g/kg, 5.6 g/kg, 5.8 g/kg, 6 g/kg, 6.2 g/kg, 6.4 g/kg, 6.6 g/kg, 6.8 g/kg, 7 g/kg, 7.2 g/kg, 7.4 g/kg, 7.6 g/kg, 7.8 g/kg, 8 g/kg, 8.2 g/kg, 8.4 g/kg, 8.6 g/kg, 8.8 g/kg, 9 g/kg, 9.2 g/kg, 9.4 g/kg, 9.6 g/kg, 9.8 g/kg, or 10 g/kg.

(5) Combination of DHA and Lutein

In one embodiment, it has been unexpectedly found that when DHA and lutein are present in a composition according to the present disclosure, the bioavailability of DHA and lutein are improved upon ingestion over nutrient composition without the combination of DHA and lutein. The improved bioavailability allows DHA and lutein to be more readily absorbed into the body of the subject. Because the bioavailability of DHA and lutein may be increased using the presently described processes, the level of DHA and lutein fortification required in the composition to provide the desired nutritional benefit may be reduced. DHA and lutein may be incorporated into the nutritional composition as recited in the values above.

c. Fat

The nutritional composition may comprise at least one fat. The fat may be incorporated into the assembly. The fat may be present within the premix, activated premix, and/or the protected premix. The fat may be a monoglyceride, a diglyceride or combination thereof (all hereafter "MDG"). Fat allows unique interactions with lipophilic compounds and proteins to form a water soluble, stable assembly. Accordingly, the presence of the fat aids in assembly formation and subsequent stability of lipophilic containing assemblies within the composition, relative to controls without MDG and hydrophobic protein. The fat also enhances the bioavailability of the lipophilic compound, relative to controls without MDG or hydrophobic protein. Fat may also increase protection of the nutritional composition from dissolved oxygen. Non-limiting examples of suitable fats or sources thereof, in addition to the mixture of monoglycerides and diglycerides discussed above, for use in the nutritional composition described herein may be selected from the group, but is not limited to, coconut oil, fractionated coconut oil, soy oil, corn oil, olive oil, safflower oil, high oleic coconut oil, fractionated coconut oil, soy oil, corn oil, olive oil, safflower oil, high oleic safflower oil, sunflower oil, high oleic sunflower oil, palm oil, palm kernel oil, palm olein, canola oil, marine oils, cottonseed oil, flax seed oil, hemp seed oil, peanut oil, borage oil, algal oils, fungal oils, MCT oil (medium chain triglycerides) and combinations thereof.

(1) Monoglycerides and Diglycerides (MDG)

The fat of the nutritional composition may by MDG. MDG is the combination of monoglycerides and diglycerides. MDG may be incorporated into the assembly. Incorporation of MDG as part of the assembly enhances the solubility of lipophilic compounds, thus enhancing its bioavailability for treatment of health conditions, relative to controls without MDG or hydrophobic protein. It is hypothesized, without being bound to a particular theory, that upon consumption, the MDG in the activated premix or the MDG-protected premix, associate with the lipophilic compound and the hydrophobic protein making it easier for it to be incorporated into the micelles which are formed in the gut. Thus, the lipophilic compound may be more efficiently delivered to the brush boarder of the intestine and absorbed into the body. Additionally, it is hypothesized, without being bound to a particular theory, that MDG may interact with the hydrophobic protein and increase access of hydrophobic domains within said protein. Accordingly, the lipophilic compound may form more stable interactions with the newly accessible hydrophobic domains of said protein.

MDG is a component with limited water solubility. When MDG is associated with the at least one hydrophobic protein and the at least one lipophilic compound, as in the assembly, its water solubility increase significantly. It is hypothesized, without being bound to any particular theory, that the MDG that remains in the aqueous phase following centrifugation are likely associated with the assembly due to its limited aqueous solubility. The increased aqueous solubility may investigated by centrifugation, as listed above, wherein the aqueous phase following centrifugation exhibits a greater presence of MDG compared to controls without MDG, lipophilic compound and at least one hydrophobic protein.

Diglycerides, which are commonly referred to as diacylglycerols (DAGs), are glycerides consisting of two fatty acid chains covalently bonded to a glycerol molecule through ester linkages. Monoglycerides are normal metabolites in the body formed during the breakdown of triglycerides and diglycerides. Non-limiting examples of commercial sources of monoglycerides and diglycerides include natural sources (e.g., animal (cow- or hog-derived) or vegetable, those which may be derived from partially hydrogenated soy bean, sunflower, safflower and coconut oil) or synthetic sources. In some embodiments, the mixture of monoglycerides and diglycerides may be derived from the hydrolysis of triglycerides in safflower oil. Monoglycerides may be in the MDG of the nutritional composition at about 0.1 wt % to about 99.9 wt %, wherein the balance of the MDG is diglycerides. Monoglycerides may be in the MDG of the nutritional composition at about 10 wt % to about 80 wt %, wherein the balance of the MDG is diglycerides. Monoglycerides may be in the MDG of the nutritional composition at about 25 wt % to about 50 wt %, wherein the balance of the MDG is diglycerides. For example, monoglycerides may be in the MDG of the nutritional composition at about 0.1 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, 6 wt %, 6.5 wt %, 7 wt %, 7.5 wt %, 8 wt %, 8.5 wt %, 9 wt %, 9.5 wt %, 10 wt %, 10.5 wt %, 11 wt %, 11.5 wt %, 12 wt %, 12.5 wt %, 13 wt %, 13.5 wt %, 14 wt %, 14.5 wt %, 15 wt %, 15.5 wt %, 16 wt %, 16.5 wt %, 17 wt %, 17.5 wt %, 18 wt %, 18.5 wt %, 19 wt %, 19.5 wt %, 20 wt %, 20.5 wt %, 21 wt %, 21.5 wt %, 22 wt %, 22.5 wt %, 23 wt %, 23.5 wt %, 24 wt %, 24.5 wt %, 25 wt %, 25.5 wt %, 26 wt %, 26.5 wt %, 27 wt %, 27.5 wt %, 28 wt %, 28.5 wt %, 29 wt %, 29.5 wt %, 30 wt %, 30.5 wt %, 31 wt %, 31.5 wt %, 32 wt %, 32.5 wt %, 33 wt %, 33.5 wt %, 34 wt %, 34.5 wt %, 35 wt %, 35.5 wt %, 36 wt %, 36.5 wt %, 37 wt %, 37.5 wt %, 38 wt %, 38.5 wt %, 39 wt %, 39.5 wt %, 40 wt %, 40.5 wt %, 41 wt %, 41.5 wt %, 42 wt %, 42.5 wt %, 43 wt %, 43.5 wt %, 44 wt %, 44.5 wt %, 45 wt %, 45.5 wt %, 46 wt %, 46.5 wt %, 47 wt %, 47.5 wt %, 48 wt %, 48.5 wt %, 49 wt %, 49.5 wt %, 50 wt %, 50.5 wt %, 51 wt %, 51.5 wt %, 52 wt %, 52.5 wt %, 53 wt %, 53.5 wt %, 54 wt %, 54.5 wt %, 55 wt %, 55.5 wt %, 56 wt %, 56.5 wt %, 57 wt %, 57.5 wt %, 58 wt %, 58.5 wt %, 59 wt %, 59.5 wt %, 60 wt 60.5 wt %, 61 wt %, 61.5 wt %, 62 wt %, 62.5 wt %, 63 wt %, 63.5 wt %, 64 wt %, 64.5 wt %, 65 wt %, 65.5 wt %, 66 wt %, 66.5 wt %, 67 wt %, 67.5 wt %, 68 wt %, 68.5 wt %, 69 wt %, 69.5 wt %, 70 wt %, 70.5 wt %, 71 wt %, 71.5 wt %, 72 wt %, 72.5 wt %, 73 wt %, 73.5 wt %, 74 wt %, 74.5 wt %, 75 wt %, 75.5 wt %, 76 wt %, 76.5 wt %, 77 wt %, 77.5 wt %, 78 wt %, 78.5 wt %, 79 wt %, 79.5 wt %, 80 wt %, 80.5 wt %, 81 wt %, 81.5 wt %, 82 wt %, 82.5 wt %, 83 wt %, 83.5 wt %, 84 wt %, 84.5 wt %, 85 wt %, 85.5 wt %, 86 wt %, 86.5 wt %, 87 wt %, 87.5 wt %, 88 wt %, 88.5 wt %, 89 wt %, 89.5 wt %, 90 wt %, 90.5 wt %, 91 wt %, 91.5 wt %, 92 wt %, 92.5 wt %, 93 wt %, 93.5 wt %, 94 wt %, 94.5 wt %, 95 wt %, 95.5 wt %, 96 wt %, 96.5 wt %, 97 wt %, 97.5 wt %, 98 wt %, 98.5 wt %, 99 wt %, 99.5 wt %, or 99.9%, wherein the balance of the MDG is diglycerides.

Non-limiting examples of suitable mixtures of monoglycerides and diglycerides for use in the composition include Capmul GMO-40 (a MDG derived from high oleic safflower oil, available from Abitec Corporation, Columbus, Ohio), and Kirnol CE1089 (a MDG derived from corn oil, available from BASF, Ludwigshafen, Germany), RADIAMULS MG F038 (a MDG derived from high oleic sunflower oil, available from Oleon, Ertvelde, Belgium).

The MDG may be in the nutritional composition at about 140 mg/kg to about 900 mg/kg. The MDG may be in the nutritional composition at about 145 mg/kg to about 890 mg/kg. The nutritional composition may comprise MDG at about 140 mg/kg to about 700 mg/kg. The MDG may be in the nutritional composition at about 145 mg/kg to about 600 mg/kg. The MDG may be in the nutritional composition at about 140 mg/kg to about 400 mg/kg. For example, the MDG may be in the nutritional composition at about 140 mg/kg, 145 mg/kg, 150 mg/kg, 155 mg/kg, 160 mg/kg, 165 mg/kg, 170 mg/kg, 175 mg/kg, 180 mg/kg, 185 mg/kg, 190 mg/kg, 195 mg/kg, 200 mg/kg, 205 mg/kg, 210 mg/kg, 215 mg/kg, 220 mg/kg, 225 mg/kg, 230 mg/kg, 235 mg/kg, 240 mg/kg, 245 mg/kg, 250 mg/kg, 255 mg/kg, 260 mg/kg, 265 mg/kg, 270 mg/kg, 275 mg/kg, 280 mg/kg, 285 mg/kg, 290 mg/kg, 295 mg/kg, 300 mg/kg, 305 mg/kg, 310 mg/kg, 315 mg/kg, 320 mg/kg, 325 mg/kg, 330 mg/kg, 335 mg/kg, 340 mg/kg, 345 mg/kg, 350 mg/kg, 355 mg/kg, 360 mg/kg, 365 mg/kg, 370 mg/kg, 375 mg/kg, 380 mg/kg, 385 mg/kg, 390 mg/kg, 395 mg/kg, 400 mg/kg, 405 mg/kg, 410 mg/kg, 415 mg/kg, 420 mg/kg, 425 mg/kg, 430 mg/kg, 435 mg/kg, 440 mg/kg, 445 mg/kg, 450 mg/kg, 455 mg/kg, 460 mg/kg, 465 mg/kg, 470 mg/kg, 475 mg/kg, 480 mg/kg, 485 mg/kg, 490 mg/kg, 495 mg/kg, 500 mg/kg, 505 mg/kg, 510 mg/kg, 515 mg/kg, 520 mg/kg, 525 mg/kg, 530 mg/kg, 535 mg/kg, 540 mg/kg, 545 mg/kg, 550 mg/kg, 555 mg/kg, 560 mg/kg, 565 mg/kg, 570 mg/kg, 575 mg/kg, 580 mg/kg, 585 mg/kg, 590 mg/kg, 595 mg/kg, 600 mg/kg, 605 mg/kg, 610 mg/kg, 615 mg/kg, 620 mg/kg, 625 mg/kg, 630 mg/kg, 635 mg/kg, 640 mg/kg, 645 mg/kg, 650 mg/kg, 655 mg/kg, 660 mg/kg, 665 mg/kg, 670 mg/kg, 675 mg/kg, 680 mg/kg, 685 mg/kg, 690 mg/kg, 695 mg/kg, 700 mg/kg, 705 mg/kg, 710 mg/kg, 715 mg/kg, 720 mg/kg, 725 mg/kg, 730 mg/kg, 735 mg/kg, 740 mg/kg, 745 mg/kg, 750 mg/kg, 755 mg/kg, 760 mg/kg, 765 mg/kg, 770 mg/kg, 775 mg/kg, 780 mg/kg, 785 mg/kg, 790 mg/kg, 795 mg/kg, 800 mg/kg, 805 mg/kg, 810 mg/kg, 815 mg/kg, 820 mg/kg, 825 mg/kg, 830 mg/kg, 835 mg/kg, 840 mg/kg, 845 mg/kg, 850 mg/kg, 855 mg/kg, 860 mg/kg, 865 mg/kg, 870 mg/kg, 875 mg/kg, 880 mg/kg, 885 mg/kg, 890 mg/kg, 895 mg/kg, or 900 mg/kg.

In some embodiments, the nutritional composition may comprise about 0.1 mg/kg to about 20 mg/kg of MDG and vitamin D. In some embodiments, the nutritional composition may comprise about 0.1 mg/kg to about 10 mg/kg of MDG and vitamin D.

(2) Palmitic Acid

The fat of the nutritional composition of the present invention may be palmitic acid. Palmitic acid may be incorporated into the assembly. Incorporation of palmitic acid as part of the assembly enhances its solubility, thus enhancing its bioavailability for treatment of health conditions, relative to controls without MDG or hydrophobic protein. Palmitic acid may be used within the nutritional composition to maintain and supplement healthy nutrition, especially within infants.

Palmitic acid is a saturated fatty acid with 16 carbons in the lipophilic chain. Palmitic acid is an important energy source for growing infants. It is also a precursor to longer fatty acids that are synthesized in the body. These longer fatty acids, such as docosahexaenoic acid, are vital structural components in the brain, eyes, and central nervous system. As a consequence, palmitic acid is an important nutrient in the healthy development of infants and babies.

Palmitic acid may be provided by HPAV oil, which comprises greater than about 22% palmitic acid, as a percentage of the total fatty acids in the HPAV oil. Examples of HPAV oil include, but are not limited to, palm oil and palm olein.

Palmitic acid is found in palm oil and palm olein, comprising over 30% of the total fatty acids in each oil. Palmitic acid is also found in cocoa butter, cottonseed oil, and the oil of some other seed plants.

Palm oil is found in the pulp of the oil palm fruit. Palmitic acid comprises from about 43% to about 45% of the fatty acids found in palm oil. Palm oil also comprises from about 37% to about 40% oleic acid, making it a good source of monounsaturated fat. Palm oil also contains the essential fatty acid linoleic acid, which comprises from about 5% to about 11% of the fatty acids in palm oil. Palm oil should not be confused with palm kernel oil, which comes from the kernel (seed or pit) of the oil palm fruit. Palm kernel oil has a very different fatty acid profile, comprising less than about 10% palmitic acid and primarily comprising saturated fatty acids. Therefore, palm kernel oil is not considered a HPAV oil for the purpose of this description.

During refinement, raw palm oil is fractionated by crystallizing and separating the liquid fraction from the solid fraction under controlled temperatures. The liquid fraction is called palm olein. Palm olein comprises somewhat less palmitic acid (from about 33% to about 40%) but more oleic acid (from about 42% to about 48%) than does palm oil.

Palmitic acid may be provided by HPAV oil, which comprises greater than about 22% palmitic acid, as a percentage of the total fatty acids in the HPAV oil. Examples of HPAV oil include, but are not limited to, palm oil and palm olein.

Suppliers of suitable HPAV oils, such as palm oil or palm olein, include: Archer Daniels Midland, Decatur, Illinois, USA; Fuji Vegetable Oil, Inc., Savannah, Georgia, USA; and California Oils Corporation, Richmond, California, USA.

An HPAV oil may be provided in the nutritional composition as an individual ingredient or in any combination with other materials or sources. For example, a HPAV oil may be provided in a mixture with other oils such as canola oil or corn oil.

In some embodiments, it may be desirable to blend a protected premix comprising the HPAV oil, a surfactant, and the MDG before blending the MDG oil or the HPAV oil with other ingredients of the nutritional composition. In these embodiments, the HPAV oil and a surfactant are mixed with the MDG oil in the presence of heat or at ambient temperature and, in some embodiments, with agitation to allow the HPAV oil to dissolve or disperse in the MDG oil.

In a protected premix that contains HPAV oil, the HPAV oil is present in an amount relative to the amount of the MDG oil that will provide effective amounts of the HPAV oil and the MDG oil in the infant formula. For example, the HPAV oil may be present in an amount of 15 g, about 20 g, about 30 g, about 50 g, about 75 g, about 100 g, about 125 g, about 150 g, about 175 g, or about 200 g, of the HPAV per 1 g of the MDG oil in the premix. Other ratios of the HPAV oil to the MDG oil are within the scope of the present disclosure, so long as the HPAV oil is completely or substantially dissolved or dispersed in the resulting premix. Based on the disclosure herein, one skilled in the art may calculate suitable ratios that will allow effective amounts of the HPAV oil and the MDG oil to be incorporated into the nutritional composition.

In human breast milk, about 70% of the palmitic acid is found in the middle, or SN-2, location of the triglyceride. The SN-2 position is relatively protected, and the palmitic acid remains bonded to the glycerol backbone until late in the digestive process. Palmitic acid in the SN-2 position is thus in a form that is easily absorbed by the intestinal tract of the infant. However, for vegetable oils such as palm oil or palm olein, only about 9% of the palmitic acid is found in the SN-2 position. The rest of the palmitic acid in these oils is found in the SN-1 or SN-3 locations on the glycerol backbone. Fatty acids in the SN-1 or SN-3 position are less protected, and are often cleaved off the glycerol backbone early in the digestive process. These free fatty acids then react with calcium in the gastric fluids, forming insoluble calcium-fatty acid soap complexes. These insoluble soap complexes, which bind up both fatty acids and calcium, cannot be absorbed in the intestinal tract, and are instead excreted from the body. Research has shown that infants who are fed formulas containing palm oil or palm olein do not absorb as much fat or calcium as infants who are fed breast milk.

Palmitic acid may be synthetically prepared from fats that more closely mimic the fats in breast milk. These fats are synthesized to have significantly more palmitic acid in the SN-2 position than is found in natural vegetable oils. The nutrient composition may have palmitic acid in the SN-2 position at about 80%, 81%, 82%, 83%, 84%, 85%, 86%, 87%, 88%, 89%, 90%, 91%, 92%, 93%, 94%, 95%, 96%, 97%, 98%, 99% or 100% of the total palmitic acid content of the nutrient composition.

Palmitic acid may be in the nutritional composition at about 0.5 g/kg to about 35 g/kg. Palmitic acid may be in the nutritional composition at about 1 g/kg to about 30 g/kg. Palmitic acid may be in the nutritional composition at about 1 g/kg to about 20 g/kg. Palmitic acid may be in the nutritional composition at about 1 g/kg to about 10 g/kg. For example, palmitic acid may be in the nutritional composition at about 0.5 g/kg, 0.75 g/kg, 1 g/kg, 1.25 g/kg, 1.5 g/kg, 1.75 g/kg, 2 g/kg, 2.25 g/kg, 2.5 g/kg, 2.75 g/kg, 3 g/kg, 3.25 g/kg, 3.5 g/kg, 3.75 g/kg, 4 g/kg, 4.25 g/kg, 4.5 g/kg, 4.75 g/kg, 5 g/kg, 5.25 g/kg, 5.5 g/kg, 5.75 g/kg, 6 g/kg, 6.25 g/kg, 6.5 g/kg, 6.75 g/kg, 7 g/kg, 7.25 g/kg, 7.5 g/kg, 7.75 g/kg, 8 g/kg, 8.25 g/kg, 8.5 g/kg, 8.75 g/kg, 9 g/kg, 9.25 g/kg, 9.5 g/kg, 9.75 g/kg, 10 g/kg, 10.25 g/kg, 10.5 g/kg, 10.75 g/kg, 11 g/kg, 11.25 g/kg, 11.5 g/kg, 11.75 g/kg, 12 g/kg, 12.25 g/kg, 12.5 g/kg, 12.75 g/kg, 13 g/kg, 13.25 g/kg, 13.5 g/kg, 13.75 g/kg, 14 g/kg, 14.25 g/kg, 14.5 g/kg, 14.75 g/kg, 15 g/kg, 15.25 g/kg, 15.5 g/kg, 15.75 g/kg, 16 g/kg, 16.25 g/kg, 16.5 g/kg, 16.75 g/kg, 17 g/kg, 17.25 g/kg, 17.5 g/kg, 17.75 g/kg, 18 g/kg, 18.25 g/kg, 18.5 g/kg, 18.75 g/kg, 19 g/kg, 19.25 g/kg, 19.5 g/kg, 19.75 g/kg, 20 g/kg, 20.25 g/kg, 20.5 g/kg, 20.75 g/kg, 21 g/kg, 21.25 g/kg, 21.5 g/kg, 21.75 g/kg, 22 g/kg, 22.25 g/kg, 22.5 g/kg, 22.75 g/kg, 23 g/kg, 23.25 g/kg, 23.5 g/kg, 23.75 g/kg, 24 g/kg, 24.25 g/kg, 24.5 g/kg, 24.75 g/kg, 25 g/kg, 25.25 g/kg, 25.5 g/kg, 25.75 g/kg, 26 g/kg, 26.25 g/kg, 26.5 g/kg, 26.75 g/kg, 27 g/kg, 27.25 g/kg, 27.5 g/kg, 27.75 g/kg, 28 g/kg, 28.25 g/kg, 28.5 g/kg, 28.75 g/kg, 29 g/kg, 29.25 g/kg, 29.5 g/kg, 29.75 g/kg, 30 g/kg, 30.25 g/kg, 30.5 g/kg, 30.75 g/kg, 31 g/kg, 31.25 g/kg, 31.5 g/kg, 31.75 g/kg, 32 g/kg, 32.25 g/kg, 32.5 g/kg, 32.75 g/kg, 33 g/kg, 33.25 g/kg, 33.5 g/kg, 33.75 g/kg, 34 g/kg, 34.25 g/kg, 34.5 g/kg, 34.75 g/kg, or 35 g/kg.

d. Protein

The nutritional composition may comprise at least one protein. The one protein may be incorporated into the assembly. The protein may be present within the activated premix and/or the protected premix. The protein uniquely interacts with the lipophilic compound and fat in the nutritional composition to form the water soluble, stable assembly discussed above. Accordingly, the presence of the protein aids in assembly formation and subsequent stability of lipophilic containing assemblies within the composition. The protein also enhances the bioavailability of the lipophilic compound, relative to controls without fat (e.g., MDG) or hydrophobic protein.

The protein may be intact protein, hydrolyzed protein or combinations thereof. The protein may be a hydrophobic protein. Non-limiting examples of suitable protein or sources thereof for use in the nutritional composition include partially hydrolyzed (degree of hydrolysis less than 25%) or non-hydrolyzed proteins (e.g., intact) or protein sources, which may be derived from any known or otherwise suitable source such as milk (e.g., casein, whey), animal (e.g., meat, fish), cereal (e.g., rice, corn) or combinations thereof. Non-limiting examples of such proteins include milk protein isolates, milk protein concentrates as described herein, such as whey protein concentrates, casein protein isolates, whey protein, caseinates, whole cow's milk, partially or completely defatted milk, soy protein isolates, soy protein concentrates, and so forth.

In some embodiments, the nutritional composition includes a protein component that consists of only intact and/or partially hydrolyzed protein; that is, the protein component is free of any protein that has a degree of hydrolysis of about 25% or more. In this context, the term "partially hydrolyzed protein" is used to refer to proteins having a degree of hydrolysis of less than about 25%, including less than about 20%, including less than about 15%, including less than about 10%, and including proteins having a degree of hydrolysis of less than about 5%. The degree of hydrolysis is the extent to which peptide bonds are broken by a hydrolysis method. The degree of protein hydrolysis for purposes of characterizing the partially hydrolyzed protein component of these embodiments is easily determined by one of ordinary skill in the composition arts by quantifying the amino nitrogen to total nitrogen ratio (AN/TN) of the protein component of the selected composition. The amino nitrogen component is quantified by USP titration methods for determining amino nitrogen content, while the total nitrogen component is determined by the Tecator Kjeldahl method, all of which are well known methods to one of ordinary skill in the analytical chemistry art.

(1) Hydrophobic Protein

The protein of the nutritional composition may comprise at least one hydrophobic protein. The hydrophobic protein may be incorporated into the assembly. Incorporation of the hydrophobic protein as part of the assembly enhances the solubility of lipophilic compounds, thus enhancing its bioavailability of the lipophilic compounds for treatment of health conditions, relative to controls without MDG or hydrophobic protein. It is hypothesized, without being bound to any particular theory, that the lipophilic compound's aqueous solubility is enhanced by associating within the hydrophobic domains of said protein. The hydrophobic protein may be, but is not limited to, β-lactoglobulin, bovine lactoferrin, $\gamma_2$-casein, β-casein, α-lactalbumin, or combinations thereof. The hydrophobic protein may be in the nutritional composition at about 1 g/L to about 100 g/L. The hydrophobic protein may be in the nutritional composition at about 10 g/L to about 80 g/L. The hydrophobic protein may be in the nutritional composition at about 20 g/L to about 60 g/L. The hydrophobic protein may be in the nutritional composition at about 30 g/L to about 50 g/L. For example, the hydrophobic protein may be in the nutritional composition at about 1 g/L, 1.5 g/L, 2 g/L, 2.5 g/L, 3 g/L, 3.5 g/L, 4 g/L, 4.5 g/L, 5 g/L, 5.5 g/L, 6 g/L, 6.5 g/L, 7 g/L, 7.5 g/L, 8 g/L, 8.5 g/L, 9 g/L, 9.5 g/L, 10 g/L, 10.5 g/L, 11 g/L, 11.5 g/L, 12 g/L, 12.5 g/L, 13 g/L, 13.5 g/L, 14 g/L, 14.5 g/L, 15 g/L, 15.5 g/L, 16 g/L, 16.5 g/L, 17 g/L, 17.5 g/L, 18 g/L, 18.5 g/L, 19 g/L, 19.5 g/L, 20 g/L, 20.5 g/L, 21 g/L, 21.5 g/L, 22 g/L, 22.5 g/L, 23 g/L, 23.5 g/L, 24 g/L, 24.5 g/L, 25 g/L, 25.5 g/L, 26 g/L, 26.5 g/L, 27 g/L, 27.5 g/L, 28 g/L, 28.5 g/L, 29 g/L, 29.5 g/L, 30 g/L, 30.5 g/L, 31 g/L, 31.5 g/L, 32 g/L, 32.5 g/L, 33 g/L, 33.5 g/L, 34 g/L, 34.5 g/L, 35 g/L, 35.5 g/L, 36 g/L, 36.5 g/L, 37 g/L, 37.5 g/L, 38 g/L, 38.5 g/L, 39 g/L, 39.5 g/L, 40 g/L, 40.5 g/L, 41 g/L, 41.5 g/L, 42 g/L, 42.5 g/L, 43 g/L, 43.5 g/L, 44 g/L, 44.5 g/L, 45 g/L, 45.5 g/L, 46 g/L, 46.5 g/L, 47 g/L, 47.5 g/L, 48 g/L, 48.5 g/L, 49 g/L, 49.5 g/L, 50 g/L, 50.5 g/L, 51 g/L, 51.5 g/L, 52 g/L, 52.5 g/L, 53 g/L, 53.5 g/L, 54 g/L, 54.5 g/L, 55 g/L, 55.5 g/L, 56 g/L, 56.5 g/L, 57 g/L, 57.5 g/L, 58 g/L, 58.5 g/L, 59 g/L, 59.5 g/L, 60 g/L, 60.5 g/L, 61 g/L, 61.5 g/L, 62 g/L, 62.5 g/L, 63 g/L, 63.5 g/L, 64 g/L, 64.5 g/L, 65 g/L, 65.5 g/L, 66 g/L, 66.5 g/L, 67 g/L, 67.5 g/L, 68 g/L, 68.5 g/L, 69 g/L, 69.5 g/L, 70 g/L, 70.5 g/L, 71 g/L, 71.5 g/L, 72 g/L, 72.5 g/L, 73 g/L, 73.5 g/L, 74 g/L, 74.5 g/L, 75 g/L, 75.5 g/L, 76 g/L, 76.5 g/L, 77 g/L, 77.5 g/L, 78 g/L, 78.5 g/L, 79 g/L, 79.5 g/L, 80 g/L, 80.5 g/L, 81 g/L, 81.5 g/L, 82 g/L, 82.5 g/L, 83 g/L, 83.5 g/L, 84 g/L, 84.5 g/L, 85 g/L, 85.5 g/L, 86 g/L, 86.5 g/L, 87 g/L, 87.5 g/L, 88 g/L, 88.5 g/L, 89 g/L, 89.5 g/L, 90 g/L, 90.5 g/L, 91 g/L, 91.5 g/L, 92 g/L, 92.5 g/L, 93 g/L, 93.5 g/L, 94 g/L, 94.5 g/L, 95 g/L, 95.5 g/L, 96 g/L, 96.5 g/L, 97 g/L, 97.5 g/L, 98 g/L, 98.5 g/L, 99 g/L, 99.5 g/L, or 100 g/L.

The hydrophobic protein may be characterized by its grand average of hydropathicity index (GRAVY) value. Hydropathicity is used as defined in Creighton T E, Proteins: structures and molecular properties, 2nd edition, 1993, W.H. Freeman and Company, NY, NY, page 160. The hydrophobic protein may have a GRAVY value of about −0.5 to about 0. The hydrophobic protein may have a GRAVY value of about −0.4 to about 0. The hydrophobic protein may have a GRAVY value of about −0.2 to about 0. The GRAVY value of the hydrophobic protein is a measure of hydrophobicity and water solubility, and may be predictive of a protein's ability to bind a lipophilic molecule such as lutein. The GRAVY value may be obtained from protein data banks known within the art, as well as referenced in Kyte et al., *J. Mol. Biol.* (1982) 157, 105-132, incorporated herein by reference in its entirety. The GRAVY value of the hydrophobic protein may be about −0.5, −0.498, −0.496, −0.494, −0.492, −0.49, −0.488, −0.486, −0.484, −0.482, −0.48, −0.478, −0.476, −0.474, −0.472, −0.47, −0.468, −0.466, −0.464, −0.462, −0.46, −0.458, −0.456, −0.454, −0.452, −0.45, −0.448, −0.446, −0.444, −0.442, −0.44, −0.438, −0.436, −0.434, −0.432, −0.43, −0.428, −0.426, −0.424, −0.422, −0.42, −0.418, −0.416, −0.414, −0.412, −0.41, −0.408, −0.406, −0.404, −0.402, −0.4, −0.398, −0.396, −0.394, −0.392, −0.39, −0.388, −0.386, −0.384, −0.382, −0.38, −0.378, −0.376, −0.374, −0.372, −0.37, −0.368, −0.366, −0.364, −0.362, −0.36, −0.358, −0.356, −0.354, −0.352, −0.35, −0.348, −0.346, −0.344, −0.342, −0.34, −0.338, −0.336, −0.334, −0.332, −0.33, −0.328, −0.326, −0.324, −0.322, −0.32, −0.318, −0.316, −0.314, −0.312, −0.31, −0.308, −0.306, −0.304, −0.302, −0.3, −0.298, −0.296, −0.294, −0.292, −0.29, −0.288, −0.286, −0.284, −0.282, −0.28, −0.278, −0.276, −0.274, −0.272, −0.27, −0.268, −0.266, −0.264, −0.262, −0.26, −0.258, −0.256, −0.254, −0.252, −0.25, −0.248, −0.246, −0.244, −0.242, −0.24, −0.238, −0.236, −0.234, −0.232, −0.23, −0.228, −0.226, −0.224, −0.222, −0.22, −0.218, −0.216, −0.214, −0.212, −0.21, −0.208, −0.206, −0.204, −0.202, −0.2, −0.198, −0.196, −0.194, −0.192, −0.19, −0.188, −0.186, −0.184, −0.182, −0.18, −0.178, −0.176, −0.174, −0.172, −0.17, −0.168, −0.166, −0.164, −0.162, −0.16, −0.158, −0.156, −0.154, −0.152, −0.15, −0.148, −0.146, −0.144, −0.142, −0.14, −0.138, −0.136, −0.134, −0.132, −0.13, −0.128, −0.126, −0.124, −0.122, −0.12, −0.118, −0.116, −0.114, −0.112, −0.11, −0.108, −0.106, −0.104, −0.102, −0.1, −0.098, −0.096, −0.094, −0.092, −0.09, −0.088, −0.086, −0.084, −0.082, −0.08, −0.078, −0.076, −0.074, −0.072, −0.07, −0.068, −0.066, −0.064, −0.062, −0.06, −0.058, −0.056, −0.054, −0.052, −0.05, −0.048, −0.046, −0.044, −0.042, −0.04, −0.038, −0.036, −0.034, −0.032, −0.03, −0.028, −0.026, −0.024, −0.022, −0.02, −0.018, −0.016, −0.014, −0.012, −0.01, −0.008, −0.006, −0.004, −0.002, or 0.

Additionally, it has been surprisingly found that hydrophobic protein associated with the assembly leads to a corresponding increase in lipophilic compound within the assembly, wherein hydrophobic protein comprises from about 10 wt % to about 95 wt % of the assembly. For example, the hydrophobic protein may be in the assembly at about 10 wt %, 10.5 wt %, 11 wt %, 11.5 wt %, 12 wt %, 12.5 wt %, 13 wt %, 13.5 wt %, 14 wt %, 14.5 wt %, 15 wt %, 15.5 wt %, 16 wt %, 16.5 wt %, 17 wt %, 17.5 wt %, 18 wt %, 18.5 wt %, 19 wt %, 19.5 wt %, 20 wt %, 20.5 wt %, 21 wt %, 21.5 wt %, 22 wt %, 22.5 wt %, 23 wt %, 23.5 wt %, 24 wt %, 24.5 wt %, 25 wt %, 25.5 wt %, 26 wt %, 26.5 wt %, 27 wt %, 27.5 wt %, 28 wt %, 28.5 wt %, 29 wt %, 29.5 wt %, 30 wt %, 30.5 wt %, 31 wt %, 31.5 wt %, 32 wt %, 32.5 wt %, 33 wt %, 33.5 wt %, 34 wt %, 34.5 wt %, 35 wt %, 35.5 wt %, 36 wt %, 36.5 wt %, 37 wt %, 37.5 wt %, 38 wt %, 38.5 wt %, 39 wt %, 39.5 wt %, 40 wt %, 40.5 wt %, 41 wt %, 41.5 wt %, 42 wt %, 42.5 wt %, 43 wt %, 43.5 wt %, 44 wt %, 44.5 wt %, 45 wt %, 45.5 wt %, 46 wt %, 46.5 wt %, 47 wt %, 47.5 wt %, 48 wt %, 48.5 wt %, 49 wt %, 49.5 wt %, 50 wt %, 50.5 wt %, 51 wt %, 51.5 wt %, 52 wt %, 52.5 wt %, 53 wt %, 53.5 wt %, 54 wt %, 54.5 wt %, 55 wt %, 55.5 wt %, 56 wt %, 56.5 wt %, 57 wt %, 57.5 wt %, 58 wt %, 58.5 wt %, 59 wt %, 59.5 wt %, 60 wt %, 60.5 wt %, 61 wt %, 61.5 wt %, 62 wt %, 62.5 wt %, 63 wt %, 63.5 wt %, 64 wt %, 64.5 wt %, 65 wt %, 65.5 wt %, 66 wt %, 66.5 wt %, 67 wt %, 67.5 wt %, 68 wt %, 68.5 wt %, 69 wt %, 69.5 wt %, 70 wt %, 70.5 wt %, 71 wt %, 71.5 wt %, 72 wt %, 72.5 wt %, 73 wt %, 73.5 wt %, 74 wt %, 74.5 wt %, 75 wt %, 75.5 wt %, 76 wt %, 76.5 wt %, 77 wt %, 77.5 wt %, 78 wt %, 78.5 wt %, 79 wt %, 79.5 wt %, 80 wt %, 80.5 wt %, 81 wt %, 81.5 wt %, 82 wt %, 82.5 wt %, 83 wt %, 83.5 wt %, 84 wt %, 84.5 wt %, 85 wt %, 85.5 wt %, 86 wt %, 86.5 wt %, 87 wt %, 87.5 wt %, 88 wt %, 88.5 wt %, 89 wt %, 89.5 wt %, 90 wt %, 90.5 wt %, 91 wt %, 91.5 wt %, 92 wt %, 92.5 wt %, 93 wt %, 93.5 wt %, 94 wt %, 94.5 wt %, or 95 wt %. Additionally, the higher molecular weight of hydrophobic protein associated with the assembly correlates with an increase in lipophilic compound within the assembly, wherein the minimum molecular weight of protein associated with the assembly may be about 5 kD to about 15 kD. For example, the minimum molecular weight of protein associated with the assembly may be about 5 kD, 5.2 kD, 5.4 kD, 5.6 kD, 5.8 kD, 6 kD, 6.2 kD, 6.4 kD, 6.6 kD, 6.8 kD, 7 kD, 7.2 kD, 7.4 kD, 7.6 kD, 7.8 kD, 8 kD, 8.2 kD, 8.4 kD, 8.6 kD, 8.8 kD, 9 kD, 9.2 kD, 9.4 kD, 9.6 kD, 9.8 kD, 10 kD, 10.2 kD, 10.4 kD, 10.6 kD, 10.8 kD, 11 kD, 11.2 kD, 11.4 kD, 11.6 kD, 11.8 kD, 12 kD, 12.2 kD, 12.4 kD, 12.6 kD, 12.8 kD, 13 kD, 13.2 kD, 13.4 kD, 13.6 kD, 13.8 kD, 14 kD, 14.2 kD, 14.4 kD, 14.6 kD, 14.8 kD, or 15 kD. In one embodiment, the minimum weight of protein associated with the assembly is about 11.8 kD.

(a) β-Casein

The hydrophobic protein of the nutritional composition may comprise at least β-casein. β-casein may be incorporated into the assembly. Incorporation of β-casein as part of the assembly enhances the solubility of lipophilic compounds, thus enhancing its bioavailability of the lipophilic compounds for treatment of health conditions, relative to controls without MDG or hydrophobic protein. It has unexpectedly been shown that β-casein is implicated in the delivery of certain lipophilic nutrients for absorption, digestion, or both. A2 β-casein is a relatively more hydrophobic form of β-casein (compared to A1 β-casein). The nutritional composition that replaces a portion of the inherent β-casein with genetic variant A2 demonstrate enhanced bioavailability of certain lipophilic nutrients.

The majority of milk protein utilized in milk protein-containing products in the United States is from the cattle breed Holstein. The term "Holstein" as used herein should be understood to encompass the Holstein breed, the Friesian breed and cross-breeds of the two, so-called Holstein-Friesian cattle. Milk from Holstein cattle includes genetic variant A1 as the predominant genetic variant. In contrast, milk from the *Bos indicus* breed has genetic variant A2 as the predominant genetic variant. Similarly, milk from the Guernsey breed of *Bos taurus* has been shown to express high levels of β-casein variant A2 and low levels of other β-casein variants.

In certain embodiments, the nutritional composition may comprise protein including 10 to 100% bovine β-casein. The bovine β-casein comprises about 50 to about 100% genetic variant A2. Thus, as a non-limiting example, in a nutritional composition containing 10 grams of protein per serving, about 1-10 grams of that protein would be bovine-β-casein, and about 0.5-10 grams of the protein would be genetic variant A2. In certain exemplary embodiments the bovine β-casein comprises about 60% to about 100%, including about 70% to about 100%, including about 80% to about 100%, and including about 90% to about 100% by weight bovine β-casein.

The bovine β-casein utilized in certain exemplary embodiments may be from a single source, or may alternatively be provided by a combination of sources. The bovine β-casein according to certain exemplary embodiments will generally be found in milk protein isolates and milk protein concentrates, but may also be found in other milk protein sources such as whole milk, nonfat dry milk, milk protein concentrate, total milk protein, milk protein isolate, acid casein, calcium caseinate, sodium caseinate, magnesium caseinate, purified β-casein, and combinations thereof. It may be possible to purify a milk protein isolate (or another milk protein source) containing unacceptably high levels of less-desirable genetic variants (e.g., those other than A2). Non-limiting examples of purification methods useful for reducing unacceptably high levels of β-casein genetic variants include: a preparative chromatographic process (e.g., affinity chromatography, ion exchange chromatography, reversed phase chromatography) or by a selective salt precipitation (e.g., ammonium sulfate). Alternatively, a milk protein source (such as milk protein isolate or milk protein concentrate) containing milk sourced from primarily non-Holstein cattle, and hence, reduced quantities of genetic variants other than A2 may also be utilized in the nutritional composition and methods disclosed herein.

The term "milk protein concentrate" is generally used to refer to a milk protein containing product that has had a considerable amount of the inherent water from ordinary milk removed and also has had inherent fat from the ordinary milk removed. The term "milk protein isolate" is generally used to refer to a type of milk-protein containing product that has not only had a considerable amount of the inherent water from ordinary milk removed and inherent fat but also a certain amount of inherent lactose removed. In most instances, milk protein isolates may be considered to be a type of further purified milk protein concentrate. Certain manufacturers may use the term milk protein concentrate to refer to milk-based protein products even if they contain at least 85 weight % protein.

The protein in the nutritional composition according to certain embodiments, may be provided by a single source of protein or a combination of protein sources. As previously discussed, about 10 to about 100% by weight of the protein present in the nutritional composition comprises bovine β-casein. The remaining portion of the protein (e.g., 0-90% by weight of the total protein present in the nutritional composition) may be selected from one or more other sources. As discussed in more detail below, these additional sources of protein are not particularly limited and may include one or more of soy protein, whey protein or any other protein source, including but not limited to those discussed herein. Furthermore, it should be understood that the source for the remaining portion of the protein could also be selected from milk protein isolate, milk protein concentrate, caseinates, or non-fat dry milk that does not meet the previously discussed requirements as long as these components are not present in amounts so high as to violate other limitations on the amounts of genetic variants discussed previously.

β-casein may be in the nutritional composition at about 0.2 g/L to about 20 g/L. (3-casein may be in the nutritional composition at about 0.5 g/L to about 15 g/L. β-casein may be in the nutritional composition at about 1 g/L to about 15 g/L. β-casein may be in the nutritional composition at about 5 g/L to about 15 g/L. For example, β-casein may be in the nutritional composition at about 0.2 g/L, 0.4 g/L, 0.6 g/L, 0.8 g/L, 1 g/L, 1.2 g/L, 1.4 g/L, 1.6 g/L, 1.8 g/L, 2 g/L, 2.2 g/L, 2.4 g/L, 2.6 g/L, 2.8 g/L, 3 g/L, 3.2 g/L, 3.4 g/L, 3.6 g/L, 3.8 g/L, 4 g/L, 4.2 g/L, 4.4 g/L, 4.6 g/L, 4.8 g/L, 5 g/L, 5.2 g/L, 5.4 g/L, 5.6 g/L, 5.8 g/L, 6 g/L, 6.2 g/L, 6.4 g/L, 6.6 g/L, 6.8 g/L, 7 g/L, 7.2 g/L, 7.4 g/L, 7.6 g/L, 7.8 g/L, 8 g/L, 8.2 g/L, 8.4 g/L, 8.6 g/L, 8.8 g/L, 9 g/L, 9.2 g/L, 9.4 g/L, 9.6 g/L, 9.8 g/L, 10 g/L, 10.2 g/L, 10.4 g/L, 10.6 g/L, 10.8 g/L, 11 g/L, 11.2 g/L, 11.4 g/L, 11.6 g/L, 11.8 g/L, 12 g/L, 12.2 g/L, 12.4 g/L, 12.6 g/L, 12.8 g/L, 13 g/L, 13.2 g/L, 13.4 g/L, 13.6 g/L, 13.8 g/L, 14 g/L, 14.2 g/L, 14.4 g/L, 14.6 g/L, 14.8 g/L, 15 g/L, 15.2 g/L, 15.4 g/L, 15.6 g/L, 15.8 g/L, 16 g/L, 16.2 g/L, 16.4 g/L, 16.6 g/L, 16.8 g/L, 17 g/L, 17.2 g/L, 17.4 g/L, 17.6 g/L, 17.8 g/L, 18 g/L, 18.2 g/L, 18.4 g/L, 18.6 g/L, 18.8 g/L, 19 g/L, 19.2 g/L, 19.4 g/L, 19.6 g/L, 19.8 g/L, or 20 g/L.

TABLE 2

Ratio of β-casein to Lipophilic Nutrients

| Nutrient | Concentration, μM (approximate) | Ratio of β-casein to lipophilic nutrient, molar, approx. |
|---|---|---|
| β-casein (~2.40 g/L) | 102 | N/A |
| vitamin A (2029 IU/L) | 2.12 | 50 |
| vitamin D (406 IU/L) | 0.026 | 4000 |
| vitamin E (10.1 IU/L) | 0.016 | 6400 |
| vitamin K (54 μg/L) | 0.120 | 900 |
| Lutein (50 μg/L) | 0.088 | 1200 |
| ARA(150 mg/L) | 500 | 0.20 |
| DHA (65 mg/L) | 200 | 0.50 |

e. Optional Ingredients

The nutritional composition may further comprise other optional ingredients that may modify the physical, chemical, hedonic or processing characteristics of the products or serve as pharmaceutical or additional nutritional components when used in the targeted population. Many such optional ingredients are known or otherwise suitable for use in other nutritional or pharmaceutical products and may also be used in the nutritional composition described herein, provided that such optional ingredients are safe and effective for oral administration and are compatible with the essential and other ingredients in the selected product form.

Non-limiting examples of such optional ingredients include carbohydrates, preservatives, antioxidants, emulsifying agents, buffers, pharmaceutical actives, additional nutrients as described herein, colorants, flavors, thickening agents and stabilizers, and so forth.

Non-limiting examples of suitable carbohydrates or sources thereof for use in the nutritional composition described herein may be selected from selected from the group of: maltodextrin, hydrolyzed or modified starch or cornstarch, glucose polymers, corn syrup, corn syrup solids, rice-derived carbohydrates, glucose, fructose, lactose, high fructose corn syrup, honey, sugar alcohols (e.g., maltitol, erythritol, sorbitol), and combinations thereof.

The nutritional composition may further comprise vitamins or related nutrients, non-limiting examples of which may be selected from the group of: vitamin A, vitamin K, thiamine, riboflavin, pyridoxine, vitamin B12, carotenoids (in addition to the lutein discussed above), niacin, folic acid, pantothenic acid, biotin, vitamin C, choline, inositol, salts, and derivatives thereof, and combinations thereof.

The nutritional composition may further comprise minerals, non-limiting examples of which may be selected from the group of: phosphorus, magnesium, iron, zinc, manganese, copper, sodium, potassium, molybdenum, chromium, selenium, chloride, and combinations thereof.

In some embodiments, the nutritional composition may comprise a compound selected from the group of: hydroxyl methyl butyrate; leucine; beta alanine; epigallocatechin gallate; human milk oligosaccharides; prebiotics; probiotics; and combinations thereof.

The nutritional composition may also include one or more masking agents to reduce or otherwise obscure bitter flavors and after taste. Suitable masking agents may be selected from the group of: natural and artificial sweeteners, sodium sources such as sodium chloride, and hydrocolloids, such as guar gum, xanthan gum, carrageenan, gellan gum, and combinations thereof. The amount of masking agent in the composition may vary depending upon the particular masking agent selected, other ingredients in the composition, and other composition or product target variables. Such amounts, however, most typically range from at least about 0.1%, including from about 0.15% to about 3.0%, and also including from about 0.18% to about 2.5%, by weight of the composition.

The nutritional composition may also optionally include one or more stabilizers. Appropriate stabilizers to use in formulation for the nutritional products include, but are not limited to, gum arabic, gum ghatti, gum karaya, gum tragacanth, agar, furcellaran, locust bean gum, pectin, low methoxyl pectin, gelatin, microcrystalline cellulose, CMC (sodium carboxymethylcellulose), methylcellulose hydroxypropyl methyl cellulose, hydroxypropyl cellulose, DATEM (diacetyl tartaric acid esters of mono- and diglycerides), dextran, CITREM (citric acid esters of mono- and diglycerides), and mixtures thereof.

(1) Choline

The optional ingredients of the nutritional composition may comprise choline. Choline may act as both a nutrient within the composition, as well as an agent that enhances assembly stability and formation. Choline may also lead to an increase in lipophilic concentration within the assembly. It is hypothesized, without being bound to any particular theory, that the positive charge on choline interacts with negative side chains of the hydrophobic protein (e.g., aspartic acid residues), and alters the 3D configuration of said protein. This may allow for more access to the hydrophobic domains of the protein by the lipophilic compound. Additionally, the use of choline may be lutein specific, in that choline selectively increases the amount of lutein within the assembly, relative to other lipophilic compounds.

Choline may be added at different stages of the composition. The stage in which choline is added to the composition is critical to the formation of stable, water soluble assemblies. Specifically, it is more advantageous to add choline to the protein slurry, relative directly to the premix/activated premix of MDG and lipophilic compound.

Choline acts as a source of methyl groups for the biosynthesis of other methylated products. It is the precursor of the neurotransmitter acetylcholine. It has been proved that the administration of choline is beneficial in patients suffering from any disorder related to defective cholinergic neurotransmission.

Choline is also a major component, along with lecithin, of phospholipids and sphingomyelin. By virtue of its fundamental functions in membrane structure, a choline deficiency causes a whole range of phospholipid abnormalities which express themselves clinically as fatty liver, kidney lesions (haemorrhagic renal necrosis) and impairment of lipoprotein metabolism. With a diet deficient in choline, cholesterol esters and fats accumulate in the liver.

Choline chloride and bitartrate are mentioned in the US Code of Federal Regulations as nutrition/dietary supplements which have been accorded GRAS status (Generally Recognised as Safe).

Choline may be in the nutritional composition at about 5 mg/kg to about 1 g/kg. Choline may be in the nutritional composition at about 50 mg/kg to about 1 g/kg. Choline may be in the nutritional composition at about 100 mg/kg to about 1 g/kg. Choline may be in the nutritional composition at about 500 mg/kg to about 1 g/kg. For example, choline may be in the nutritional composition at about 5 mg/kg, 10 mg/kg, 15 mg/kg, 20 mg/kg, 25 mg/kg, 30 mg/kg, 35 mg/kg, 40 mg/kg, 45 mg/kg, 50 mg/kg, 55 mg/kg, 60 mg/kg, 65 mg/kg, 70 mg/kg, 75 mg/kg, 80 mg/kg, 85 mg/kg, 90 mg/kg, 95 mg/kg, 100 mg/kg, 105 mg/kg, 110 mg/kg, 115 mg/kg, 120 mg/kg, 125 mg/kg, 130 mg/kg, 135 mg/kg, 140 mg/kg, 145 mg/kg, 150 mg/kg, 155 mg/kg, 160 mg/kg, 165 mg/kg, 170 mg/kg, 175 mg/kg, 180 mg/kg, 185 mg/kg, 190 mg/kg, 195 mg/kg, 200 mg/kg, 205 mg/kg, 210 mg/kg, 215 mg/kg, 220 mg/kg, 225 mg/kg, 230 mg/kg, 235 mg/kg, 240 mg/kg, 245 mg/kg, 250 mg/kg, 255 mg/kg, 260 mg/kg, 265 mg/kg, 270 mg/kg, 275 mg/kg, 280 mg/kg, 285 mg/kg, 290 mg/kg, 295 mg/kg, 300 mg/kg, 305 mg/kg, 310 mg/kg, 315 mg/kg, 320 mg/kg, 325 mg/kg, 330 mg/kg, 335 mg/kg, 340 mg/kg, 345 mg/kg, 350 mg/kg, 355 mg/kg, 360 mg/kg, 365 mg/kg, 370 mg/kg, 375 mg/kg, 380 mg/kg, 385 mg/kg, 390 mg/kg, 395 mg/kg, 400 mg/kg, 405 mg/kg, 410 mg/kg, 415 mg/kg, 420 mg/kg, 425 mg/kg, 430 mg/kg, 435 mg/kg, 440 mg/kg, 445 mg/kg, 450 mg/kg, 455 mg/kg, 460 mg/kg, 465 mg/kg, 470 mg/kg, 475 mg/kg, 480 mg/kg, 485 mg/kg, 490 mg/kg, 495 mg/kg, 500 mg/kg, 505 mg/kg, 510 mg/kg, 515 mg/kg, 520 mg/kg, 525 mg/kg, 530 mg/kg, 535 mg/kg, 540 mg/kg, 545 mg/kg, 550 mg/kg, 555 mg/kg, 560 mg/kg, 565 mg/kg, 570 mg/kg, 575 mg/kg, 580 mg/kg, 585 mg/kg, 590 mg/kg, 595 mg/kg, 600 mg/kg, 605 mg/kg, 610 mg/kg, 615 mg/kg, 620 mg/kg, 625 mg/kg, 630 mg/kg, 635 mg/kg, 640 mg/kg, 645 mg/kg, 650 mg/kg, 655 mg/kg, 660 mg/kg, 665 mg/kg, 670 mg/kg, 675 mg/kg, 680 mg/kg, 685 mg/kg, 690 mg/kg, 695 mg/kg, 700 mg/kg, 705 mg/kg, 710 mg/kg, 715 mg/kg, 720 mg/kg, 725 mg/kg, 730 mg/kg, 735 mg/kg, 740 mg/kg, 745 mg/kg, 750 mg/kg, 755 mg/kg, 760 mg/kg, 765 mg/kg, 770 mg/kg, 775 mg/kg, 780 mg/kg, 785 mg/kg, 790 mg/kg, 795 mg/kg, 800 mg/kg, 805 mg/kg, 810 mg/kg, 815 mg/kg, 820 mg/kg, 825 mg/kg, 830 mg/kg, 835 mg/kg, 840 mg/kg, 845 mg/kg, 850 mg/kg, 855 mg/kg, 860 mg/kg, 865 mg/kg, 870 mg/kg, 875 mg/kg, 880 mg/kg, 885 mg/kg, 890 mg/kg, 895 mg/kg, 900 mg/kg, 905 mg/kg, 910 mg/kg, 915 mg/kg, 920 mg/kg, 925 mg/kg, 930 mg/kg, 935 mg/kg, 940 mg/kg, 945 mg/kg, 950 mg/kg, 955 mg/kg, 960 mg/kg, 965 mg/kg, 970 mg/kg, 975 mg/kg, 980 mg/kg, 985 mg/kg, 990 mg/kg, 995 mg/kg, or 1 g/kg.

(2) Lecithin

The optional ingredients of the nutritional composition may comprise lecithin. Lecithin may act as both a nutrient source within the composition, as well as an agent that enhances assembly stability and formation. Lecithin may also lead to an increase in lipophilic concentration within the assembly. Lecithin is predominantly a mixture of glycerol phospholipids (e.g., phosphatidylcholine, phosphatidylethanolamine and phosphatidylinositol). Phosphatidylcholine is typically the major glycerol phospholipid component. Lecithin may also contain other compounds such as free fatty acids, monoglycerides, diglycerides, triglycerides, glycolipids, and other lipid/fatty acid containing compounds. Lecithins are sometimes classified as glycerol phospholipids or phosphatides. This class of compounds has amphiphilic properties and thus, emulsifying functionality.

Lecithin is typically added to liquid food products (including nutritional compositions), so that the liquid products remain homogeneous and does not separate. Lecithin is approved by the United States Food and Drug Administration for human consumption with the status "Generally Recognized As Safe." Non-limiting examples of lecithin suitable for use herein include egg lecithin, wheat lecithin, corn lecithin, soy lecithin, modified lecithin, and combinations thereof. Lecithin may be provided in deoiled or liquid form, or phosphatidylcholine enriched form. Additionally, lecithin may be derived from sources that include, but are not limited to organic soy, canola oil, nonfat dry milk, or whey protein.

In one embodiment, the nutritional powder may comprise deoiled lecithin, wherein the deoiled lecithin comprises 1% water; 3% triglycerides; 24% phosphatidylcholine; 20% phosphatidylethanolamine; 14% phosphatidylinositol; 7% phosphatidic acid; 8% minor phospholipids; 8% complexed sugars; and 15% glycolipids.

In another embodiment, the nutritional powder may comprise liquid lecithin, wherein the liquid lecithin comprises 1% water; 37% triglycerides; 16% phosphatidylcholine; 13% phosphatidylethanolamine; 10% phosphatidylinositol; 5% phosphatidic acid; 2% minor phospholipids; 5% complexed sugars; and 11% glycolipids.

Lecithin suitable for use herein may be obtained from any known or otherwise suitable nutrition source. Non-limiting examples include soy lecithin from ADM Specialty Food Ingredients, Decatur, Ill., USA; soy lecithin from Solae, LLC, St. Louis, Mo., USA; and soy lecithin from American Lecithin Company, Oxford, Conn., USA.

Lecithin may be in the nutritional composition at about 10 mg/kg to about 5 g/kg. Lecithin may be in the nutritional composition at about 50 mg/kg to about 5 g/kg. Lecithin may be in the nutritional composition at about 100 mg/kg to about 1 g/kg. Lecithin may be in the nutritional composition at about 500 mg/kg to about 1 g/kg. For example, lecithin may be in the nutritional composition at about 10 mg/kg, 15 mg/kg, 20 mg/kg, 25 mg/kg, 30 mg/kg, 35 mg/kg, 40 mg/kg, 45 mg/kg, 50 mg/kg, 55 mg/kg, 60 mg/kg, 65 mg/kg, 70 mg/kg, 75 mg/kg, 80 mg/kg, 85 mg/kg, 90 mg/kg, 95 mg/kg, 100 mg/kg, 105 mg/kg, 110 mg/kg, 115 mg/kg, 120 mg/kg, 125 mg/kg, 130 mg/kg, 135 mg/kg, 140 mg/kg, 145 mg/kg, 150 mg/kg, 155 mg/kg, 160 mg/kg, 165 mg/kg, 170 mg/kg, 175 mg/kg, 180 mg/kg, 185 mg/kg, 190 mg/kg, 195 mg/kg, 200 mg/kg, 205 mg/kg, 210 mg/kg, 215 mg/kg, 220 mg/kg, 225 mg/kg, 230 mg/kg, 235 mg/kg, 240 mg/kg, 245 mg/kg, 250 mg/kg, 255 mg/kg, 260 mg/kg, 265 mg/kg, 270 mg/kg, 275 mg/kg, 280 mg/kg, 285 mg/kg, 290 mg/kg, 295 mg/kg, 300 mg/kg, 305 mg/kg, 310 mg/kg, 315 mg/kg, 320 mg/kg, 325 mg/kg, 330 mg/kg, 335 mg/kg, 340 mg/kg, 345 mg/kg, 350 mg/kg, 355 mg/kg, 360 mg/kg, 365 mg/kg, 370 mg/kg, 375 mg/kg, 380 mg/kg, 385 mg/kg, 390 mg/kg, 395 mg/kg, 400 mg/kg, 405 mg/kg, 410 mg/kg, 415 mg/kg, 420 mg/kg, 425 mg/kg, 430 mg/kg, 435 mg/kg, 440 mg/kg, 445 mg/kg, 450 mg/kg, 455 mg/kg, 460 mg/kg, 465 mg/kg, 470 mg/kg, 475 mg/kg, 480 mg/kg, 485 mg/kg, 490 mg/kg, 495 mg/kg, 500 mg/kg, 505 mg/kg, 510 mg/kg, 515 mg/kg, 520 mg/kg, 525 mg/kg, 530 mg/kg, 535 mg/kg, 540 mg/kg, 545 mg/kg, 550 mg/kg, 555 mg/kg, 560 mg/kg, 565 mg/kg, 570 mg/kg, 575 mg/kg, 580 mg/kg, 585 mg/kg, 590 mg/kg, 595 mg/kg, 600 mg/kg, 605 mg/kg, 610 mg/kg, 615 mg/kg, 620 mg/kg, 625 mg/kg, 630 mg/kg, 635 mg/kg, 640 mg/kg, 645 mg/kg, 650 mg/kg, 655 mg/kg, 660 mg/kg, 665 mg/kg, 670 mg/kg, 675 mg/kg, 680 mg/kg, 685 mg/kg, 690 mg/kg, 695 mg/kg, 700 mg/kg, 705 mg/kg, 710 mg/kg, 715 mg/kg, 720 mg/kg, 725 mg/kg, 730 mg/kg, 735 mg/kg, 740 mg/kg, 745 mg/kg, 750 mg/kg, 755 mg/kg, 760 mg/kg, 765 mg/kg, 770 mg/kg, 775 mg/kg, 780 mg/kg, 785 mg/kg, 790 mg/kg, 795 mg/kg, 800 mg/kg, 805 mg/kg, 810 mg/kg, 815 mg/kg, 820 mg/kg, 825 mg/kg, 830 mg/kg, 835 mg/kg, 840 mg/kg, 845 mg/kg, 850 mg/kg, 855 mg/kg, 860 mg/kg, 865 mg/kg, 870 mg/kg, 875 mg/kg, 880 mg/kg, 885 mg/kg, 890 mg/kg, 895 mg/kg, 900 mg/kg, 905 mg/kg, 910 mg/kg, 915 mg/kg, 920 mg/kg, 925 mg/kg, 930 mg/kg, 935 mg/kg, 940 mg/kg, 945 mg/kg, 950 mg/kg, 955 mg/kg, 960 mg/kg, 965 mg/kg, 970 mg/kg, 975 mg/kg, 980 mg/kg, 985 mg/kg, 990 mg/kg, 995 mg/kg, 1 g/kg, 1.2 g/kg, 1.4 g/kg, 1.6 g/kg, 1.8 g/kg, 2 g/kg, 2.2 g/kg, 2.4 g/kg, 2.6 g/kg, 2.8 g/kg, 3 g/kg, 3.2 g/kg, 3.4 g/kg, 3.6 g/kg, 3.8 g/kg, 4 g/kg, 4.2 g/kg, 4.4 g/kg, 4.6 g/kg, 4.8 g/kg, or 5 g/kg.

4. Method of Manufacturing

To prepare the nutritional composition having improved bioavailability of a lipophilic compound contained therein, a method in accordance with the disclosure may be utilized. The method may comprise the steps of: forming a premix; adding the premix to a solution to form an activated premix or a protected premix, and adding the activated premix to the composition, wherein the assembly may be at least formed in the activated premix.

a. Premix

In some embodiments, a premix comprising MDG is provided. The premix may comprise MGD alone, MGD and at least one lipophilic compound, as well as other optional ingredients, as described above. The premix may be activated. The premix may be heated prior to being activated. In some embodiments, the premix is heated to about 85° F. for 30 min. In some embodiments, the premix is heated to 120° F. for about 10 minutes. One of skill would appreciate that the premix composition may affect the temperature and time that is needed to heat said premix. The premix may be protected, for example by surfactants.

(1) Activated Premix

The premix may be added to an aqueous solution, for example to a protein-in-water slurry, to form an "activated premix." The activated premix is then added to the composition which may comprise at least one lipophilic compound.

Notably, to form an "activated premix," the premix may not be added to a quantity of oil that is sufficient to cause the MDG to disassociate from the assembly in the oil prior to the addition of the premix into the aqueous solution. In this instance, the activate premix may be protected to limit dissociation of MDG and lipophilic compound from each other.

When an "activated premix" is subsequently added to a fat-containing solution, at least a portion of the MDG is not disassociated from the assembly by the fat in the fat-containing solution. To determine the amount of the monoglycerides and diglycerides that are not disassociated in the fat, the "Disassociated MDG (monoglyceride and diglyceride) Test" may be utilized.

The Disassociated MDG Test is as follows. The fat-containing solution is subjected to high speed centrifugation (31,000×g; 20° C.; 4 h), as described above. The resulting aqueous fraction is subjected to HPLC analysis for monoglycerides and diglycerides content as described in "Determination of food emulsifiers in commercial additives and food products by liquid chromatography/atmospheric-pressure chemical ionization mass spectrophotometry," by M. Suman et al., Journal of Chromatography A, 1216 (2009) 3758-3766. The level of monoglycerides and diglycerides detected in the aqueous fraction is compared to the level that was added to the fat-containing solution to arrive at the percentage of the mixture of monoglycerides and diglycerides that is not disassociated by the fat.

Using the Disassociated MDG Test, one may determine the impact of utilizing an activated premix versus a premix that has not been activated in a composition. This may be accomplished by comparing the amount of monoglycerides and diglycerides that is present in the aqueous fraction of a composition comprising an activated premix, with the amount of monoglycerides and diglycerides that is present in the aqueous fraction of the same composition in which the premix has not been activated. The aqueous fraction of the composition comprising the activated premix will typically contain a higher amount of monoglycerides and diglycerides than the same composition in which the premix has not been activated.

The difference between the content of monoglycerides and diglycerides in the aqueous fraction of the composition comprising the activated premix, and the content of monoglycerides and diglycerides in the aqueous fraction of the same composition comprising a premix that has not been activated, may be quantified. In some embodiments, the content of monoglycerides and diglycerides in the aqueous fraction of the composition comprising the activated premix may be at least about 5%, 10% or 15% higher than in the same composition that comprises a premix that has not been activated.

(b) Variations of Manufacture

The premix, activated premix, and composition may comprise different embodiments, as some are listed below. It should be noted that the nutritional composition is not limited to the representative embodiments listed below.

In some embodiments, a premix comprising the lipophilic compound and MDG is provided. To make the premix, the lipophilic compound may be mixed with the MDG in the presence of heat or at ambient temperature, and in some embodiments, with agitation to allow the lipophilic compound to dissolve into the monoglycerides and diglycerides. The premix is added to an aqueous solution, for example to a protein-in-water slurry, to form an activated premix, which contains the assembly. The activated premix is then added to the composition.

In some embodiments, a premix comprising the lipophilic compound, surfactant, MDG is provided. To make the premix, the lipophilic compound may be mixed with the MDG in the presence of heat or at ambient temperature, and in some embodiments, with agitation to allow the lipophilic compound to dissolve into the mixture of monoglycerides and diglycerides. The premix is added to a fat-containing solution, such as a protein-in-fat slurry, to form an "protected premix", which contains the assembly. The "protected premix" is then added to the composition.

Without wishing to be bound by theory, it is believed that the surfactant combines with the lipophilic compound, monoglycerides and diglycerides, to form a microemulsion when the premix is added to the fat-containing solution. Thus, in a "protected premix," the monoglycerides and diglycerides may be protected from disassociating in the fat-containing solution.

The activated premix or protected premix may be added to any other ingredients of the nutritional or pharmaceutical composition at any useful point during the manufacturing process. In some embodiments, the nutritional or pharmaceutical composition may then be dried to form a powdered composition using any methods known in the art. By way of example, nutritional powders may be prepared by preparing at least two slurries that will later be blended together (and further may be blended with the activated premix), heat treated, standardized, heat treated a second time, evaporated to remove water, and spray dried to form a powdered nutritional composition.

Slurries to which the activated premix or protected premix may be added include a carbohydrate-mineral (CHO-MIN) slurry and a protein-in-oil (PIO) slurry. Initially, the CHO-MIN slurry may be formed by dissolving selected carbohydrates (e.g., lactose, galactooligosaccharides, etc.) in heated water with agitation, followed by the addition of minerals (e.g., potassium citrate, magnesium chloride, potassium chloride, sodium chloride, choline chloride, etc.). The resulting CHO-MIN slurry may then be held with continued heat and moderate agitation until it is later blended with the other prepared slurries.

The protein-in-oil (PIO) slurry may be formed by heating and mixing the oil (e.g., high oleic safflower oil, soybean oil, coconut oil, monoglycerides, etc.) and emulsifier (e.g., soy lecithin), and then adding oil soluble vitamins, protein (e.g., milk protein concentrate, milk protein hydrolysate, etc.), carrageenan (if any), calcium carbonate or tricalcium phosphate (if any), and arachidonic acid (ARA) oil and docosahexaenoic acid (DHA) oil (if any) with continued heat and agitation. The resulting PIO slurry may be held with continued heat and moderate agitation until it is later blended with the other prepared slurries.

Water is heated and then combined with the CHO-MIN slurry, nonfat milk (if any), and the PIO slurry under adequate agitation. The pH of the resulting blend is adjusted to 6.6-7.0, and the blend is held under moderate heated agitation. ARA oil and DHA oil is added at this stage in some embodiments. In some embodiments, the activated premix or protected premix is blended with one or more of the heated water, CHO-MIN slurry, nonfat milk (if any), and the PIO slurry. Alternatively, the activated premix or protected premix may be blended into the composition after further processing and immediately prior to drying of the composition.

The composition may then be subjected to high-temperature short-time (HTST) processing, during which the composition is heat treated, emulsified and homogenized, and then cooled. Water soluble vitamins and ascorbic acid are added, the pH is adjusted to the desired range if necessary, flavors (if any) are added, and water is added to achieve the desired total solid level. In some embodiments, the emulsions may then be further diluted, and subsequently processed and packaged as ready-to-drink or concentrated liquids. In some embodiments, the emulsions are evaporated, heat treated and subsequently processed and packaged as reconstitutable powder, e.g., spray dried, dry blended, agglomerated.

The spray dried powdered nutritional composition or dry blended powdered nutritional composition may be prepared by any collection of known or otherwise effective techniques, suitable for making and formulating a nutritional powder. For example, the spray drying step may likewise include any spray drying technique that is known for or otherwise suitable for use in the production of nutritional powders. Many different spray drying methods and techniques are known for use in the nutrition field, all of which are suitable for use in the manufacture of the spray dried powdered nutritional composition. Following drying, the finished powder may be packaged into suitable containers.

5. Methods of Use

The nutritional composition may be packaged and sealed in single or multi-use containers, and then stored under ambient conditions or under refrigeration for up to 36 months or longer, more typically from about 6 months to about 24 months. For multi-use containers, these packages may be opened and then covered for repeated use by the ultimate user. For liquid embodiments, the opened and subsequently recovered package is typically stored under refrigerated conditions, and the contents used within about 7 days. For powdered embodiments, the opened and subsequently recovered package may be typically stored under ambient conditions (e.g., avoid extreme temperatures) and the contents used within about one month. Non-limiting examples of ways in which the present formulas may be utilized include use as the following products, use as: a beverage, e.g. a coffee beverage, a cocoa or chocolate beverage, a malted beverage, a fruit or juice beverage, a carbonated beverage, a soft drink, or a milk based beverage; a performance nutrition product, e.g. a performance nutrition bar, powder or ready-to-drink beverage; a medical nutrition product; a dairy product, e.g. a milk drink, a yogurt or other fermented dairy product; an ice cream product; a confectionary product, e.g. a chocolate product; a functional food or beverage, e.g. a slimming product, a fat burning product, a product for improving mental performance or preventing mental decline, or a skin improving product. A beverage according to the invention may be in the form of a powder or liquid concentrate to be mixed with a suitable liquid, e.g. water or milk, before consumption; or a ready-to-drink beverage.

In embodiments directed toward enhancing the absorption of the lipophilic nutrient, the lipophilic nutrient is administered to the subject in a nutritional composition comprising the lipophilic nutrient and a lipophilic MDG carrier oil of the nutritional composition. The absorption of the lipophilic nutrient may be enhanced in one or more measurable ways. The absorption of the lipophilic nutrient may be enhanced by increasing the maximum plasma concentration of the nutrient in the blood of the ingesting subject. The absorption of the lipophilic nutrient may be enhanced by prolonging the plasma absorption of the nutrient in the blood of the ingesting subject over a period of days or weeks. The absorption of the lipophilic nutrient may be enhanced by increasing the total plasma concentration of the nutrient in the blood of the ingesting subject over a period of days or weeks.

In embodiments in which the lipophilic compound is lutein, the powdered nutritional composition including the lutein may be administered to improve age-related macular degeneration and other retinal diseases and disorders. Although in some embodiments, the methods of the present disclosure may be directed to individuals who have age-related macular degeneration or other retinal diseases and disorders, the methods of the present disclosure as described herein are also intended in some embodiments to include the use of such methods in "at risk" individuals, including individuals unaffected by or not otherwise afflicted with age-related macular degeneration or other retinal diseases or disorders, for the purpose of preventing, minimizing, or delaying the development of such diseases and conditions over time. For such prevention purposes, the methods of the present disclosure preferably include continuous, daily administration of the composition as described herein. Such preventive methods may be directed at adults or others, particularly older adults, who are susceptible to developing age-related macular degeneration or other retinal diseases and disorders due to hereditary considerations, environmental considerations, and the like.

Composition including Vitamin D may be administered to subjects to promote healthy bone development, reduce Vitamin D deficiency, increase bone strength, preserve or increase bone mineralization, and preserve or increase bone mineral density. The composition including Vitamin D may also be administered to subjects suffering from or at risk for suffering from diseases and conditions associated with inadequate bone mineralization, such as rickets, osteomalacia, osteoporosis, osteopenia, and bone fractures. The subjects receiving the composition with Vitamin D may include, but are not limited to, pregnant and post-natal women, infants, children, adolescents, adults, post-menopausal women, and older adults. In some embodiments, the methods of the present disclosure are directed to pregnant or post-natal women, to promote healthy bone development in the developing fetus or infant. In some embodiments, the methods of the present disclosure are directed to infants and children, to promote healthy bone development and prevent rickets or bone fractures in the growing child. In some embodiments, the methods of the present disclosure are directed to adolescents and adults, to promote increased bone mineralization and bone mineral density. In some embodiments, the methods of the present disclosure are directed to post-menopausal women, to prevent or slow the onset of osteoporosis. In some embodiments, the methods of the present disclosure are directed to adults who have osteomalacia, osteoporosis, osteopenia, or other bone diseases and disorders. In some embodiments, the methods of the present disclosure are directed to "at risk" individuals, including individuals unaffected by or not otherwise afflicted by osteomalacia, osteoporosis, osteopenia, loss of balance and falling, bone fractures, or other bone diseases or disorders, for the purpose of preventing, minimizing, or delaying the development of such diseases and conditions over time. For such development, maintenance, and prevention purposes, the methods of the present disclosure preferably include continuous, daily administration of the composition as described herein. Such development, maintenance, and preventive methods are directed at subjects such as pregnant and postnatal women, infants, children, adolescents, adults, post-menopausal women, and older adults. Preventative methods are particularly directed to older adults who are susceptible to developing age-related osteoporosis, osteopenia, loss of balance or falling, broken bones, or other diseases and disorders associated with inadequate Vitamin D consumption or inadequate bone mineralization.

In these embodiments, a subject desirably consumes servings of the composition that provide an effective amount of Vitamin D per day. Effective amounts of Vitamin D range from about 50 IU to about 7,500 IU per day, including from about 100 IU per day to about 5,000 IU per day, including from about 200 IU per day to about 2,500 IU per day, including from about 250 IU per day to about 1,500 IU per day, including from about 400 IU per day to about 1,000 IU per day, and including from about 500 IU per day to about 800 IU per day.

In embodiments in which the lipophilic nutrient is Vitamin E, the nutritional composition including Vitamin E may be administered to subjects to provide antioxidants, promote cardiovascular health, and prevent or reduce the risks of some types of cancer. The subjects receiving the nutritional composition with Vitamin E may include, but are not limited to, pregnant and post-natal women, infants, children, and adults. In some embodiments, the methods of the present disclosure may be directed to pregnant or post-natal women to promote healthy development in the developing fetus or infant. In some embodiments, the methods of the present disclosure may be directed to infants and children to promote healthy development in the growing child. In some embodiments, the methods of the present disclosure may be directed to adults who have cardiovascular disease. In some embodiments, the methods of the present disclosure are also directed to "at risk" individuals, including individuals unaffected by or not otherwise afflicted with cancer, cardiovascular disease, or other diseases or disorders, for the purpose of preventing, minimizing, or delaying the development of such diseases and conditions over time. For such development, maintenance, and prevention purposes, the methods of the present disclosure preferably include continuous, daily administration of the nutritional composition as described herein. Such development, maintenance, and preventive methods may be directed at subjects such as pregnant and postnatal women, infants, children, and adults, particularly older adults who are susceptible to developing cancer, cardiovascular disease, or other diseases and disorders due to hereditary considerations, environmental considerations, and the like.

In embodiments in which the lipophilic nutrient is DHA, the nutritional composition including DHA may be administered to subjects to promote healthy eye, brain, and central nervous system development, maintain overall brain health, prevent or reduce age-related decline in mental functioning, and reduce cardiovascular and other diseases and disorders. The subjects receiving the nutritional composition with DHA may include, but are not limited to, pregnant and post-natal women, infants, children, and adults. In some embodiments, the methods of the present disclosure may be directed to pregnant or post-natal women to promote eye, brain, and central nervous system development in the developing fetus or infant. In some embodiments, the methods of the present disclosure may be directed to infants and children to promote eye, brain, and central nervous system development in the growing child. In some embodiments, the methods of the present disclosure may be directed to adults to maintain overall brain health, prevent or reduce age-related decline in mental functioning, and reduce cardiovascular and other diseases and disorders. In some embodiments, the methods of the present disclosure are also directed to "at risk" individuals, including individuals unaffected by or not otherwise afflicted with age-related declines in mental functioning or cardiovascular disease, for the purpose of preventing, minimizing, or delaying the development of such diseases and conditions over time. For such development, maintenance, and prevention purposes, the methods of the present disclosure preferably include continuous, daily administration of the nutritional composition as described herein. Such development, maintenance, and preventive methods may be directed at subjects such as pregnant and postnatal women, infants, children, and adults, particularly older adults who are susceptible to age-related declines in mental functioning, cardiovascular disease, or other diseases and disorders due to hereditary considerations, environmental considerations, and the like.

The nutritional composition including HPAV oil and an activated MDG oil component or a protected premix may be administered to infants to enhance palmitic acid absorbance, promote healthy bone development, and maintain healthy bone mineral density. The subjects receiving the composition with an HPAV oil and an activated MDG oil component or a protected premix include, but are not limited to, pre-term and term infants. In some embodiments, the methods of the present disclosure may be directed to infants, to promote healthy bone development and maintain healthy bone mineral density in the growing infant. For such development and maintenance purposes, the methods of the present disclosure preferably include continuous, daily administration of the nutritional composition as described herein. Such development and maintenance methods may be directed at subjects such as preterm and term infants.

In these embodiments, an infant desirably consumes servings of the nutritional composition that provide effective amounts of the HPAV oil per day. Effective amounts of the HPAV oil range from about 0.6 g to about 18 g per day, including from about 1 g per day to about 15 g per day, including from about 2.5 g per day to about 12.5 g per day, including from about 5 g per day to about 10 g per day, and including from about 6 g per day to about 8 g per day.

The nutritional composition including DHA and lutein may be administered to subjects to promote healthy eye and retina development, maintain overall eye health, and prevent or reduce age-related macular degeneration and other diseases and disorders of the eye. The subjects receiving the nutritional composition with DHA and lutein may include, but are not limited to, pregnant and post-natal women, infants, children, and adults. In some embodiments, the methods of the present disclosure may be directed to pregnant or post-natal women, to promote eye and retina development and healthy vision in the developing fetus or infant. In some embodiments, the methods of the present disclosure may be directed to infants, to promote eye and retina development and visual acuity in the growing child. In some embodiments, the methods of the present disclosure may be directed to children and adults to improve visual acuity, improve photostress recovery, or reduce sensitivity to glare. In some embodiments, the methods of the present disclosure may be directed to adults who have age-related macular degeneration, glaucoma, cataracts, lacrimal keratoconjunctivitis, or other diseases and disorders of the eye. In some embodiments, the methods of the present disclosure are also directed to "at risk" individuals, including individuals unaffected by or not otherwise afflicted with age-related macular degeneration, glaucoma, cataracts, lacrimal keratoconjunctivitis, diabetic retinopathy, or other diseases or disorders of the eye, for the purpose of preventing, minimizing, or delaying the development of such diseases and conditions over time. For such development, maintenance, and prevention purposes, the methods of the present disclosure preferably include continuous, daily administration of the nutritional composition as described herein. Such development, maintenance, and preventive methods may be directed at subjects such as pregnant and postnatal women, infants, children, and adults, particularly older adults who are susceptible to developing age-related macular degeneration or other diseases and disorders of the eye due to hereditary considerations, environmental considerations, and the like.

In these embodiments, a subject desirably consumes servings of the composition that provide effective amounts of DHA and lutein per day. Effective amounts of DHA range from about 5 mg to about 10 g per day, including from about 10 mg per day to about 1 g per day, including from about 20 mg per day to about 500 mg per day, including from about 40 mg per day to about 200 mg per day, and including from about 80 mg per day to about 150 mg per day. Effective amounts of lutein range from about 5 μg to about 10 mg per day, including from about 10 μg per day to about 5 mg per day, including from about 25 μg per day to about 1 mg per day, including from about 50 μg per day to about 500 μg per day, and including from about 100 μg per day to about 250 μg per day.

In these embodiments, an individual desirably consumes at least one serving of the nutritional composition daily, and in some embodiments, may consume two, three, or even more servings per day. Each serving is desirably administered as a single undivided dose, although the serving may also be divided into two or more partial or divided servings to be taken at two or more times during the day. The methods of the present disclosure include continuous day after day administration, as well as periodic or limited administration, although continuous day after day administration is generally desirable. The nutritional composition may be for use in infants, children, and adults.

The nutritional composition has multiple aspects, illustrated by the following non-limiting examples.

5. Examples

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, or methods of use of the invention, may be made without departing from the spirit and scope thereof.

The following examples illustrate specific embodiments and/or features of the nutritional composition comprising an activated premix and the composition comprising a protected premix. The examples are given solely for the purpose of illustration and are not to be construed as limitations of the present disclosure, as many variations thereof are possible without departing from the spirit and scope of the disclosure. All exemplified amounts are weight percentages based upon the total weight of the composition, unless otherwise specified.

The exemplified composition may be prepared in accordance with the manufacturing methods described herein, such that each exemplified nutritional or pharmaceutical composition has improved lipophilic compound bioavailability.

The following details may be applied to the below-listed Examples when appropriate. Changes outside of the details listed below are recited within the specific Examples.

The size exclusion chromatography (SEC) system used in the following Examples is as follows: Column: Superdex Peptide 10/300 GL, GE Healthcare P/N 17-5176-01; Mobile Phase: 700 mL Milli-Q Plus water, 300 mL acetonitrile; 1.0 mL trifluoroacetic acid; Flow Rate: 0.4 mL/minute; Temperature: ambient (~21° C.); Detection: UV light at 214 nm, 280 nm; visible light at 476 nm; Injection: 10 μL; Run Time: 70 minutes; Sample Preparation: dilute 0.6-1.1 g to 10 mL with Mobile Phase; Calibration: by 6 purified reference proteins, 14.2-160 kD.

The high molecular weight lutein assembly is determined as follows: SEC peak eluting ≤20.0 minutes, using visible light detection at 476 nm (a lutein absorbance maximum). The high MW lutein assembly is a water dispersible or water soluble, protein-dominant, macromolecular aggregate in which lutein is bound. The size of the high MW lutein assembly lies approximately in the 60-380 kD range (~60-95 Å). The concentration of the high MW lutein assembly is quantified as peak area (mAU-min. at 476 nm) per mg of sample injected. The values reported as high MW lutein assembly are not absolute concentrations of bound lutein, but are instead relative measures of the lutein bound in these high MW but water dispersible/soluble, macromolecular aggregates.

The protein >137 kD is determined as follows: SEC peak eluting ≤18.0 minutes, using UV detection at 214 nm (a peptide bond and amino acid side chain signal). The peak consists predominantly of aggregated proteins; e.g., its size is larger than all major milk proteins (~14 to 25 kD), so that the protein in this peak (>137 kD) is regarded as aggregated but still water dispersible/soluble, and capable of encapsulating lutein and other oil soluble vitamins/nutrients. It is quantified as g of protein per kg of sample. Peak area of the protein is measured versus a known concentration to provide the g/kg of said protein.

The bound lipophile index is determined as follows: a non-specific indicator of lipophilic nutrients (including lutein and any combination of other oil soluble vitamins) in the high MW protein peak (described above). The value reported is the peak area ratio, 280 nm/214 nm, for the SEC peak eluting ≤18.0 minutes, a relative marker of lipophilic nutrient concentration in the high MW aggregate. The validity of the index is based on the fact that the 280 nm/214 nm ratios for lipophilic nutrients is >than that for proteins.

Examples 1-5

Examples 1-5 illustrate powdered infant formulas of the present disclosure, the ingredients of which are listed in the table below. All ingredient amounts are listed as kg per 1000 kg batch, unless otherwise specified.

TABLE 3

Nutritional Composition Ingredients for Examples 1-5 and other Exemplified Compositions.

| INGREDIENT | EXAMPLE 1 | EXAMPLE 2 | EXAMPLE 3 | EXAMPLE 4 | EXAMPLE 5 |
|---|---|---|---|---|---|
| Corn Syrup | 504.1 | 504.1 | 504.1 | 504.1 | 504.1 |
| Soy Protein Isolate-5% DH | 144.8 | 144.8 | 144.8 | 144.8 | 144.8 |
| Sunflower Oil | 112.5 | 112.5 | 101.3 | 112.5 | 112.5 |
| Sucrose | 98.3 | 98.3 | 98.3 | 98.3 | 98.3 |
| Soy Oil | 83.9 | 83.9 | 75.5 | 83.9 | 83.9 |
| Coconut Oil | 75.6 | 75.6 | 68.0 | 75.6 | 75.6 |
| Fructooligosaccharides | 17.0 | 17.0 | 17.0 | 17.0 | 17.0 |
| Potassium Citrate | 16.5 | 16.5 | 16.5 | 16.5 | 16.5 |
| Calcium Phosphate | 16.4 | 16.4 | 16.4 | 16.4 | 16.4 |
| Sodium Chloride | 3.8 | 3.8 | 3.8 | 3.8 | 3.8 |
| ARA Oil | 3.0 | 3.0 | 3.0 | 3.0 | 3.0 |
| Magnesium Chloride | 2.8 | 2.8 | 2.8 | 2.8 | 2.8 |
| L-Methionine | 1.7 | 1.7 | 1.7 | 1.7 | 1.7 |
| Ascorbic Acid | 1.1 | 1.1 | 1.1 | 1.1 | 1.1 |
| DHA Oil | 1.1 | 1.1 | 1.1 | 1.1 | 1.1 |
| Mono-and Diglyceride/Lutein Blend | approx. 622.0 g | approx. 590.9 g | approx. 27.2 | approx. 653.1 g | approx. 685.0 g |
| Monodiglycerides and Diglycerides | 621.0 g | 590.3 g | 27.0 | 652.7 g | 683.5 g |
| Lutein | 945.0 mg | 566 mg | 200 g | 392 mg | 1.5 g |
| Choline Chloride | 507.7 g | 507.7 g | 507.7 g | 507.7 g | 507.7 g |
| Famine | 457.5 g | 457.5 g | 457.5 g | 457.5 g | 457.5 g |
| Inositol | 353.0 g | 353.0 g | 353.0 g | 353.0 g | 353.0 g |
| Ascorbyl Palmitate | 347.5 g | 347.5 g | 347.5 g | 347.5 g | 347.5 g |
| Ferrous Sulfate | 319.2 g | 319.2 g | 319.2 g | 319.2 g | 319.2 g |
| Mixed Tocopherols | 157.2 g | 157.2 g | 157.2 g | 157.2 g | 157.2 g |

TABLE 3-continued

Nutritional Composition Ingredients for Examples 1-5 and other Exemplified Compositions.

| INGREDIENT | EXAMPLE 1 | EXAMPLE 2 | EXAMPLE 3 | EXAMPLE 4 | EXAMPLE 5 |
|---|---|---|---|---|---|
| L-Carnitine | 112.7 g | 112.7 g | 112.7 g | 112.7 g | 112.7 g |
| Niacinamide | 97.9 g | 97.9 g | 97.9 g | 97.9 g | 97.9 g |
| d-alpha-tocopheryl acetate | 78.8 g | 78.8 g | 78.8 g | 78.8 g | 78.8 g |
| d-Calcium Pantothenate | 58.7 g | 58.7 g | 58.7 g | 58.7 g | 58.7 g |
| Zinc | 56.0 g | 56.0 g | 56.0 g | 56.0 g | 56.0 g |
| Iron | 16.9 g | 16.9 g | 16.9 g | 16.9 g | 16.9 g |
| Thiamine | 15.2 g | 15.2 g | 15.2 g | 15.2 g | 15.2 g |
| Vitamin A palmitate | 14.8 g | 14.8 g | 14.8 g | 14.8 g | 14.8 g |
| Copper | 7.2 g | 7.2 g | 7.2 g | 7.2 g | 7.2 g |
| Riboflavin | 6.7 g | 6.7 g | 6.7 g | 6.7 g | 6.7 g |
| Pyridoxine Hydrochloride | 6.1 g | 6.1 g | 6.1 g | 6.1 g | 6.1 g |
| Folic Acid | 2.1 g | 2.1 g | 2.1 g | 2.1 g | 2.1 g |
| Potassium Iodide | 11 g | 11 g | 11 g | 11 g | 11 g |
| Phylloquinone | 857.1 mg | 857.1 mg | 857.1 mg | 857.1 mg | 857.1 mg |
| Vitamin D3 | 103.7 mg | 103.7 mg | 103.7 mg | 103.7 mg | 103.7 mg |
| Lycopene | 980.0 mg | 980.0 mg | 980.0 mg | 980.0 mg | 980.0 mg |
| Biotin | 592.5 mg | 592.5 mg | 592.5 mg | 592.5 mg | 592.5 mg |
| Beta-Carotene | 215.6 mg | 215.6 mg | 215.6 mg | 215.6 mg | 215.6 mg |
| Selenium | 147.0 mg | 147.0 mg | 147.0 mg | 147.0 mg | 147.0 mg |
| Cyanocobalamin | 71.3 mg | 71.3 mg | 71.3 mg | 71.3 mg | 71.3 mg |

Examples 6-10

Examples 6-10 illustrate powdered infant formulas of the present disclosure, the ingredients of which are listed in the table below. All ingredient amounts are listed as kg per 1000 kg batch, unless otherwise specified.

TABLE 4

Nutritional Composition Ingredients for Examples 6-10 and other Exemplified Compositions.

| INGREDIENT | EXAMPLE 6 | EXAMPLE 7 | EXAMPLE 8 | EXAMPLE 9 | EXAMPLE 10 |
|---|---|---|---|---|---|
| Skim milk | 2057.3 | 2057.3 | 2057.3 | 2057.3 | 2057.3 |
| Lactose | 414.1 | 414.1 | 414.1 | 414.1 | 414.1 |
| Sunflower oil | 111.1 | 88.9 | 111.1 | 111.1 | 111.1 |
| Soy oil | 83.3 | 66.6 | 83.3 | 83.3 | 83.3 |
| Coconut oil | 74.6 | 59.7 | 74.6 | 74.6 | 74.6 |
| GOS | 72.3 | 72.3 | 72.3 | 72.3 | 72.3 |
| Whey Protein Concentrate | 49.4 | 49.4 | 49.4 | 49.4 | 49.4 |
| Whey protein hydrolysate (<25DH) | 5.6 | 5.6 | 5.6 | 5.6 | 5.6 |
| Potassium citrate | 3.4 | 3.4 | 3.4 | 3.4 | 3.4 |
| ARA | 2.9 | 2.9 | 2.9 | 2.9 | 2.9 |
| Calcium carbonate | 2.6 | 2.6 | 2.6 | 2.6 | 2.6 |
| Potassium hydroxide | 2.3 | 2.3 | 2.3 | 2.3 | 2.3 |
| Soy lecithin | 1.7 | 1.7 | 1.7 | 1.7 | 1.7 |
| DHA | 1.6 | 1.6 | 1.6 | 1.6 | 1.6 |
| Ascorbic acid | 1.5 | 1.5 | 1.5 | 1.5 | 1.5 |
| Choline bitartrate | 1.2 | 1.2 | 1.2 | 1.2 | 1.2 |
| Magnesium chloride | 1.2 | 1.2 | 1.2 | 1.2 | 1.2 |
| Mono-and diglyceride/Lutein blend | approx. 1.10 | approx. 53.8 | approx. 0.99 | approx. 1.155 | approx. 1.21 |
| Monoglycerides and Diglycerides | 1.10 | 53.5 | 0.99 | 1.153 | 1.21 |
| Lutein | 2.65 g | 320 g | 568 mg | 2.3 g | 385 mg |
| Sodium chloride | 1 | 1 | 1 | 1 | 1 |
| Taurine | 428 g | 428 g | 428 g | 428 g | 428 g |
| L-Tryptophan | 277 g | 277 g | 277 g | 277 g | 277 g |
| Cytidine 5'-monophosphate | 257 g | 257 g | 257 g | 257 g | 257 g |
| Myo-inositol | 257 g | 257 g | 257 g | 257 g | 257 g |
| Ascorbyl palmitate | 200 g | 200 g | 200 g | 200 g | 200 g |
| Disodium guanosine 5'-monophosphate | 187 g | 187 g | 187 g | 187 g | 187 g |
| Disodium uridine 5'-monophosphate | 163 g | 163 g | 163 g | 163 g | 163 g |
| Ferrous sulfate monohydrate | 130.6 g | 130.6 g | 130.6 g | 130.6 g | 130.6 g |
| RRR-α-Tocopheryl acetate | 119.7 g | 119.7 g | 119.7 g | 119.7 g | 119.7 g |
| Tocopherol-2 | 106.7 g | 106.7 g | 106.7 g | 106.7 g | 106.7 g |

TABLE 4-continued

Nutritional Composition Ingredients for Examples 6-10 and other Exemplified Compositions.

| INGREDIENT | EXAMPLE 6 | EXAMPLE 7 | EXAMPLE 8 | EXAMPLE 9 | EXAMPLE 10 |
|---|---|---|---|---|---|
| Zinc sulfate monohydrate | 104 g | 104 g | 104 g | 104 g | 104 g |
| Adenosine 5'-monophosphate | 98 g | 98 g | 98 g | 98 g | 98 g |
| Ferrous sulfate | 88 g | 88 g | 88 g | 88 g | 88 g |
| Mixed tocopherols | 77 g | 77 g | 77 g | 77 g | 77 g |
| Niacinamide | 59 g | 59 g | 59 g | 59 g | 59 g |
| L-Carnitine | 43 g | 43 g | 43 g | 43 g | 43 g |
| Calcium d-pantothenate | 42 g | 42 g | 42 g | 42 g | 42 g |
| Retinyl palmitate | 13 g | 13 g | 13 g | 13 g | 13 g |
| Copper sulfate | 11 g | 11 g | 11 g | 11 g | 11 g |
| Thiamin HCl | 9 g | 9 g | 9 g | 9 g | 9 g |
| Pyridoxine HCl | 5 g | 5 g | 5 g | 5 g | 5 g |
| Riboflavin | 5 g | 5 g | 5 g | 5 g | 5 g |
| Manganese sulfate monohydrate | 3 g | 3 g | 3 g | 3 g | 3 g |
| Folic acid | 796 mg | 796 mg | 796 mg | 796 mg | 796 mg |
| P-Carotene | 770 mg | 770 mg | 770 mg | 770 mg | 770 mg |
| Phylloquinone | 618 mg | 618 mg | 618 mg | 618 mg | 618 mg |
| Potassium iodide | 550 mg | 550 mg | 550 mg | 550 mg | 550 mg |
| d-Biotin | 238 mg | 238 mg | 238 mg | 238 mg | 238 mg |
| Sodium selenate | 117 mg | 117 mg | 117 mg | 117 mg | 117 mg |
| Cholecalciferol | 93 mg | 93 mg | 93 mg | 93 mg | 93 mg |
| Cyanocobalamin | 8 mg | 8 mg | 8 mg | 8 mg | 8 mg |

Examples 11-15

Examples 11-15 illustrate powdered adult formulas of the present disclosure, the ingredients of which are listed in the table below. All ingredient amounts are listed as kg per 1000 kg batch, unless otherwise specified.

TABLE 5

Nutritional Composition Ingredients for Examples 11-15 and other Exemplified Compositions.

| INGREDIENT | EXAMPLE 11 | EXAMPLE 12 | EXAMPLE 13 | EXAMPLE 14 | EXAMPLE 15 |
|---|---|---|---|---|---|
| Corn syrup | 259.86 | 259.86 | 259.86 | 259.86 | 259.86 |
| Corn maltodextrin | 216.25 | 216.25 | 216.25 | 216.25 | 216.25 |
| Sucrose | 177.95 | 177.95 | 177.95 | 177.95 | 177.95 |
| Corn oil | 155.4 | 155.4 | 155.4 | 155.4 | 155.4 |
| Sodium and calcium caseinates | 152.43 | 152.43 | 152.43 | 152.43 | 152.43 |
| Acid Casein | 132.97 | 132.97 | 132.97 | 132.97 | 132.97 |
| Calcium Caseinate | 19.46 | 19.46 | 19.46 | 19.46 | 19.46 |
| Soy protein isolate | 28.94 | 28.94 | 28.94 | 28.94 | 28.94 |
| Mono-and diglyceride/Lutein | approx. | approx. | approx. | approx. | approx. |
| Blend | 15.53 | 15.6 | 2.3 | 7.8 | 5.91 |
| Monoglycerides and diglycerides | 15.50 | 15.57 | 2.3 | 7.8 | 5.91 |
| Lutein | 2.9 g | 34.0 g | 5.0 g | 2.5 g | 12.5 g |
| Artificial flavoring | 14.55 | 14.55 | 14.55 | 14.55 | 14.55 |
| Potassium citrate | 10.75 | 10.75 | 10.75 | 10.75 | 10.75 |
| 20% Potassium Citrate | 3.22 | 3.22 | 3.22 | 3.22 | 3.22 |
| Potassium Citrate | 7.54 | 7.54 | 7.54 | 7.54 | 7.54 |
| Magnesium chloride | 7.53 | 7.53 | 7.53 | 7.53 | 7.53 |
| Calcium phosphate | 6.23 | 6.23 | 6.23 | 6.23 | 6.23 |
| Sodium citrate | 5.66 | 5.66 | 5.66 | 5.66 | 5.66 |
| Potassium chloride | 3.79 | 3.79 | 3.79 | 3.79 | 3.79 |
| Soy lecithin | 3.44 | 3.44 | 3.44 | 3.44 | 3.44 |
| Ascorbic acid | 1.91 | 1.91 | 1.91 | 1.91 | 1.91 |
| Choline chloride | 1.64 | 1.64 | 1.64 | 1.64 | 1.64 |
| Zinc sulfate | 155.8 g | 155.8 g | 155.8 g | 155.8 g | 155.8 g |
| dl-alpha-tocopheryl acetate | 129.6 g | 129.6 g | 129.6 g | 129.6 g | 129.6 g |
| Niacinamide | 124.2 g | 124.2 g | 124.2 g | 124.2 g | 124.2 g |
| Ferrous sulfate | 121.7 g | 121.7 g | 121.7 g | 121.7 g | 121.7 g |
| Calcium pantothenate | 80.3 g | 80.3 g | 80.3 g | 80.3 g | 80.3 g |
| Manganese sulfate | 38.7 g | 38.7 g | 38.7 g | 38.7 g | 38.7 g |
| Cupric sulfate | 21.1 g | 21.1 g | 21.1 g | 21.1 g | 21.1 g |
| Thiamine chloride hydrochloride | 20.5 g | 20.5 g | 20.5 g | 20.5 g | 20.5 g |
| Pyridoxine hydrochloride | 19.8 g | 19.8 g | 19.8 g | 19.8 g | 19.8 g |
| Riboflavin | 16.0 g | 16.0 g | 16.0 g | 16.0 g | 16.0 g |
| Vitamin A palmitate | 10.4 g | 10.4 g | 10.4 g | 10.4 g | 10.4 g |

TABLE 5-continued

Nutritional Composition Ingredients for Examples 11-15 and other Exemplified Compositions.

| INGREDIENT | EXAMPLE 11 | EXAMPLE 12 | EXAMPLE 13 | EXAMPLE 14 | EXAMPLE 15 |
|---|---|---|---|---|---|
| Folic acid | 2.8 g | 2.8 g | 2.8 g | 2.8 g | 2.8 g |
| Biotin | 2.4 g | 2.4 g | 2.4 g | 2.4 g | 2.4 g |
| Chromium chloride | 1.3 g | 1.3 g | 1.3 g | 1.3 g | 1.3 g |
| Sodium molybdate | 1.0 g | 1.0 g | 1.0 g | 1.0 g | 1.0 g |
| Potassium iodide | 0.44 g | 0.44 g | 0.44 g | 0.44 g | 0.44 g |
| Sodium selenate | 0.43 g | 0.43 g | 0.43 g | 0.43 g | 0.43 g |
| Phylloquinone | 0.22 g | 0.22 g | 0.22 g | 0.22 g | 0.22 g |
| Cyanocobalamin | 0.05 g | 0.05 g | 0.05 g | 0.05 g | 0.05 g |
| Vitamin D3 | 0.03 g | 0.03 g | 0.03 g | 0.03 g | 0.03 g |

Examples 16-18

Examples 16-18 illustrate liquid adult formulas of the present disclosure, the ingredients of which are listed in the table below. All ingredient amounts are listed as kg per 1000 kg batch, unless otherwise specified.

TABLE 6

Nutritional Composition Ingredients for Examples 16-18 and other Exemplified Compositions.

| Ingredient | Example 16 | Example 17 | Example 18 |
|---|---|---|---|
| Water | QS | QS | QS |
| Corn Syrup | 33 kg | 33 kg | 33 kg |
| Maltodextrin | 28 kg | 28 kg | 28 kg |
| Sucrose | 19.4 kg | 19.4 kg | 19.4 kg |
| Mono- and Diglyceride/DHA premix | 18.3 kg | 6.1 kg | 2.4 kg |
| Monoglycerides and Diglycerides | 9.6 kg | 5.1 kg | 2 kg |
| Docosahexaenoic Acid Oil (60% DHA in vegetable oil) | 8.7 kg | 1 kg | 0.4 kg |
| Caseinate | 8.7 kg | 8.7 kg | 8.7 kg |
| High Oleic Safflower Oil | — | 2 kg | 3.3 kg |
| Canola Oil | — | 2 kg | 3.3 kg |
| Soy Protein | 3.7 kg | 3.7 kg | 3.7 kg |
| Whey Protein | 3.2 kg | 3.2 kg | 3.2 kg |
| Caseinate | 2.9 kg | 2.9 kg | 2.9 kg |
| Corn Oil | | 1 kg | 1.6 kg |
| Tricalcium Phosphate | 1.4 kg | 1.4 kg | 1.4 kg |
| Potassium Citrate | 1.3 kg | 1.3 kg | 1.3 kg |
| Magnesium Phosphate | 952 gm | 952 gm | 952 gm |
| Lecithin | 658 gm | 658 gm | 658 gm |
| Magnesium chloride | 558 gm | 558 gm | 558 gm |
| Vanilla Flavor | 544 gm | 544 gm | 544 gm |
| Sodium Chloride | 272 gm | 272 gm | 272 gm |
| Carrageenan | 227 gm | 227 gm | 227 gm |
| Choline chloride | 218 gm | 218 gm | 218 gm |
| UTM/TM Premix | 165 gm | 165 gm | 165 gm |
| Potassium Chloride | 146 gm | 146 gm | 146 gm |
| Ascorbic Acid | 145 gm | 145 gm | 145 gm |
| Sodium Citrate | 119 gm | 119 gm | 119 gm |
| Potassium Hydroxide | 104 gm | 104 gm | 104 gm |
| Docosahexaenoic Acid Oil (60% DHA in vegetable oil) | 8.7 kg | 1 kg | 1 kg |
| WSV Premix | 33 gm | 33 gm | 33 gm |
| Vit DEK Premix | 29 gm | 29 gm | 29 gm |
| Vitamin A | 3.7 gm | 3.7 gm | 3.7 gm |
| Potassium Iodide | 86 mcg | 86 mcg | 86 mcg |

Example 19

In this Example, the effect of mixing lutein, a polar lipid nutrient, in a combination of monoglycerides and diglycerides on the lutein bioavailability is evaluated and compared to the bioavailability of lutein that is mixed in typical triglyceride-based oils.

Male Sprague Dawley rats weighing between 280 and 330 grams were all fed a normal commercially available Purina Rat Chow for one week. Rats were then fasted overnight prior to surgery, and under anesthesia, a laparotomy was performed, and the intestinal lymph duct was cannulated according to the procedure of Tso et al., "The Absorption of Lipid and Lipoprotein Synthesis," Lipid Research Methodology, Chapter 5: 191-216 (1984) Alan R. Liss, Inc., NY, NY, hereby incorporated by reference to the extent consistent herewith. The superior mesenteric artery was isolated, but not occluded. A silicon infusion tube (1.6 mm OD) was placed in the stomach for future infusion of a test sample. The fundic incision was closed by a purse string suture. The rats were allowed to recover for 24 hours before infusion began.

The test samples included the following solutions: (1) lutein in safflower oil (control); (2) lutein in monoglycerides and diglycerides derived from corn oil; and (3) lutein in monoglycerides and diglycerides derived from high oleic acid sunflower oil.

The rats were randomly assigned to three groups. The animals were intragastrically infused 24 hours after surgery with 20 mg/kg lutein from their respective lutein-containing solutions.

Lymph was collected in pre-cooled tubes 1 hour before the lutein infusions (fasting) and then hourly for 6 hours after initiation of infusion. At the end of the 6 hours infusion, the rats were sacrificed by exsanguination.

The lymph lipids were extracted and analyzed for lutein concentration using high-performance liquid chromatography with programmed wavelength ultraviolet detection (Craft Technologies, Wilson, NC).

Figure 2:
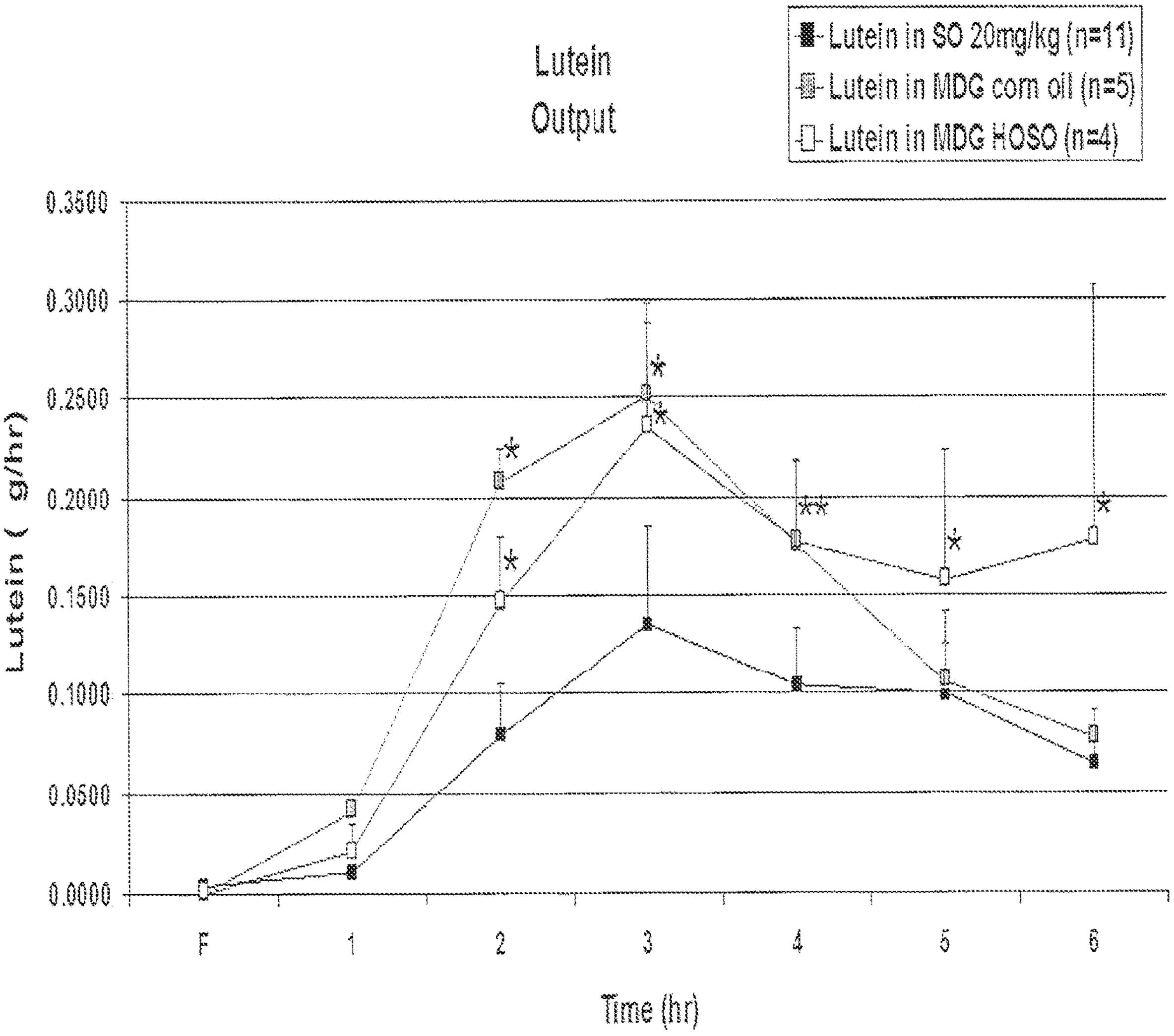
FIG. 2 shows the hourly lutein output in lymph over a 6 hour period after lutein administration of different nutritional composition batches.
Figure 3:
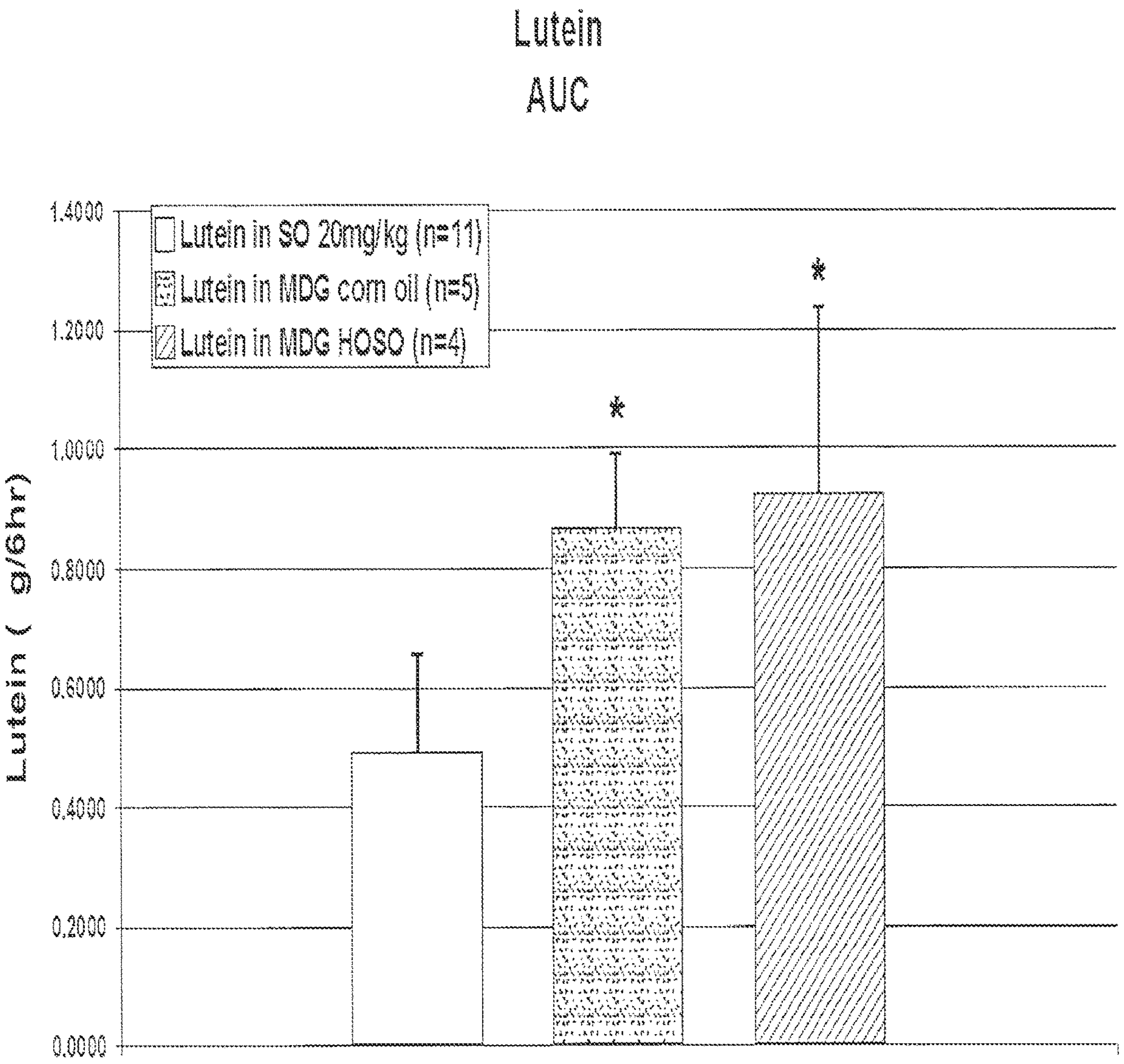
FIG. 3 shows cumulative lymphatic lutein absorption over a 6 hour period after lutein administration of different nutritional composition batches.
Figure 4:
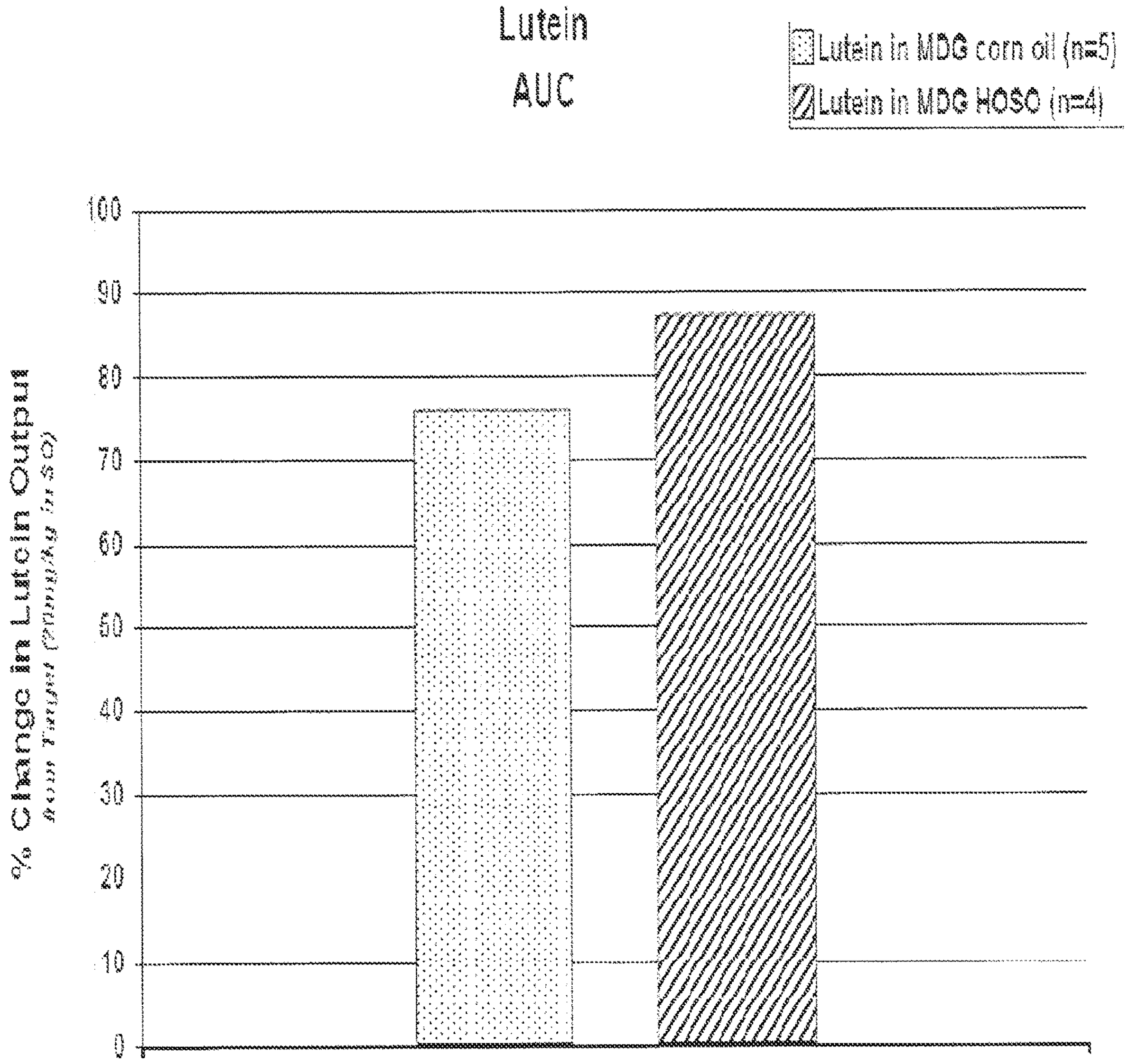
FIG. 4 shows the percent change in lymphatic lutein absorption of lutein with mono- and diglycerides versus control over a period of 6 hours.

FIG. 1 shows the hourly lymph flow rate over a period of 6 hours following lutein administration. FIG. 2 shows the hourly lutein output in lymph over a 6 hour period after lutein administration. FIG. 3 shows cumulative lymphatic lutein absorption over a 6 hour period after lutein administration. FIG. 4 shows the percent change in lymphatic lutein absorption of lutein with mono- and diglycerides versus control over a period of 6 hours.

As shown in FIG. 1, the mean fasting lymph flow for all three groups of rats varied between 2.3 and 2.6 mL/h. In all groups, lymph flow increased significantly after lutein infusion and reached a maximum output between 2.7 and 3.9 mL/h during hours 2-3 after lipid infusion. There were no differences in lymph flow rates between the groups indicating that the use of lutein in mono- and diglycerides did not significantly affect lymph flow rates versus the lutein in triglyceride control. FIG. 2 shows the lymphatic lutein output in g/h during the first 6 hours after gastric feeding of the 3 different lutein samples. The lymphatic output of lutein increased in all groups during the first 3 hours and reached a steady state from hour 3 to hour 5 after lutein administration. However, there was a significant increase in the amounts of lymphatic lutein output 2-6 hours after lutein administration with lutein given with mono and diglycerides (corn and HOSO) as compared with lutein in the triglyceride control. FIG. 3 shows the above lutein absorption improvements with mono and diglycerides by demonstrating a significantly higher cumulative lutein absorption over the 6 hour absorption period (area under the curve (AUC)) versus the lutein in the triglyceride control. When this data is expressed as a percent change in lymphatic lutein absorption, as shown in FIG. 4, there was a 78%-88% increase in lymphatic lutein absorption of lutein with mono and diglycerides versus the control over the 6 hour infusion period. This data indicates that the polar lipid nutrient lutein has improved bioavailability in a mixture of monoglycerides and diglycerides as compared to triglyceride oils.

Example 20

In this Example, the effect of the addition of an activated premix comprising lutein and the effect of the addition of a protected premix on the bioavailability of the lutein in a nutritional composition is evaluated and compared to the bioavailability of lutein that is typically added to triglyceride-based oils prior to addition to the nutritional composition.

Male Sprague Dawley rats weighing between 280 and 330 grams were all fed a normal commercially available Purina Rat Chow for one week. Rats were then fasted overnight prior to surgery, and under anesthesia, a laparotomy was performed, and the intestinal lymph duct was cannulated according to the procedure of Tso et al., "The Absorption of Lipid and Lipoprotein Synthesis," Lipid Research Methodology, Chapter 5: 191-216 (1984) Alan R. Liss, Inc., NY, NY, hereby incorporated by reference to the extent consistent herewith. The superior mesenteric artery was isolated, but not occluded. A silicon infusion tube (1.6 mm OD) was placed in the stomach for future infusion of a test sample. The fundic incision was closed by a purse string suture. The rats were allowed to recover for 24 hours before infusion began.

The test samples included the following nutritional compositions: (AET-C) lutein added to high oleic safflower oil at 120° F. for 10 minutes, added to the protein-in-fat slurry (control); (AET-1) lutein premixed with monoglycerides and diglycerides at 120° F. for 10 minutes, lecithin added to the premix post heating and allowed to mix for 5 minutes, added to the protein-in-fat slurry to form an MDG-protected premix prior to addition to the remainder of the composition; (AET-2) lutein premixed with monoglycerides and diglycerides at 120° F. for 10 minutes, added to the protein-in-water slurry to form an activated premix, prior to addition to the remainder of the composition; (AET-3) lutein premixed with monoglycerides and diglycerides at 120° F. for 10 minutes added to the protein-in-fat slurry prior to addition to the remainder of the composition, and (AET-4) lutein premixed with monoglycerides and diglycerides at 120° F. for 10 minutes, choline-added as choline chloride to the premix post heating and allowed to mix for 5 minutes, added to the protein-in-water slurry to form an activated premix prior to addition to the remainder of the composition. The compositions for each of the test samples are provided in detail in the following table.

TABLE 7

Nutritional Composition Ingredients for Example 20 and other Exemplified Compositions.

| | AET-C | | AET-1 | | AET-2 | | AET-3 | | AET-4 | |
|---|---|---|---|---|---|---|---|---|---|---|
| | Amount per 1000 kg | Unit | Amount per 1000 kg | Unit | Amount per 1000 kg | Unit | Amount per 1000 kg | Unit | Amount per 1000 kg | Unit |
| Ingredient Name: | | | | | | | | | | |
| Ingredient Water | Q.S. | kg | Q.S. | kg | Q.S. | kg | Q.S. | kg | Q.S. | kg |
| Lactose | 49.27 | kg | 49.27 | kg | 49.27 | kg | 49.27 | kg | 49.27 | kg |
| Non-Fat Dry Milk | 22.06 | kg | 22.06 | kg | 22.06 | kg | 22.06 | kg | 22.06 | kg |
| High Oleic Safflower Oil | 13.44 | kg | 12.78 | kg | 12.78 | kg | 12.78 | kg | 12.78 | kg |
| Soy Oil | 10.06 | kg | 9.57 | kg | 9.57 | kg | 9.57 | kg | 9.57 | kg |
| Coconut Oil | 9.60 | kg | 9.13 | kg | 9.13 | kg | 9.13 | kg | 9.13 | kg |
| Galacto-oligosaccharides | 9.40 | kg | 9.40 | kg | 9.40 | kg | 9.40 | kg | 9.40 | kg |
| Whey Protein Concentrate | 6.31 | kg | 6.31 | kg | 6.31 | kg | 6.31 | kg | 6.31 | kg |
| Monoglyceride and Diglyceride Oil | | | 1.62 | kg | 1.62 | kg | 1.62 | kg | 1.62 | kg |
| Ascorbic Acid | 611.99 | g | 611.99 | g | 611.99 | g | 611.99 | g | 611.99 | g |
| Calcium Carbonate | 559.70 | g | 559.70 | g | 559.70 | g | 559.70 | g | 559.70 | g |
| Potassium Citrate | 545.40 | g | 545.40 | g | 545.40 | g | 545.40 | g | 545.40 | g |
| ARASCO Mortierella Alpina Oil | 395.30 | g | 395.30 | g | 395.30 | g | 395.30 | g | 395.30 | g |

TABLE 7-continued

Nutritional Composition Ingredients for Example 20 and other Exemplified Compositions.

| | AET-C | | AET-1 | | AET-2 | | AET-3 | | AET-4 | |
|---|---|---|---|---|---|---|---|---|---|---|
| | Amount per 1000 kg | Unit | Amount per 1000 kg | Unit | Amount per 1000 kg | Unit | Amount per 1000 kg | Unit | Amount per 1000 kg | Unit |
| KOH 45% | 368.00 | g | 368.00 | g | 368.00 | g | 368.00 | g | 368.00 | g |
| Centrol (Lecithin) | 346.99 | g | 346.99 | g | 346.99 | g | 346.99 | g | 346.99 | g |
| Myverol | 346.99 | g | 346.99 | g | 346.99 | g | 346.99 | g | 346.99 | g |
| Nucleotide-Choline Premix | 314.15 | g | 314.15 | g | 314.15 | g | 314.15 | g | 314.15 | g |
| DHASCO Crypthecodinium Cohnii Oil | 208.80 | g | 208.80 | g | 208.80 | g | 208.80 | g | 208.80 | g |
| Vit/Min/Taur Premix | 176.00 | g | 176.00 | g | 176.00 | g | 176.00 | g | 176.00 | g |
| Seakem RLC Carrageenan | 175.26 | g | 175.26 | g | 175.26 | g | 175.26 | g | 175.26 | g |
| Sodium Citrate | 163.00 | g | 163.00 | g | 163.00 | g | 163.00 | g | 163.00 | g |
| Sodium Chloride | 145.30 | g | 145.30 | g | 145.30 | g | 145.30 | g | 145.30 | g |
| Magnesium Chloride | 126.50 | g | 126.50 | g | 126.50 | g | 126.50 | g | 126.50 | g |
| Potassium Phosphate Dibasic | 117.60 | g | 117.60 | g | 117.60 | g | 117.60 | g | 117.60 | g |
| Ferrous sulfate | 66.50 | g | 66.50 | g | 66.50 | g | 66.50 | g | 66.50 | g |
| Choline Chloride | 44.97 | g | 44.97 | g | 44.97 | g | 44.97 | g | 44.97 | g |
| Vitamin A, D3, E, K1 | 35.80 | g | 35.80 | g | 35.80 | g | 35.80 | g | 35.80 | g |
| Magnesium Sulfate | 27.40 | g | 27.40 | g | 27.40 | g | 27.40 | g | 27.40 | g |
| Zinc Sulfate | 17.90 | g | 17.90 | g | 17.90 | g | 17.90 | g | 17.90 | g |
| Lutein | 12.35 | g | 12.35 | g | 12.35 | g | 12.35 | g | 12.35 | g |
| L-Carnitine | 5.50 | g | 5.50 | g | 5.50 | g | 5.50 | g | 5.50 | g |
| Cupric Sulfate | 1.90 | g | 1.90 | g | 1.90 | g | 1.90 | g | 1.90 | g |
| Manganese Sulfate | 110.00 | mg | 110.00 | mg | 110.00 | mg | 110.00 | mg | 110.00 | mg |
| Citric Acid (Processing aid) | As needed | | As needed | | As needed | | As needed | | As needed | |
| Potassium Iodide | As needed | | As needed | | As needed | | As needed | | As needed | |
| Sodium Selenate | As needed | | As needed | | As needed | | As needed | | As needed | |
| Potassium Chloride | As needed | | As needed | | As needed | | As needed | | As needed | |

The rats were randomly assigned to five groups. The animals were intragastrically infused 24 hours after surgery with 3 ml of nutritional formula that delivered 5.8 μg lutein per animal from their respective lutein-containing solutions.

Lymph was collected in pre-cooled tubes 1 hour before the nutritional composition infusions (fasting) and then hourly for 8 hours after initiation of infusion. At the end of the 8 hours infusion, the rats were sacrificed by exsanguination.

The lymph lipids were extracted and analyzed for lutein concentration using high-performance liquid chromatography with programmed wavelength ultraviolet detection (Craft Technologies, Wilson, NC).

Figure 5:
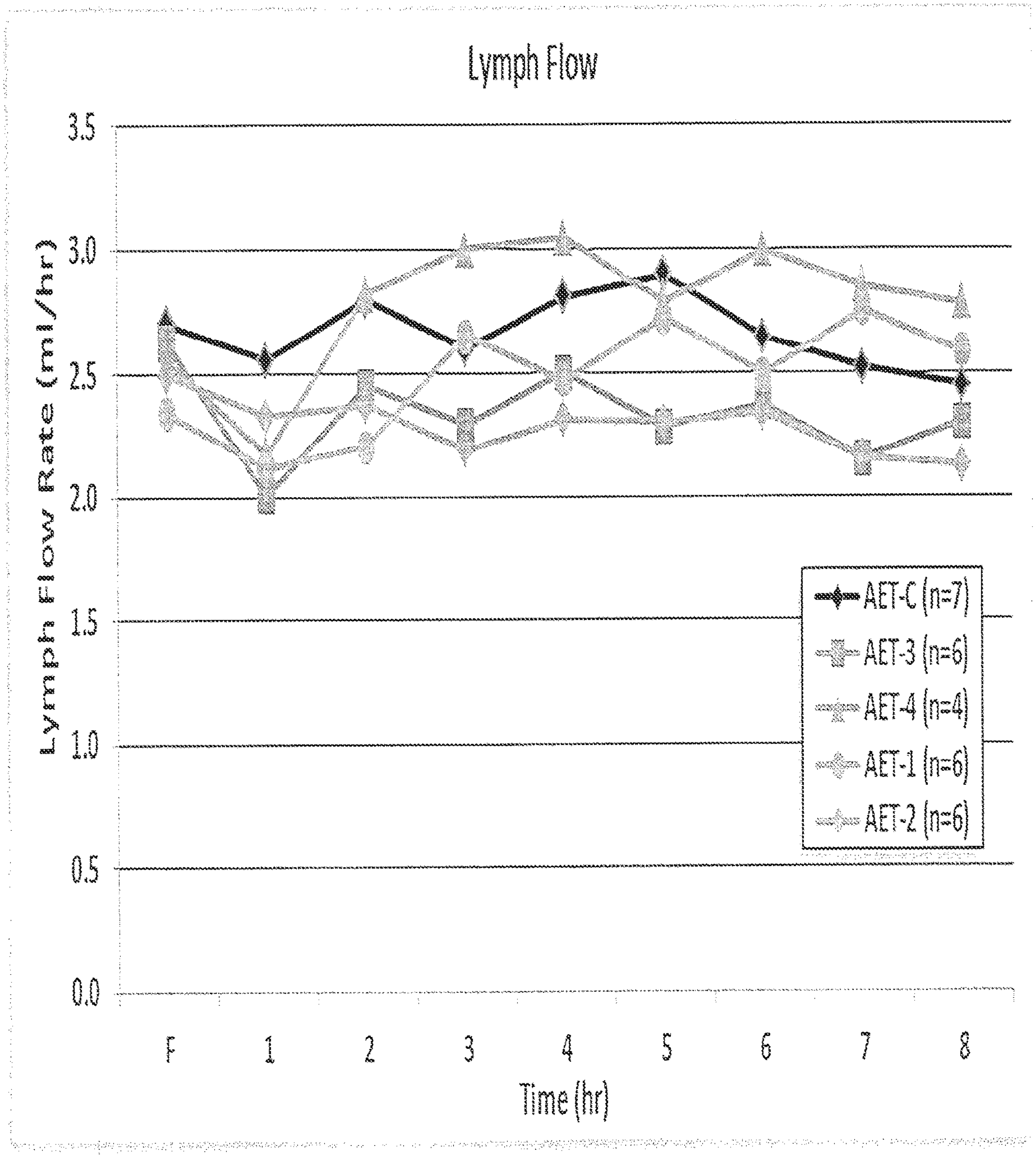
FIG. 5 shows the hourly lymph flow rate over a period of 8 hours following administration of variable nutritional compositions containing lutein.
Figure 6:
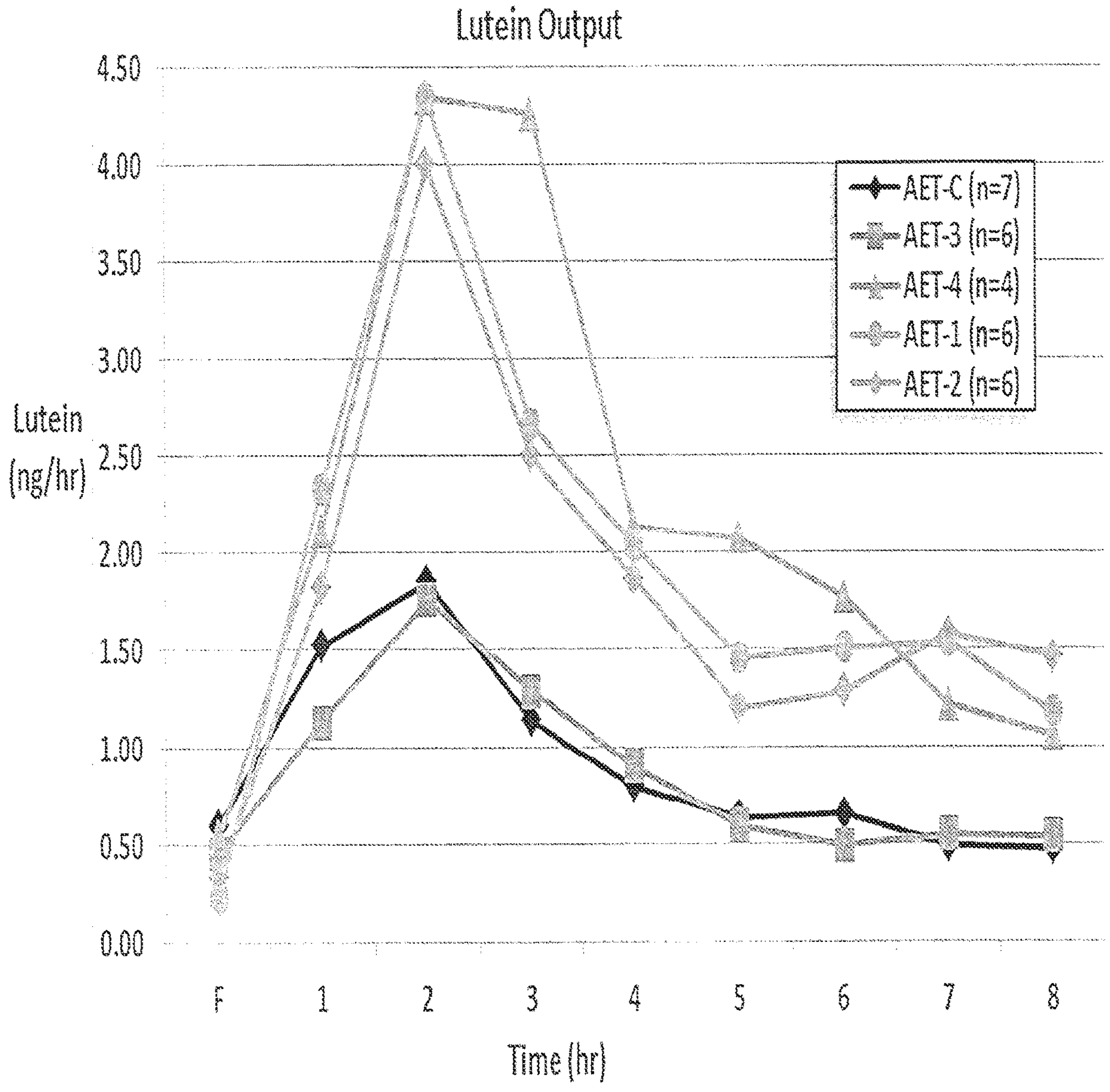
FIG. 6 shows the hourly lutein output in lymph over an 8 hour period after administration of variable nutritional compositions containing lutein.
Figure 7:
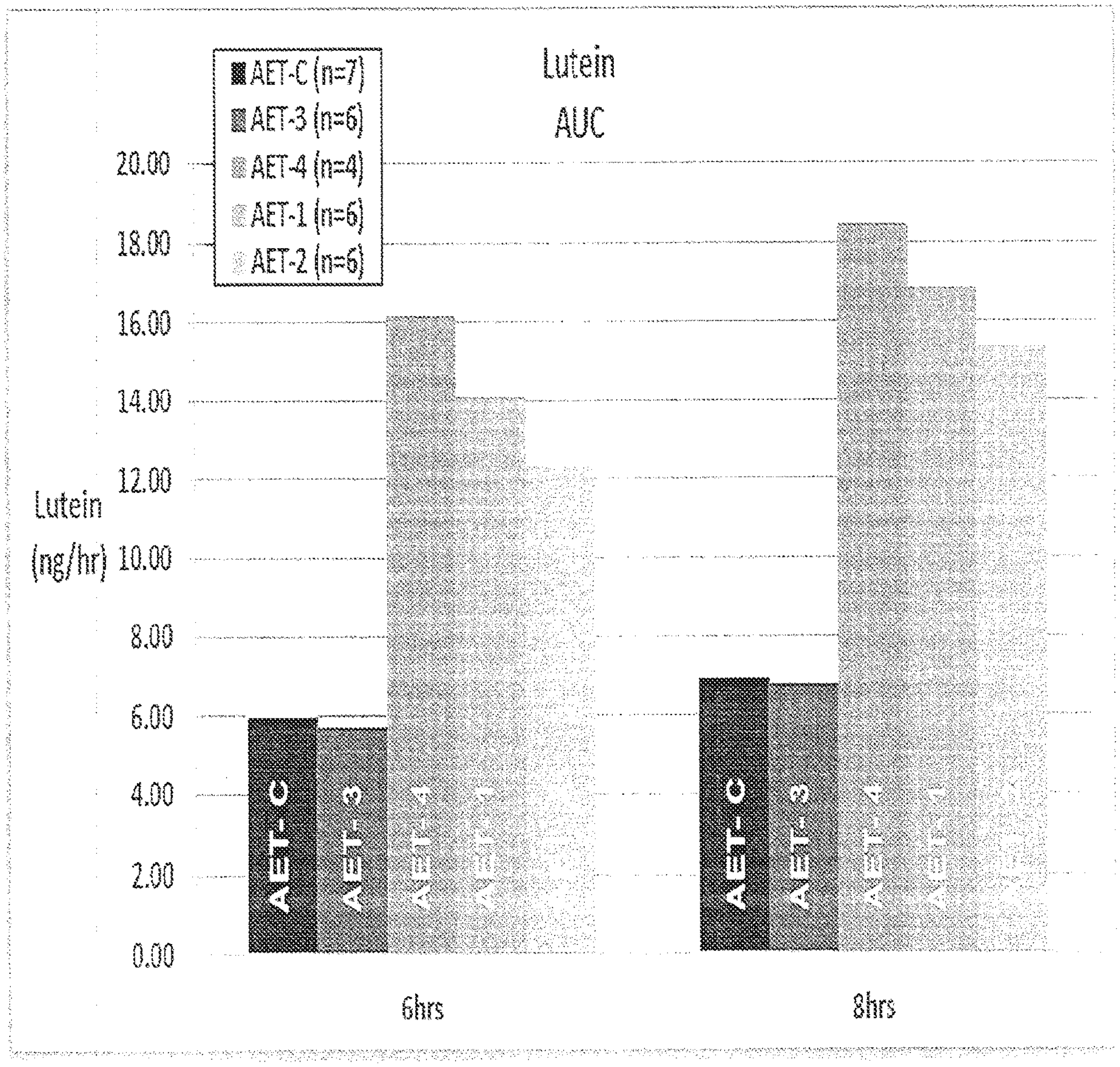
FIG. 7 shows cumulative lymphatic lutein absorption over a 6 hour and 8 hour period after administration of variable nutritional compositions containing lutein.
Figure 8:
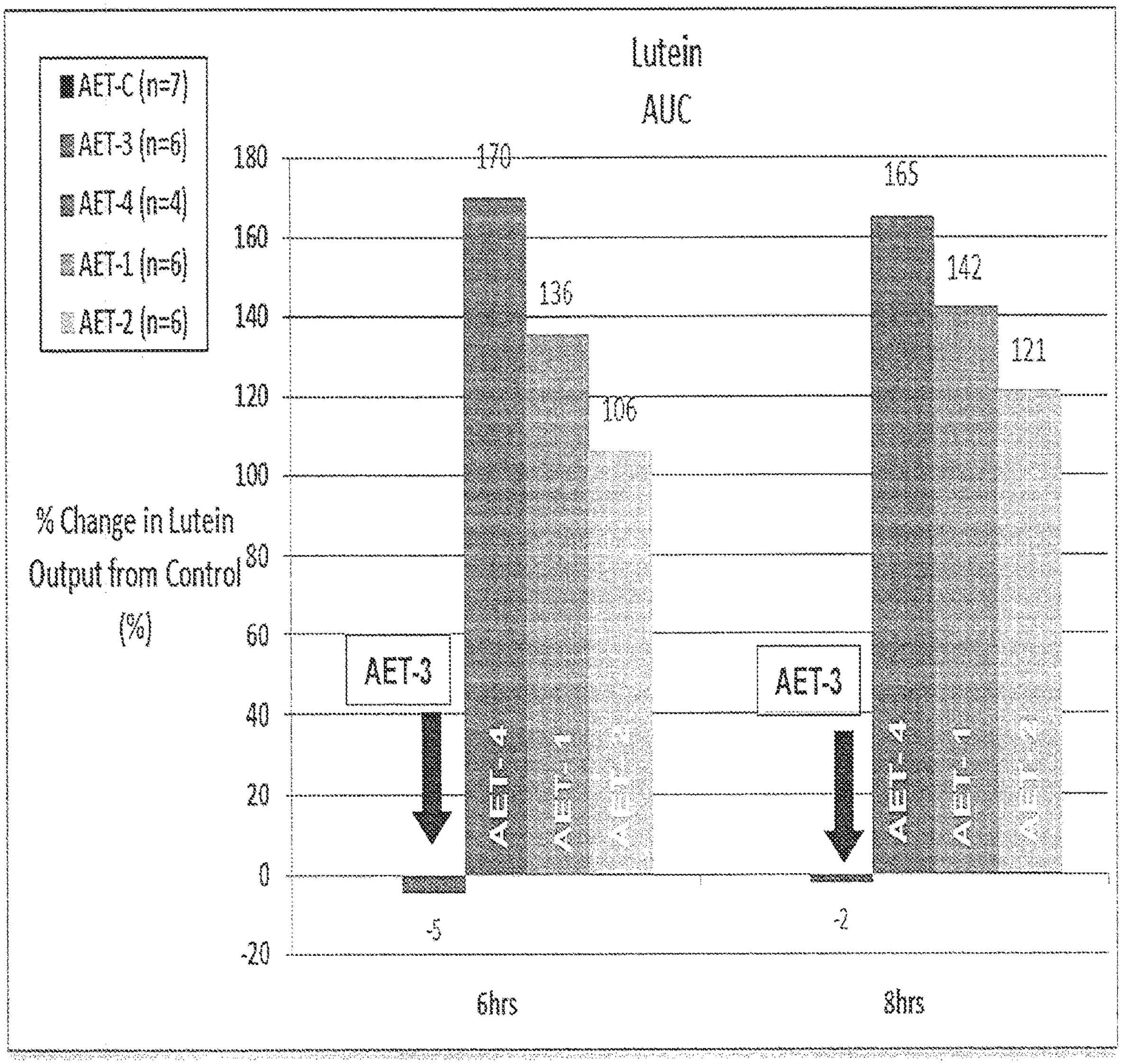
FIG. 8 shows the percent change in lymphatic lutein absorption over a period of 6 hours and 8 hours following administration of variable nutritional compositions containing lutein versus control.

FIG. 5 shows the hourly lymph flow rate over a period of 8 hours following administration of liquid infant compositions containing lutein. FIG. 6 shows the hourly lutein output in lymph over an 8 hour period after administration of liquid infant compositions containing lutein. FIG. 7 shows cumulative lymphatic lutein absorption over a 6 hour and 8 hour period after administration of liquid infant compositions containing lutein. FIG. 8 shows the percent change in lymphatic lutein absorption over a period of 6 hours and 8 hours following administration of liquid infant compositions containing lutein versus control.

As shown in FIG. 5, the mean fasting lymph flow for all three groups of rats varied between 2.4 and 2.7 mL/h. In all groups, lymph flow increased significantly after nutritional composition infusion and reached a maximum output between 2.8 and 3.1 mL/h during hours 2-3 after nutritional composition infusion. There were no differences in lymph flow rates between the groups indicating that the use of a nutritional composition including either an activated premix with lutein or an MDG-protected premix with lutein, did not significantly affect lymph flow rates versus the control nutritional composition including lutein in triglyceride. FIG. 6 shows the lymphatic lutein output in g/h during the first 8 hours after gastric feeding of the 5 different nutritional composition samples. The lymphatic output of lutein increased in all groups during the first 3 hours and reached a steady state from hour 2 to hour 3 after nutritional formula administration. However, there was a significant increase in the amounts of lymphatic lutein output 2-8 hours after lutein administration when lutein was given in the form of an activated premix (AET-2, AET-4) or with lutein given in the form of an MDG-protected premix (AET-1), as compared with lutein mixed directly with the triglycerides control or non-activated premix containing lutein, monoglycerides and diglycerides (AET-C and AET-3, respectively). FIG. 7 shows the lutein absorption improvements with an activated premix with lutein or an MDG-protected premix with lutein by demonstrating significantly higher cumulative lutein absorption over the 6 and 8 hour absorption period (area under the curve (AUC)) versus the lutein in the control and non-activated samples. When this data is expressed as a percent change in lymphatic lutein absorption, as shown in FIG. 8, there was a 106%-170% increase in lymphatic lutein absorption of compositions comprising activated premix with lutein or an MDG-protected premix with lutein versus the control and non-activated sample over the 6 hour infusion period. There was a 121%-165% increase in lymphatic lutein absorption of the compositions comprising an activated premix with lutein or an MDG-protected premix with lutein versus the control and non-activated sample over the 8 hour infusion period. These data indicate that the lipophilic compound lutein has improved bioavailability when in an activated premix or an MDG-protected premix as compared to when it is in triglyceride oils.

Example 21

In this Example, the test samples evaluated in Example 20 are further evaluated for lutein that is not solubilized by the fat in the sample nutritional compositions. The five samples, AET-C, AET-1, AET-2, AET-3 and AET-4 were each subjected to high speed centrifugation (31,000×g; 20° C.; 4 h). The visible absorbance of the resulting aqueous fractions (after 2:8 dilution with water, followed by syringe filtration through a 0.45 μm PTFE membrane) was measured at 476 nm (a lutein absorbance maximum). The absorbance readings (expressed as milliabsorbance units per gram of aqueous fraction (mAU/g)) are reported in the table below, along with a ranking of the in vivo lutein response for the same variations tested in Example 20.

TABLE 8

Relationship between Lutein in the Aqueous Fraction with in vivo Response

| Sample ID | Visible light absorbance, mAU/g, 476 nm | In vivo ranking of lutein response |
|---|---|---|
| AET-C | 57.6 | 1 (lowest response) |
| AET-1 | 62.7 | 4 |
| AET-2 | 61.3 | 3 |
| AET-3 | 59.4 | 2 |
| AET-4 | 64.9 | 5 (highest response) |

As may be seen from the table, the absorbance values are correlated with the in vivo findings in that each of the sample nutritional compositions comprising an activated premix (AET-2 and AET-4) or an MDG-protected premix (AET-1) have higher lutein absorbance values than those sample nutritional compositions that do not comprise an activated premix (AET-C and AET-3). This means that more lutein is present in the aqueous fraction of the sample nutritional compositions comprising an activated premix or an MDG-protected premix. Thus, at least in relation to the sample nutritional compositions, the bioavailability of lutein was accurately predicted in vitro utilizing this method.

In this Example, the effect of the addition of an activated premix or an MDG-protected premix to a nutritional composition on the bioavailability of other lipophilic compounds such as total triglycerides, phospholipids, arachidonic acid (ARA) and docosahexaenoic acid (DHA) is evaluated and compared to the bioavailability of the lipophilic compounds that are consumed in the absence of the activated premix or the MDG-protected premix.

A similar protocol for animal infusions and lymph collection as described in Example 20 was followed, including the use of the same test samples. The lymph lipids were extracted and analyzed for triglycerides, phospholipids, ARA and DHA concentration using high-performance liquid chromatography.

Figure 9:
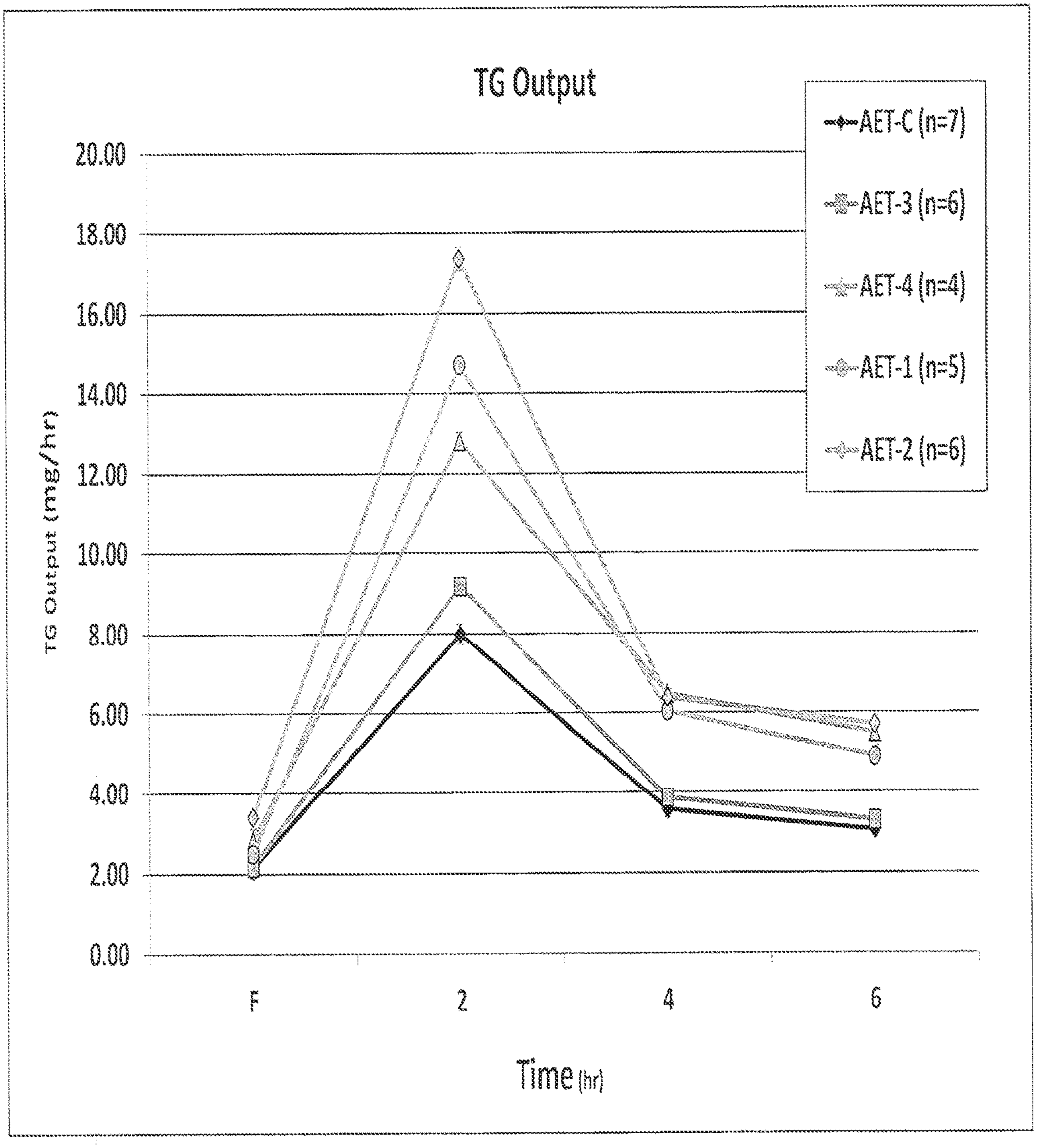
FIG. 9 shows the hourly lymphatic triglyceride output over a period of 6 hours following nutritional composition administration.
Figure 10:
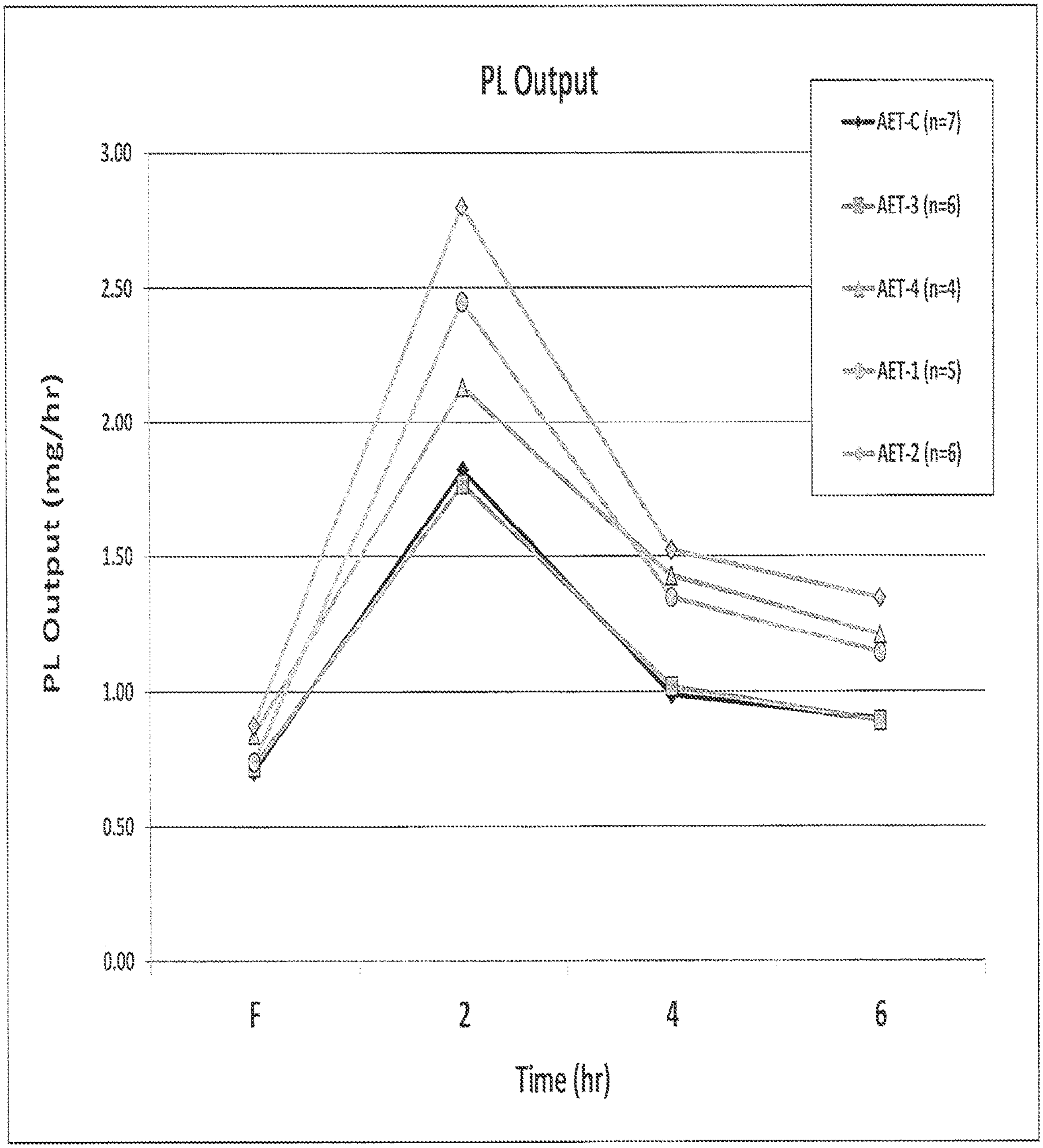
FIG. 10 shows the hourly lymphatic phospholipid output over 6 hours following nutritional composition administration.

FIG. 9 shows the hourly lymphatic triglyceride output over a period of 6 hours following nutritional composition administration. FIG. 10 shows the hourly lymphatic phospholipid output over 6 hours following nutritional composition administration.

Figure 11:
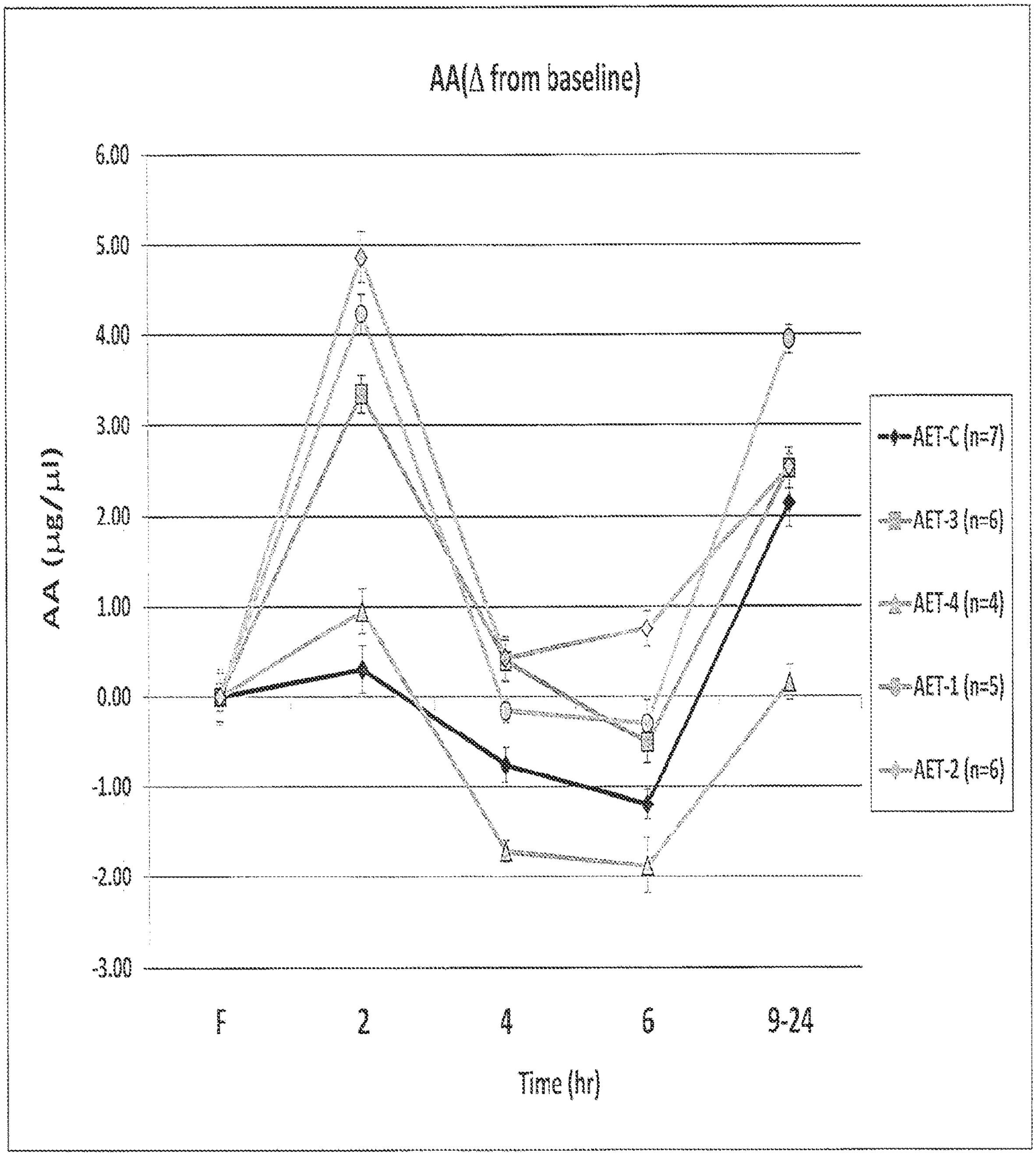
FIG. 11 shows the change in lymphatic absorption of ARA from fasting, over a period of 6 hours following nutritional composition administration
Figure 12:
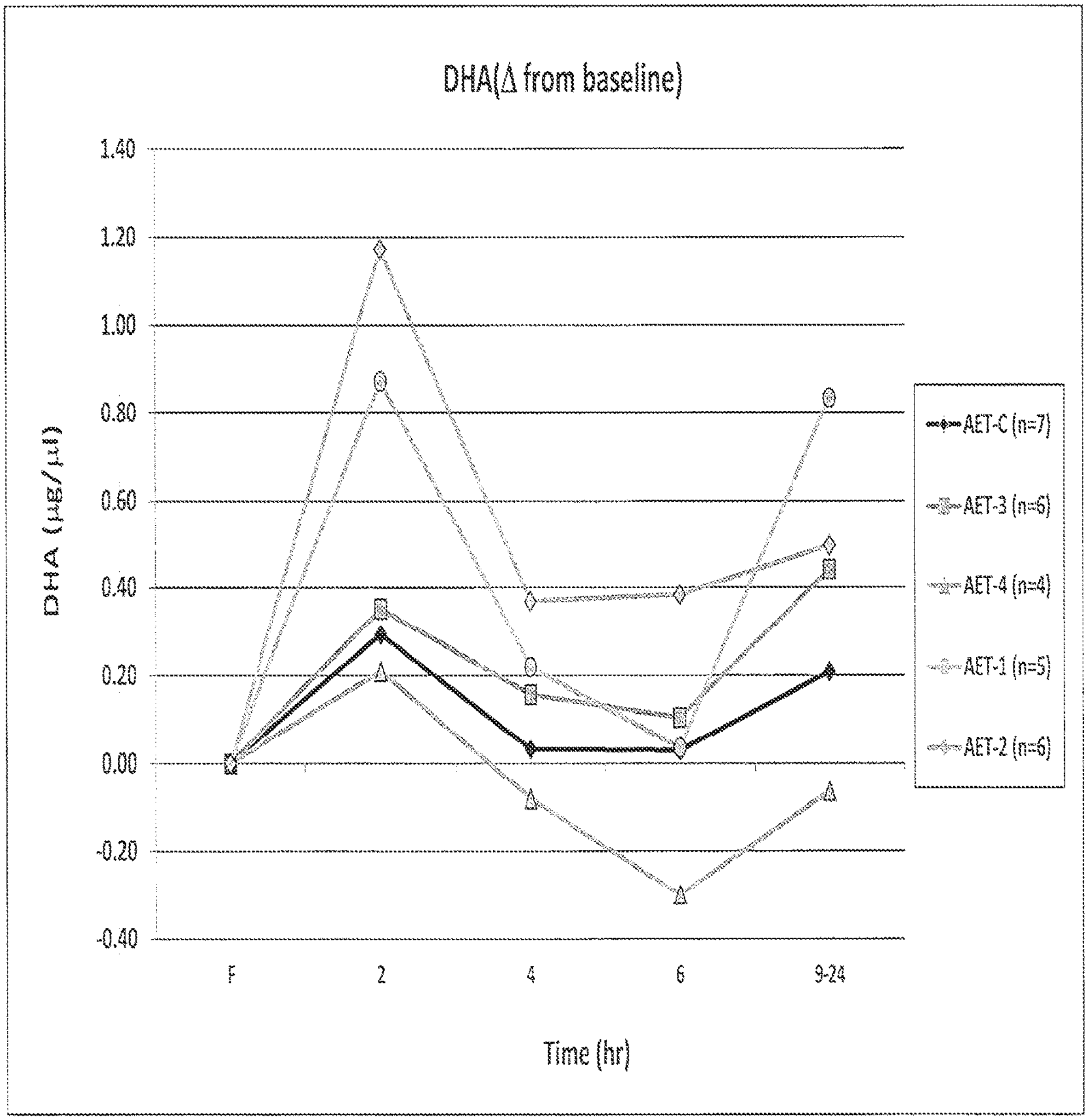
FIG. 12 shows the change in lymphatic absorption of DHA from fasting, over a period of 6 hours following nutritional composition administration
Figure 13:
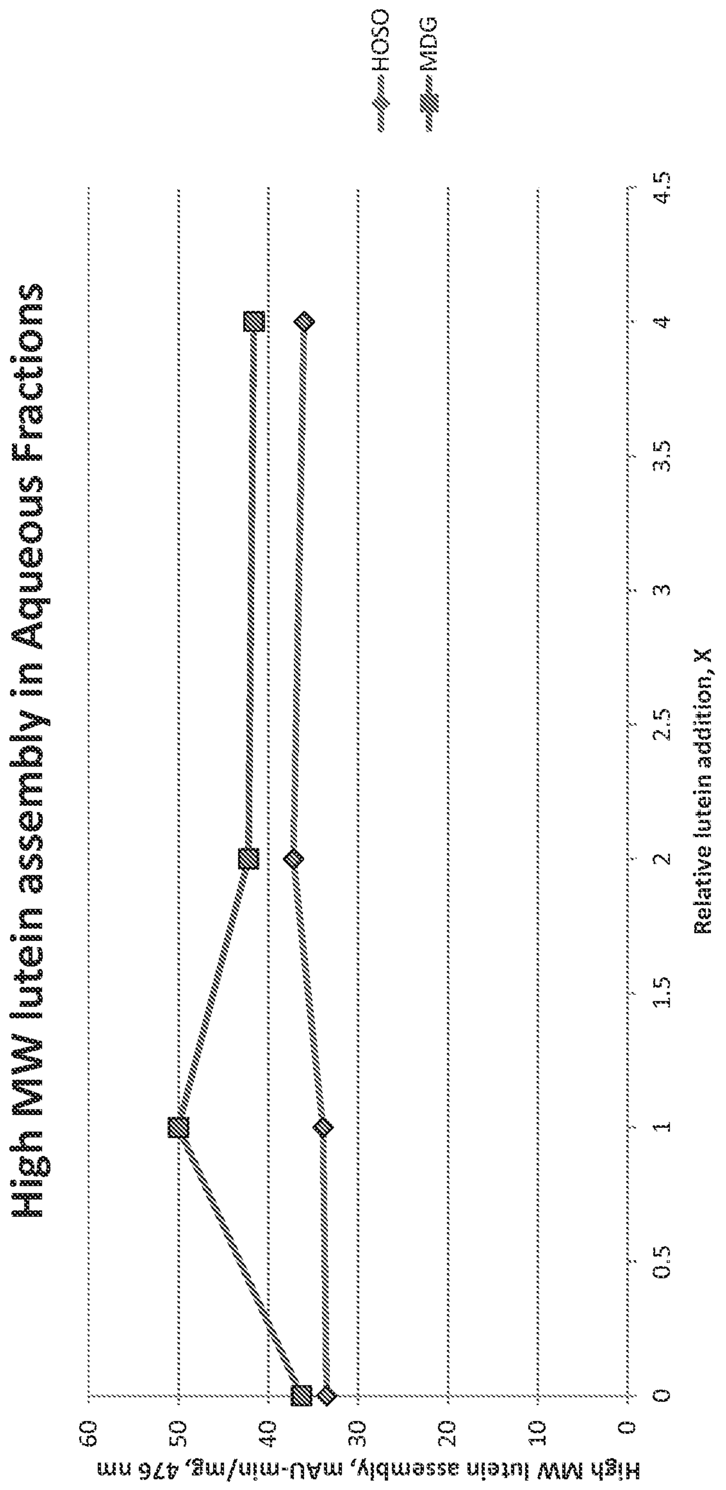
FIG. 13 shows presence of the high molecular weight lutein assembly within the aqueous phase following centrifugations of variable nutritional compositions, as a function of lutein concentration.
Figure 14:
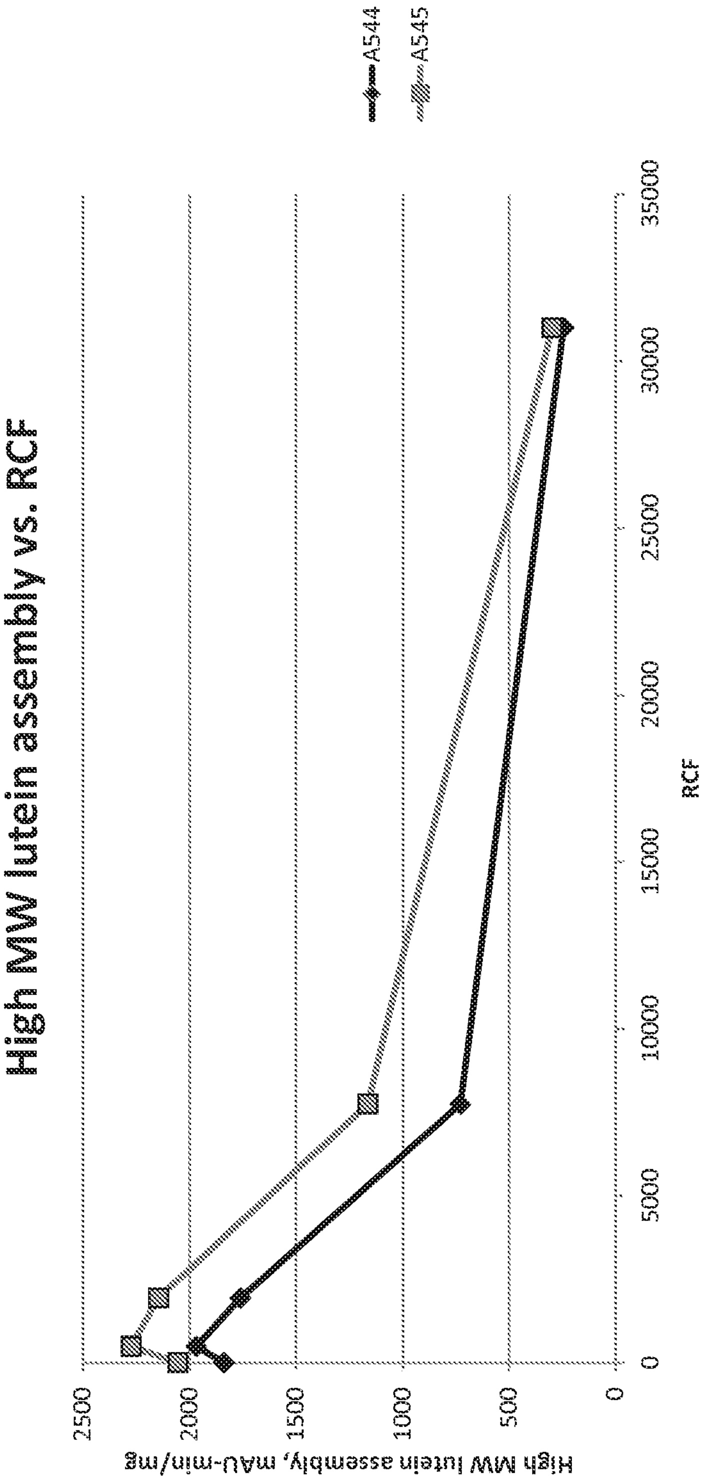
FIGS. 14-16 show the effect of different centrifugal forces on the presence of the FIG. 14: high molecular weight lutein assembly.
Figure 15:
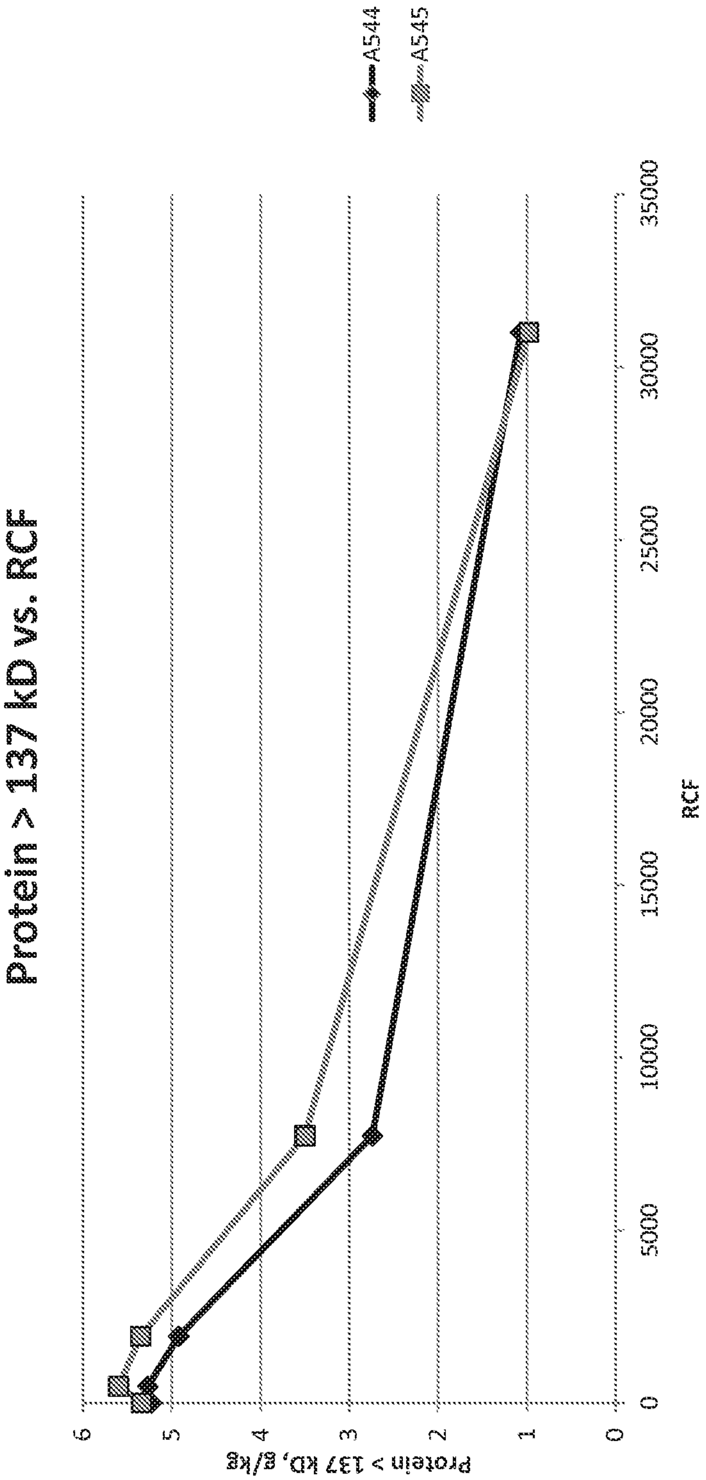
Figure 16:
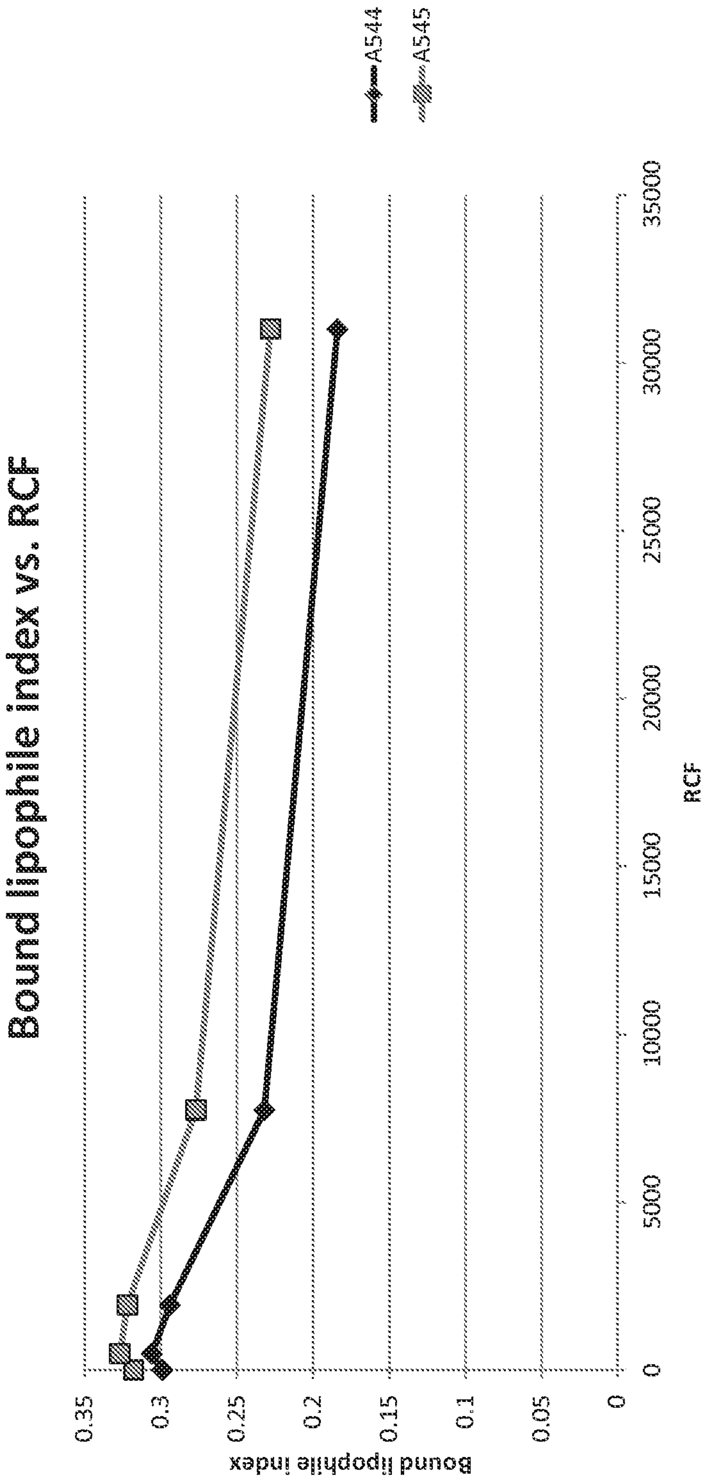
Figure 17:
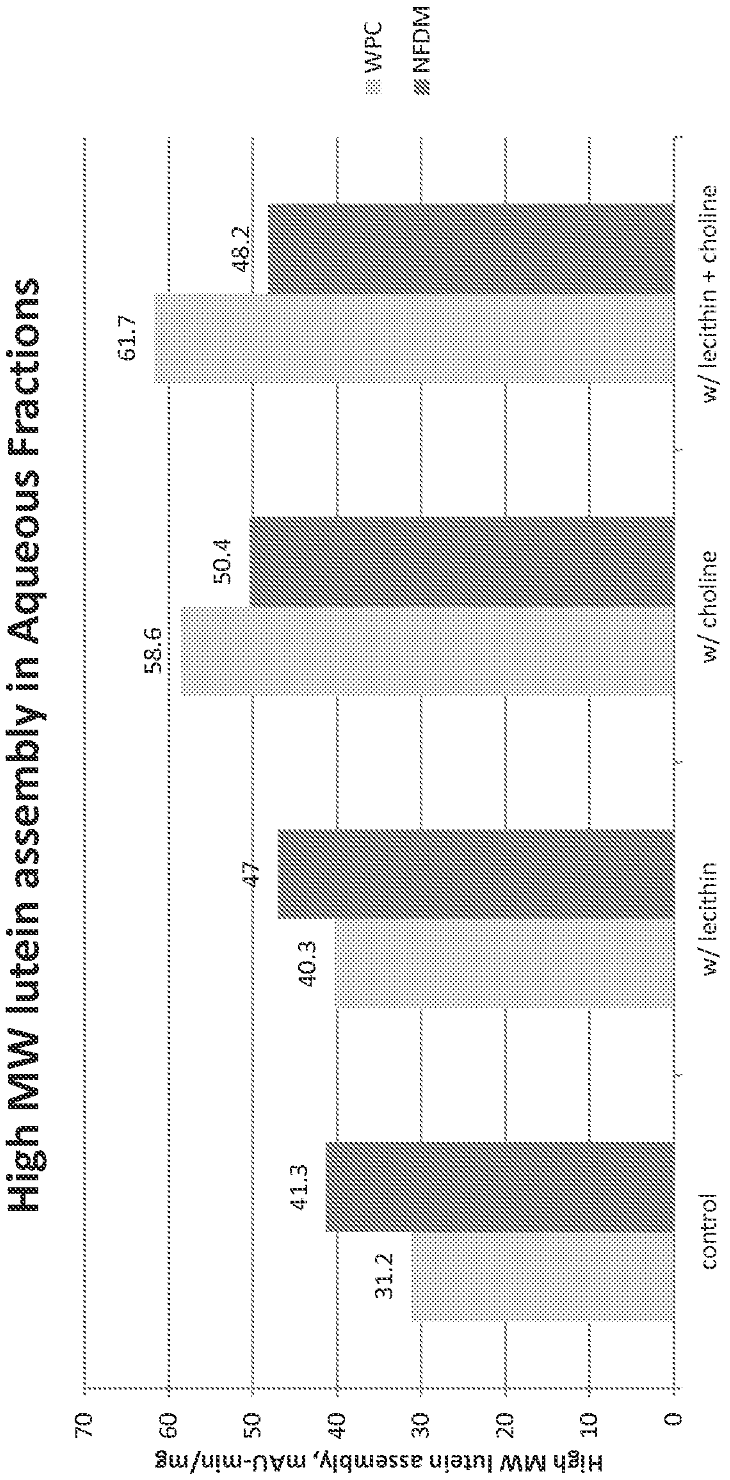
FIG. 17 shows the effects that choline and lecithin addition to the nutritional composition have on the formation of the high molecular weight lutein assembly.

FIG. 11 and FIG. 12 show the change in lymphatic absorption of ARA and DHA from fasting, respectively, over a period of 6 hours following nutritional composition administration.

As shown in FIG. 9, the lymphatic output of triglycerides increased in all groups during the 6 hours post administration of nutritional composition samples. However, there was a significant increase in the amounts of lymphatic triglyceride output 2-6 hours after sample administration with an activated premix (AET-2, AET-4) or an MDG-protected premix (AET-1) as compared with the samples having the monoglycerides and diglycerides mixed directly with the triglycerides in a non-activated premix or a non-MDG-protected premix (AET-C and AET-3). Similarly, FIG. 10 shows that the lymphatic output of phospholipids increased in all groups during the 6 hours post sample administration. There was a significant increase in the amount of lymphatic phospholipid output 2-6 hours after sample administration with a given in an activated premix (AET-2, AET-4) or an MDG-protected premix (AET-1) as compared with the samples having the monoglycerides and diglycerides mixed directly with the triglycerides in a non-activated premix or a non-MDG-protected premix (AET-C and AET-3).

As shown in FIG. 11, there was a significant increase in lymph levels of ARA from fasting during the 6 hours post administration of the nutritional compositions containing an activated premix (AET-2) or an MDG-protected premix (AET-1) as compared with the non-activated or non-MDG-protected control. FIG. 12 shows similar results by demonstrating a significant increase in lymph levels of DHA from fasting during the 6 hours post administration of the nutritional formulas containing an activated premix (AET-2) or an MDG-protected premix as compared with the non-activated or non-MDG-protected control.

Example 22

A study was conducted to compare a commercially representative nutritional powder (details of powder components are listed below) with and without MDG. The nutritional powder batches (control and MDG) were reconstituted (152 g/L), centrifuged (31,000×g/20° C./4 h), and analyzed as outlined below. The metric used to analyze the bound lutein is the early eluting peak of the SEC chromatogram, which corresponds to the high molecular weight peak. The numerical value of this peak is the area of the peak at 476 nm per microliter of sample injected. Additionally, the cream layer, which is the upper layer obtained upon the high speed centrifugation, is used to examine the mechanism of action for enhanced lutein solubility, as well as to determine which proteins are responsible for the bound lutein assemblies.

The markers of bound lutein (high MW size exclusion chromatography (SEC) peak area at 476 nm) were significantly higher for MDG batches versus control. The cream layer protein comparison and the attached chromatograms were consistent with MDG-facilitated formation of high MW, but water dispersible (aqueous fraction), and even water soluble (100 k ultrafiltrate), assemblies of native proteins (casein, α-lactalbumin, β-lactoglobulin) and lutein.

TABLE 9

Nutritional Composition Ingredients for Example 22 and other Exemplified Compositions.

| INGREDIENTS (MDG Incorporated Formula) | AMOUNT PER 1000 KG | | | | INGREDIENTS (Control Formula) | AMOUNT PER 1000 KG | | | |
|---|---|---|---|---|---|---|---|---|---|
| Non Fat Dry Milk | 442 | kg | | | Non Fat Dry Milk | 442 | kg | | |
| Lactose | 167.8 | kg | | | Lactose | 167.8 | kg | | |
| Sucrose | 111.9 | kg | | | Sucrose | 111.9 | kg | | |
| High oleic safflower oil | 86.6 | kg | | | High oleic safflower oil | 89.9 | kg | | |
| Soy oil | 67.4 | kg | | | Soy oil | 67.4 | kg | | |
| Coconut Oil | 64.4 | kg | | | Coconut Oil | 64.4 | kg | | |
| Galactooligosaccharides (GOS) | 36.2 | kg | | | Galactooligosaccharides (GOS) | 36.2 | kg | | |
| Whey protein concentrate (75%) | 35.7 | kg | | | Whey protein concentrate (75%) | 35.7 | kg | | |
| Potassium Citrate | 6.8 | kg | | | Potassium Citrate | 6.8 | kg | | |
| Capmul GM040 (MDG Oil) | 3.29 | kg | | | Calcium Carbonate | 2.7 | kg | | |
| Calcium Carbonate | 2.7 | kg | | | Sodium Chloride | 1.7 | kg | | |
| Sodium Chloride | 1.7 | kg | | | Nucleotide/Choline Premix | 1.6 | kg | | |
| Nucleotide/Choline Premix | 1.6 | kg | | | Choline bitartrate | | | 805.5 | g |
| Choline bitartrate | | | 805.5 | g | Cytidine 5'-monophosphate | | | 166.3 | g |
| Cytidine 5'-monophosphate | | | 166.3 | g | Disodium guanosine 5'-monophosphate | | | 121 | g |
| Disodium guanosine 5'-monophosphate | | | 121 | g | Disodium uridine 5'-monophosphate | | | 105.4 | g |
| Disodium uridine 5'-monophosphate | | | 105.4 | g | Adenosine 5'-monophosphate | | | 63.2 | g |
| Adenosine 5'-monophosphate | | | 63.2 | g | Maltodextrin (premix diluent) | | | q.s. | |
| Maltodextrin (premix diluent) | | | q.s. | | Lecithin, PCR negative, IP | 1.4 | kg | | |
| Lecithin, PCR negative, IP | 1.4 | kg | | | Ascorbic Acid | 1.4 | kg | | |
| Ascorbic Acid | 1.4 | kg | | | Tricalcium phosphate | 1.16 | kg | | |
| Tricalcium phosphate | 1.16 | kg | | | Water Soluble Vitamin and Mineral Premix | 869.7 | g | | |
| Water Soluble Vitamin and Mineral Premix | 869.7 | g | | | Taurine | | | 265.8 | g |
| Taurine | | | 265.8 | g | m-Inositol | | | 193.0 | g |
| m-Inositol | | | 193.0 | g | Zinc Sulfate, Monohydrate | | | 89.0 | g |
| Zinc Sulfate, Monohydrate | | | 89.0 | g | Niacinamide | | | 56.7 | g |
| Niacinamide | | | 56.7 | g | d-Calcium Pantothenate | | | 34.0 | g |
| d-Calcium Pantothenate | | | 34.0 | g | Ferrous Sulfate, Dried (Monohydrate) | | | 29.8 | g |
| Ferrous Sulfate, Dried (Monohydrate) | | | 29.8 | g | Copper Sulfate, Anhydrous | | | 10.4 | g |
| Copper Sulfate, Anhydrous | | | 10.4 | g | Thiamine Chloride Hydrochloride | | | 8.80 | g |
| Thiamine Chloride Hydrochloride | | | 8.80 | g | Riboflavin | | | 3.88 | g |
| Riboflavin | | | 3.88 | g | Pyridoxine Hydrochloride | | | 3.56 | g |
| Pyridoxine Hydrochloride | | | 3.56 | g | Folic Acid | | | 1.31 | g |
| Folic Acid | | | 1.31 | g | Manganese Sulfate, Monohydrate | | | 1.01 | g |
| Manganese Sulfate, Monohydrate | | | 1.01 | g | Biotin | | | 0.343 | g |
| Biotin | | | 0.343 | g | Sodium Selenate, Anhydrous | | | 0.206 | g |
| Sodium Selenate, Anhydrous | | | 0.206 | g | Cyanocobalamin | | | 0.027 | g |
| Cyanocobalamin | | | 0.027 | g | Corn Starch (modified) (0.1% B12 spray dry) | | | 27.4 | g |
| Corn Starch (modified) (0.1% B12 spray dry) | | | 27.4 | g | Dextrose | | | q.s. | |
| Dextrose | | | q.s. | | Docosahexaenoic acid (DHA) | 759.2 | g | | |
| Docosahexaenoic acid (DHA) | 759.2 | g | | | Vitamin A, D3, E, K1 premix | 386.9 | g | | |
| Vitamin A, D3, E, K1 premix | 386.9 | g | | | d-α-tocopheryl acetate | | | 78.2 | g |
| d-α-tocopheryl acetate | | | 78.2 | g | Vitamin A palmitate | | | 14.6 | g |
| Vitamin A palmitate | | | 14.6 | g | Phylloquinone | | | 851.2 | mg |
| Phylloquinone | | | 851.2 | mg | Vitamin D3 | | | 103.0 | mg |
| Vitamin D3 | | | 103.0 | mg | Vegetable oil (premix diluent) | | | q.s. | |
| Vegetable oil (premix diluent) | | | q.s. | | Choline Chloride | 284 | g | | |
| Choline Chloride | 284 | g | | | Magnesium Chloride | 261.1 | g | | |
| Magnesium Chloride | 261.1 | g | | | Ferrous Sulfate | 222.0 | g | | |
| Ferrous Sulfate | 222.0 | g | | | Arachidonic acid | 205.2 | g | | |
| Arachidonic acid | 205.2 | g | | | Ascorbyl Palmitate | 164.4 | g | | |
| Ascorbyl Palmitate | 164.4 | g | | | Tocopherol-2 food grade antioxidant | 87.8 | g | | |
| Tocopherol-2 food grade antioxidant | 87.8 | g | | | Mixed tocopherols | | | 63.7 | g |
| Mixed tocopherols | | | 63.7 | g | Vegetable oil (diluent) | | | q.s. | |
| Vegetable oil (diluent) | | | q.s. | | Lutein 20% | 12.5 | g | | |
| Lutein 20% | 12.5 | g | | | Lutein | | | 2.5 | g |
| Lutein | | | 2.5 | g | Beta-Carotene (30%) | 3.22 | g | | |
| Beta-Carotene (30%) | 3.22 | g | | | β-carotene | | | 966 | mg |
| β-carotene | | | 966 | mg | Potassium Hyrdoxide | as needed | | | |
| Potassium Hyrdoxide | as needed | | | | | | | | |

Example 23

A study was conducted to compare the bound lutein size estimates within the aqueous fraction. Bound lutein size estimates were investigated via SAXS, SEC, and MALDI-TOF.

In summary, the bound lutein may be placed into two or three categories: (a) large (~100-1000 Å, or >250 kD) water soluble/dispersible aggregates that are not discrete structures and span a broad size range as determined by SAXS and SEC analysis; (b) native protein/lutein complexes (~10-50 kD, ~27 TO 57 Å) that are generally discrete, well-defined structures, which is supported by MALDI-TOF and SEC data; and (c) a relatively small (~8 Å, or ~3-4 kD) crystal. The small structure may or may not comprise lutein.

Example 24

A study was conducted to examine the grand average of hydropathicity index (GRAVY) of milk proteins. The GRAVY value is a measure of hydrophobicity and water solubility, and may be predictive of a protein's ability to bind a lipophilic molecule such as lutein.

The lutein binding capacities of eight major milk proteins were predicted from their GRAVY values using the plot listed below. The GRAVY values of said milk proteins are listed in the table below, as well as their predicated lutein binding capacity. It was found that the milk proteins $\gamma_2$-casein, β-lactoglobulin, β-casein and α-lactalbumin had the highest predicted lutein binding capacity of <2 μM, which correlates with MALDI-TOF data implicating these proteins as binding participants in the lutein/protein complexes. Accordingly, the GRAVY values were able to correlate accurate lutein binding trends of proteins that have been shown to efficiently interact with lutein within the nutritional product. This results in GRAVY values potentially providing insight into other potential proteins, and may be useful in optimizing the nutritional product system.

TABLE 10

GRAVY Value Analysis of Different Proteins

| Protein | MW, kD | GRAVY | Lutein $K_d$, μM | $K_d$ Source |
|---|---|---|---|---|
| StARD3 | 50.5 | 0.001 | 0.45 | Published |
| GSTP1 | 23.2 | −0.131 | 1.35 | Published |
| HSA | 66.5 | −0.395 | 1.69 | Published |
| Milk proteins | | | | |
| $\gamma_2$-casein | 11.8 | −0.136 | 1.05 | Predicted |
| β-lactoglobulin | 18.3 | −0.162 | 1.13 | Predicted |
| β-casein | 23.6 | −0.355 | 1.68 | Predicted |
| α-lactalbumin | 14.2 | −0.453 | 1.96 | Predicted |
| BSA | 66.4 | −0.475 | 2.02 | Predicted |
| κ-casein | 19.0 | −0.557 | 2.26 | Predicted |
| α-$s_1$-casein | 23.0 | −0.704 | 2.68 | Predicted |
| α-s2-casein | 24.3 | −0.918 | 3.29 | Predicted |

Example 25

A study was conducted to investigate the size/mass of the high molecular weight lutein assemblies. A SEC calibration curve was determined to analyze the aforementioned high molecular weight assemblies. These values were also compared to the data presented in Example 3, regarding size of the high molecular weight lutein assembly.

The reference proteins, their SEC elution times and molecular weight are listed in the table below, and were used to estimate the size of the high molecular weight lutein assembly. The SEC analysis was performed as recited in the preceding Examples. By extrapolation from a reference protein plot, the size of the high molecular weight lutein assembly was found to be in the ranges of 60-380 kD, with a peak at 160 kD. These values correspond to particle size diameters of 60-96 Å, with a peak at 78 Å. The estimated values presented below, appear to be consistent with SAXS data presented in Example 23, wherein it corresponds with the intermediated size category of 10-100 Å. It should be noted that particles in the large category, presented in Example 23, would be excluded from the ultrafiltrate, and there may be larger lutein assemblies in the aqueous fraction prior to ultrafiltration. Additionally, it is noted that the 214 nm/280 nm ratio of the high molecular weight lutein assembly was in the range of the reference proteins, suggesting a protein presence in the high molecular weight assembly.

TABLE 11

Calibration of Assembly Size with Known Protein Molecular Weights

| Reference Protein (Sigma, bovine) | MW, kD | SEC Elution Time, minutes | 214 nm/280 nm peak area ratio |
|---|---|---|---|
| α-Lactalbumin | 14.2 | 23.67 | 8.12 |
| β-Lactoglobulin | 18.3 | 22.41 | 13.6 |
| β-Casein | 23.6 | 21.17 | 19.1 |
| BSA | 66.4 | 19.01 | 17.3 |
| Lactoferrin | 76.1 | 19.08 | 10.6 |
| IgG | ~160 | 19.05 | 10.7 |
| High MW lutein assembly | | | |
| Range | 60 to 380 kD (~60 to 95Å) | 15.7-20.0 | 10.6 |
| Peak | 160 kD (~78Å) | 17.66 | N/A |

Example 26

A study was conducted to examine the high molecular weight lutein assemblies in commercially available nutritional powder batches, both before and after centrifugation. The nutritional powder batches (control and MDG incorporated) were reconstituted (152 g/L), and were analyzed before and after centrifuged (31,000×g/20° C./4 h). The components of these powders are listed in the table of Example 22. The table below displays the high molecular weight lutein assembly analysis via SEC, and is represented as mAU-min/mg injected. The MDG composition shows higher initial lutein presence in both the whole product and the aqueous fraction, wherein it shows even a higher difference in the aqueous fraction relative to the control composition.

It was found that the high molecular weight lutein assembly present within the aqueous fraction was 22% higher than in the control batch. This indicates significantly enhanced solubility and/or stability in the MDG composition. Additionally, the chromatograms illustrate that some fraction (12.3% to 14.5%) of the high molecular weight lutein assembly is recovered in the supernatant after high speed centrifugation, which conveys that these assemblies are sufficiently soluble and stable that they were not removed or disassembled by the stresses associated with high speed centrifugation.

TABLE 12

| Analysis of Commercially Representative Nutritional Composition comprising MDG | | |
|---|---|---|
| | Batch A544 (control) | Batch A545 (MDG Incorporated) |
| Whole product (w/o centrifugation) | 1977 | 2070 |
| Aqueous Fraction (after centrifugation) | 244 | 299 |
| % Recovery | 12.3% | 14.5% |

Example 27

A study was conducted to evaluate high molecular lutein assemblies facilitated by the presence of MDG vs. high oleic safflower oil (HOSO). Bench scale model systems were prepared in nonfat dry milk (NFDM), wherein the NFDM was used at 10% (w/w), a lipid (HOSO or MDG), and lutein. Lutein was used at variable amounts, and these compositions were then assessed for the formation of high molecular weight assemblies. The different compositions were centrifuged (31,000×g/20° C./1 h) to obtain aqueous fractions, which were compared by a pH 2.5 SEC as detailed above, and lutein assemblies were analyzed by measuring a visible light absorbance at 476 nm, and by measuring visible light transmittance at 860 nm. Additionally, there was a group of MDG-batches that were not centrifuged, so the whole product was analyzed for the presence of lutein assemblies.

The results demonstrate that HOSO has little capacity for facilitating the high molecular weight lutein assemblies at any of the different lutein concentrations. In contrast, the MDG compositions exhibited significant formation of high molecular weight lutein assemblies, which may be seen with the higher absorbance at 476 nm. Furthermore, this experiment revealed that lutein concentration greater than 1×, showed a decrease in lutein-assembly formation. This data suggests that there is an optimal ratio of lutein to MDG for the formation of high molecular weight lutein assemblies. Additionally, the non-centrifuged samples reveal that approximately 36% of the total assembly is recovered following high-speed centrifugation.

Example 28

A study was conducted to analyze protein involvement with the high molecular weight lutein assembly. These studies were performed on batches that comprised MDG or HOSO. The different batch variations were examined using the same techniques as listed above. Specifically, bench scale model systems were prepared in nonfat dry milk, wherein the NFDM was used at 10% (w/w), a lipid (HOSO or MDG), and lutein. Lutein was used at variable amounts, and these compositions were then assessed for the formation of high molecular weight assemblies. The different compositions were centrifuged (31,000×g/20° C./1 h) to obtain aqueous fractions, which were compared by a pH 2.5 SEC as detailed above. Protein was analyzed to examine the different molecular weight fractions and their association with lutein.

The results demonstrated that MDG enhances the solubility and/or the stability of both molecular weight fractions, >57 kD and >137 kD. This was especially enhanced in the 137 kD fraction for the MGD batches. It should be noted that the density of the protein assembly may be a factor in its centrifugation recovery, as would be expected as the lipid content of the assembly significantly increases, the assembly may be more vulnerable to removal by high speed centrifugation. Additionally, as shown in the prior Example, lutein incorporation for compositions with greater than 1× lutein actually decreased assembly formation. This further suggests that an optimal ratio/range of MDG and lutein are needed.

TABLE 13

| Model System Investigation of Assembly Formation | | | | |
|---|---|---|---|---|
| Tube | Lipid | Lutein | Centrifugation | High MW lutein assembly |
| 1 | HOSO | 0× | Yes | 33.5 |
| 2 | HOSO | 1× | Yes | 33.9 |
| 3 | HOSO | 2× | Yes | 37.2 |
| 4 | HOSO | 4× | Yes | 36.0 |
| 5 | MDG | 0× | Yes | 36.3 |
| 6 | MDG | 1× | Yes | 50.0 |
| 7 | MDG | 2× | Yes | 42.2 |
| 8 | MDG | 4× | Yes | 41.6 |
| 5 | MDG | 0× | No | 101 |
| 6 | MDG | 1× | No | 139 |
| 7 | MDG | 2× | No | 129 |
| 8 | MDG | 4× | No | 139 |

Example 29

A study was conducted to investigate the formation of high molecular weight lutein assemblies at different concentrations of MDG, HOSO and lutein. Specifically, lutein assembly was assessed by measuring mAU-min/mg at 476 nm, and by determining the presence of the >137 kD protein fraction present in the aqueous fraction following centrifugation. These tests were performed as listed above, with the different compositions being centrifuged (31,000×g/20° C./1 h) to obtain aqueous fractions, which were analyzed by SEC as detailed above.

In summary, the MDG batches outperformed the HOSO batches at both the presence of lutein high molecular weight assemblies, as well as greater amounts of the >137 kD fraction being present within the aqueous fraction. Additionally, it should be noted that the size of the assembly varied, even though the MDG/lutein ratio was held constant. Since the lutein assemblies were increased using a combination of MDG and HOSO, their use within the composition may be advantageous.

TABLE 14

| Model System Investigation II of Assembly Formation | | | | | |
|---|---|---|---|---|---|
| Variable | HOSO, g/L | MDG, g/L | Lutein, μg/L | High MW lutein assembly, mAU-min/mg, 476 nm | Aqueous Fraction protein > 137 kD, g/kg |
| 1 | 0 | 6.67 | 10.4 | 59.7 | 0.517 |
| 2 | 0 | 4.44 | 6.94 | 58.0 | 0.498 |
| 3 | 0 | 2.22 | 3.47 | 40.8 | 0.447 |
| 4 | 6.67 | 0 | 10.4 | 38.1 | 0.412 |
| 5 | 4.44 | 0 | 6.94 | 37.4 | 0.408 |
| 6 | 2.22 | 0 | 3.47 | 35.2 | 0.380 |
| 7 | 3.33 | 3.33 | 10.4 | 55.8 | 0.490 |
| 8 | 1.11 | 1.11 | 3.47 | 45.7 | 0.439 |

Example 30

A study was performed to assess the amino acid profiles of the proteins that are involved in the high molecular weight lutein assembly from the samples in Example 29. In order to compare the SEC peak area, response to an independent measure of protein concentration, each of the samples were fractionated by SEC, and the individual fractions tested for amino acids. In each case, 10×4-min fractions were collected (manually), over the elution range of the hydrolysate (from about 20 min to about 60 min), so that the volume of each fraction was 1.6 mL (i.e., 0.4 mL/min×4 min). Each fraction was acid-digested (6 M HCl, 110° C., 22 h), and each digest was tested for eight amino acids (arginine [R], serine [S], ASX, [B]=aspartic acid [D]+asparagine [N], GLX [Z]=glutamic acid, [E]+glutamine [Q], threonine [T], and glycine [G]) by reversed phase HPLC (RPLC) of their 9-fluorenylmethoxycarbonyl (FMOC) derivatives, using a modification of methods known in the art. The derivatised standard and sample solutions were tested for the FMOC derivatives of the six amino acids by RPLC, using an Agilent model 1100 HPLC system (Agilent Technologies, Wilmington, DE, USA) with an Agilent model G1321A fluorescence detector (FLD, Agilent Technologies, Wilmington, DE, USA). The RPLC system was equipped with a 4.6×250 mm i.d., 5 μm, 120 Å, YMC-Pack ODS-AM reversed phase column (Waters, Milford, MA, USA), maintained at 20° C. by a model G1316A thermostated column compartment (Agilent Technologies, Wilmington, DE, USA). RPLC mobile phase A was 65% (v/v) 0.05 M citric acid, pH 3.0 with NaOH, and 35% (v/v) ACN; RPLC mobile phase B was 20% (v/v) 0.05 M citric acid, pH 3.0 with NaOH, and 80% (v/v) ACN. The flow rate was 0.5 mL/min, and the elution program was as follows: 0.0-2.0 min, 0% B; 2.0-25.0 min, 0% B to 50% B (linear); 25.1-48.0 min, 100% B; 48.1-63.0 min, 0% B. The FLD excitation wavelength was 262 nm, the emission wavelength was 310 nm, and the gain was set at 10. The injection volume was 4 μL. The concentrations of R, S, B (D+N), Z (E+Q), T, and G in the sample solutions (i.e., prepared from the SEC fractions) were calculated by linear regression from the respective, individually-constructed, standard curves.

The table listed below displays the different amino acid ratios for different proteins and the experimental groups. For example, NFDM, casein, whey, as well as the protein present in the aqueous fraction and native protein. Of note, native protein refers to monomeric unaggregated protein, which has a molecular weight of approximately in the range of 14-25 kD. Tube 1 refers to the sample with the highest amount of lutein assembly, while tube 6 refers to the sample having the lowest. They were chosen to optimally contrast the distribution of individual proteins within the assembly.

The data presented, suggest that a greater presence of casein is in the high molecular weight fraction than compared to native protein.

TABLE 15

Analysis of Proteins Associated with Assembly

| Amino acid ratio, w/w | GLX/ ASX | ASX/ Gly | ASX/Ser | ASX/Arg |
|---|---|---|---|---|
| NFDM | 2.76 | 3.59 | 1.39 | 2.10 |
| Casein | 3.20 | 3.90 | 1.23 | 1.90 |
| Whey | 1.58 | 5.96 | 2.09 | 4.42 |
| β-casein | 3.92 | 1.02 | 0.44 | 1.72 |
| Tube 1, high MW protein | 2.47 | 1.22 | 0.53 | 2.59 |
| Tube 1, native protein | 1.77 | 1.41 | 1.05 | 5.51 |
| Tube 6, high MW protein | 2.71 | 0.97 | 0.42 | 1.96 |
| Tube 6, native protein | 1.76 | 1.48 | 1.04 | 5.32 |

Example 31

A study was conducted to evaluate the presence of specific proteins that associate with the high molecular weight lutein complex. Commercially representative nutritional powder batches (control and MDG incorporated) were reconstituted (152 g/L), and were analyzed before and after centrifugation (31,000×g/20° C./2 h). The components of these powders are listed in the table of Example 22. Reversed phase HPLC was then used to compare the distribution of individual proteins.

Determination of the proteins associated with lutein complex was performed on an Agilent model 1100 HPLC system (Agilent Technologies, Wilmington, DE, USA) with a model G1315A diode array detection (DAD) system (Agilent Technologies). The system was equipped with a 250 mm×4.6 mm I.D., 5 μm, 120 Å, YMC-Pack ODS-AQ reversed-phase column (Waters, Milford, MA, USA). The column was maintained at 40° C. during analyses by a model G1316A thermostated column compartment (AgilentTechnologies). Direct determinations of intact proteins were performed on the same system equipped with a 250 mm×4.6 mm I.D., 5p m, 300 Å, Jupiter C18 reversed phase column (Phenomenex, Torrance, CA, USA), also with column temperature maintained at 40° C.

The reverse phase HPLC method used a binary gradient elution, with vacuum-degassed mobile phases A (water, Milli-Q Plus) and B (650 mL 0.02M KH2PO4, pH 2.9, +175 mL acetonitrile+175 mL isopropanol). The injection volume was 2 μL, and the elution program was 0% B at 0.3 mL/min from 0.0 to 20.0 min, 16% B at 0.5 mL/min from 20.2 to 40.0 min, 100% B at 0.5 mL/min from 40.1 to 45.0 min, 0% B at 0.5 mL/min from 45.1 to 59.0 min, and 0% B at 0.3 mL/min from 59.5 to 60.0 min. The intact protein method also used a binary gradient elution, with vacuum-degassed mobile phases A (800 mL Milli-Q Plus water+200 mL acetonitrile+0.500 mL trifluoroacetic acid) and B (250 mL Milli-Q Plus water+750 mL acetonitrile+0.500 mL trifluoroacetic acid). The elution program, with a constant flow rate of 0.6 mL/min, was 0% B from 0.0 to 5.0 min 0 to 100% B from 5.0 to 40.0 min, 100% B from 40.0 to 45.0 min, and 0% B from 45.0 to 60.0 min. The detection wavelengths were 214 nm and 280 nm, with reference at 590 nm. The injection volume was 10 μL, and the run time was 60 min per injection.

The results demonstrated that the whole product had a significant decreased presence of native α-casein in the MDG batches. This suggests that there may be enhanced calcium solubility within the MDG composition. Additionally, the aqueous fraction of MDG compositions had a significant increase in β-casein, which suggests that said protein may be involved in the high molecular weight lutein assembly. The presence of β-casein was further confirmed by the decrease in presence within the cream layer.

TABLE 16

Analysis of Proteins Associated with Assembly for Commercially Representative Nutritional Composition

| Sample Comparison | Observation | Interpretation |
|---|---|---|
| Whole Product | Significantly decreased presence of native alpha-casein in A545 | Apparent increase in soluble calcium in A545 (alpha-caseins are especially sensitive to soluble calcium) |
| Aqueous Fraction (centrifugation supernatant) | Significantly increased presence of native beta-casein in A545 | Apparent increased incorporation of beta-casein into water soluble, high MW assemblies, by MDG |
| Cream Layer (extracted protein) | Slightly decreased levels of native beta-casein and beta-lactoglobulin in A545 | Consistent with interpretation of Aqueous Fraction comparison |

Example 32

A study was conducted to investigate the effects of variable concentrations of MDG and HOSO, as well as the presence of different proteins, on the formation of high molecular weight lutein assemblies. Model systems of different proteins: sodium caseinate, total milk protein, whey protein concentrate and whey protein hydrolysate were incorporated into the composition at 3.7 wt % of protein in the system. The details of the amounts of MDG, HOSO and lutein are detailed in the table below. Samples were then centrifuged (31,000×g/20° C./1 h), and the aqueous fractions were tested by SEC. The mobile phase used for SEC was 70% $H_2O$, 30% acetonitrile, and 0.100 trifluoracetic acid.

The data demonstrated that MDG compositions increased lutein assembly, and high molecular protein fractions across all groups compared to HOSO compositions. The addition of whey protein hydrolysate showed the greatest amount of bound lutein. This suggests that it may be advantageous to have whey protein hydrolysate within an MDG-based composition. This finding is interesting in that it may be whey protein hydrolysate's ability to aggregate that leads to enhanced lutein assembly. Furthermore, the SEC plots for sodium caseinate and total milk protein suggest the presence of casein within the lutein complex.

TABLE 17

Model System Investigation III of Assembly Formation

| Protein ingredient | HOSO, g/L | MDG, g/L | Lutein, μg/L | High MW lutein assembly, mAU-min/mg, 476 nm | Aqueous Fraction protein > 137 kD, g/kg |
|---|---|---|---|---|---|
| Sodium | 6.67 | 0 | 6.94 | 35.6 | 0.425 |
| Caseinate | 0 | 6.67 | 6.94 | 41.6 | 0.466 |
| Total Milk | 6.67 | 0 | 6.94 | 40.6 | 0.908 |
| Protein | 0 | 6.67 | 6.94 | 50.7 | 0.968 |
| Whey Protein | 6.67 | 0 | 6.94 | 34.4 | 0.115 |
| Concentrate | 0 | 6.67 | 6.94 | 53.0 | 0.253 |
| Whey Protein | 6.67 | 0 | 6.94 | 65.9 | 0.299 |
| Hydrolysate | 0 | 6.67 | 6.94 | 97.0 | 0.453 |

Example 33

A study was conducted to evaluate the effect of relative centrifugal force (RCF) on analyzing the high molecular weight lutein assembly in the aqueous phase. The components of these powders are listed in the table of Example 22. Samples were centrifuged, and the aqueous fractions were tested by SEC. The mobile phase used for SEC was 70% $H_2O$, 30% acetonitrile, 0.1 trifluoracetic acid. The different RCFs used were 1×g, 484×g, 1935×g, 7741×g and 31,000×g. These variables and others used in the compositions are listed in the table below. The compositions were then assessed for high molecular weight lutein assembly and the presence of protein >137 kD as done above, as well as bound lipophile index. Bound lipophile index, a relative marker for of lipophilic nutrients in the high molecular weight assembly, was determined as the peak ratio, 280 nm/214 nm for protein >137 kD.

The results exhibit that the MDG compositions generated a high molecular weight lutein assembly, across all RCFs, which has significantly greater water solubility, and/or is more stable to external stress compared to control compositions.

TABLE 18

Analysis of Variable Centrifugal Forces on the Assembly

| Nutritional Powder Batch | RCF (20° C., 2 hrs) | High MW lutein assembly | Protein > 137 kD, g/kg | Bound lipophile index |
|---|---|---|---|---|
| A544 | 1 × g | 1839 | 5.23 | 0.299 |
| A545 | | 2056 | 5.34 | 0.318 |
| A544 | 484 × g | 1969 | 5.27 | 0.306 |
| A545 | | 2274 | 5.60 | 0.327 |
| A544 | 1935 × g | 1761 | 4.92 | 0.294 |
| A545 | | 2146 | 5.35 | 0.322 |
| A544 | 7741 × g | 729 | 2.74 | 0.232 |
| A545 | | 1163 | 3.50 | 0.277 |
| A544 | 31,000 × g | 244 | 1.07 | 0.184 |
| A545 | | 299 | 0.98 | 0.228 |

Example 34

A study was conducted to evaluate the effect of pH, during the SEC process, on analyzing the presence of high molecular weight lutein assemblies. The components of these powders are listed in the table of Example 22. In this experiment, neutral pH SEC was performed on MDG and control samples. After the samples were reconstituted, they were analyzed via SEC under the conditions listed below. No centrifugation was performed on samples prior to running on SEC.

The results demonstrate that under these conditions, the MDG-based compositions performed better than controls in the formation of the high molecular weight lutein assembly, high molecular weight protein, and bound lipophile index. Additionally, this Example demonstrates that the difference between MDG samples and control is not an artifact of the analytical techniques used to assess the lutein assemblies.

TABLE 18

The Effect of pH on Assembly Characterization

| | A544 (control) | A545 (MDG) |
|---|---|---|
| High MW lutein assembly, mAU-min/mg injected | 372 | 419 |
| High MW protein, g/kg | 3.61 | 3.73 |
| Bound lipophile index | 0.216 | 0.225 |

Example 35

A study was performed to investigate the effects of choline on the formation of high molecular weight lutein assemblies. Model systems of a protein ingredient (whey protein concentrate or NFDM at 3.7 wt. % of protein), MDG (4.4 g/L) and lutein (6.7 mg/L). Additionally, different experimental groups also had either lecithin (949 mg/L), choline (45 mg/L), or the combination thereof. Samples were then centrifuged (31,000×g/20° C./1 h), and the aqueous fractions were tested by SEC for analysis on high molecular weight lutein assembly, high molecular weight protein, and bound lipophile index. The data is presented in the table below.

In summary, choline had a significant positive effect on the formation of high molecular weight lutein assemblies in the whey protein concentrate assemblies. It is hypothesized, without being bound to a particular theory, that choline being a basic compound may interact with aspartic acid side chains, which are acidic. These interactions may alter the 3-dimensional configuration of the major whey protein β-lactoglobulin such that the hydrophobic domains are more accessible to lutein binding.

It should also be noted that choline may have a selective enhancement of lutein incorporation, since the bound lipophile index actually decreased, even though lutein increased, when choline was present.

Example 36

A study was conducted to examine variations of commercially representative nutritional composition batches. Samples were prepared as detailed above, with composition with and without MDG. Samples were centrifuged (7,7741× g/20° C./2 h), and the aqueous fractions were tested by SEC for analysis on high molecular weight lutein assembly, high molecular weight protein, and bound lipophile index. The data is presented in the table below.

In summary, the high molecular weight lutein assembly was 10-30% greater in MGD compositions relative to control compositions. Additionally, the MDG compositions correlated with a high molecular weight protein peak. The estimated mass of the high molecular peak for these batches was in the 240 kD range. There is also evidence that other lipophilic nutrients (e.g., Vitamin A, D, E, K, etc.) may be present within the high molecular weight assembly.

TABLE 20

Analysis of Commercially Representative Nutritional Composition in Assembly Formation

| Batch | 017-1 | 017-2 | 017-3 | 017-4 | 017-5 |
|---|---|---|---|---|---|
| Lutein/MDG addition | Control | PIF, w/ lecithin | PIW | PIF | PIW, w/ choline |
| Total lutein, mg/kg | 2.18 | 1.99 | 2.06 | 1.80 | 1.88 |
| Lutein assembly, conc. | 2236 | 2464 | 2815 | 2844 | 2845 |
| Lutein assembly, mass | 237 kD | 240 kD | 247 kD | 237 kD | 244 kD |
| High MW protein, g/kg | 5.93 | 6.34 | 6.75 | 6.92 | 6.87 |
| Bound lipophile index | 0.301 | 0.311 | 0.329 | 0.327 | 0.329 |

Example 37

A study was conducted to investigate using a neutral pH as the SEC running condition and its subsequent effect on the high molecular weight lutein assemblies during separation Samples were prepared as detailed above, with composition with and without MDG. Samples were were tested by SEC for analysis on high molecular weight lutein assembly and bound lipophile index. SEC was performed using 0.05M HEPES, pH 7.0, and a Superdex Peptide column. The data is presented in the table below.

TABLE 19

Model System Investigation IV of Assembly Formation

| Tube | Protein ingredient (37 g protein per kg) | Lecithin, mg/L | Choline, mg/L | High MW lutein assembly, mAU-min/mg, 476 nm | Aqueous Fraction protein > 137 kD, g/kg | Bound lipophile index (280 nm/214 nm ratio) |
|---|---|---|---|---|---|---|
| 1 | WPC | 0 | 0 | 31.2 | 0.105 | 0.157 |
| 2 | NFDM | 0 | 0 | 41.3 | 0.413 | 0.118 |
| 3 | WPC | 949 | 0 | 40.3 | 0.143 | 0.163 |
| 4 | NFDM | 949 | 0 | 47.0 | 0.441 | 0.123 |
| 5 | WPC | 0 | 45 | 58.6 | 0.295 | 0.151 |
| 6 | NFDM | 0 | 45 | 50.4 | 0.443 | 0.131 |
| 7 | WPC | 949 | 45 | 61.7 | 0.338 | 0.146 |
| 8 | NFDM | 949 | 45 | 48.2 | 0.451 | 0.126 |

The results indicate that the high molecular weight lutein assembly and protein both increased in all MDG batches relative to control batches. This Example supports the integrity of the analytical techniques used for lutein assembly analysis.

TABLE 21

The Effect of pH on Assembly Characterization in Commercially Representative Nutritional Composition

| Batch | 017-1 | 017-2 | 017-3 | 017-4 | 017-5 |
|---|---|---|---|---|---|
| Lutein/MDG addition | Control | PIF, w/ lecithin | PIW | PIF | PIW, w/ choline |
| Total lutein, mg/kg | 2.18 | 1.99 | 2.06 | 1.80 | 1.88 |
| Lutein assembly, conc. | 820 | 1170 | 1160 | 1190 | 1060 |
| Lipophile assembly, conc. | 7820 | 10,500 | 11,300 | 10,800 | 9510 |

Example 38

A study was performed to evaluate the effects of choline on the formation of high molecular weight lutein assemblies by providing choline at variable points during the composition. Mixtures of water, NFDM, MDG, lutein and choline chloride, wherein the choline was either added to the MDG and lutein or to the NFDM slurry. Samples were then centrifuged (31,000×g/20° C./1 h), ultrafiltrated through a 100 k filter, and the aqueous fractions were tested by SEC for analysis on high molecular weight lutein assembly, high molecular weight protein, and native protein bound lutein. The supernatant was diluted 1:4 (v/v) prior to running on the SEC, with the SEC mobile phase (0.05M KH2PO4, 0.15M NaCl, pH 7.5). The different parameters examined were high molecular weight lutein assembly, protein >137 kD, and middle range protein, which corresponds to the native protein, bound lutein. Additionally, ultrafiltrate analysis was performed on the lutein assembly and high molecular weight protein metrics. The data is presented in the table below.

The enhancing effect of choline on lutein incorporation within high molecular weight assemblies appears to be process dependent. Specifically, it was found that the bound lutein was significantly higher when choline was added to the NFDM slurry, as opposed to addition to the MDG and lutein.

TABLE 22

Model System Investigation V of Assembly Formation

| Choline addition point | Added to MDG + lutein | Added to NFDM slurry |
|---|---|---|
| Aqueous Fraction, 214 nm (protein metric) | 121 | 190 |
| Aqueous Fraction, 476 nm (bound lutein metric) | 0.265 | 0.330 |
| Aqueous Fraction, 476 nm, native protein range (native protein bound lutein metric) | 0.0346 | 0.0455 |
| 100K UF permeate, 214 nm (protein metric) | 44.8 | 59.7 |
| 100K UF permeate, 476 nm (lutein metric) | 0.0343 | 0.0387 |

Example 39

A study was performed to evaluate the effects of variable components on the formation of high molecular weight lutein assemblies. The different compositions include various proteins ingredients (NFDM, β-lactoglobulin, or bovine lactoferrin); varying amounts of MDG and HOSO, and lutein. The specific details of the aforementioned variables are listed in the table below. Samples were then centrifuged (31,000×g/20° C./1 h), and tested for bound lutein via SEC.

The results demonstrate that both lutein assembly and protein >137 kD metrics are increased with the presence of MDG within the composition. Interestingly, the combination of MDG and HOSO exhibited the greatest amount of lutein assembly formation and protein >137 kD, compared to MDG and HOSO alone. Additionally, the use of β-lactoglobulin, or bovine lactoferrin, alone, as part of the composition showed the capability to form lutein assemblies and protein >137 kD.

TABLE 23

Model System Investigation VI of Assembly Formation

| Tube | 1 | 2 | 3 | 4 | 5 | 6 | 7 | 8 |
|---|---|---|---|---|---|---|---|---|
| Protein, 37 g protein/kg | NFDM | NFDM | NFDM | NFDM | NFDM | NFDM | βLG | BLF |
| MDG, g/kg | 6.64 | 6.62 | 3.31 | 1.66 | 0.826 | 0 | 6.62 | 6.62 |
| HOSO, g/kg | 0 | 0 | 3.31 | 4.96 | 5.79 | 6.62 | 0 | 0 |
| Lutein, mg/kg | 5.05 | 10.1 | 10.1 | 10.1 | 10.1 | 10.1 | 10.1 | 10.1 |
| MDG/lutein, w/w | 1315 | 655 | 328 | 164 | 81.8 | 0 | 655 | 655 |
| High MW lutein assembly | 49.4 | 51.7 | 57.4 | 57.9 | 50.7 | 36.4 | 11.3 | 18.6 |
| Protein > 137 kD, g/kg | 0.413 | 0.407 | 0.412 | 0.416 | 0.393 | 0.343 | 0.012 | 0.018 |
| Bound lipophile index | 0.136 | 0.137 | 0.147 | 0.147 | 0.141 | 0.124 | 0.270 | 0.174 |

Example 40

A study was conducted to investigate the effects of variable components on the formation of high molecular weight lutein assemblies. The different compositions include different protein ingredients (NFDM, β-lactoglobulin, or bovine lactoferrin) at 37 g of protein per kg, MDG at 6.62 g/kg, and lutein 10.1 mg/kg. The β-lactoglobulin, and bovine lactoferrin were tested both with and without centrifugation. Samples were then analyzed by SEC for high molecular weight lutein assembly, high molecular weight protein (>137 kD), either with centrifugation or without. If samples were centrifuged, they were done so at 31,000×g/20° C./1 h. Details of the different experimental group's ability to produce high molecular weight lutein assemblies are shown in the table below.

The data revealed that both β-lactoglobulin and bovine lactoferrin were capable of forming stable, high molecular weight lutein assemblies. Furthermore, these assemblies were still present after centrifugation, demonstrating the high solubility/stability of the bound lutein assemblies.

TABLE 24

Effect of Different Proteins on Assembly Formation in a Model System

| Tube | Protein (37 g protein/kg) | Sample prep for SEC | High MW lutein assembly | Protein > 137 kD, g/kg | Bound lipophile index |
|---|---|---|---|---|---|
| 2 | NFDM | Aqueous | 51.7 | 0.407 | 0.137 |
| 7 | β-LG | Fraction | 11.3 | 0.012 | 0.270 |
| 8 | BLF | | 18.6 | 0.018 | 0.174 |
| 7 | β-LG | Whole | 66.4 | 0.144 | 0.324 |
| 8 | BLF | suspension | 60.5 | 0.132 | 0.305 |

Example 41

A study was conducted to examine the effects of variable components on the formation of high molecular weight lutein assemblies. Samples were subjected to appropriate thermal processing during which the composition is pre-heated to 165-185° F. and then passed through homogenizers, first at 1000 psig and then at 4000 psig with NFDM at 37 g of protein/L, with lutein at 10.1 mg/L, and with varying amounts of HOSO and/or MDG. After homogenization the each variable is subjected to a high temperature-short time (HTST) process of about 165-185° F. and a 16 second hold and then cooled to about 40° F. All samples were then tested by SEC, either following centrifugation (31,000×g/20° C./1 h) or without centrifugation. The data is listed in the table below.

The results demonstrate that the combination of MDG and HOSO led to the highest amount of lutein assembly formation, as well as protein >137 kD prior to centrifugation.

TABLE 25

Model System Investigation VII of Assembly Formation

| Tube | HOSO, g/L | MDG, g/L | High MW lutein assembly | Protein > 137 kD, g/kg | Bound lipophile index |
|---|---|---|---|---|---|
| 1 | 6.62 | 0 | 216 | 0.706 | 0.258 |
| 2 | 2.21 | 0 | 102 | 0.464 | 0.195 |
| 3 | 0 | 6.62 | 167 | 0.667 | 0.226 |
| 4 | 0 | 2.21 | 65 | 0.384 | 0.165 |
| 5 | 3.31 | 3.31 | 195 | 0.712 | 0.246 |
| 6 | 4.97 | 1.65 | 208 | 0.747 | 0.247 |
| results of testing without centrifugation | | | | | |
| 1 | 6.62 | 0 | 612 | 2.06 | 0.258 |
| 2 | 2.21 | 0 | 242 | 1.18 | 0.198 |
| 3 | 0 | 6.62 | 648 | 2.27 | 0.246 |
| 4 | 0 | 2.21 | 260 | 1.66 | 0.165 |
| 5 | 3.31 | 3.31 | 970 | 2.96 | 0.286 |
| 6 | 4.97 | 1.65 | 888 | 2.57 | 0.297 |

Example 42

A study was conducted to examine the effects of variable components on the formation of high molecular weight lutein assemblies using a commercially available nutritional powder. Samples were tested (without dilution or centrifugation) for bound lutein and related attributes by SEC. The attributes are compared below, and the bound lutein values (peak area at 476 nm, per mg injected) are also compared in the table below.

The results demonstrate that the combination of MDG provided the highest amount of the metrics listed below relative to controls. Specifically, MDG/choline outperformed all other groups across all metrics.

TABLE 26

Effect of Different Variables on Assembly Formation in a Commercially Variation Lutein, High MW lutein

| Variation | Lutein, mg/kg (as fed) | High MW lutein assembly | Protein > 137 kD, g/kg | Bound lipophile index |
|---|---|---|---|---|
| Control | 2.47 | 6995 | 13.8 | 0.373 |
| MDG/PIF | 2.47 | 9189 | 16.3 | 0.419 |
| MDG/PIW | 2.35 | 10,566 | 17.8 | 0.441 |
| MDG/lecithin | 2.44 | 10,298 | 17.2 | 0.446 |
| MDG/choline | 2.11 | 10,937 | 18.1 | 0.448 |

Example 43

A study was conducted to examine the effects of variable components on the formation of high molecular weight lutein assemblies. Each variable was subjected to appropriate thermal processing during which the composition is pre-heated to 165-185° F. and then passed through homogenizers, first at 1000 psig and then at 4000 psig. After homogenization, each variable was subjected to a high temperature-short time (HTST) process of about 165-185° F. and a 16 second hold and then cooled to about 40° F. Samples were homogenized and pasteurized with the following parameters of protein ("P"=nonfat dry milk, at 10% w/w), lutein ("L"), HOSO ("H"), MDG ("M"), lecithin ("Le"), and/or choline ("C"). These samples were tested for bound lutein and related attributes by size exclusion chromatography (SEC). Each variable was tested both before and after centrifugation (at 31,000×g/20 C/1 h).

The results demonstrate that the presence of MDG led to the formation of lutein assembly formation and protein >137 kD.

TABLE 27

Model System Investigation VIII of Assembly Formation

| Variable | Sample | High MW lutein assembly | Protein > 137 kD, g/kg | Bound lipophile index |
|---|---|---|---|---|
| PLH | Whole | 779 | 2.21 | 0.293 |
| PLH | Supernatant | 328 (42%) | 0.97 (44%) | 0.281 |
| PLM | Whole | 439 | 1.28 | 0.273 |
| PLM | Supernatant | 321 (73%) | 0.90 (75%) | 0.286 |
| PLMLe | Whole | 845 | 3.03 | 0.253 |
| PLMLe | Supernatant | 239 (28%) | 1.13 (37%) | 0.215 |
| PLMC | Whole | 432 | 1.27 | 0.269 |
| PLMC | Supernatant | 323 (75%) | 0.98 (77%) | 0.276 |

Example 44

A study was conducted to examine the effects of variable components on the formation of high molecular weight lutein assemblies. Samples were subjected to appropriate thermal processing during which the composition was pre-heated to 165-185° F. and then passed through homogenizers, first at 1000 psig and then at 4000 psig with NFDM at 37 g of protein/L, with lutein at 10.1 mg/L, and with varying amounts of HOSO and/or MDG. After homogenization each variable was subjected to a high temperature-short time (HTST) process of about 165-185° F. and a 16 second hold, and then cooled to about 40° F. All samples were then tested by SEC, either following centrifugation (31,000×g/20° C./1 h) or without centrifugation. The data is listed in the table below.

Samples prepared with lutein, a lipid (HOSO or MDG), and varying levels of protein (nonfat dry milk), were tested for bound lutein and related attributes by size exclusion chromatography (SEC). Specifically, the parameters investigated were high molecular weight lutein assembly, protein >137 kD, and bound lipophile index. The results for samples prepared with and without centrifugation (31,000×g; 20 C; 1 h) are compared below.

The results demonstrate that both of MDG and HOSO led to the higher amounts of lutein assembly formation, protein >137 kD, and bound lipophilic index with increasing amounts of protein. Additionally, the presences of MDG resulted mostly in higher amounts of the aforementioned metrics, relative to HOSO. Interestingly, MDG outperformed HOSO more significantly as the protein was increased via all metrics.

TABLE 28

Model System Investigation VIII of Assembly Formation

| Tube | Protein (NFDM), g/kg | Lipid, 4.4 g/kg | High MW lutein assembly | Protein > 137 kD, g/kg | Bound lipophile index |
|---|---|---|---|---|---|
| 1 | 24.1 | HOSO | 107 | 2.17 | 0.103 |
| 2 | 24.1 | MDG | 122 | 2.11 | 0.107 |
| 3 | 48.2 | HOSO | 218 | 4.15 | 0.110 |
| 4 | 48.2 | MDG | 232 | 4.15 | 0.112 |
| 5 | 96.4 | HOSO | 506 | 10.1 | 0.121 |
| 6 | 96.4 | MDG | 616 | 11.6 | 0.125 |
| Tested after centrifugation at 31,000 × g and at 20° C. for 1 hr | | | | | |
| 1 | 24.1 | HOSO | 49.8 | 0.884 | 0.096 |
| 2 | 24.1 | MDG | 53.8 | 1.02 | 0.098 |
| 3 | 48.2 | HOSO | 108 | 2.44 | 0.102 |
| 4 | 48.2 | MDG | 118 | 2.48 | 0.101 |
| 5 | 96.4 | HOSO | 287 | 5.31 | 0.119 |
| 6 | 96.4 | MDG | 309 | 5.47 | 0.125 |

Example 45

A study was conducted to examine the presence of tocopherol within the high molecular weight assembly. The components of the tested powders are listed in the table of Example 22. All samples were formulated and then then tested by SEC, following centrifugation (31,000×g/20° C./3 h). The data is listed in the table below.

TABLE 29

Analysis of Tocopherol within the Assembly

| Nutritional Powder | Tocopherols (α-, γ-, and δ-) in Aqueous Fraction, approximate |
|---|---|
| A544 (control) | 1.51 mg/kg |
| A545 (MDG) | 1.69 mg/kg |

The results demonstrated that the aqueous fractions of commercially available nutritional powders with MDG contained tocopherols are at a level that is 11% greater than control compositions. The aqueous fraction concentrations (~1.69 and ~1.51 mg/kg, respectively) appear to represent an appreciable proportion of the total tocopherol within the commercially available nutritional composition (approximately 20-30%). The tocopherol solubility provided by the MDG within the composition is in stark contrast to the reported solubility limit of vitamin E in water (20.9 mg/kg at 33° C.). This suggests that the assemblies comprising MDG enhance the aqueous solubility of tocopherol.

Example 46

TABLE 30

Analysis of Casein Associated with the Assembly

| Protein system | Current commercial composition | Composition |
|---|---|---|
| 64% nonfat dry milk (NFDM), 36% WPC | NFDM from Holstein-Friesian breeds | NFDM from Guernsey breed |
| Total protein concentration | 2.07 g per 100 kcal | 2.07 g per 100 kcal |
| Total β-casein concentration | 0.36 g per 100 kcal | 0.36 g per 100 kcal |
| Major genetic variant of β-casein | A1 | A2 |

Table 31 below shows partial composition information (protein content) for a commercial liquid nutritional composition designed for individuals with diabetes, compared with an exemplary liquid nutritional composition according to the embodiments disclosed herein. Both illustrate liquid nutritional product with varying sources of caseinates, and have a caseinate, SPC combination. The beta-casein utilized in the embodiment on the right is sourced from *Bos indicus* has A2 as the major genetic variant.

TABLE 31

Partial Composition Information of Commercially Available Nutritional Composition

| Protein system | Current commercial composition | Composition |
|---|---|---|
| 80% caseinates, 20% SPC | Caseinates from *Bos taurus* milk, Holstein-Friesian breeds | Caseinates from *Bos indicus* milk |
| Total protein concentration | 76 g per liter | 76 g per liter |
| Total β-casein concentration | 22 g per liter | 22 g per liter |
| Major genetic variant of β-casein | A1 | A2 |

A nutritional composition intended for infants and suitable for utilizing the protein disclosed herein is described in Table 32 below. The 14 grams of protein per liter of nutritional composition comprises about 18% by weight bovine beta-casein.

TABLE 32

Nutritional Composition Ingredients for Example 46 and other Exemplified Compositions

| Ingredient Name | Amount per 1000 Kg batch | Kg/g/ mg |
|---|---|---|
| Ingredient Water | Q.S. | Kg |
| Nonfat Milk | 83.00 | Kg |
| Lactose | 51.82 | Kg |
| High Oleic Safflower Oil | 13.06 | Kg |
| Soy Oil | 10.50 | Kg |
| Coconut Oil | 9.256 | Kg |
| Galacto-oligosaccharides | 8.630 | Kg |
| Whey Protein Concentrate | 6.075 | Kg |
| 5% Potassium Hydroxide | 2.494 | Kg |
| KOH | 124.7 | g |
| Potassium Citrate | 536.6 | g |
| Calcium Carbonate | 449.9 | g |
| Ascorbic Acid | 446.9 | g |
| ARASCO Mortierella Alpina Oil | 359.3 | g |
| Soy Lecithin | 339.7 | g |
| Myverol 18-06 | 339.7 | g |
| Nucleotide-Choline Premix | 293.2 | g |
| Choline Bitartrate | 51.75 | g |
| Cytidine 5'-Monoohosohate | 30.49 | g |
| Disodium Guanosine 5'-Monophosphate | 15.64 | g |
| Disodium Uridine 5'-Monophosphate | 13.15 | g |
| Adenosine 5'-Monophosphate | 11.60 | g |
| Potassium Chloride | 199.9 | g |
| Magnesium Chloride | 154.0 | g |
| Vit/Min/Taur Premix | 149.9 | g |
| Taurine | 45.83 | g |
| m-Inositol | 33.28 | g |
| Zinc Sulfate | 15.35 | g |
| Niacinamide | 9.781 | g |
| Calcium Pantothenate | 5.865 | g |
| Ferrous Sulfate | 5.131 | g |
| Cupric Sulfate | 1.800 | g |
| Thiamine Chloride HCI | 1.518 | g |
| Riboflavin | 669.3 | g |
| Pvridoxine HCI | 613.1 | mg |
| Folic Acid | 206.1 | mg |
| Manganese Sulfate | 174.6 | mg |
| Biotin | 59.21 | mg |
| Sodium Selenate | 35.51 | mg |
| Cyanocobalamin | 4.722 | mg |
| DHASCO Crypthecodinium Cohnii Oil | 131.0 | g |
| Choline Chloride | 123.7 | g |
| Seakem GP-359 | 120.0 | g |
| Ultra-Micronized Tricalcium Phosphate | 103.2 | g |
| Potassium Phosphate Monobasic | 90.6 | g |
| Vitamin A, D3, E, K1 Premix | 64.7 | g |
| RRR Aloha-Tocophervl Acetate | 9.063 | g |
| Vitamin A Palmitate | 1.725 | g |
| Vitamin K1 (Phylloquinone) | 100.3 | mg |
| Vitamin D3 | 14.06 | mg |
| Ferrous Sulfate | 60.9 | g |
| Seakem RLC Carrageenan | 60.0 | g |
| Carotenoid Premix | 57.1 | g |
| Lutein | 119.9 | mg |
| Lycopene | 119.9 | mg |
| Beta-Carotene | 25.98 | mg |
| Sodium Chloride | 40.1 | g |
| Citric Acid (Processing Aid) | 29.8 | g |
| L-Carnitine | 3.62 | g |
| Riboflavin | 2.18 | g |

A nutritional composition suitable for utilizing the protein disclosed herein is described in Table 33 below. The 34 grams of protein per liter of nutritional composition comprises about 25% by weight bovine beta-casein.

TABLE 33

Nutritional Composition Ingredients for Example 46 and other Exemplified Compositions

| Ingredient | Kg per 1000 Kg |
|---|---|
| Water | Q.S. |
| Sucrose | 75.0 |
| Milk Protein Isolate (Alapro 4900-Fonterra) | 34.9 |
| Soy Oil | 8.0 |
| Soy Protein Isolate | 3.7 |
| Potassium Citrate | 3.3 |
| Phytosterol Ester | 3.2 |
| Avicel CL611 | 3.0 |
| Magnesium Phosphate Dibasic | 1.92 |
| N&A Vanilla Flavor | 1.80 |
| m-TCP | 1.75 |
| N&A Dairv Cream Flavor 32122 | 1.30 |
| Soy Lecithin | 1.0 |
| Magnesium Chloride | 1.15 |
| Sodium Chloride | 0.75 |
| Choline Chloride | 0.53 |
| Ascorbic Acid | 0.377 |
| Potassium Chloride | 0.309 |
| Potassium Hydroxide 45% (Processing Aid) | 0.262 |
| WSV Premix | 0.185 |
| Corn Starch (Processing Aid) | 0.0631143 |
| Dextrose (Processing Aid) | 0.062977 |
| Niacinamide | 0.0274725 |
| d-Calcium Pantothenate | 0.0177239 |
| Thiamine Chloride Hydrochloride | 0.0045325 |
| Pyridoxine Hydrochloride | 0.0043625 |
| Riboflavin | 0.0035335 |
| Folic Acid | 0.0006739 |
| Biotin | 0.0005467 |
| Cyanocobalamin | 0.00006318 |
| Carrageenan (Viscarin SA-359) | 0.180 |
| UTM/TM Premix | 0.150 |
| Zinc Sulfate, Monohydrate | 0.0837855 |
| Maltodextrin (Processing aid) | 0.0346267 |
| Manganese Sulfate, Monohydrate | 0.0207663 |
| Citric acid, Anhydrous | 0.009258 |
| Chromium Chloride, Hexahydrate | 0.0007288 |
| Sodium Molybdate, Dihydrate | 0.0005882 |
| Sodium Selenate, Anhydrous | 0.0002465 |
| Vitamin ADEK Premix | 0.135 |
| Coconut Oil (Processing Aid) | 0.0799578 |
| Vitamin E (dl-Alpha Tocophervi Acetate) | 0.0495827 |
| Vitamin A Palmitate | 0.0051266 |
| Phylloquinone | 0.000297 |
| Vitamin D3 | 0.00003594 |
| Sucralose Liquid (25%) | 0.10 |
| Seakem CM514 | 0.090 |
| Acesulfame potassium | 0.050 |
| Potassium Iodide | 0.00023 |

In certain exemplary embodiments disclosed herein, the nutritional compositions are administered (or consumed) orally as needed to provide the desired level of nutrition. In certain of these embodiments, the nutritional compositions are administered (or consumed) in the form of one to two servings daily or in one or two or more divided doses daily. In certain embodiments, when the nutritional composition is a liquid, the serving may be 150 milliliters to 500 milliliters. In certain other embodiments, when the nutritional composition is a liquid, the serving is 237 milliliters (~8 fl. oz.). In other embodiments, when the nutritional composition is a liquid, the serving is 177 milliliters to 414 milliliters (~6 fl. oz. to ~14 fl. oz.). In yet other embodiments, when the nutritional composition is a liquid, the serving is 207 milliliters to 266 milliliters (~7 fl. oz. to ~9 fl. oz.). Various calorie contents may be associated with each serving of the nutritional compositions according to the first, second and third embodiments disclosed herein, typically from 25 to 500 Kcal, including 50 to 400 Kcal; 100 to 350 Kcal or 150 to 350 Kcal per serving. Alternatively, a serving may be construed as any amount which is intended to be consumed in one sitting or within one hour or less.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

Examples 47-53

Examples 47-49 illustrate soy-based powdered infant formulas of the present disclosure, the ingredients of which are listed in Table 34. All ingredient amounts are listed as kg per 1000 kg batch, unless otherwise specified.

TABLE 34

Nutritional Composition Ingredients for Examples 47-49 and other Exemplified Compositions

| Ingredient | Example 1 | Example 2 | Example 3 |
|---|---|---|---|
| Corn Syrup | 504.1 | 504.1 | 504.1 |
| Soy Protein Isolate (5% DH) | 144.8 | 144.8 | 144.8 |
| Sunflower Oil | 112.5 | 112.5 | 112.5 |
| Sucrose | 98.3 | 98.3 | 98.3 |
| Soy Oil | 83.9 | 83.9 | 83.9 |
| Coconut Oil | 75.6 | 75.6 | 75.6 |
| Fructooligosaccharides | 17 | 17 | 17 |
| Potassium Citrate | 16.5 | 16.5 | 16.5 |
| Calcium Phosphate | 16.4 | 16.4 | 16.4 |
| Sodium Chloride | 3.8 | 3.8 | 3.8 |
| Arachidonic Acid Oil | 3 | 3 | 3 |
| Magnesium Chloride | 2.8 | 2.8 | 2.8 |
| L-Methionine | 1.7 | 1.7 | 1.7 |
| Ascorbic Acid | 1.1 | 1.1 | 1.1 |
| Docosahexaenoic Acid Oil | 1.1 | 1.1 | 1.1 |
| MDG Oil | 621.0 g | 590.3 g | 558.9 g |
| Lutein | 945.0 mg | 346 mg | 11 g |
| Choline Chloride | 507.7 g | 507.7 g | 507.7 g |
| Taurine | 457.5 g | 457.5 g | 457.5 g |
| Inositol | 353.0 g | 353.0 g | 353.0 g |
| Ascorbyl Palmitate | 347.5 g | 347.5 g | 347.5 g |
| Ferrous Sulfate | 319.2 g | 319.2 g | 319.2 g |
| Mixed Tocopherols | 157.2 g | 157.2 g | 157.2 g |
| L-Carnitine | 112.7 g | 112.7 g | 112.7 g |

TABLE 34-continued

Nutritional Composition Ingredients for Examples 47-49 and other Exemplified Compositions

| Ingredient | Example 1 | Example 2 | Example 3 |
|---|---|---|---|
| Niacinamide | 97.9 g | 97.9 g | 97.9 g |
| D-Alpha-Tocopheryl Acetate | 78.8 g | 78.8 g | 78.8 g |
| Calcium D-Pantothenate | 58.7 g | 58.7 g | 58.7 g |
| Zinc | 56.0 g | 56.0 g | 56.0 g |
| Iron | 16.9 g | 16.9 g | 16.9 g |
| Thiamine | 15.2 g | 15.2 g | 15.2 g |
| Vitamin A Palmitate | 14.8 g | 14.8 g | 14.8 g |
| Copper | 7.2 g | 7.2 g | 7.2 g |
| Riboflavin | 6.7 g | 6.7 g | 6.7 g |
| Pyridoxine Hydrochloride | 6.1 g | 6.1 g | 6.1 g |
| Folic Acid | 2.1 g | 2.1 g | 2.1 g |
| Potassium Iodide | 11 g | 11 g | 11 g |
| Phylloquinone | 857.1 mg | 857.1 mg | 857.1 mg |
| Vitamin D3 | 47 mg | 103.7 mg | 324 mg |
| Lycopene | 980.0 mg | 980.0 mg | 980.0 mg |
| Biotin | 592.5 mg | 592.5 mg | 592.5 mg |
| Beta-Carotene | 215.6 mg | 215.6 mg | 215.6 mg |
| Selenium | 147.0 mg | 147.0 mg | 147.0 mg |
| Cyanocobalamin | 71.3 mg | 71.3 mg | 71.3 mg |

Examples 50-52 illustrate milk-based powdered infant formulas of the present disclosure, the ingredients of which are listed in Table 35. All ingredient amounts are listed as kg per 1000 kg batch, unless otherwise specified.

TABLE 35

Nutritional Composition Ingredients for Examples 50-52 and other Exemplified Compositions

| Ingredient | Example 4 | Example 5 | Example 6 |
|---|---|---|---|
| Skim Milk | 2057.3 | 2057.3 | 2057.3 |
| Lactose | 414.1 | 414.1 | 414.1 |
| Sunflower Oil | 111.1 | 111.1 | 111.1 |
| Soy Oil | 83.3 | 83.3 | 83.3 |
| Coconut Oil | 74.6 | 74.6 | 74.6 |
| Galactooligosaccharides | 72.3 | 72.3 | 72.3 |
| Whey Protein Concentrate | 49.4 | 49.4 | 49.4 |
| Whey Protein Hydrolysate (<25% DH) | 5.6 | 5.6 | 5.6 |
| Potassium Citrate | 3.4 | 3.4 | 3.4 |
| Arachidonic Acid Oil | 2.9 | 2.9 | 2.9 |
| Calcium Carbonate | 2.6 | 2.6 | 2.6 |
| Potassium Hydroxide | 2.3 | 2.3 | 2.3 |
| Soy Lecithin | 1.7 | 1.7 | 1.7 |
| Docosahexaenoic Acid Oil | 1.6 | 1.6 | 1.6 |
| Ascorbic Acid | 1.5 | 1.5 | 1.5 |
| Choline Bitartrate | 1.2 | 1.2 | 1.2 |
| Magnesium Chloride | 1.2 | 1.2 | 1.2 |
| MDG Oil | 1.1 | 1.044 | 0.99 |
| Lutein | 2.65 g | 15 g | 364 mg |
| Sodium Chloride | 1 | 1 | 1 |
| Taurine | 428 g | 428 g | 428 g |
| L-Tryptophan | 277 g | 277 g | 277 g |
| Cytidine 5'-Monophosphate | 257 g | 257 g | 257 g |
| Myo-Inositol | 257 g | 257 g | 257 g |
| Ascorbyl Palmitate | 200 g | 200 g | 200 g |
| Disodium Guanosine 5'-Monophosphate | 187 g | 187 g | 187 g |
| Disodium Uridine 5'-Monophosphate | 163 g | 163 g | 163 g |
| Ferrous Sulfate Monohydrate | 130.6 g | 130.6 g | 130.6 g |
| RRR-Alpha-Tocopheryl Acetate | 119.7 g | 119.7 g | 119.7 g |
| Tocopherol-2 | 106.7 g | 106.7 g | 106.7 g |
| Zinc Sulfate Monohydrate | 104 g | 104 g | 104 g |
| Adenosine 5'-Monophosphate | 98 g | 98 g | 98 g |
| Ferrous Sulfate | 88 g | 88 g | 88 g |
| Mixed Tocopherols | 77 g | 77 g | 77 g |
| Niacinamide | 59 g | 59 g | 59 g |
| L-Carnitine | 43 g | 43 g | 43 g |
| Calcium D-Pantothenate | 42 g | 42 g | 42 g |
| Retinyl Palmitate | 13 g | 13 g | 13 g |
| Copper Sulfate | 11 g | 11 g | 11 g |
| Thiamin Hydrochloride | 9 g | 9 g | 9 g |

TABLE 35-continued

Nutritional Composition Ingredients for Examples 50-52 and other Exemplified Compositions

| Ingredient | Example 4 | Example 5 | Example 6 |
|---|---|---|---|
| Pyridoxine Hydrochloride | 5 g | 5 g | 5 g |
| Riboflavin | 5 g | 5 g | 5 g |
| Manganese Sulfate Monohydrate | 3 g | 3 g | 3 g |
| Folic Acid | 796 mg | 796 mg | 796 mg |
| Beta-Carotene | 770 mg | 770 mg | 770 mg |
| Phylloquinone | 618 mg | 618 mg | 618 mg |
| Potassium Iodide | 550 mg | 550 mg | 550 mg |
| D-Biotin | 238 mg | 238 mg | 238 mg |
| Sodium Selenate | 117 mg | 117 mg | 117 mg |
| Vitamin D3 | 50 mg | 93 mg | 295 mg |
| Cyanocobalamin | 8 mg | 8 mg | 8 mg |

Example 53 illustrates a ready-to-feed milk-based liquid infant formula of the present disclosure, the ingredients of which are listed in Table 36. All ingredient amounts are listed as kg per 1000 kg batch, unless otherwise specified.

TABLE 36

Nutritional Composition Ingredients for Example 53 and other Exemplified Compositions

| Ingredient | Example 7 |
|---|---|
| Water | Q.S. |
| Lactose | 48.2 |
| Skim Milk | 22.1 |
| High Oleic Safflower Oil | 13.3 |
| Soy Oil | 10.2 |
| Coconut Oil | 9.7 |
| Galactooligosaccharides | 9.4 |
| Whey Protein Concentrate | 6.3 |
| Potassium Hydroxide | 166 g |
| Calcium Carbonate | 747 g |
| Potassium Citrate | 650 g |
| Ascorbic Acid | 610 g |
| Arachidonic Acid Oil | 410 g |
| Distilled Monoglycerides | 347 g |
| Lecithin | 350 g |
| Cytidine 5'-Monophosphate | 32.8 g |
| Disodium Guanosine 5'-Monophosphate | 16.8 g |
| Disodium Uridine 5'-Monophosphate | 14.1 g |
| Adenosine 5'-Monophosphate | 12.5 g |
| Docosahexaenoic Acid Oil | 225 g |
| MDG Oil | 210 g |
| Potassium Phosphate | 185 g |
| Taurine | 57 g |
| Myo-Inositol | 48 g |
| L-Tryptophan | 19 g |
| Niacinamide | 6 g |
| Calcium D-Pantothenate | 5 g |
| Thiamine Hydrochloride | 1.4 g |
| Riboflavin | 13 g |
| Pyridoxine Hydrochloride | 750 mg |
| Folic Acid | 145 mg |

TABLE 36-continued

Nutritional Composition Ingredients for Example 53 and other Exemplified Compositions

| Ingredient | Example 7 |
|---|---|
| D-Biotin | 36 mg |
| Cyanocobalamin | 5.4 mg |
| Carrageenan | 175 g |
| Sodium Citrate | 174 g |
| Sodium Chloride | 145 g |
| Magnesium Chloride | 126 g |
| Ferrous Sulfate | 66.5 g |
| Choline Chloride | 45 g |
| Vitamin E Acetate | 21 g |
| Vitamin A Palmitate | 2 g |
| Phylloquinone | 131.6 mg |
| Vitamin D3 | 16 mg |
| Magnesium Sulfate | 32 g |
| Zinc Sulfate | 17.9 g |
| L-Carnitine | 5.5 g |
| Cupric Sulfate | 2 g |
| Lutein | 160 mg |
| Beta-Carotene | 80 mg |
| Manganese Sulfate | 110 mg |

Example 54

In this Example, the effect of using an activated MDG oil component or an MDG-protected premix on the absorbance of triglycerides and fatty acids in a nutritional composition is evaluated and compared to the absorbance of triglycerides and fatty acids in a nutritional composition without MDG oil. The fatty acids that were measured for this test included palmitic acid, linoleic acid, and alpha-linolenic acid.

The following nutritional compositions were tested:

Triglyceride oil control (AET-C): high oleic safflower oil was added to the protein-in-fat slurry prior to addition to the remainder of the composition;

MDG-protected premix (AET-1): MDG oil was premixed with lecithin for 5 minutes; this premix was added to the protein-in-fat slurry to form an MDG-protected premix prior to addition to the remainder of the composition;

Activated MDG oil component (AET-2): MDG oil was added to the protein-in-water slurry to form an activated MDG oil component prior to addition to the remainder of the composition;

MDG oil, not activated (AET-3): MDG oil was added to the protein-in-fat slurry prior to addition to the remainder of the composition; and Activated MDG oil component with choline (AET-4): MDG oil was premixed with choline for 5 minutes; this premix was added to the protein-in-water slurry to form an activated MDG oil component prior to addition to the remainder of the composition.

TABLE 37

Nutritional Composition Ingredients for Example 54 and other Exemplified Compositions

| | AET-C | | AET-1 | | AET-2 | | AET-3 | | AET-4 | |
|---|---|---|---|---|---|---|---|---|---|---|
| Sample ID: | Amount/ 1000 kg | Unit | Amount/ 1000 kg | Unit | Amount/ 1000 kg | Unit | Amount/ 1000 kg | Unit | Amount/ 1000 kg | Unit |
| Ingredient Name: | | | | | | | | | | |
| Water | Q.S. | kg | Q.S. | Kg | Q.S. | kg | Q.S. | kg | Q.S. | kg |
| Lactose | 49.27 | kg | 49.27 | Kg | 49.27 | kg | 49.27 | kg | 49.27 | kg |

TABLE 37-continued

Nutritional Composition Ingredients for Example 54 and other Exemplified Compositions

| Sample ID: | AET-C Amount/ 1000 kg | AET-C Unit | AET-1 Amount/ 1000 kg | AET-1 Unit | AET-2 Amount/ 1000 kg | AET-2 Unit | AET-3 Amount/ 1000 kg | AET-3 Unit | AET-4 Amount/ 1000 kg | AET-4 Unit |
|---|---|---|---|---|---|---|---|---|---|---|
| Non-Fat Dry Milk | 22.06 | kg | 22.06 | Kg | 22.06 | kg | 22.06 | kg | 22.06 | kg |
| High Oleic Safflower Oil | 13.44 | kg | 12.78 | Kg | 12.78 | kg | 12.78 | kg | 12.78 | kg |
| Soy Oil | 10.06 | kg | 9.57 | Kg | 9.57 | kg | 9.57 | kg | 9.57 | kg |
| Coconut Oil | 9.60 | kg | 9.13 | Kg | 9.13 | kg | 9.13 | kg | 9.13 | kg |
| Galactooligo-saccharides | 9.40 | kg | 9.40 | Kg | 9.40 | kg | 9.40 | kg | 9.40 | kg |
| Whey Protein Concentrate | 6.31 | kg | 6.31 | Kg | 6.31 | kg | 6.31 | kg | 6.31 | kg |
| MDG Oil | 0 | kg | 1.62 | Kg | 1.62 | kg | 1.62 | kg | 1.62 | kg |
| Ascorbic Acid | 611.99 | g | 611.99 | G | 611.99 | g | 611.99 | g | 611.99 | g |
| Calcium Carbonate | 559.70 | g | 559.70 | G | 559.70 | g | 559.70 | g | 559.70 | g |
| Potassium Citrate | 545.40 | g | 545.40 | G | 545.40 | g | 545.40 | g | 545.40 | g |
| ARASCO Mortierella Alpina Oil | 395.30 | g | 395.30 | G | 395.30 | g | 395.30 | g | 395.30 | g |
| Potassium Hydroxide, 45% | 368.00 | g | 368.00 | G | 368.00 | g | 368.00 | g | 368.00 | g |
| Lecithin | 346.99 | g | 346.99 | G | 346.99 | g | 346.99 | g | 346.99 | g |
| Myverol | 346.99 | g | 346.99 | G | 346.99 | g | 346.99 | g | 346.99 | g |
| Nucleotide-Choline Premix | 314.15 | g | 314.15 | G | 314.15 | g | 314.15 | g | 314.15 | g |
| DHASCO Crypth. Cohnii Oil | 208.80 | g | 208.80 | G | 208.80 | g | 208.80 | g | 208.80 | g |
| Vitamin/Mineral/ Taurine Premix | 176.00 | g | 176.00 | G | 176.00 | g | 176.00 | g | 176.00 | g |
| Carrageenan | 175.26 | g | 175.26 | G | 175.26 | g | 175.26 | g | 175.26 | g |
| Sodium Citrate | 163.00 | g | 163.00 | G | 163.00 | g | 163.00 | g | 163.00 | g |
| Sodium Chloride | 145.30 | g | 145.30 | G | 145.30 | g | 145.30 | g | 145.30 | g |
| Magnesium Chloride | 126.50 | g | 126.50 | G | 126.50 | g | 126.50 | g | 126.50 | g |
| Potassium Phosphate Dibasic | 117.60 | g | 117.60 | G | 117.60 | g | 117.60 | g | 117.60 | g |
| Ferrous sulfate | 66.50 | g | 66.50 | G | 66.50 | g | 66.50 | g | 66.50 | g |
| Choline Chloride | 44.97 | g | 44.97 | G | 44.97 | g | 44.97 | g | 44.97 | g |
| Vitamin A, D3, E, K1 | 35.80 | g | 35.80 | G | 35.80 | g | 35.80 | g | 35.80 | g |
| Magnesium Sulfate | 27.40 | g | 27.40 | G | 27.40 | g | 27.40 | g | 27.40 | g |
| Zinc Sulfate | 17.90 | g | 17.90 | G | 17.90 | g | 17.90 | g | 17.90 | g |
| Lutein | 12.35 | g | 12.35 | G | 12.35 | g | 12.35 | g | 12.35 | g |
| L-Carnitine | 5.50 | g | 5.50 | G | 5.50 | g | 5.50 | g | 5.50 | g |
| Cupric Sulfate | 1.90 | g | 1.90 | G | 1.90 | g | 1.90 | g | 1.90 | g |
| Manganese Sulfate | 110.00 | mg | 110.00 | Mg | 110.00 | mg | 110.00 | mg | 110.00 | mg |
| Citric Acid | As needed | | As needed | | As needed | | As needed | | As needed | |
| Potassium Iodide | As needed | | As needed | | As needed | | As needed | | As needed | |
| Sodium Selenate | As needed | | As needed | | As needed | | As needed | | As needed | |
| Potassium Chloride | As needed | | As needed | | As needed | | As needed | | As needed | |

Male Sprague Dawley rats weighing between 280 and 330 grams were all fed a normal commercially available Purina Rat Chow for one week. Rats were then fasted overnight prior to surgery, and under anesthesia, a laparotomy was performed, and the intestinal lymph duct was cannulated according to the procedure of Tso et al., "The Absorption of Lipid and Lipoprotein Synthesis," *Lipid Research Methodology*, Chapter 5: 191-216 (1984) Alan R. Liss, Inc., NY, NY, hereby incorporated by reference to the extent consistent herewith. The superior mesenteric artery was isolated, but not occluded. A silicon infusion tube (1.6 mm OD) was placed in the stomach for future infusion of a test sample. The fundic incision was closed by a purse string suture. The rats were allowed to recover for 24 hours before infusion began.

The rats were randomly assigned to receive one of the five nutritional compositions being tested. (The number of rats in each group, e.g. "(n=7)," is shown in the key for FIG. 18.) The animals were intragastrically infused 24 hours after surgery with 3 ml of their respective test nutritional compositions.

Lymph was collected in pre-cooled tubes for 1 hour to measure fasting levels of triglycerides, palmitic acid, linoleic acid, and alpha linolenic acid before the nutritional composition infusions began. Lymph was then collected in pre-cooled tubes hourly for 6 hours after initiation of infusion. At the end of the experiment, the rats were sacrificed by exsanguination.

The lymph lipids were extracted and analyzed for triglycerides, palmitic acid, linoleic acid, and alpha-linolenic acid using high-performance liquid chromatography (Craft Technologies, Wilson, NC).

Figure 18:
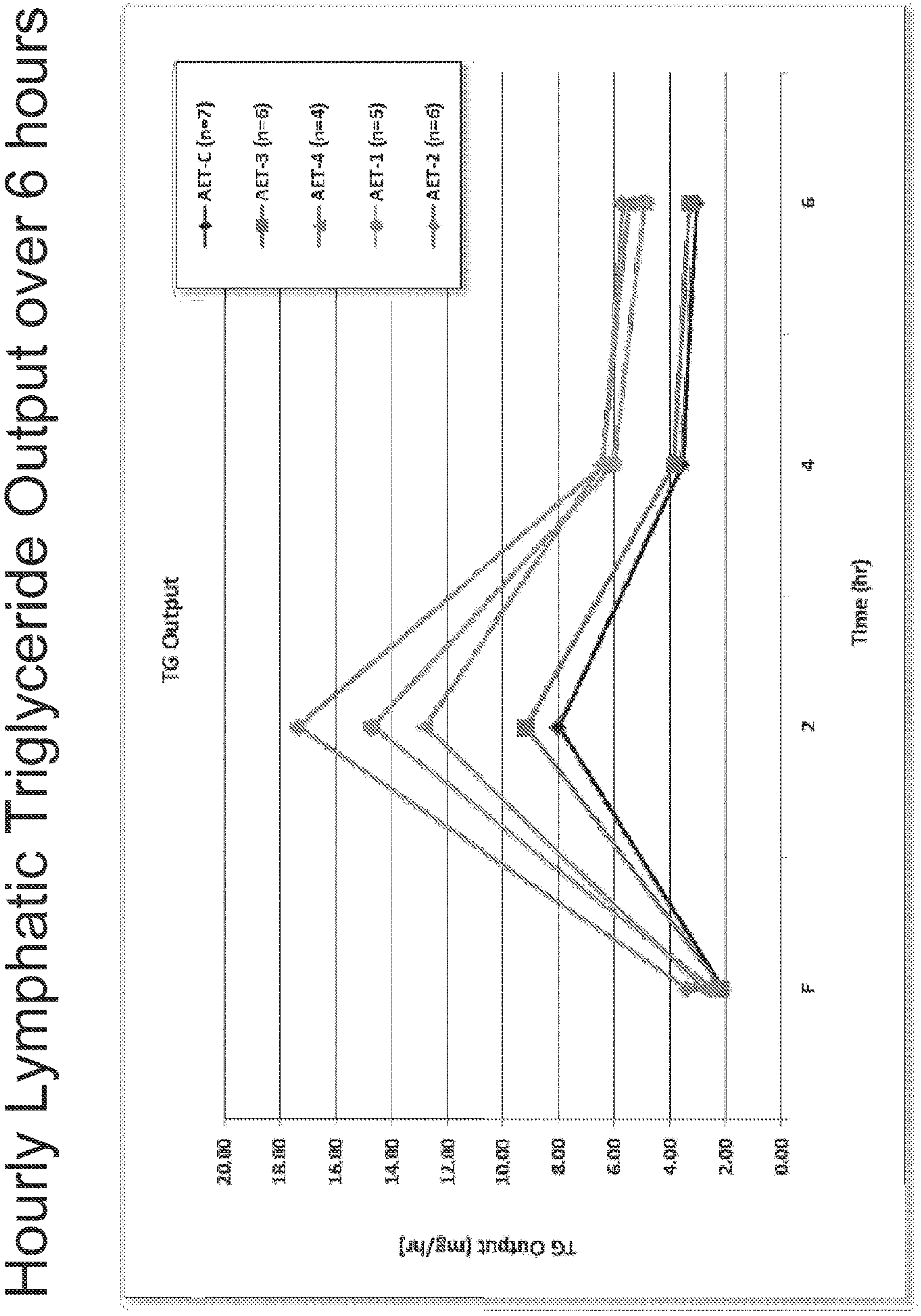
FIG. 18 shows the lymphatic output of triglycerides over a period of 6 hours following infusion of variable nutritional compositions.
Figure 19:
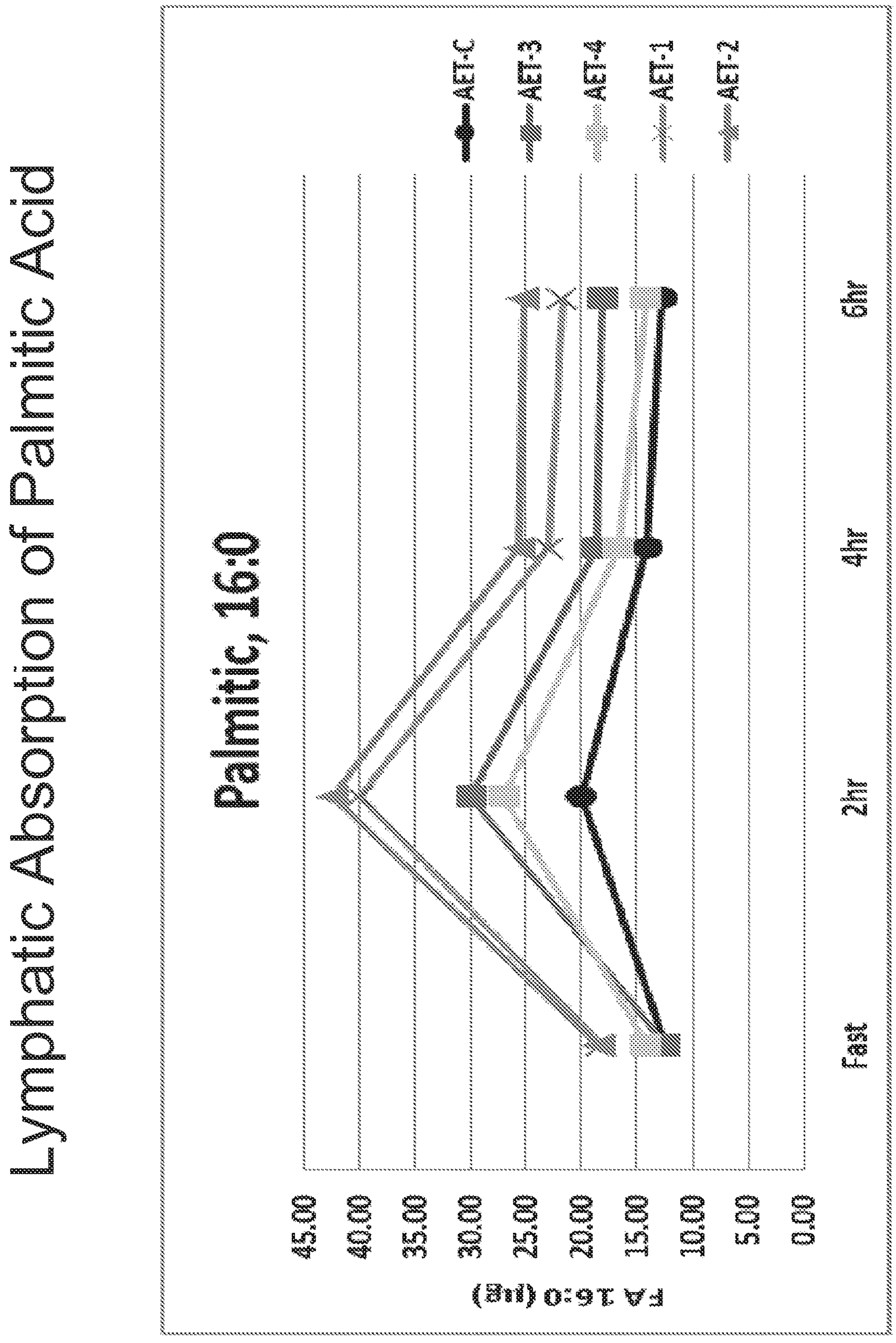
FIG. 19 shows the lymphatic absorption of palmitic acid over a 6 hour period following infusion of variable nutritional compositions.
Figure 20:
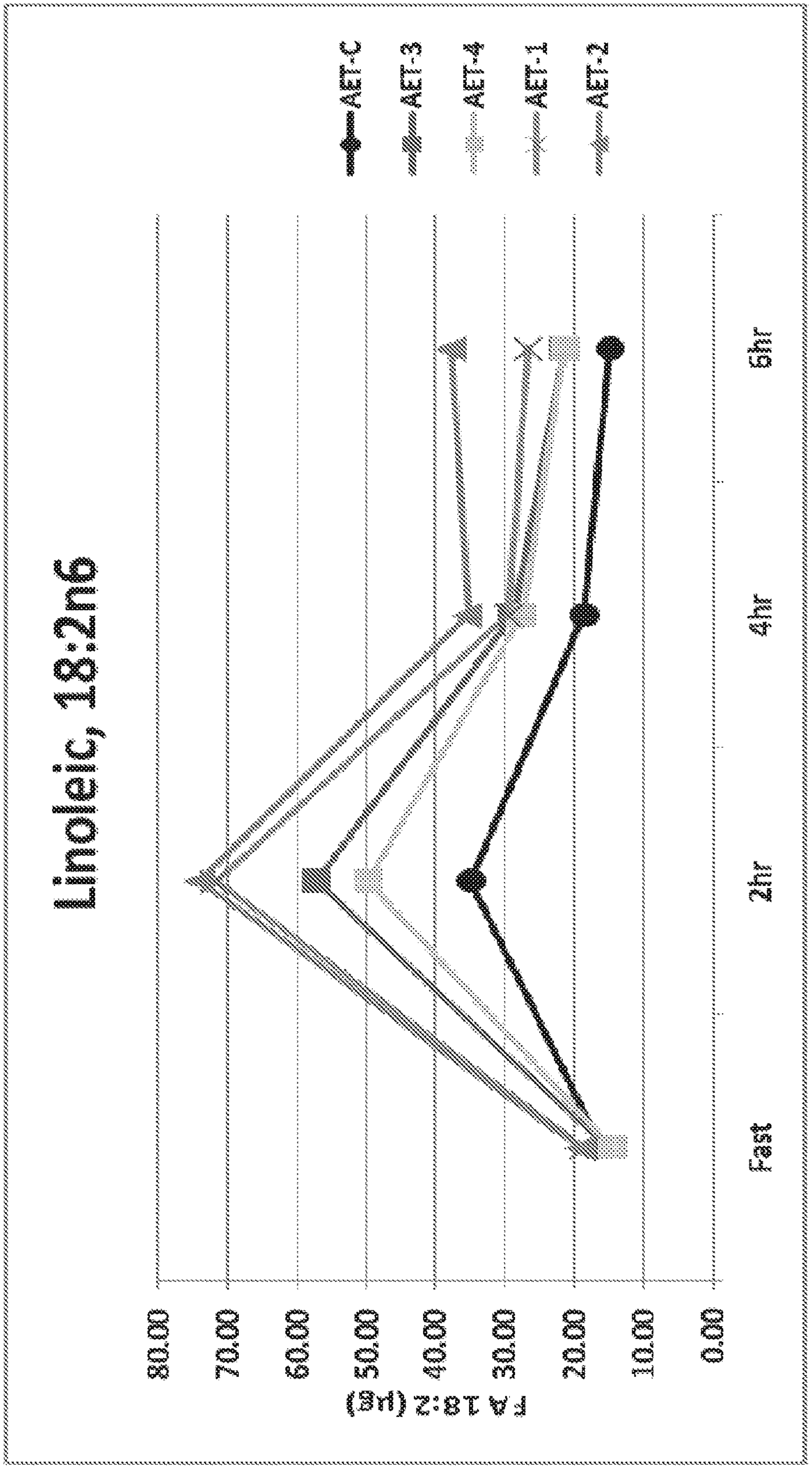
FIG. 20 shows the lymphatic absorption of linoleic acid over a 6 hour period following infusion of variable nutritional compositions.
Figure 21:
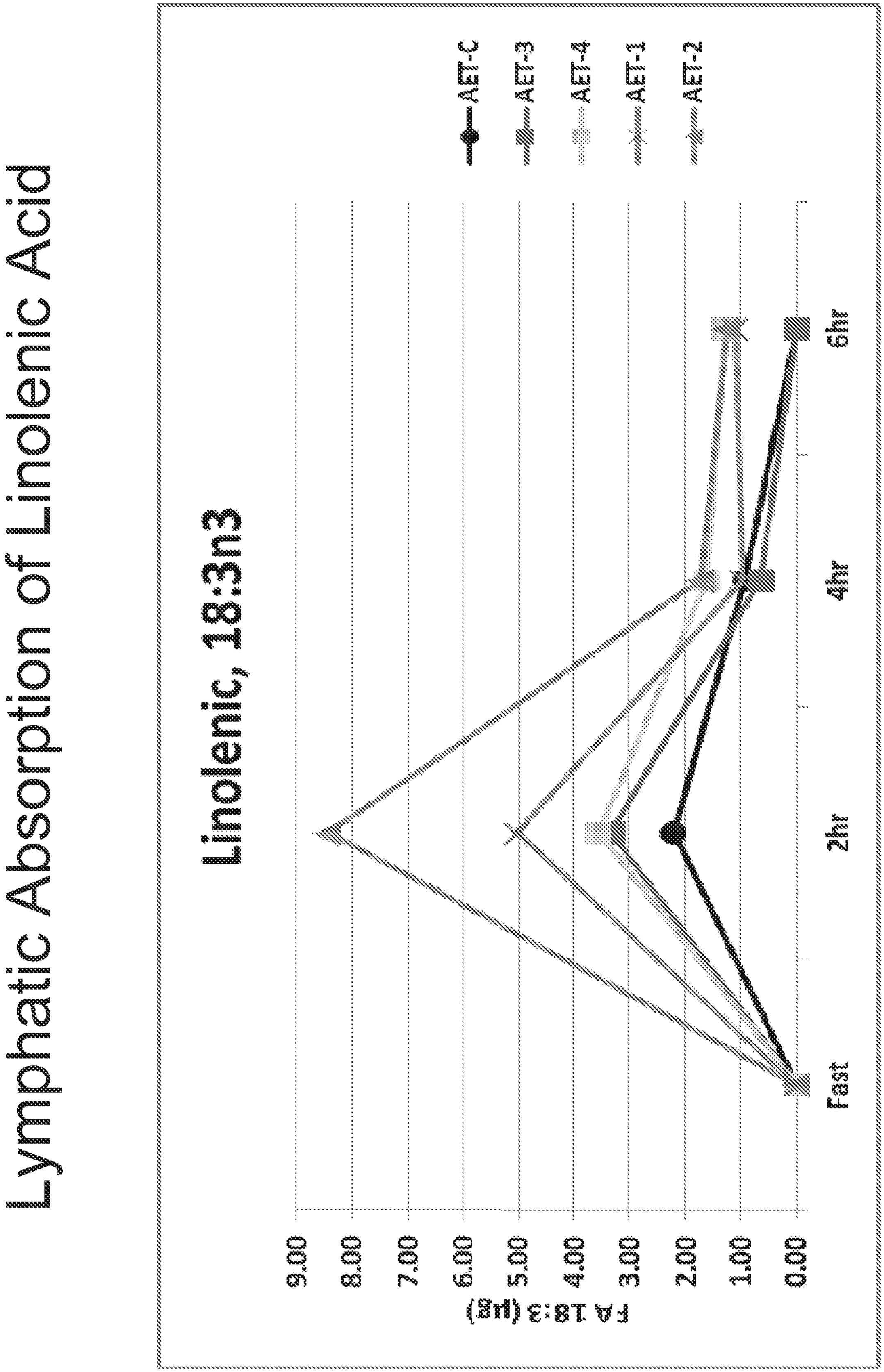
FIG. 21 shows the lymphatic absorption of alpha-linolenic acid over a period of 6 hours following infusion of variable nutritional compositions.

FIG. 18 shows the lymphatic output of triglycerides over a period of 6 hours following infusion of the liquid nutritional compositions. FIG. 19 shows the lymphatic absorption of palmitic acid over a 6 hour period following infusion of the liquid nutritional compositions. FIG. 20 shows the lymphatic absorption of linoleic acid over a 6 hour period following infusion of the liquid nutritional compositions. FIG. 21 shows the lymphatic absorption of alpha-linolenic acid over a period of 6 hours following infusion of the liquid nutritional compositions.

As shown in FIG. 18, the mean fasting lymphatic triglyceride output for all groups of rats varied between about 2.0 and 3.5 mg/hr. In all groups, lymphatic triglyceride output increased after infusion of each nutritional composition began and reached a maximum output of about 8 to about 17.5 mg/hr two hours after infusion began. The control group (AET-C) and the group receiving MDG oil that was not activated (AET-3) showed modest increases in the lymphatic triglyceride output, with a triglyceride output of about 8 to about 9 mg/hr two hours after infusion began. However, the groups receiving either an activated MDG component (AET-2 and AET-4) or an MDG-protected premix (AET-1) showed greater lymphatic triglyceride output, with a triglyceride output of about 13 to about 17.5 mg/hr two hours after infusion of the nutritional compositions began.

As shown in FIG. 18, the mean fasting lymphatic triglyceride output for all groups of rats varied between about 2.0 and 3.5 mg/hr. In all groups, lymphatic triglyceride output increased after infusion of each nutritional composition began and reached a maximum output of about 8 to about 17.5 mg/hr two hours after infusion began. The control group (AET-C) and the group receiving MDG oil that was not activated (AET-3) showed modest increases in the lymphatic triglyceride output, with a triglyceride output of about 8 to about 9 mg/hr two hours after infusion began. However, the groups receiving either an activated MDG component (AET-2 and AET-4) or an MDG-protected premix (AET-1) showed greater lymphatic triglyceride output, with a triglyceride output of about 13 to about 17.5 mg/hr two hours after infusion of the nutritional compositions began.

FIG. 20 shows the lymphatic absorption of linoleic acid for 6 hours following infusion of the five nutritional compositions. The lymphatic absorption of linoleic acid increased in all groups during the first two hours and fell to a steady state from about 4 to 6 hours after infusion of the nutritional compositions began. However, there was a marked increase in the lymphatic absorption of linoleic acid two hours after infusion began for the nutritional compositions containing some form of MDG oil (AET-1 to AET-4), when compared with the nutritional composition containing the triglyceride control with no MDG oil (AET-C).

FIG. 21 shows the lymphatic absorption of alpha-linolenic acid for 6 hours following infusion of the five nutritional compositions. The lymphatic absorption of alpha-linolenic acid increased in all groups during the first two hours and fell to a steady state from about 4 to 6 hours after infusion of the nutritional compositions began. However, there was a marked increase in the lymphatic absorption of alpha-linolenic acid two hours after infusion began for the nutritional compositions containing some form of MDG oil (AET-1 to AET-4), when compared with the nutritional composition containing the triglyceride control with no MDG oil (AET-C).

Example 55

In this Example, the nutritional compositions evaluated in Example 1 were further tested for lutein that is not solubilized by the fat in the nutritional compositions. The five compositions, AET-C, AET-1, AET-2, AET-3 and AET-4, were each subjected to high speed centrifugation (31,000×g; 20° C.; 4 h). The aqueous fraction of each centrifuged nutritional composition was diluted 2:8 with water, and the diluted aqueous fractions were filtered through 0.45 μm PTFE membranes. The visible absorbance of the diluted aqueous fractions was measured at 476 nm (a lutein absorbance maximum). The absorbance readings (milliabsorbance units per gram of aqueous fraction (mAU/g)) are reported in Table 3 below, along with a ranking of the in vivo lutein response for the same compositions tested in Example 1.

TABLE 38

Relationship between Lutein in the Aqueous Fraction with in vivo Response

| Sample ID | Absorbance, mAU/g, 476 nm | Ranking of in vivo lutein response |
|---|---|---|
| AET-C | 57.6 | 1 (lowest response) |
| AET-1 | 62.7 | 4 |
| AET-2 | 61.3 | 3 |
| AET-3 | 59.4 | 2 |
| AET-4 | 64.9 | 5 (highest response) |

As may be seen from the table, the absorbance values correlate with the in vivo results, in that each of the nutritional compositions comprising an activated MDG premix (AET-2 and AET-4) or an MDG-protected premix (AET-1) have higher lutein absorbance values than do the control nutritional composition (AET-C) or the nutritional composition that does not comprise an activated premix (AET-3). More lutein is present in the aqueous fraction of the nutritional compositions comprising an activated MDG premix or an MDG-protected premix. Thus, the relative bioavailability of lutein, as demonstrated by in vivo testing, was accurately predicted by in vitro testing using this method.

Example 56

In this Example, the effect on the bioavailability of DHA in nutritional compositions containing an activated MDG premix or an MDG-protected premix is evaluated and compared to the bioavailability of DHA that is in nutritional compositions without the activated MDG premix or the MDG-protected premix.

Figure 22:
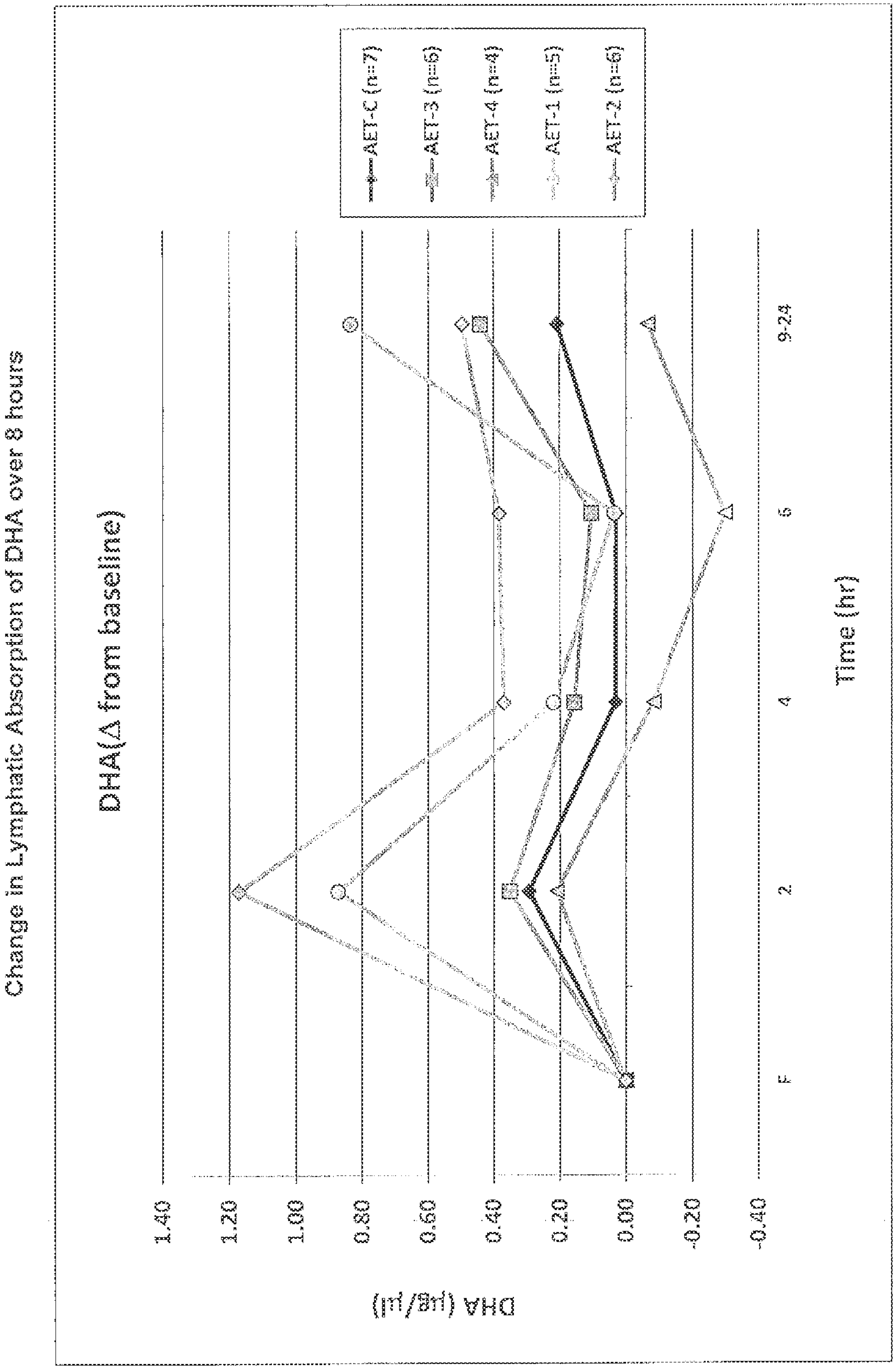
FIG. 22 shows the change in lymphatic output of DHA over time following the administration of variable nutritional compositions.

A similar protocol for animal infusion and lymph collection as described in Example 1 was followed, including the infusion of the same nutritional compositions (e.g., compositions AET-C, AET-1, AET-2, AET-3 and AET-4). The lymph lipids were extracted and analyzed for DHA concentration using high-performance liquid chromatography. FIG. 22 shows the change in lymphatic output of DHA over time. There was a significant increase in lymph levels of DHA from the initial (fasting) levels to the DHA levels in the 6 hrs following infusion for the nutritional compositions containing an activated premix (AET-2) or an MDG-protected premix (AET-1). In comparison, the control nutritional composition (AET-C) and the nutritional composition that does not comprise an activated premix (AET-3) showed only a modest increase in the lymph levels of DHA over time.

Example 57

A study was conducted to compare a commercially representative nutritional powder with and without MDG. Nutritional powder batches (control and MDG) were reconstituted (152 g/L), centrifuged (31,000×g/20° C./4 h), and the MDG concentration in the aqueous fraction of samples was estimated by HPLC determination of monolinolein and monoolein, and represented as mg of MDG per kg of aqueous fraction.

TABLE 39

MDG presence in the Aqueous Fraction after Nutritional Composition Centrifugation

| Batch | 08/15/13 | 09/19/13 | 11/05/13 | 02/15/14 |
|---|---|---|---|---|
| AET-C (no MDG) | <70 | <40 | <20 | NT (not tested) |
| AET-1 | 144 | 120 | NT | NT |
| AET-2 | NT | 150 | NT | NT |
| AET-3 | NT | 90 | 118 | NT |
| AET-4 | 178 | 140 | 115 | NT |
| AET4-5 | NT | NT | 127 | NT |
| A455 (no MDG) | NT | NT | NT | <10 |
| A456 | NT | NT | NT | 30 |
| A457 | NT | NT | NT | 40 |
| A458 | NT | NT | NT | 40 |

A measurable presence of MDG in the aqueous fractions of all MDG samples was detected, and an absence of MDG in the aqueous fraction of all control batches, was verified by LC/UV analysis. The significance of the data is that (a) MDG is present in the Aqueous Fraction (despite its very low water solubility), and that (b) the MDG concentration is generally correlated with in vivo lutein availability.

Example 58

A study was conducted to investigate the distribution of lutein and MDG within the nutritional compositions. Sample were prepared using homogenization at 150/20 bar, and then centrifuged at 100,000×g for 1 hour. The different layers (e.g., cream, aqueous, and pellet) were then analyzed for the presence of lutein and MDG.

The results demonstrate that nutritional compositions comprising MDG provided MDG and lutein within the aqueous phase, wherein these molecules have very limited water solubility. Specifically, it was found that lutein and MDG were present in the aqueous phase, following centrifugation, at approximately 4 wt % and approximately 8 wt % of the nutritional composition respectively. This suggests that the lutein found in the aqueous phase is associated with water-soluble complexes. It should be noted that the pellet contained approximately 1% of the lutein, suggesting that lutein could be associated with a sedimentable assembly as well.

Example 59

A study was conducted to investigate the dispersibility/solubility of MDG (mono- and diglycerides) in various aqueous preparations as evaluated by HPLC. The MDG was added to water at 95° C., RT, and then the samples were subjected to high speed centrifugation at 20° C., and are reported in the table below.

TABLE 40

MDG Alone has Limited Solubility in the Aqueous Fraction

| MDG Preparation | Soluble MDG, as mg per kg | Soluble MDG, as % of total MDG |
|---|---|---|
| 1.00% (w/w) MDG suspension in 95° C. water | 1980 | 19.8% |
| Room temperature filtrate of 1.00% (w/w) MDG suspension | −32 | −0.32% |
| Centrifugation supernatant of room temperature filtrate | −16 | −0.16% |

The MDG present following centrifugation was very limited, and is in stark contrast to the MDG present within the aqueous phase following centrifugation of the nutritional composition. This suggests that the solubility of MDG, along with the lipophilic compound, is increased in nutritional compositions comprising MDG, at least one lipophilic compound, and at least one hydrophobic protein.

Example 60

A study was conducted to further investigate the distribution of lutein and MDG within the nutritional composition. Samples included MDG/lutein/water; MDG/lutein/NFDM/water; MDG/lutein/WPC/water; and MDG/water.

The premixes were provided as follows: in samples that contained lutein, lutein was heated for 2 h at 50° C. with shaking. In samples that contained MDG (GMO-40) and lutein, lutein was added to MDG and heated to 50-60° C. and mixed for 10 minutes. In samples that contained protein, non-fat dried milk was added to water (50-60° C.) with agitation and allowed to hydrate for approximately 10 min.

The samples were prepared as follows: for solution 1, water was heated to 50-60° C., an lutein in GMO-40 blend and turrax (30 sec 10000 rpm) was added; for solution 2, NFDM was placed in water solution heated to 50-60° C., and lutein was added in GMO-40 blend and turrax (30 sec 10000 rpm); for solution 3, water was heated to 50-60° C., and GMO-40 blend and turrax (30 sec 10000 rpm) was added. The solutions are listed in the table below as X.1, wherein 1 is the solution.

TABLE 41

Batch Details for Example 60

| | MDG + lutein | MDG + lutein + NFDM | | MDG + lutein + WPC | MDG |
|---|---|---|---|---|---|
| sample | 3.1 | 3.2 | 3.2-1 | 3.2-2 | 3.3 |
| lutein | 0.0695 | 0.0601 | 0.0601 | 0.0601 | 0 |
| GMO-40 | 9.18 | 7.94 | 7.94 | 7.94 | 9.18 |
| dried milk (nonfat dried milk, NFDM) | 0 | 107.98 | 107.98 | 0 | 0 |
| Whey protein concentrate 80 (WPC) | 0 | 0 | 0 | 107.98 | 0 |
| water | 790.75 | 684.02 | 684.02 | 684.02 | 790.82 |
| TOTAL [g] | 800 | 800 | 800 | 800 | 800 |

Samples were formulated as detailed above, and then characterized by ultrafiltration with various membranes, as well as ultracentrifuged at various times and speed (e.g., 100,000×g, 4,500×g, and 1,000×g). The details of the different centrifugation/filtration method are listed below.

Speed of centrifugation: 1000×g, Centrifugation time: 15 min, Centrifugation temperature: 20° C., Centrifuge tubes: Cellstar tube 50 ml from Greiner bio-one, Tube diameter: 23 mm, Amount of product in tube: 45 ml, Centrifuge: type 5810 R from Eppendorf, aqueous phase isolation by syringe through the cream layer.

Speed of centrifugation: 4500×g, Centrifugation time: 15 min, Centrifugation temperature: 20° C., Centrifuge tubes: Cellstar tube 50 ml from Greiner bio-one, Tube diameter: 23 mm, Amount of product in tube: 45 ml, Centrifuge: type 5810 R from Eppendorf, aqueous phase by syringe through the cream layer.

Speed of centrifugation: 100,000×g, Centrifugation time: 1 h, Centrifugation temperature: 20° C., Centrifuge tubes: Ultra Clear Centrifuge tubes from Beckmann Coulter, Tube size: 14×89 mm, Amount of product in tube: 11.3 g, Centrifuge: type L-90K from Beckmann Coulter, aqueous phase isolation by freezing the tube with content in liquid nitrogen and cutting the part with the serum phase including the tube wall followed by thawing the content of this part of the tube.

Membrane: Centrifugal filter units from Amicon Ultra; 100 kDa and 10 kDa, Centrifugation speed: 4000 g, Centrifugation time: 30 min, Centrifugation temperature: 20° C., Centrifuge tubes: Cellstar tube 50 ml from Greiner bio-one, Tube diameter: 23 mm, Amount of product in tube: 45 ml, Centrifuge: type 5810 R from Eppendorf, Serum isolation by removing the filter form the tube and decanting the filtrate.

Centrifugation speed (Lumifuge): 1000 g, Centrifugation time: 255 min, Light factor: 1, Centrifugation temperature: 20° C., Lumifuge: type Centrifuge lumiview 110 from LUM Gmbh.

Following centrifugation and/or ultrafiltration, samples were analyzed for the presence of lutein, and MDG within the different phases.

Lutein analysis as done by RP-HPLC-DAD, and MDG analysis was done by RP-HPLC-UV-ELSD. In MDG analysis, samples were prepared as follows: samples were weighed at 0.15 g in a 20 mL tell bottle; the solution was stirred on a magnetic stirrer in the fume hood; 15.0 mL or 13.5 mL, 80% acetone+20% chloroform were added with a measuring cylinder.

Stir the solution for 10 minutes on a magnetic stirrer in a water bath at ±50° C. (warm water from the tap); the solution was sonicated for 10 minutes at room temperature; 1.5 mL of sample was centrifuged in a 1.5 mL centrifuge tube, 10 min at 20.000×g; 20 uL of the supernatant was injected on the HPLC column. UV spectroscopy of the samples was performed with wavelength scans (200-900 nm at 5 nm intervals) at 20° C. using a Cary 4000 UV-Vis Spectrophotometer (Varian BV). All measurements were carried out in quartz cuvettes with a 1 mm path length.

Qualitatively, samples without protein resulted in more appreciable amounts of precipitated lutein along the side of the sample flasks. This suggests that there is an optimal interaction between lutein, hydrophobic protein and MDG to achieve the water soluble assembly.

Figure 23:
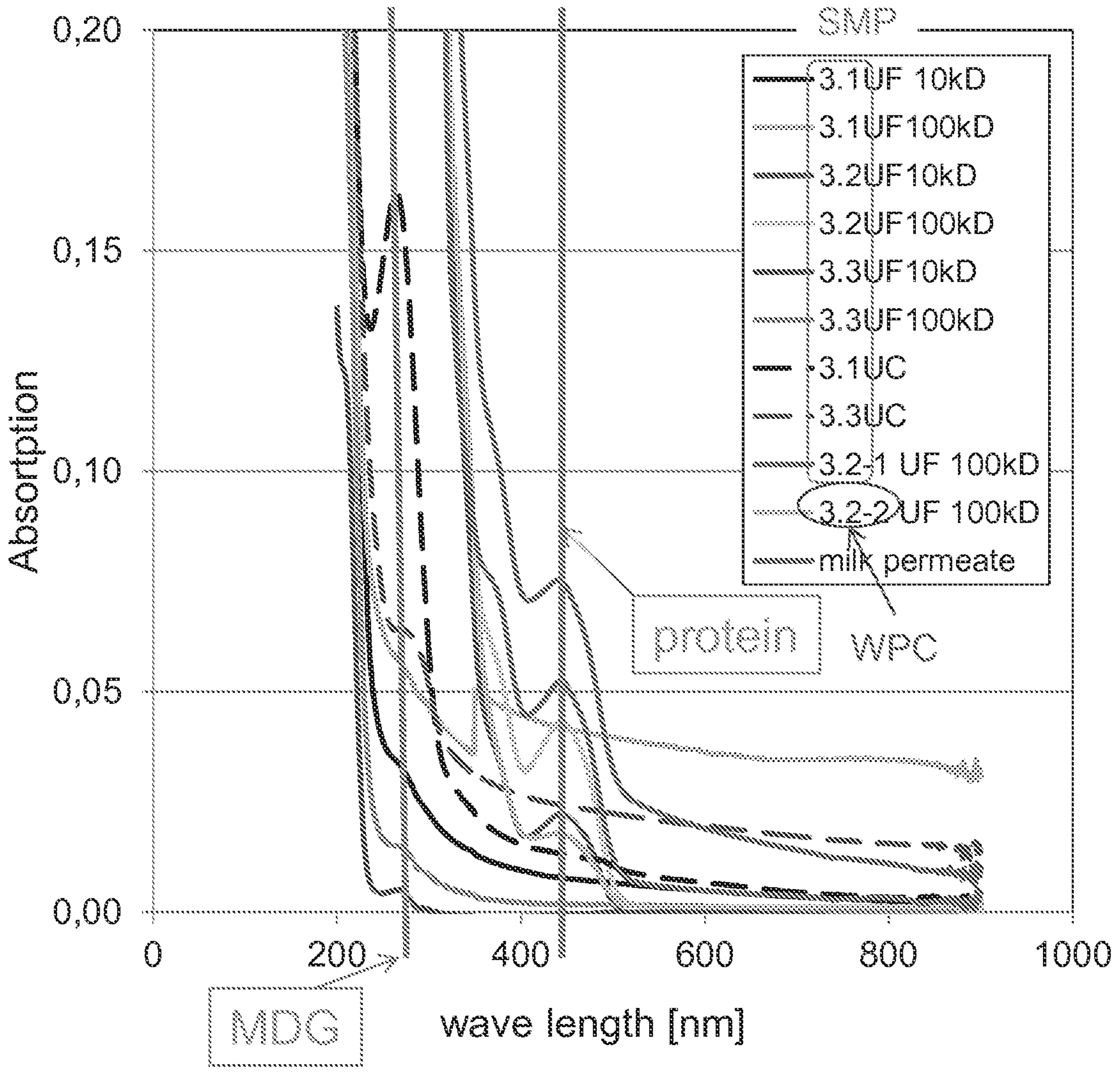
FIG. 23 shows UV spectra of the aqueous fractions of variable nutritional compositions. UF: ultrafiltration with membrane of 10 kD or 100 kD; UC: centrifugation method C (100,000×g); SMP: skimmed milk powder/nonfat dried milk; WPC: whey protein concentrate 80.

In the ultrafiltration analysis, no lutein or MDG passed through the 100 kD filter, this was across all samples (FIG. 23).

The results also demonstrated that the presence of protein resulted in more lutein and MDG in the aqueous phase. Furthermore, when comparing WPC vs. NFDM, WPC resulted in both more lutein and MDG in the aqueous phase. There may be different particle characteristics (e.g., size) of for the WPC batch, that results in greater distribution of lutein and MDG in the aqueous phase, relative to NFDM.

Centrifugation at 100,000×g: lutein was only found in the aqueous phase of samples containing protein; negligible lutein was found in aqueous phases of samples containing only lutein and MDG.

Centrifugation at 4,500×g: similar amounts of lutein were found in the aqueous phase of samples containing NFDM and WPC. More MDG was found in the aqueous phase of samples containing WPC than NFDM. Additionally, concentrations of lutein and MDG in the aqueous were considerably higher than in those of protein-free systems centrifuged at 1,000×g.

Centrifugation at 1,000×g: resulted in considerably higher amounts of lutein in the aqueous phase of samples with NFDM, than without. Specifically, ~20% lutein was found in the aqueous phase at this centrifugation speed. Overall, the data suggest that there is an optimal interaction between lutein, hydrophobic protein and MDG to achieve the water soluble assembly.

TABLE 42

Centrifugation/Ultrafiltration Analysis of Variable MDG Batches

| | 3.1 | | 3.2 | | 3.2-1 | | 3.2-2 | | 3.3 | |
|---|---|---|---|---|---|---|---|---|---|---|
| sample | Lutein | MDG | Lutein | MDG | Lutein | MDG | Lutein | MDG | Lutein | MDG |
| Ultrafiltration | n.a. | n.a. | n.a. | n.a. | n.d. | n.d. | n.d. | n.d. | n.a. | n.a. |
| Centrifugation method A (1000 g) | 0.1 | 0.047 | 3.3 | 3.572 | n.d. | n.d. | n.d. | n.d. | n.a | 0.234 |
| Centrifugation method B (4500 g) | n.d. | n.d. | n.d. | n.d. | 1.6 | 1.967 | 1.6 | 3.01 | n.d. | n.d. |
| Centrifugation method C (100,000 g) | n.a. | n.a | 0.2 | 1.59 | n.d. | n.d. | n.d. | | n.a. | n.a |
| Overall sample | | | | | 13.1 | 7.33 | 15.4 | 8.44 | | |

Example 61

A study was conducted to investigate the effect of shelf-life on MGD batches. Different MDG bathes included, 18 month old batch, 24 month old batch (AET-1), and the control. The different MDG batches were examined in the lymphatic model as described in Example 20.

Figure 24:
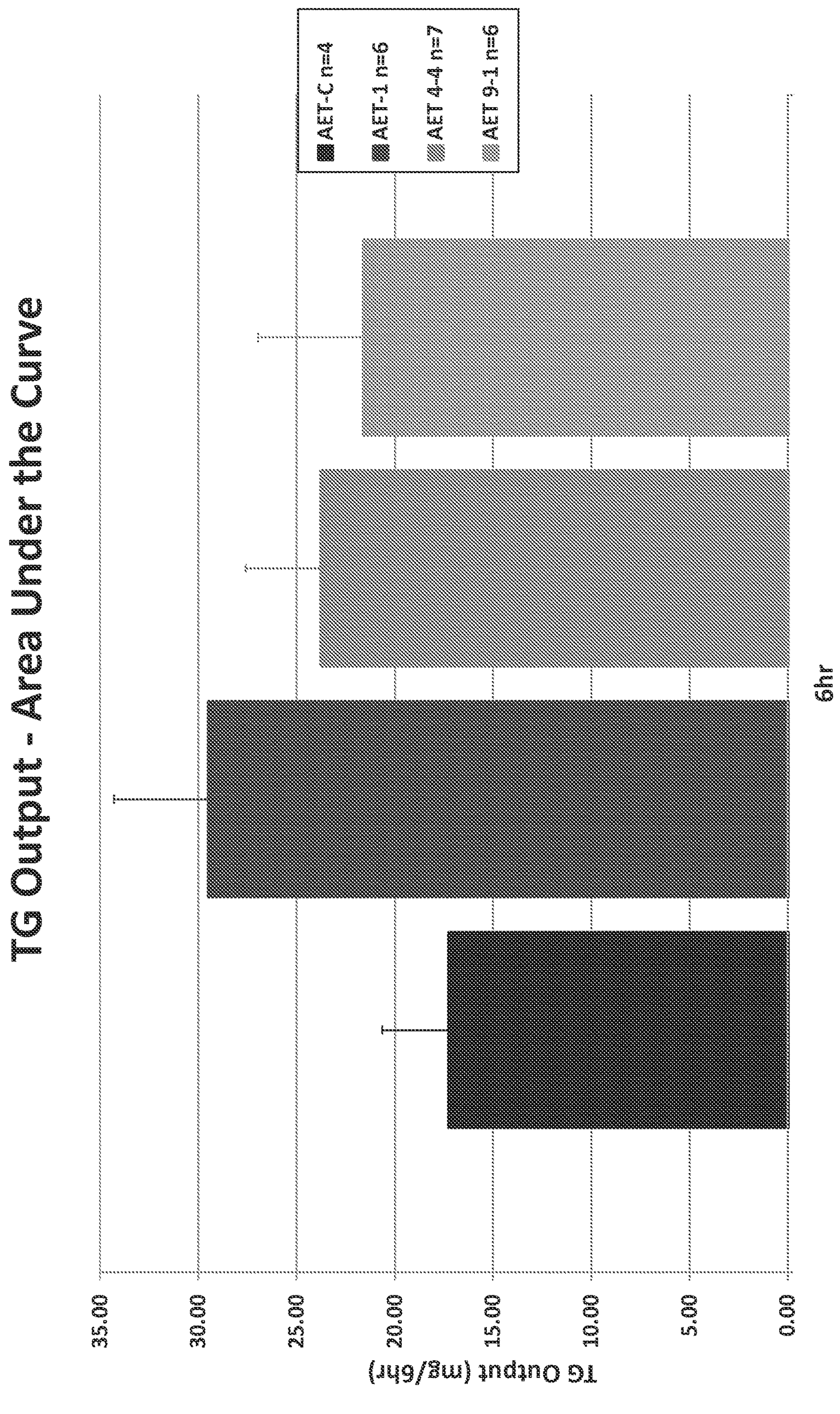
FIG. 24 shows lymphatic triglyceride output over a 6 hour period following administration of variable nutritional compositions, wherein the compositions are stratified based on length of time post-production.

The results demonstrate that the older batch of bounty performed at similar levels as the newer batch in the bioavailability of lutein (FIG. 24). This suggests that the assembly of the nutritional composition is stable for at least 24 months.

What is claimed is:

1. A nutritional composition comprising an emulsion of an aqueous phase and a lipid phase:

wherein the lipid phase includes triglycerides;

wherein the aqueous phase includes a carbohydrate and assemblies comprising:

a vitamin comprising one or more of vitamins A, D, E, or K;

a hydrophobic protein;

a phospholipid; and a monoglyceride and diglyceride oil (MDG oil); and wherein at least 5% of the assemblies remains in the aqueous phase after centrifugation at 31,000×g for one hour at 20° C.

2. The nutritional composition of claim 1, wherein the phospholipid comprises one or more of lecithin, glycerol phospholipids, phosphatides, or combinations thereof.

3. The nutritional composition of claim 1, wherein the phospholipid comprises one or more of phosphatidylcholine, phosphatidylethanolamine, phosphatidylinositol, or combinations thereof.

4. The nutritional composition of claim 1, wherein the nutritional composition comprises from 10 mg/kg to 5 g/kg of the phospholipid.

5. The nutritional composition of claim 1, wherein the nutritional composition comprises from 140 mg/kg to 900 mg/kg of the MDG oil.

6. The nutritional composition of claim 1, wherein the MDG oil comprises from 10 wt. % to 80 wt. % of monoglycerides.

7. The nutritional composition of claim 6, wherein the MDG oil comprises from 25 wt. % to 50 wt. % of monoglycerides.

8. The nutritional composition of claim 1, wherein the nutritional composition comprises: from 140 mg/kg to 900 mg/kg of the MDG oil; and from 10 mg/kg to 5 g/kg of the phospholipid.

9. The nutritional composition of claim 1, wherein the assembly further comprises a ganglioside.

10. The nutritional composition of claim 1, wherein an amount of the vitamin in the aqueous phase after centrifugation at 31,000×g for one hour at 20° C. is increased by at least 1% compared to the same nutritional composition but without the MDG oil.

11. The nutritional composition of claim 1, wherein the nutritional composition provides an increase in bioavailability of the vitamin when administered to a subject, compared with the same nutritional composition but without the MDG oil.

12. A method of preparing a nutritional composition, the method comprising:

(a) mixing a vitamin comprising one or more of vitamins A, D, E, and K; a phospholipid; and a monoglyceride and diglyceride oil (MDG oil) to form a premix, the premix containing less than 20% by weight triglycerides;

(b) combining the premix with a protein-in-water slurry containing one or more hydrophobic proteins to form water-soluble assemblies comprising the vitamin, the phospholipid, the MDG oil, and the one or more hydrophobic proteins;

(c) combining the result of step (b) with one or more additional nutritional components, wherein at least one of the one or more additional nutritional components comprises triglycerides; and (d) emulsifying to produce a liquid nutritional composition having an aqueous phase and a lipid phase, in which at least a portion of the assemblies remain in the aqueous phase.

13. The method of claim 12, wherein the phospholipid comprises one or more of lecithin, glycerol phospholipids, phosphatides, or combinations thereof.

14. The method of claim 12, wherein the phospholipid comprises one or more of phosphatidylcholine, phosphatidylethanolamine, phosphatidylinositol, or combinations thereof.

15. The method of claim 12, wherein the nutritional composition comprises from 10 mg/kg to 5 g/kg of the phospholipid.

16. The method of claim 12, wherein the nutritional composition comprises from 140 mg/kg to 900 mg/kg of the MDG oil.

17. The method of claim 12, wherein the MDG oil comprises from 10 wt. % to 80 wt. % of monoglycerides.

18. The method of claim 17, wherein the MDG oil comprises from 25 wt. % to 50 wt. % of monoglycerides.

19. The method of claim 12, wherein at least 5% of the assemblies remain in the aqueous phase after centrifugation of the nutritional composition at 31,000×g for one hour at 20° C.

20. The method of claim 12, wherein the nutritional composition provides an increase in bioavailability of the vitamin when administered to a subject, compared with the same nutritional composition but without the MDG oil.

21. The method of claim 12, further comprising converting the liquid nutritional composition to a powdered nutritional composition.

* * * * *